United States Patent
Hamada

(10) Patent No.: US 7,266,277 B2
(45) Date of Patent: Sep. 4, 2007

(54) OPTICAL DEVICE, OPTICAL DEVICE MANUFACTURING METHOD, AND OPTICAL INTEGRATED DEVICE

(75) Inventor: Hidenobu Hamada, Amagasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 119 days.

(21) Appl. No.: 10/534,835

(22) PCT Filed: May 19, 2004

(86) PCT No.: PCT/JP2004/007136

§ 371 (c)(1),
(2), (4) Date: May 13, 2005

(87) PCT Pub. No.: WO2004/104662

PCT Pub. Date: Dec. 2, 2004

(65) Prior Publication Data

US 2005/0259935 A1  Nov. 24, 2005

(30) Foreign Application Priority Data

May 23, 2003 (JP) ............................. 2003-145708
Jan. 26, 2004 (JP) ............................. 2004-017655
Mar. 10, 2004 (JP) ............................. 2004-068066

(51) Int. Cl.
G02B 6/10 (2006.01)
G02B 6/28 (2006.01)

(52) U.S. Cl. .................. 385/129; 385/130; 385/39; 385/27; 385/24

(58) Field of Classification Search .................... None
See application file for complete search history.

(56) References Cited

U.S. PATENT DOCUMENTS

| 3,614,197 | A | 10/1971 | Nishizawa et al. |
| 4,087,159 | A | 5/1978 | Ulrich |
| 4,950,045 | A | 8/1990 | Bricheno et al. |
| 5,410,625 | A | 4/1995 | Jenkins et al. |
| 6,847,773 | B2 * | 1/2005 | Korenaga et al. ............ 385/132 |
| 6,909,818 | B2 * | 6/2005 | Tsushima et al. ............. 385/14 |
| 7,035,518 | B2 * | 4/2006 | Imoto .......................... 385/132 |
| 2003/0215203 | A1 * | 11/2003 | Lock et al. .................. 385/129 |

FOREIGN PATENT DOCUMENTS

JP  62-35304  2/1987

(Continued)

OTHER PUBLICATIONS

Lucas B. Soldano et al., "Optical Multi-Mode Interference Devices Based on Self-Imaging: Principles and Applications", Journal of Lightwave Technology, Apr. 1995, vol. 13, No. 4, pp. 615-627.

(Continued)

Primary Examiner—Rodney Bovernick
Assistant Examiner—Omar Rojas
(74) Attorney, Agent, or Firm—Wenderoth, Lind & Ponack, L.L.P.

(57) ABSTRACT

In a multi-mode interference waveguide (MMI) of a sheet shape spreading in the length direction and the width direction, the length of the multi-mode interference waveguide is set to such a length that the unique mode interferes in the length direction, thereby reducing the coupling loss when inputting/outputting the signal light. The multi-mode interference waveguide has a maximum refraction factor portion in the thickness direction and has such a refraction factor distribution that the refraction factor is reduced as departing from the maximum refraction factor portion. Thus, it is possible to suppress mode dispersion in the thickness direction of the multi-mode interference waveguide and obtain a high transmission rate in the order of 10 Gb/s.

33 Claims, 47 Drawing Sheets

FOREIGN PATENT DOCUMENTS

| | | |
|---|---|---|
| JP | 1-156703 | 6/1989 |
| JP | 5-011132 | 1/1993 |
| JP | 8-201648 | 8/1996 |
| JP | 11-84434 | 3/1999 |
| JP | 2000-111738 | 7/2000 |
| JP | 2000-329962 | 11/2000 |
| JP | 2001-147351 | 5/2001 |
| JP | 2001-183710 | 7/2001 |
| JP | 3370667 | 11/2002 |
| JP | 2003-43285 | 2/2003 |
| JP | 2003-50330 | 2/2003 |
| WO | 92/11550 | 7/1992 |

OTHER PUBLICATIONS

K.-C. Lin et al., "Guided-wave 1.3/1.55μm wavelength division multiplexer based on multimode interference", Electronics Letters, Jul. 4, 1996, vol. 32, No. 14, pp. 1259-1261.

Baojun Li et al., "Low-Loss 1×2 Multimode Interference Wavelength Demultiplexer in Silicon-Germanium Alloy", IEEE Photonics Technology Letters, May 1999, vol. 11, No. 5, pp. 575-577.

F. Rottmann et al., "Integrated-Optic Wavelength Multiplexers on Lithium Niobate Based on Two-Mode Interference", Journal of Lightwave Technology, vol. 6, No. 6, Jun. 1988, pp. 946-952.

M.R. Paiam, "Compact Planar 980/1550-nm Wavelength Multi/Demultiplexer Based on Multimode Interference", IEEE Photonics Technology Letters, vol. 7, No. 10, Oct. 1995, pp. 1180-1182.

* cited by examiner

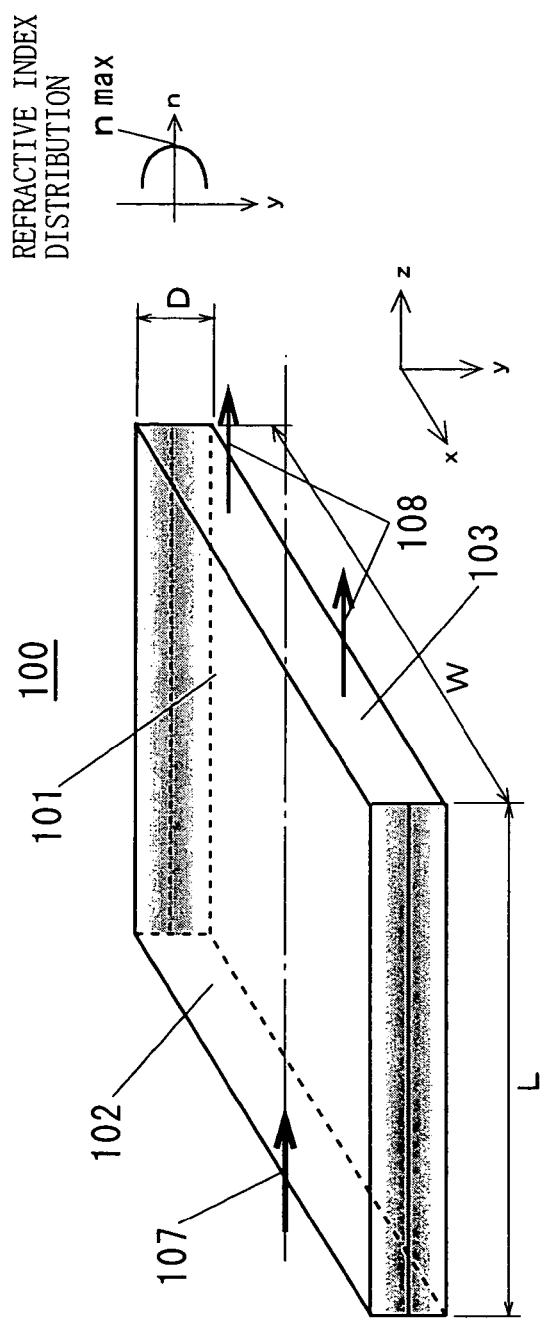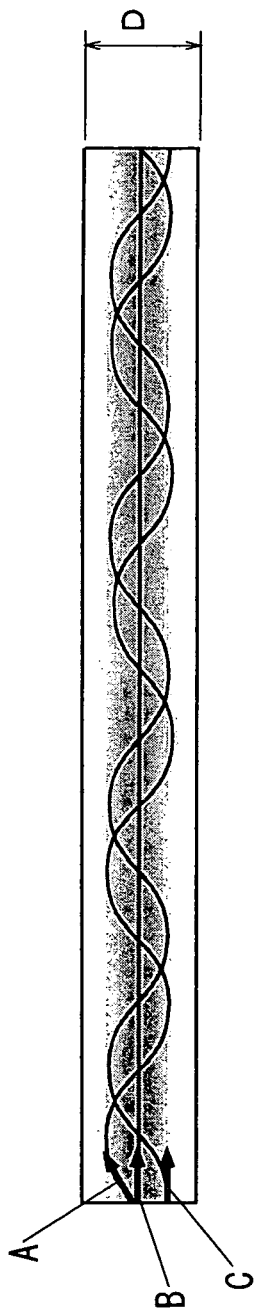
Fig.1A
Fig.1B

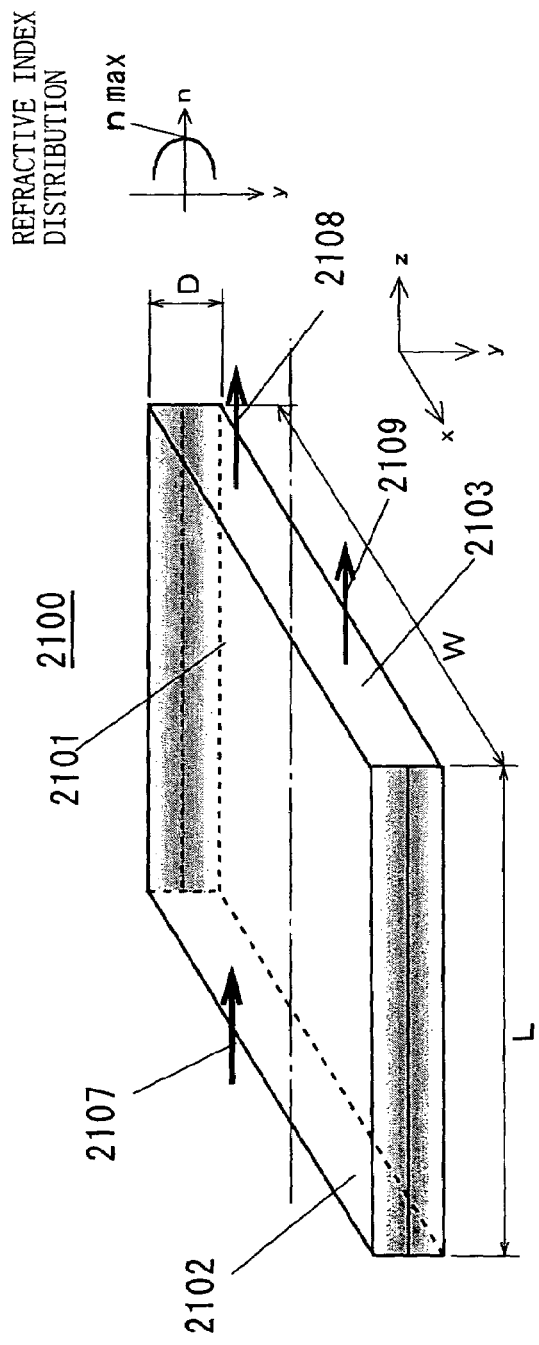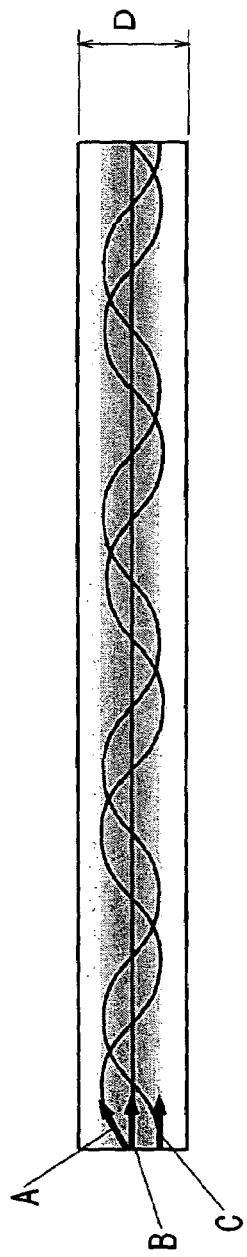
Fig.21A
Fig.21B

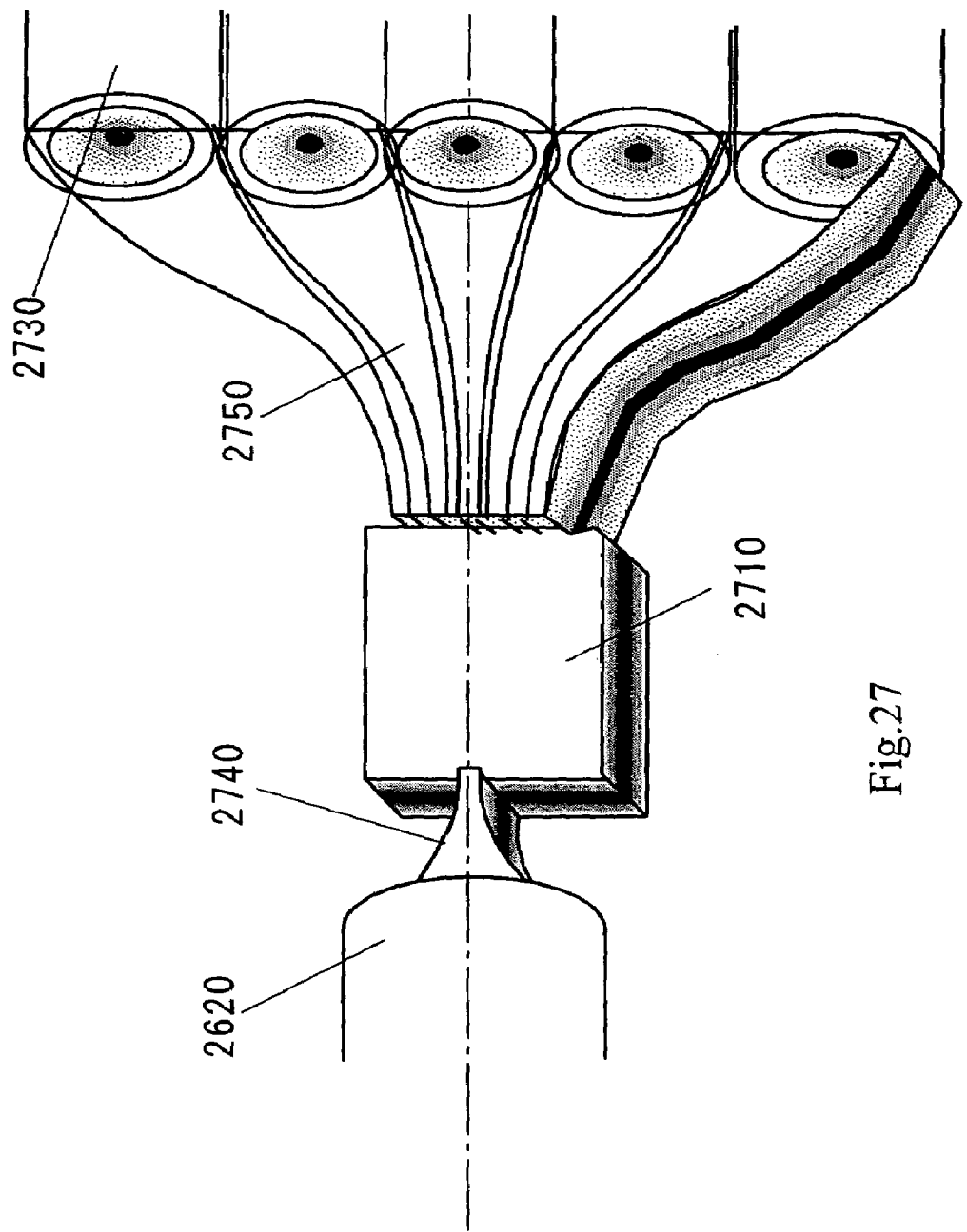

POUR INTO FORMING DIE

START UV CURING
(HEATING)

COMPLETE UV CURING
(HEATING)

CUT

POUR INTO FORMING DIE

START UV CURING
(HEATING)

COMPLETE UV CURING
(HEATING)

CUT

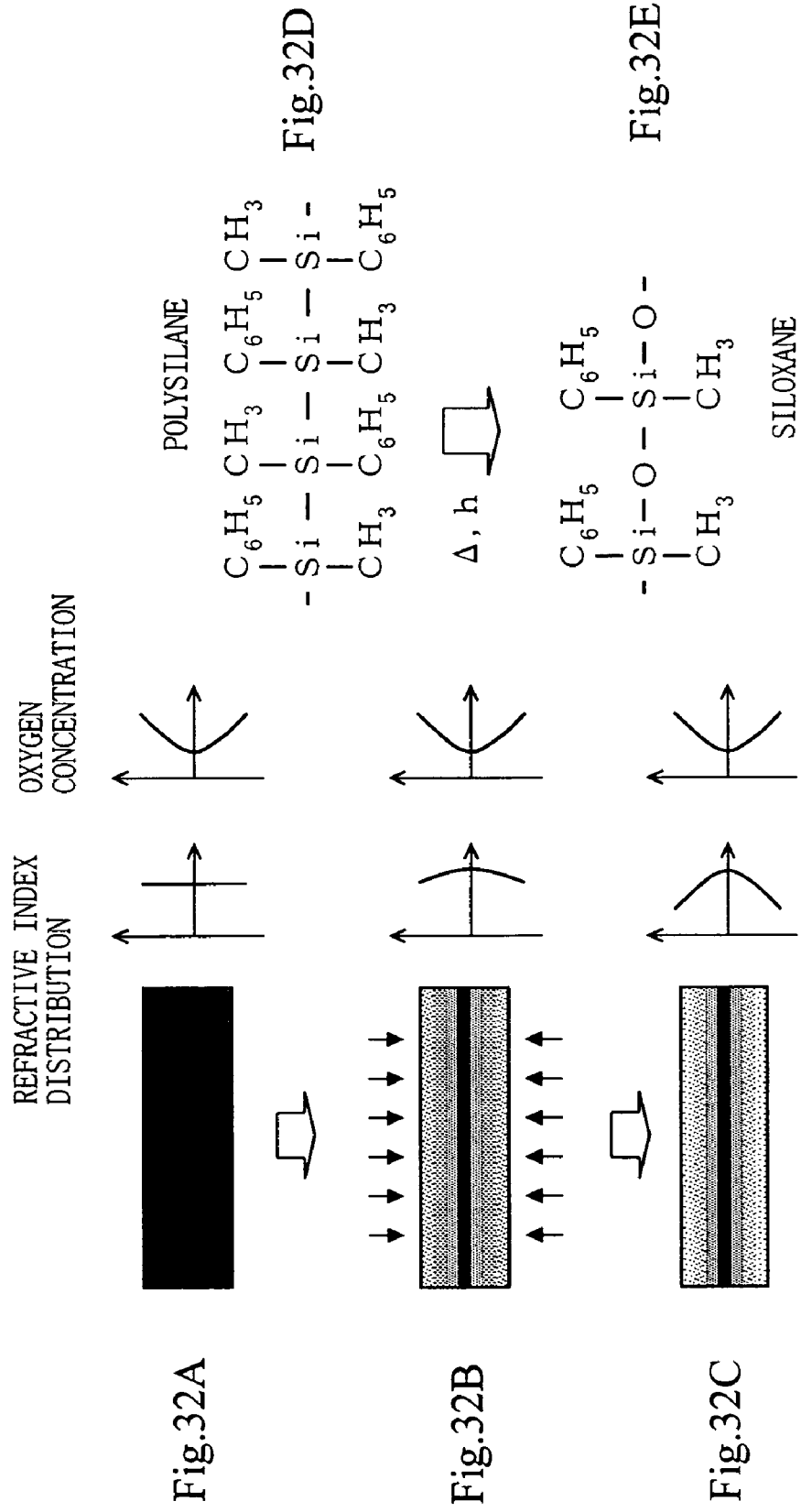

OPTICAL DEVICE, OPTICAL DEVICE MANUFACTURING METHOD, AND OPTICAL INTEGRATED DEVICE

TECHNICAL FIELD

The present invention relates to an optical device having a sheet-form transmission line used for high-speed multi-mode optical transmission and a method of manufacturing the optical device, and more specifically, to an optical device using a self-imaging principle of a multi-mode interference suitable for an optical splitter, an optical combiner, an optical demultiplexer, an optical multiplexer, an optical straight sheet bus, an optical cross sheet bus, a star coupler, an optical switch and the like, and a method of manufacturing the optical device. Moreover, the present invention relates to an optical integrated device having the above-described optical device in a plurality of numbers.

BACKGROUND ART

Research has been performed on an optical device using an optical transmission line which optical device is suitable for optical communication systems and the like. It is expected that such an optical device will be applied to an optical data bus sheet for data exchange between optical circuits and applied to an optical splitter for splitting a signal beam and an optical combiner for combining signal beams. Of the optical transmission lines, a multi-mode optical transmission line, which is inexpensive compared to a single-mode optical transmission line, can take the place of a conventional electronic circuit.

An example of the multi-mode optical transmission line is a sheet-form multi-mode optical transmission line. For example, Document (3) discloses an optical bus circuit board provided with: a sheet-form transparent medium whose refractive index is homogeneous; a laser diode array that makes a signal beam incident on an incident end surface of the transparent medium; and a photodiode array that receives the signal beam having exited from the exit side end surface of the transparent medium. In the optical bus circuit board disclosed in Document (3), the incident beam emitted from the laser diode array is repetitively totally reflected in the direction of the thickness and in the direction of the width inside the transparent medium, exits from the entire area of the exit side end surface as the exiting beam, and is received by the photodiode array.

Moreover, Document (2) discloses, like Document (3), an optical splitter provided with: a sheet-form transparent medium whose refractive index is homogeneous; a laser diode that makes a signal beam incident on the transparent medium; and a plurality of optical fibers that receives the signal beam having exited from the transparent medium. In the optical splitter described in Document (2), a light diffusing layer is provided on the incident side end surface so that the signal beam is efficiently diffused inside the transparent medium within a short distance. In Document (2), the incident beam is also repetitively totally reflected in the direction of the thickness and in the direction of the width within the transparent medium, exits from the entire area of the exit side end surface as the exiting beam, and is received by the photodiode array.

Moreover, Document (1) discloses a sheet-form optical data bus having a refractive index distribution such that the highest refractive index is provided at the center in the direction of the thickness and the refractive index is decreased with distance from the center. In the optical data bus described in Document (1), the mode dispersion of multiple modes is reduced by the refractive index distribution. In Document (1), the incident beam also exits from the entire area of the exit side end surface as the exiting beam.

On the other hand, there is a technology in which an optical waveguide that transmits a signal beam in multiple modes in the direction of the width is disposed between a single-mode optical transmission line on the incident side and a single-mode optical transmission line on the exit side. This optical waveguide has a predetermined size L in the direction of the length which size L is determined by a uniform refractive index n of the optical waveguide, the basic mode width $W_0$, in the direction of the width, of the optical waveguide and the wavelength $\lambda$ of the transmitted signal beam. The optical waveguide generates the exiting beam by the eigenmodes of the signal beam interfering with each other in the direction of the length, based on the size L in the direction of the length (Documents (4) to (8), (11)).

Moreover, in recent years, in the field of optical communications, a wavelength division multiplexing (referred to also as WDM) method has been examined in which, in order to increase the communication capacity, a plurality of signals is superimposed on a signal beam of different wavelengths to be multiplexed and transmitted on the same optical transmission line. In the WDM method, optical devices such as an optical demultiplexer that demultiplexes signal beams of different wavelengths and an optical multiplexer that multiplexes signal beams of different wavelengths play an important role.

A conventional example is known that realizes such an optical demultiplexer and an optical splitter by use of the technology in which an optical waveguide that transmits a signal beam in multiple modes in the direction of the width is disposed between a single-mode optical transmission line on the incident side and a single-mode optical transmission line on the exit side (Documents (9), (12) to (15)). These conventional optical demultiplexer and optical splitter are connected to the incident side single-mode waveguide and to the exit side single-mode waveguide, and are provided with the optical waveguide that transmits a signal beam in multiple modes in the direction of the width. In the optical devices described in Documents (9) and (12) to (15), a multiplex signal beam of two wavelengths that are different from each other is transmitted in the incident side single-mode waveguide and made incident on the optical waveguide. The size, in the direction of the width, and the size, in the direction of the length, of the optical waveguide are set so that the exiting beam is generated in a different position on the exit end by the eigenmodes of the signal beam interfering with each other in the direction of the length.

Moreover, Document (10) discloses a method of manufacturing an optical device provided with an incident side beam converter, an optical waveguide and an exit side beam converter. The optical device manufacturing method of Document 10 describes that the optical waveguide is formed by enclosing a fluid material in a glass substrate. Moreover, Document (10) particularly discloses that the incident side beam converter and the exit side beam converter are provided with a refractive index distribution by successively laminating materials having different refractive indices (see Document (10), FIG. 4 and the corresponding description).

In a case where the multi-mode optical transmission line is made of a homogeneous medium, when a signal beam is transmitted, the physical optical path length (phase velocity) differs among the modes. For this reason, a phenomenon occurs in which the intensity distribution of the exiting beam varies depending on the length of the optical transmission line.

Moreover, when the length of the multi-mode optical transmission line is long to an extent that exceeds 100 mm, since the group velocity differs among the optical paths, a phenomenon occurs in which the signal waveform of the transmitted beam changes.

As described above, when a mode dispersion occurs which is a phenomenon in which the phase velocity or the group velocity differs among the modes, the signal beam cannot be transmitted while the intensity distribution of the incident beam is maintained to the exit side.

To solve the above-mentioned problem, an optical transmission line provided with a refractive index distribution is proposed. A signal beam propagating through a medium having a refractive index distribution draws a curved (meandering) beam locus based on the refractive index distribution. By applying this phenomenon, even if the physical optical path lengths of the optical paths are different from each other, the optical path length thereof can be made the same as each other by the difference in refractive index. Therefore, by appropriately setting the refractive index distribution, a multi-mode optical transmission line can be obtained since the mode dispersion is suppressed.

For example, Document (1) describes an optical device provided with laminated sheet-form optical transmission lines and having a refractive index distribution in the direction in which the sheet-form optical transmission lines are laminated. The sheet-form optical transmission lines described in Document (1) are capable of transmitting a gigabit-class high-frequency signal in multiple modes since the mode dispersion is suppressed by the refractive index distribution.

Such an optical device requires a structure for making a signal beam incident on the sheet-form optical transmission lines and making the signal beam to exit from the sheet-form optical transmission lines. In the optical device described in the above-described Document (1), a signal beam is made parallelly incident in the signal beam transmission direction from one end of the sheet-form optical transmission lines, and parallelly exits in the signal beam transmission direction from the other end of the sheet-form optical transmission lines (FIGS. 1 and 9 of Document (1)).

Moreover, a technology is known in which the optical waveguide (sheet-form optical transmission line) is provided with a mirror for perpendicularly bending the optical axis of the signal beam and the optical waveguide is coupled to the outside (FIGS. 1 and 2 of Document (16)). In the optical waveguide described in Document (16), the signal beam incident from a direction perpendicular to the transmission direction is bent by a mirror disposed at 45 degrees from the signal beam transmission direction and is incident on the optical waveguide. Moreover, the signal beam transmitted through the optical waveguide is bent by a mirror disposed at 45 degrees from the signal beam transmission direction and exits in a direction perpendicular to the transmission direction (see FIGS. 1 and 2 of Document (16)).

List of the Documents (1) Japanese Laid-Open Patent Publication No. 2000-111738(FIG. 3)

(2) Japanese Laid-Open Patent Publication No. 2000-329962(FIG. 2)

(3) Japanese Laid-Open Patent Publication No. 2001-147351(FIG. 1)

(4) Japanese Laid-Open Patent Publication No. 2003-050330(FIG. 1)

(5) Japanese Laid-Open Patent Publication No. 2001-183710(FIG. 1)

(6) Japanese Laid-Open Patent Publication No. Hei 1-156703(FIG. 1)

(7) U.S. Pat. No. 4,087,159 (FIG. 1)

(8) U.S. Pat. No. 4,950,045 (FIG. 1)

(9) Japanese Laid-Open Patent Publication No. Hei 8-201648 (pages 2 to 5, FIG. 11)

(10) Japanese Laid-Open Patent Publication No.2003-043285 (FIG. 4)

(11) Lucas B. Soldano and Eric C. M. Pennings, "Optical Multi-Mode Interference Device Based on Self-Imaging: Principles and Applications", Vol. 13, No.4 Journal of Lightwave Technology, April, 1995

(12) F. Rottmann, A. Neyer, W. Mevenkamp, and E. Voges, "Integrated-Optic Wavelength Multiplexers on Lithium Niobate based on Two-Mode Interference", Journal of Lightwave Technology" Vol. 6, No. 6 June, 1988

(13) M. R. Paiam, C. F. Janz, R. I. MacDonald and J. N. Broughton, "Compact Planar 980/1550-nm Wavelength Multi/Demultiplexer Based on Multimode Interference" IEEE Photonics Technology Letters, Vol. 7, No. 10, October, 1995

(14) K. C. Lin and W. Y. Lee, "Guided-wave 1.3/1.55 µm wavelength division multiplexer based on multimode interference", IEEE Electronics Letters, Vol. 32, No. 14, Jul. 4, 1996.

(15) Baojun Li, Guozheng Li, Enke Liu, Zuimin Jiang, Jie Qin and Xun Wang, "Low-Loss 1×2 Multimode Interference Wavelength Demultiplexer in Silicon-Germanium Alloy" IEEE Photonics Technology Letters, Vol. 11, No. 5, May, 1999

(16) Japanese Laid-Open Patent Publication No. Sho 62-35304(FIG. 1, FIG. 2)

DISCLOSURE OF THE INVENTION

The multi-mode optical transmission lines described in Documents (2) and (3) transmit the incident beam that is incident as a signal beam while totally reflecting it in the direction of the thickness and in the direction of the width inside the transparent medium. For this reason, the optical path length difference occurs among the paths of the incident beam that is incident while being diffused, and this causes the mode dispersion. Therefore, in the multi-mode optical transmission lines described in Documents (2) and (3), the transmission speed is limited by the typical incident beam dispersion, so that transmission at a high speed exceeding 10 Gbps cannot be performed.

In the optical data bus described in Document (1), since a refractive index distribution is provided in the direction of the thickness, the mode dispersion in the direction of the thickness is suppressed. However, since the refractive index is uniform in the direction of the width, the mode dispersion in the direction of the width occurs, so that the transmission speed is limited as well. Moreover, in all of the technologies described in Documents (1) to (3), since the incident beam exits from the entire area of the exit side end surface as the exiting beam, the loss of coupling to the optical transmission line provided on the exit side is large.

Moreover, in the optical waveguides described in Documents (4) to (8) and (11), when a signal beam that is single-mode in the direction of the thickness is made incident, the coupling loss is small and the signal beam can be transmitted at high speed. However, even in the case of a single mode, when an incident beam largely diffused and having a large spread angle or an incident beam with a large beam diameter such as an exiting beam from a multi-mode waveguide is used as the signal beam, since the coupling to the optical waveguide is difficult, the loss of the signal beam when the signal beam is incident and exits is large. Moreover, in the optical waveguide described in Documents (4) to (8) and (11), since loss is large with respect to the incident beam that is incident with its axis being shifted from the center of the optical waveguide, it is necessary to couple the incident and exiting beams to the incident and exit sides with high accuracy.

Moreover, when the optical waveguides described in Documents (4) to (8) and (11) are used with a signal beam that is multi-mode in the direction of the thickness being made incident, the problem is improved that it is difficult to couple the incident and exiting beams with respect to the incident beam largely diffused and having a large spread angle and the incident beam with a large beam diameter. However, when the optical waveguides described in Documents (4) to (8) and (11) are used with a signal beam that is multi-mode in the direction of the thickness being made incident, the mode dispersion occurs in the direction of the thickness, so that the signal beam cannot be transmitted at high speed. Moreover, in this case, since a plurality of eigenmodes, excited in the direction of the thickness, of the incident beam that is incident with its axis being shifted in the direction of the thickness interferes in the direction of the length, the intensity distribution, in the direction of the thickness, of the exiting beam is changed. When the intensity distribution in the direction of the thickness is changed, the loss when the exiting beam is coupled to the optical transmission line on the exit side is large.

On the other hand, the optical device manufacturing method described in Document (10) discloses not an example in which the optical waveguide is provided with a refractive index distribution but an example in which the incident side or exit side beam converter is provided with a refractive index distribution. Therefore, when the process, of manufacturing the optical waveguide, of the optical device manufacturing method described in Document (10) is used, only the conventional optical transmission lines, having a homogeneous refractive index, described in Documents (1), (2), (4) to (9) and (11) to (15) can be manufactured. Moreover, when the process, of manufacturing the beam converter, of the optical device manufacturing method described in Document (10) is used, since the size in the direction of the width and the size in the direction of the length are defined so that a lens function is provided, an optical waveguide that causes a multi-mode interference cannot be obtained. Moreover, the process, of manufacturing the beam converter, of the optical device manufacturing method described in Document (10) cannot be said to be a method that is high in productivity when applied to a method of forming a refractive index distribution in the optical waveguide, because it is a method in which materials having different refractive indices are successively laminated.

Accordingly, a first object of the present invention is to provide an optical device having a sheet-form multi-mode optical transmission line where the coupling when a signal beam is made incident and made to exit is easy and loss is small, and being capable of high-speed transmission of approximately 10 Gbs equal to the speed of the signal beam transmission in a single mode, and a method of manufacturing the optical device. Moreover, the first object of the present invention is to provide an optical integrated device having the above-described optical devices in a plurality of numbers and a method of manufacturing the optical integrated device.

The above-mentioned first object is achieved by the following first optical device:

An optical device that connects, by a signal beam, between an externally inputted input signal and an output signal to be outputted, is provided with an optical transmission line being sheet-form and including a refractive index distribution such that a highest refractive index part is provided in a direction of a thickness of the sheet and a refractive index does not increase with distance from the highest refractive index part in the direction of the thickness, a signal beam corresponding to the input signal is made incident on the optical transmission line as an incident beam, inside the optical transmission line, the incident beam is transmitted, in a direction of a length that is orthogonal to the direction of the thickness, in multiple modes having a plurality of eigenmodes in a direction of a width that is orthogonal to both the direction of the length and the direction of the thickness, and an exiting beam is generated by the plurality of eigenmodes interfering with each other in the direction of the length, and the exiting beam is made to exit from the optical transmission line, and the output signal corresponding to the exiting beam is outputted.

In the first optical device according to the present invention, since the optical transmission line has the refractive index distribution in the direction of the thickness, even in the case of the structure that transmits a signal beam in multiple modes, the mode dispersion is suppressed in the direction of the thickness, so that the signal beam can be transmitted at high speed. Moreover, in the optical device according to the present invention, since the optical transmission line generates the exiting beam by the multi-mode interference, the loss at the time of incidence and exit is small and a highly accurate adjustment is unnecessary at the time of connection.

Preferably, the optical transmission line has a size, in the direction of the length, expressed by a function of a difference between a propagation constant of a 0th-order mode excited in the direction of the width of the optical transmission line and a propagation constant of a primary mode. Preferably, the optical transmission line has a size, in the direction of the length, expressed by a function of a basic mode width in the direction of the width, an effective refractive index with respect to a 0-th order mode beam excited in the direction of the width and a wavelength of a beam transmitted in the multi-mode optical transmission line.

Preferably, the optical transmission line includes a refractive index distribution such that a central position in the direction of the thickness has the highest refractive index and the refractive index does not increase with distance from the central position. In particular, it is preferably that the refractive index distribution change substantially along a quadratic function.

Preferably, further, the optical transmission line is made of polysilane. In particular, the optical transmission line is made of polysilane, and the refractive index distribution is provided by an oxygen concentration distribution when the polysilane is cured.

Preferably, the input signal is an electric signal, and an incident portion is provided that converts the electric signal into the signal beam and makes the signal beam incident on the optical transmission line as the incident beam. As an example, the incident portion has a plurality of light emitting portions disposed in an array in the direction of the width of the optical transmission line. Moreover, preferably, the input signal is a signal beam, and an incident portion is provided that makes the signal beam incident on the optical transmission line as an incident beam.

Preferably, the output signal is an electric signal, and an exit portion is provided that receives the signal beam as an exiting beam having exited from the optical transmission line and converts the signal beam into the electric signal. As an example, the exit portion has a plurality of light receiving portions disposed in an array in the direction of the width of the optical transmission line. Moreover, preferably, the output signal is a signal beam, and an exit portion is provided that makes the signal beam exit from the optical transmission line as an exiting beam.

Preferably, the optical device is a 1×N optical splitting device that is capable of receiving at least one input signal and outputting the input signal as a number, N (N=1,2, 3, . . . ), of output signals, and the optical transmission line includes:

an incident surface for making the incident beam incident; and an exit surface for making the exiting beam exit, the size in the direction of the length is a value that is substantially an integral multiple of the following expression when the basic mode width in the direction of the width is $W_0$, an effective refractive index with respect to a 0th-order mode beam excited in the direction of the width is $n_0$ and the wavelength of the beam transmitted in the multi-mode optical transmission line is $\lambda$, and one incident beam is made incident on a center in the direction of the width on the incident surface and a number, N, of exiting beams are generated symmetrically with respect to the center in the direction of the width on the exit surface:

$$\frac{1}{N} \cdot \frac{n_0 W_0^2}{\lambda}$$

Preferably, the optical device is an N×1 optical combining device that is capable of receiving a number, N (N=1,2, 3, . . . ), of input signals and outputting the input signals as at least one output signal, and the optical transmission line includes:

an incident surface for making the incident beam incident;, and an exit surface for making the exiting beam exit, the size in the direction of the length is a value that is substantially an integral multiple of the following expression when the basic mode width in the direction of the width is $W_0$, an effective refractive index with respect to a 0th-order mode beam excited in the direction of the width is $n_0$ and the wavelength of the beam transmitted in the multi-mode optical transmission line is $\lambda$, and a number, N, of incident beams all having the same wavelength $\lambda$ are made incident symmetrically with respect to a center in the direction of the width on the incident surface and one exiting beam is generated at the center in the direction of the width on the exit surface:

$$\frac{1}{N} \cdot \frac{n_0 W_0^2}{\lambda}$$

Preferably, the optical device is a straight sheet bus that is capable of receiving a number, N (N=1,2,3, . . . ), of input signals and outputting the input signals as a number, N, of output signals corresponding one-to-one to the input signals, and the optical transmission line includes:

an incident surface for making the incident beam incident; and an exit surface for making the exiting beam exit, the size in the direction of the length is a value that is substantially an integral multiple of the following expression when the basic mode width in the direction of the width is $W_0$, an effective refractive index of a 0th-order mode beam excited in the direction of the width is $n_0$ and the wavelength of the beam transmitted in the multi-mode optical transmission line is $\lambda$, and a number, N, of incident beams all having the same wavelength $\lambda$ are made incident on given positions in the direction of the width on the incident surface and a number, N, of exiting beams corresponding one-to-one to the number, N, of incident beams are generated in positions, on the exit surface, whose positions in the direction of the width are the same as incident positions of the incident beams:

$$\frac{8 n_0 W_0^2}{\lambda}$$

Preferably, the optical device is a cross sheet bus that is capable of receiving a number, N (N=1,2,3, . . . ), of input signals and outputting the input signals as a number, N, of output signals corresponding one-to-one to the input signals, and the optical transmission line includes:

an incident surface for making the incident beam incident; and an exit surface for making the exiting beam exit, a size in the direction of the length is a value that is substantially an odd multiple of the following expression when the basic mode width in the direction of the width is $W_0$, an effective refractive index of a 0th-order mode beam excited in the direction of the width is $n_0$ and the wavelength of the beam transmitted in the multi-mode optical transmission line is $\lambda$, and a number, N, of incident beams all having the same wavelength $\lambda$ are made incident on given positions in the direction of the width on the incident surface and a number, N, of exiting beams corresponding one-to-one to the number, N, of incident beams are generated in positions, on the exit surface, whose positions in the direction of the width are symmetrical to incident positions of the incident beams with respect to the center in the direction of the width:

$$\frac{4 n_0 W_0^2}{\lambda}$$

Preferably, the optical device is a star coupler that receives a number, N (N=1,2,3, . . . ), of input signals and outputs the input signals as a number, N, of output signals corresponding to the input signals, and the optical transmission line includes:

an incident surface for making the incident beam incident; and an exit surface for making the exiting beam exit, a size in the direction of the length is substantially a value of the following expression when the basic mode width in the direction of the width is $W_0$, an effective refractive index of a 0th-order mode beam excited in the direction of the width is $n_0$ and the wavelength of the beam transmitted in the multi-mode optical transmission line is $\lambda$, and a number, N, of incident beams all having the same wavelength $\lambda$ are made incident on predetermined positions in the direction of the width on the incident surface and a number, N, of exiting beams are generated for any one of the incident beams in positions, on the exit surface, whose positions in the direction of the width are symmetrical to incident positions of the incident beams with respect to the center in the direction of the width:

$$\left(p \pm \frac{1}{N}\right)\frac{4n_0 W_0^2}{\lambda}$$

(p is an integer that makes the value inside the parentheses positive)

Preferably, further, the optical device is a star coupler that receives a number, $N_{EVEN}$ ($N_{EVEN}$=2,4,6, . . . ), of input signals and outputs the input signals as a number, $N_{EVEN}$, of output signals corresponding to the input signals, and the optical transmission line makes a number, $N_{EVEN}$, of incident beams all having the same wavelength $\lambda$ incident on positions symmetrical with respect to the center in the direction of the width on the incident surface.

Moreover, preferably, further, the optical device is a star coupler that receives a number, $N_{ODD}$ ($N_{ODD}$=1,3,5, . . . ), of input signals and outputs the input signals as a number, $N_{ODD}$, of output signals corresponding to the input signals, and the optical transmission line makes a number, $N_{O4141}$, of incident beams all having the same wavelength $\lambda$ incident on positions asymmetrical with respect to the center in the direction of the width on the incident surface.

Preferably, the optical device is a two-way straight sheet bus that is capable of receiving a number, N (N=1,2,3, . . . ), of input signals and outputting the input signals as a number, N, of output signals corresponding one-to-one to the first input signals, and is capable of receiving a number, M (M=1,2,3, . . . ), of input signals and outputting the input signals as a number, M, of output signals corresponding one-to-one to the input signals, and the optical transmission line includes:

a first surface formed at one end in the direction of the length; and a second surface formed at another end in the direction of the length, a size in the direction of the length is a value that is substantially an integral multiple of the following expression when the basic mode width in the direction of the width is $W_0$, an effective refractive index of a 0th-order mode beam excited in the direction of the width is $n_0$ and the wavelength of the beam transmitted in the multi-mode optical transmission line is $\lambda$, a number, N, of incident beams all having the same wavelength $\lambda$ are made incident on given positions in the direction of the width on the first surface and a number, N, of exiting beams corresponding one-to-one to the number, N, of incident beams are generated in positions, on the second surface, whose positions in the direction of the width are the same as incident positions of the incident beams, and a number, M, of incident beams all having the same wavelength $\lambda$ as the incident beams on the first surface are made incident on given positions in the direction of the width on the second surface and a number, M, of exiting beams corresponding one-to-one to the number, M, of incident beams are generated in positions, on the first surface, whose positions in the direction of the width are the same as incident positions of the incident beams:

$$\frac{8n_0 W_0^2}{\lambda}$$

Preferably, the optical device is a two-way cross sheet bus that is capable of receiving a number, N (N=1,2,3, . . . ), of first input signals and outputting the input signals as a number, N, of first output signals corresponding one-to-one to the first input signals, and is capable of receiving a number, M (M=1,2,3, . . . ), of second input signals and outputting the input signals as a number, M, of output signals corresponding one-to-one to the second input signals, and the optical transmission line includes:

a first surface formed at one end in the direction of the length; and a second surface formed at another end in the direction of the length, a size in the direction of the length is a value that is substantially an odd multiple of the following expression when the basic mode width in the direction of the width is $W_0$, an effective refractive index of a 0th-order mode beam excited in the direction of the width is $n_0$ and the wavelength of the beam transmitted in the multi-mode optical transmission line is $\lambda$, a number, N, of incident beams all having the same wavelength $\lambda$ are made incident on given positions in the direction of the width on the first surface and a number, N, of exiting beams corresponding one-to-one to the number, N, of incident beams are generated in positions, on the second surface, whose positions in the direction of the width are symmetrical to incident positions of the incident beams with respect to the center in the direction of the width, and a number, M, of incident beams all having the same wavelength $\lambda$ are made incident on given positions in the direction of the width on the second surface and a number, M, of exiting beams corresponding one-to-one to the number, M, of incident beams are generated in positions, on the first surface, whose positions in the direction of the width are symmetrical to incident positions of the incident beams with respect to the center in the direction of the width:

$$\frac{4n_0 W_0^2}{\lambda}$$

Preferably, the optical transmission line includes: a reflecting surface that is formed at one end in the direction of the length and bends an optical path of the incident beam incident in a direction parallel to the direction of the thickness, substantially 90 degrees in the direction of the length; and/or a reflecting surface that is formed at another end in the direction of the length and bends an optical path of the exiting beam transmitted in the direction of the length, substantially 90 degrees so as to exit in a direction parallel to the direction of the thickness.

Preferably, the optical transmission line includes: a prism that is formed at one end in the direction of the length and bends, in the direction of the length, an optical path of the incident beam incident in a direction inclined in the direction of the thickness; and/or a prism that is formed at another end in the direction of the length and bends an optical path of the exiting beam transmitted in the direction of the length, so as to exit in a direction inclined in the direction of the thickness.

Preferably, the optical transmission line has a plurality of eigenmodes in the direction of the thickness. According to this structure, an optical device that uses the multi-mode interference also in the direction of the thickness can be provided. Preferably, the optical transmission line has a thickness of not less than 20 μm.

Preferably, the optical transmission line is curved so that a central position in the direction of the thickness always draws the same curve on given two different cross sections including the direction of the length and the direction of the thickness. Preferably, the optical transmission line is twisted so that a central position in the direction of the thickness draws different curves on given two different cross sections including the direction of the length and the direction of the thickness.

The above-mentioned first object is achieved by the following optical integrated device:

An optical integrated device that connects, by a signal beam, between an externally inputted input signal and an output signal to be outputted, is provided with a light transmitting portion comprising a plurality of optical transmission lines being sheet-form and including a refractive index distribution such that a highest refractive index part is provided in a direction of a thickness of the sheet and a refractive index does not increase with distance from the highest refractive index part in the direction of the thickness, the optical transmission lines being laminated in the direction of the thickness, a signal beam corresponding to the input signal is made incident on the optical transmission lines as an incident beam, inside the optical transmission lines, the incident beam is transmitted, in a direction of a length that is orthogonal to the direction of the thickness, in multiple modes having a plurality of eigenmodes in a direction of a width that is orthogonal to both the direction of the length and the direction of the thickness, and an exiting beam is generated by the plurality of eigenmodes interfering with each other in the direction of the length, and the exiting beam is made to exit from the optical transmission lines, and the output signal corresponding to the exiting beam is outputted.

In the optical integrated device according to the present invention, since the optical transmission lines have the refractive index distribution in the direction of the thickness, even in the case of the structure that transmits a signal beam in multiple modes, the mode dispersion is suppressed in the direction of the thickness, so that the signal beam can be transmitted at high speed. Moreover, in the optical integrated device according to the present invention, since the optical transmission lines generate the exiting beam by the multi-mode interference, the loss at the time of incidence and exit is small and a highly accurate adjustment is unnecessary at the time of connection.

The above-mentioned first object is achieved by the following first method of manufacturing an optical device:

In a method of manufacturing an optical device that connects, by a signal beam, between an externally inputted input signal and an output signal to be outputted, the optical device is provided with an optical transmission line being sheet-form and including a refractive index distribution such that a highest refractive index part is provided in a direction of a thickness of the sheet and a refractive index does not increase with distance from the highest refractive index part in the direction of the thickness, a signal beam corresponding to the input signal is made incident on the optical transmission line as an incident beam, inside the optical transmission line, the incident beam is transmitted, in a direction of a length that is orthogonal to the direction of the thickness, in multiple modes having a plurality of eigenmodes in a direction of a width that is orthogonal to both the direction of the length and the direction of the thickness, and an exiting beam is generated by the plurality of eigenmodes interfering with each other in the direction of the length, the exiting beam is made to exit from the optical transmission line, and the output signal corresponding to the exiting beam is outputted, and the optical device manufacturing method is provided with:

a first step of preparing a forming die that is made of a material capable of transmitting an energy to be applied to cure a resin of which the optical transmission line is made, and includes a concave portion having at least the same depth as the direction of the thickness of the optical transmission line;

a second step of filling the concave portion with the resin;

a third step of applying the energy in a predetermined quantity to the forming die filled with the resin, from above and below in the direction of the thickness; and a fourth step of, on the resin cured with a desired refractive index distribution being formed, determining at least a size in the direction of the length and forming a part of connection of the incident and exiting beams in order to form the resin into the optical transmission line.

In the first optical device manufacturing method according to the present invention, since the above steps are provided, a sheet-form optical transmission line including a desired refractive index distribution can be easily manufactured with high precision.

Preferably, in the third step, the application of the energy is an application of an ultraviolet ray of a predetermined wavelength, and in the first step, the prepared forming die is made of a material that is transparent with respect to the ultraviolet ray of the predetermined wavelength.

Preferably, in the third step, the application of the energy is heating.

Preferably, the optical transmission line includes a refractive index distribution such that a central position in the direction of the thickness has the highest refractive index and the refractive index does not increase with distance from the central position. Preferably, further, the refractive index distribution changes substantially along a quadratic function.

Preferably, further, the optical transmission line is made of polysilane. Moreover, preferably, further, the optical transmission line is made of polysilane, and the refractive index distribution is provided by an oxygen concentration distribution when the polysilane is cured.

Preferably, in the first step, the forming die includes a concave portion having a size including a plurality of optical transmission lines to be manufactured, and in the fourth step, a plurality of optical transmission lines is simultaneously manufactured by cutting the resin.

Preferably, in the first step, the forming die includes a concave portion having a size substantially equal to a size, in the direction of the width, of the optical transmission line to be manufactured, and in the fourth step, the size in the direction of the length is determined by cutting the resin.

Preferably, in the first step, the forming die includes a concave portion having a size substantially equal to a size of the optical transmission line to be manufactured, and in the fourth step, a wall, of the concave portion, situated in a position where the incident beam and the exiting beam are made incident and made to exit on and from the optical transmission line is removed.

Preferably, a fifth step of releasing the optical transmission line from the forming die either before or after the fourth step is further included.

In the optical device manufacturing method of the present invention, since the forming die can be reused by including the fifth step, the cost at the time of manufacture can be reduced.

The above-mentioned second object is achieved by the following second optical device:

An optical device that is capable of receiving a multiple signal beam where two different wavelengths are superimposed on each other, demultiplexing the multiple signal beam according to the wavelength, and outputting the multiple signal beam as two different signal beams, is provided with an optical transmission line being sheet-form and including a refractive index distribution such that a highest refractive index part is provided in a direction of a thickness of the sheet and a refractive index does not increase with distance from the highest refractive index part in the direction of the thickness, the multiple signal beam is made incident on the optical transmission line as an incident beam, inside the optical transmission line, the incident beam is transmitted, in a direction of a length that is orthogonal to the direction of the thickness, in multiple modes having a plurality of eigenmodes for each wavelength in a direction of a width that is orthogonal to both the direction of the length and the direction of the thickness, and two exiting beams are generated in different positions in the direction of the width according to the wavelength by the plurality of eigenmodes interfering with each other in the direction of the length with respect to signal beams of the same wavelength, and the two exiting beams are made to exit from the optical transmission line.

In the second optical device according to the present invention, since the optical transmission line has the refractive index distribution in the direction of the thickness, even in the case of the structure that transmits a signal beam in multiple modes, the mode dispersion is suppressed in the direction of the thickness, so that the signal beamcan be transmitted at high speed. Moreover, in the optical device according to the present invention, since the optical transmission line generates the exiting beam by the multi-mode interference and demultiplexes it according to the wavelength, the loss at the time of incidence and exit is small and a highly accurate adjustment is unnecessary at the time of connection.

Preferably, the two exiting beams are made to exit from positions in the direction of the width where a ratio in light quantity between the two exiting beams is highest. Preferably, the two exiting beams are made to exit from positions in the direction of the width where light quantities of the two exiting beams are lowest.

Preferably, the optical transmission line has a size in the direction of the length expressed by a function of a difference between a propagation constant of a 0th-order mode excited in the direction of the width of the optical transmission line and a propagation constant of a primary mode.

Preferably, the optical transmission line has a rectangular parallelepiped shape, and has a size in the direction of the length expressed by a function of a basic mode width in the direction of the width, the highest refractive index in the direction of the thickness and a wavelength of a beam transmitted in the multi-mode optical transmission line.

Preferably, the optical transmission line includes a refractive index distribution such that a central position in the direction of the thickness has the highest refractive index and the refractive index does not increase with distance from the central position. In particular, it is preferable that the refractive index distribution change substantially along a quadratic function.

The optical devices described in Documents (9) and (12) to (15) have a similar problem to those of Documents (4) to (8) and (11), because the optical waveguide performing optical splitting transmits the signal beam in multiple modes only in the direction of the width. That is, even in the case of a single mode, when a multiplex signal beam largely diffused and having a large spread angle or a multiplex signal beam with a large beam diameter is used as the signal beam, since the coupling to the optical waveguide is difficult, the loss of the signal beam when the signal beam is incident and exits is large. Moreover, since loss is large with respect to the incident beam that is incident with its axis being shifted from the center of the optical waveguide, it is necessary to couple the incident multiplex signal beam and the exiting signal beam to the incident and exit sides with high accuracy.

Moreover, when the optical waveguides described in the optical devices described in Documents (9) and (12) to (15) are used with a multiplex signal beam that is multi-mode in the direction of the thickness being incident, the mode dispersion occurs in the direction of the thickness, so that the signal beam cannot be transmitted at high speed. Moreover, in this case, since a plurality of eigenmodes, excited in the direction of the thickness, of the multiplex signal beam that is incident with its axis being shifted in the direction of the thickness interferes in the direction of the length, the intensity distribution in the direction of the thickness is changed. When the intensity distribution in the direction of the thickness is changed, the multiplex signal beam cannot be demultiplexed or multiplexed.

Accordingly, a second object of the present invention is to provide an optical device having a sheet-form multi-mode optical transmission line where the coupling when a signal beam is made incident and made to exit is easy and loss is small, being capable of high-speed transmission of approximately 10 Gbs equal to the speed of the signal beam transmission in a single mode, and being capable of excellently demultiplexing and multiplexing a multiplex signal beam.

The above-mentioned second object is achieved by the following third optical device:

An optical device that is capable of receiving two signal beams having different wavelengths, multiplexing the signal beams and outputting the signal beams as a multiple signal beam where two different wavelengths are superimposed on each other, is provided with an optical transmission line being sheet-form and including a refractive index distribution such that a highest refractive index part is provided in a direction of a thickness of the sheet and a refractive index does not increase with distance from the highest refractive index part in the direction of the thickness, the two signal beams are made incident on the optical transmission line as incident beams, inside the optical transmission line, the incident beam is transmitted, in a direction of a length that is orthogonal to the direction of the thickness, in multiple modes having a plurality of eigenmodes for each wavelength in a direction of a width that is orthogonal to both the direction of the length and the direction of the thickness, and the exiting beam which is a multiple signal beam is generated in the same position in the direction of the width according to the wavelength by the plurality of eigenmodes interfering with each other in the direction of the length with respect to signal beams of the same wavelength, and the exiting beam is made to exit from the optical transmission line.

In the third optical device according to the present invention, since the optical transmission line has the refractive index distribution in the direction of the thickness, even in the case of the structure that transmits a signal beam in multiple modes, the mode dispersion is suppressed in the direction of the thickness, so that the signal beam can be transmitted at high speed. Moreover, in the optical device according to the present invention, since the optical transmission line generates the exiting beam by the multi-mode interference and multiplexes it according to the wavelength, the loss at the time of incidence and exit is small and a highly accurate adjustment is unnecessary at the time of connection.

None of the optical transmission lines and the optical waveguides described in Documents (1) to (8) and (11) goes beyond making the exiting beam uniquely exit in correspondence with the incident beam. Therefore, a technical idea of performing switching to select the exit position of the exiting beam corresponding to the incident beam by use of an optical transmission line or an optical waveguide is not suggested.

Accordingly, a third object of the present invention is to provide an optical device having a sheet-form multi-mode optical transmission line where the coupling when a signal beam is made incident and made to exit is easy and loss is small, being capable of high-speed transmission of approximately 10 Gbs equal to the speed of the signal beam transmission in a single mode, and being capable of switching of the signal beam to be transmitted.

The above-mentioned third object is achieved by the following fourth optical device:

An optical device that connects, by a signal beam, between an externally inputted input signal and an output signal to be outputted, is provided with:

an optical transmission line being sheet-form, including a refractive index distribution such that a highest refractive index part is provided in a direction of a thickness of the sheet and a refractive index does not increase with distance from the highest refractive index part in the direction of the thickness, and comprising a first partial optical transmission line and a second partial optical transmission line adjoining in a direction of the width orthogonal to the thickness of the thickness; and refractive index modulating means capable of changing the refractive index distribution of at least one of the first and second partial optical transmission lines based on an externally supplied control signal, selection can be made between a first condition in which the incident beam is transmitted by use of only the first partial optical transmission line and a second condition in which the incident beam is transmitted by use of the first and second partial optical transmission lines, based on an operation of the refractive index modulating means, a signal beam corresponding to the input signal is made incident on the first optical transmission line as the incident beam, in the first condition, inside the first optical transmission line, the incident beam is transmitted, in a direction of a length that is orthogonal to the direction of the thickness and the direction of the width, in multiple modes having a plurality of eigenmodes in the direction of the width, the exiting beam is generated by the plurality of eigenmodes interfering with each other in the direction of the length, and the exiting beam is made to exit from the first optical transmission line and the output signal corresponding to the exiting beam is outputted, and in the second condition, inside the first and second optical transmission lines, the incident beam is transmitted, in the direction of the thickness, in multiple modes having a plurality of eigenmodes in the direction of the width, the exiting beam is generated by the plurality of eigenmodes interfering with each other in the direction of the length, and the exiting beam is made to exit from the second optical transmission line and the output signal corresponding to the exiting beam is outputted.

In the fourth optical device according to the present invention, since the optical transmission line has the refractive index distribution in the direction of the thickness, even in the case of the structure that transmits a signal beam in multiple modes, the mode dispersion is suppressed in the direction of the thickness, so that the signal beam can be transmitted at high speed. Moreover, in the optical device according to the present invention, since the optical transmission line generates the exiting beam by the multi-mode interference and switches it, the loss at the time of incidence and exit is small and a highly accurate adjustment is unnecessary at the time of connection.

Preferably, the refractive index modulating means is capable of changing the refractive index distribution of the first multi-mode partial optical transmission line, in the second condition, makes the refractive index distributions of the first and second multi-mode partial optical transmission lines the same as each other, and in the first condition, makes a highest refractive index of the first multi-mode partial optical transmission line higher than a highest refractive index of the second multi-mode partial optical transmission line.

Preferably, the refractive index modulating means is capable of changing the refractive index distribution of the second multi-mode partial optical transmission line, in the second condition, makes the refractive index distributions of the first and second multi-mode partial optical transmission lines the same as each other, and in the first condition, makes a highest refractive index of the second multi-mode partial optical transmission line lower than a highest refractive index of the first multi-mode optical transmission line.

Preferably, the refractive index modulating means is capable of changing the refractive index distributions of the first and second multi-mode partial optical transmission lines, in the second condition, makes the refractive index distributions of the first and second multi-mode partial optical transmission lines the same as each other, and in the first condition, makes a highest refractive index of the first multi-mode partial optical transmission line higher than a highest refractive index of the second multi-mode partial optical transmission line in the second condition, and makes the highest refractive index of the second multi-mode partial optical transmission line lower than the highest refractive index of the first multi-mode partial optical transmission line in the second condition.

Preferably, of the first and second multi-mode optical transmission lines, the optical transmission line whose refractive index distribution is changeable by the refractive index modulating means is made of a polymer exhibiting a thermooptic effect, and the refractive index modulating means includes a thermal sheet capable of generating/absorbing heat according to the control signal, and changes the refractive index distribution by changing a temperature of the optical transmission line by the thermal sheet.

Preferably, in the optical transmission line, a size in the direction of the length is a value that is substantially an odd multiple of the following expression when the basic mode width, in the direction of the width, of the transmission line is $W_0$, an effective refractive index of a 0th-order mode beam excited in the direction of the width is $n_0$ and the wavelength of the beam transmitted in the first and second optical transmission lines is $\lambda$:

$$\frac{4n_0 W_0^2}{\lambda}$$

Preferably, the optical transmission line has a size, in the direction of the width, that is $(1/\sqrt{2})$ times with respect to the direction of the width to which the optical transmission line is added. According to this structure, the exiting beam can be generated by the multi-mode interference also in the second condition.

Preferably, the optical transmission line includes a refractive index distribution such that a central position in the direction of the thickness has the highest refractive index and the refractive index does not increase with distance from the central position. In particular, it is preferable that the refractive index distributions change substantially along a quadratic function.

In the optical waveguides described in Documents (4) to (8) and (11), the optical waveguide is single-mode both on the input side and on the exit side (the core diameter is 10 μm at most). Therefore, when eigenmodes that are different in the direction of the width are caused to interfere with each other (multi-mode interference: hereinafter, sometimes referred to as MMI) and the exiting beam is generated based on the self-imaging principle, it is necessary for the separation between the exiting beams at the output end only to be approximately 10 μm corresponding to the core diameter of the optical waveguide on the output side in the case where one beam is split into two beams. However, when the optical waveguides on the input side and on the output side are both multi-mode optical waveguides, the core diameter calculated in a similar manner is as large as approximately 20 μm to 1,000 μm. For this reason, it is necessary that the separation between the exiting beams at the output end of the optical waveguide be at least not less than the core diameter.

The separation between the exiting beams based on the self-imaging principle of the multi-mode interference is substantially proportional to the width of the optical waveguide. Moreover, the size, in the direction of the length, of the optical waveguide in this case is substantially proportional to the square of the size in the direction of the width. For this reason, when the optical waveguides on the input side and on the output side are both multi-mode optical waveguides, the configuration of the optical waveguides is as large as 2 to 100 times in the direction of the width and 4 to 10,000 times in the direction of the length compared to the case of single-mode optical waveguides. For example, when 200-μm multi-mode optical fibers are used as the input and output waveguides, the size in the direction of the width is 20 times and the size in the direction of the length is approximately 200 times (specifically, the width: approximately 400 μm, the length: approximately 120,000 μm) compared to the case where single-mode optical fibers are used; such optical waveguides are large and inferior in the balance (ratio) between the width and length, and are therefore difficult to handle.

Further, the profile of the exiting beam generated based on the self-imaging principle of the multi-mode interference is substantially the same as the profile of the incident beam. For this reason, when two or more beams are combined into one beam or one beam is split into two or more beams, that is, when a larger number of incident and exiting beams having a large mode field are inputted and outputted at the incident and exit ends, it is necessary that the size, in the direction of the width, of the optical waveguide be increased. As has already been mentioned, the size, in the direction of the length, of the optical waveguide that generates the exiting beam based on the self-imaging principle of the multi-mode interference is substantially proportional to the square of the size in the direction of the width. Therefore, when the size, in the direction of the width, of the optical waveguide is increased, it is necessary that the size in the direction of the length be larger than that in the case where one beam is split into two beams.

Accordingly, a fourth object of the present invention is to provide an optical device having a sheet-form multi-mode optical transmission line where the coupling when a signal beam is made incident and made to exit is easy and loss is small, being capable of high-speed transmission of approximately 10 Gbs equal to the speed of the signal beam transmission in a single mode, and in which the sizes, in the direction of the width and in the direction of the length, of the sheet-form multi-mode optical transmission line are small. Moreover, the fourth object of the present invention is to provide a method of manufacturing the above-described optical device.

The above-mentioned fourth object is achieved by the following fifth optical device:

In an optical device for changing a distance between a number, N (N=2,3,4, . . . ), of signal beams disposed on a straight line, a number, N, of optical transmission lines are disposed on the straight line, the optical transmission lines being sheet-form and including a refractive index distribution such that a highest refractive index part is provided in a direction of a thickness of the sheet and a refractive index does not increase with distance from the highest refractive index part in the direction of the thickness, the signal beams are made incident on the optical transmission lines as incident beams, inside the optical transmission lines, the incident beam is transmitted, in a direction of a length that is orthogonal to the direction of the thickness, in multiple modes having a plurality of eigenmodes in a direction of a width that is orthogonal to both the direction of the length and the direction of the thickness, and exiting beams are generated in positions different from positions where the incident beams are incident on the optical transmission lines in the direction of the width by the plurality of eigenmodes interfering with each other in the direction of the length, and the exiting beams are made to exit from the optical transmission lines as the signal beams.

In the fifth optical device according to the present invention, since the above structure is provided, the distance between a plurality of signal beams can be easily changed. Consequently, even when a multi-mode optical fiber or the like is used as the incident and exit portion, connection can be made without any increase in the size of the optical transmission line.

Preferably, the optical transmission lines include:

an incident surface for making the incident beams incident; and an exit surface for making the exiting beams exit, and the incident beams are made incident on given positions in the direction of the width on the incident surface and the exiting beams are generated in positions, on the exit surface, whose positions in the direction of the width are symmetrical to the incident positions of the incident beams with respect to a center in the direction of the width.

Preferably, the optical device increases the distance between the signal beams. Preferably, a sheet-form incident side optical transmission line is provided, and the optical transmission line is a 1×N optical splitting device that splits one incident beam into a number, N, of beams and connects the number, N, of exiting beams into which the incident beam is split, to the optical transmission lines as the signal beams.

The above-mentioned fourth object is achieved by the following sixth optical device:

An optical device for changing a position of a signal beam is provided with a plurality of optical transmission lines being sheet-form and including a refractive index distribution such that a highest refractive index part is provided in a direction of a thickness of the sheet and a refractive index does not increase with distance from the highest refractive index part in the direction of the thickness, the plurality of optical transmission lines are connected in multiple stages so that an exiting beam having exited from one of the optical transmission lines becomes an incident beam to be made incident on another one of the optical transmission lines, the signal beam is made incident on the optical transmission line as the incident beam, inside the optical transmission lines, the incident beam is transmitted, in a direction of a length that is orthogonal to the direction of the thickness, in multiple modes having a plurality of eigenmodes in a direction of a width that is orthogonal to both the direction of the length and the direction of the thickness, and the exiting beam is generated in a position different from a position where the incident beam is incident on the optical transmission lines in the direction of the width by the plurality of eigenmodes interfering with each other in the direction of the length, and the exiting beam is made to exit from the optical transmission lines as the signal beam.

In the sixth optical device according to the present invention, since the above structure is provided, the signal beam can be easily shifted in the direction of the width. Consequently, even when a multi-mode optical fiber or the like is used as the incident and exit portion, connection can be made without any increase in the size of the optical transmission line.

Preferably, the signal beam is a number, N (N=2,3, 4, . . . ), of signal beams disposed on a straight line, a number, N, of optical transmission lines are disposed on the straight line to change a distance between the number, N, of signal beams, the optical transmission lines being sheet-form and including a refractive index distribution such that a highest refractive index part is provided in a direction of a thickness of the sheet and a refractive index does not increase with distance from the highest refractive index part in the direction of the thickness, the signal beams are made incident on the optical transmission lines as the incident beams, inside the optical transmission lines, the incident beams are transmitted, in the direction of the length that is orthogonal to the direction of the thickness, in multiple modes having a plurality of eigenmodes in the direction of the width that is orthogonal to both the direction of the length and the direction of the thickness, and exiting beams are generated in positions different from positions where the incident beams are incident on the optical transmission lines in the direction of the width by the plurality of eigenmodes interfering with each other in the direction of the length, and the exiting beams are made to exit from the optical transmission lines as the signal beam.

The above-mentioned fourth object is achieved by the following seventh optical device:

An optical device that connects, by a signal beam, between an externally inputted input signal and an output signal to be outputted, is provided with:

a sheet-form optical transmission line being sheet-form and including a refractive index distribution such that a highest refractive index part is provided in a direction of a thickness of the sheet and a refractive index does not increase with distance from the highest refractive index part in the direction of the thickness;

an incident side optical transmission line that transmits the incident beam corresponding to the input signal so as to be incident on the sheet-form optical transmission line;

an incident side beam converter that connects the incident side optical transmission line and the sheet-form optical transmission line and converts a mode field of the incident side optical transmission line so that it can be incident on the sheet-form optical transmission line;

an exit side optical transmission line that transmits the exiting beam from the sheet-form optical transmission line so as to exit as the output signal; and an exit side beam converter that connects the exit side optical transmission line and the sheet-form optical transmission line and converts a mode field of the sheet-form optical transmission line so that it can be incident on the exit side optical transmission line, the signal beam exiting from the incident side beam converter is made incident on the sheet-form optical transmission line as the incident beam, inside the sheet-form optical transmission line, the incident beam is transmitted, in a direction of a length that is orthogonal to the direction of the thickness, in multiple modes having a plurality of eigenmodes in a direction of a width that is orthogonal to both the direction of the length and the direction of the thickness, and the exiting beam is generated by the plurality of eigenmodes interfering with each other in the direction of the length, and the exiting beam is made to exit from the sheet-form optical transmission line and made incident on the exit side beam converter.

In the seventh optical device according to the present invention, since the above structure is provided, the distance between a plurality of signal beams can be easily changed. Consequently, even when a multi-mode optical fiber or the like of a different mode field is used as the incident and exit portion, connection can be made without any increase in the size of the optical transmission line.

Preferably, the incident side beam converter is a lens element having a refractive index distribution such that a highest refractive index is provided at a center and a refractive index decreases with distance from the center, and is disposed in the same numbers as the signal beams that are made incident on the sheet-form optical transmission line.

Preferably, the incident side beam converter includes the refractive index distribution such that a change in refractive index between the center and a periphery gradually increases from a side of the incident side optical transmission line toward a side of the sheet-form optical transmission line.

Preferably, the incident side beam converter is a waveguide having a refractive index distribution such that the highest refractive index is provided in a central portion, in a direction parallel to the direction of the thickness, of the sheet-form optical transmission line and the refractive index decreases with distance from the central portion, and is disposed in the same numbers as the signal beams that are made incident on the sheet-form optical transmission line.

Preferably, the waveguide has a configuration such that a size in the direction of the width decreases toward a part of connection with the sheet-form optical transmission line. Preferably, further, the incident side beam converter is formed integrally with the sheet-form optical transmission line.

Preferably, the incident side beam converter is an optical transmission line having a refractive index distribution such that a highest refractive index is provided in a central portion, in a direction parallel to the direction of the thickness and a direction parallel to the direction of the width, of the sheet-form optical transmission line and the refractive index decreases with distance from the central portion, and the number of incident side beam converters disposed for the sheet-form optical transmission line is one.

Preferably, the exit side beam converter is a lens element having a refractive index distribution such that a highest refractive index is provided at a center and a refractive index decreases with distance from the center, and is disposed in the same numbers as the signal beams exiting from the sheet-form optical transmission line.

Preferably, the exit side optical transmission line is an optical fiber having a refractive index distribution such that a highest refractive index is provided at a center and a refractive index decreases with distance from the center, and the exit side beam converter includes the refractive index distribution such that a change in refractive index between the center and a periphery gradually increases from a side of the exit side optical transmission line toward a side of the sheet-form optical transmission line.

Preferably, the exit side beam converter is a waveguide having a refractive index distribution such that the highest refractive index is provided in a central portion, in a direction parallel to the direction of the thickness, of the sheet-form optical transmission line and the refractive index decreases with distance from the central portion, and is disposed in the same numbers as the signal beams exiting from the sheet-form optical transmission line.

Preferably, further, the waveguide has a configuration such that a size in the direction of the width decreases toward a part of connection with the sheet-form optical transmission line. Preferably, further, the exit side beam converter is formed integrally with the sheet-form optical transmission line.

Preferably, the exit side beam converter is an optical transmission line having a refractive index distribution such that a highest refractive index is provided in a central portion, in a direction parallel to the direction of the thickness and a direction parallel to the direction of the width, of the sheet-form optical transmission line and the refractive index decreases with distance from the central portion, and the number of exit side beam converters disposed for the sheet-form optical transmission line is one.

The above-mentioned object is achieved by the following second optical device manufacturing method:

In a method of manufacturing an optical device that connects, by a signal beam, between an externally inputted input signal and an output signal to be outputted, the optical device is provided with:

a sheet-form optical transmission line being sheet-form and including a refractive index distribution such that a highest refractive index part is provided in a direction of a thickness of the sheet and a refractive index does not increase with distance from the highest refractive index part in the direction of the thickness;

an incident side optical transmission line that transmits the incident beam corresponding to the input signal so as to be incident on the sheet-form optical transmission line;

an incident side beam converter that connects the incident side optical transmission line and the sheet-form optical transmission line and converts a mode field of the incident side optical transmission line so that it can be incident on the sheet-form optical transmission line;

an exit side optical transmission line that transmits the exiting beam from the sheet-form optical transmission line so as to exit as the output signal; and an exit side beam converter that connects the exit side optical transmission line and the sheet-form optical transmission line and converts a mode field of the sheet-form optical transmission line so that it can be incident on the exit side optical transmission line, the optical device manufacturing method comprising: a first step of preparing a forming die that has a concave portion corresponding to the sheet-form optical transmission line and at least one of the incident side beam converter and the exit side beam converter and is made of a material capable of transmitting an energy to be applied to cure a resin of which the sheet-form optical transmission line is made;

a second step of filling the concave portion with the resin;

a third step of applying the energy in a predetermined quantity to the forming die filled with the resin, from above and below in the direction of the thickness to form a desired refractive index distribution by curing the resin; and a fourth step of, when the incident side beam converter and the exit side beam converter not formed in the concave portion are present, connecting the converters to the cured resin, and further, connecting the incident side optical transmission line and the exit side optical transmission line.

In the second optical device manufacturing method according to the present invention, since the above steps are provided, an optical device provided with a sheet-form optical transmission line and an incident side optical transmission line including a desired refractive index distribution and an exit side optical transmission line can be easily manufactured with high precision.

Preferably, the application of the energy is an application of an ultraviolet ray of a predetermined wavelength, and the forming die is made of a material that is transparent with respect to the ultraviolet ray of the predetermined wavelength.

Moreover, preferably, the application of the energy is heating.

Preferably, a fifth step of releasing the cured resin from the forming die prior to the fourth step is provided.

Preferably, in the fourth step, when the incident side beam converter and the exit side beam converter not formed in the forming die are present, the converters are connected to the cured resin, and further, when the incident side optical transmission line and the exit side optical transmission line are connected together, the optical transmission lines are disposed on a substrate where a positioning portion for positioning the optical transmission lines is formed.

Preferably, in the first step, the forming die includes a positioning portion for positioning at least one of the incident side optical transmission line and the exit side optical transmission line, and in the fourth step, the optical transmission lines are disposed on the forming die where the positioning portion is formed.

Preferably, the incident side optical transmission line is an optical fiber. Moreover, preferably, the exit side optical transmission line is an optical fiber.

According to the first optical device according to the present invention, an optical device can be provided that has a sheet-form multi-mode optical transmission line where the coupling is easy and loss is small when a signal beam is made incident and made to exit and is capable of high-speed transmission of approximately 10 Gbs equal to the speed of the signal beam transmission in a single mode. Moreover, according to the first optical device manufacturing method according to the present invention, the above-described optical device can be manufactured.

Moreover, according to the first optical integrated device according to the present invention, an optical integrated device having the above-described optical device in a plurality of numbers can be provided. Moreover, according to the first optical integrated device manufacturing method according to the present invention, the above-described optical integrated device can be manufactured.

According to the second and third optical devices according to the present invention, an optical device can be provided that has a sheet-form multi-mode optical transmission line where the coupling is easy and loss is small when a signal beam is made incident and made to exit, is capable of high-speed transmission of approximately 10 Gbs equal to the speed of the signal beam transmission in a single mode and is capable of excellently performing demultiplexing and multiplexing of a multiple signal beam.

According to the fourth optical device according to the present invention, an optical device can be provided that has a sheet-form multi-mode optical transmission line where the coupling is easy and loss is small when a signal beam is made incident and made to exit, is capable of high-speed transmission of approximately 10 Gbs equal to the speed of the signal beam transmission in a single mode, and is capable of switching of the transmitted signal beam.

According to the fifth and sixth optical devices according to the present invention, an optical device can be provided that has a sheet-form multi-mode optical transmission line where the coupling is easy and loss is small when a signal beam is made incident and made to exit and is capable of high-speed transmission of approximately 10 Gbs equal to the speed of the signal beam transmission in a single mode and in which the sizes, in the direction of the width and in the direction of the length, of the sheet-form multi-mode optical transmission line are small.

When the incident and exit direction of the signal beam and the beam transmission direction of the sheet-form optical transmission line coincide with each other like the technology described in Document (1), the incident and exit portions and the sheet-form optical transmission line can be coupled together without any loss. That is, since it is easy to adjust the intensity peak of the signal beam incident on the sheet-form optical transmission line and the refractive index distribution of the sheet-form optical transmission line, the loss of the signal beam when the signal beam is incident can be made small.

However, in optical devices, it is necessary to dispose an optical part such as a laser on the incident side and dispose an optical part such as a sensor on the exit side. For this reason, when these optical parts and the sheet-form optical transmission line are coupled together, it is necessary to adjust the height between the optical parts and the sheet-form optical transmission line, so that it is necessary to perform padding when the optical parts are mounted. Consequently, the optical device cannot be made compact.

On the other hand, Document (16) is a technology regarding a single-mode sheet-form optical transmission line provided with no refractive index distribution. Therefore, in the optical waveguide described in Document (2), the mode dispersion occurs, so that a gigabit-class high-frequency signal beam cannot be transmitted in multiple modes.

Moreover, in recent years, an optical device that generates a signal beam by use of the multi-mode interference has been proposed. By using the multi-mode interference, an optical splitter that splits the incident signal beam into a plurality of signal beams and an optical combiner that combines a plurality of incident signal beams into a single signal beam can be easily obtained. However, there is no description as to the multi-mode interference in either of Document (1) and Document (16).

Accordingly, a fifth object of the present invention is to provide an optical device where optical parts can be easily mounted and that is capable of transmitting a gigabit-class high-frequency signal beam in multiple modes.

Moreover, a sixth object of the present invention is to provide an optical device where optical parts cab be easily mounted and that is capable of transmitting a gigabit-class high-frequency signal beam in multiple modes and is capable of making a signal beam exit by use of the multi-mode interference.

The above-mentioned fifth object is achieved by an eighth optical device having the following structure:

An optical device that transmits an externally incident signal beam and makes the transmitted signal beam to exit to an outside, is provided with an optical transmission line including a refractive index distribution in a first direction and being capable of transmitting the signal beam with a plurality of optical paths in a second direction orthogonal to the first direction, at least one of an optical axis of the signal beam incident on the optical transmission line and an optical axis of the signal beam exiting from the optical transmission line is not parallel to the second direction, and a phase difference, at the time of incidence on the optical transmission line, between the two optical paths, of the plurality of optical paths, incident on the optical transmission line symmetrically to each other with respect to the optical axis of the signal beam and a phase difference, at the time of exit from the optical transmission line, between the two optical paths are the same.

According to the above structure, since the eighth optical device according to the present invention is provided with the optical transmission line including the refractive index distribution in the first direction and being capable of transmitting the signal beam with a plurality of optical paths in the second direction orthogonal to the first direction, the mode dispersion is suppressed, so that gigabit-class high-frequency signal beams can be transmitted in multiple modes.

Moreover, since at least one of the optical axis of the signal beam incident on the optical transmission line and the optical axis of the signal beam exiting from the optical transmission line is not parallel to the second direction, it is unnecessary to perform padding when the optical parts are mounted. Consequently, the overall structure of the optical device can be made compact.

Further, since the phase difference, at the time of incidence on the optical transmission line, between the two optical paths, of the plurality of optical paths of the signal beam, incident on the optical transmission line symmetrically to each other with respect to the optical axis of the signal beam and the phase difference, at the time of exit from the optical transmission line, between the two optical paths are the same, the intensity distribution of the signal beam at the time of incidence can be made to exit as the signal beam as it is. That is, since no phase difference is caused by the optical transmission line, the signal beam can be made to exit from the optical transmission line with the intensity distribution of the incident beam being maintained, so that the signal beam can be made to exit from the optical transmission line without any loss.

Preferably, the optical device is provided with the following structure:

An incident portion for making the signal beam incident on the optical transmission line, and an exit portion for making the signal beam to exit from the optical transmission line are provided, and at least one of the incident portion and the exit portion is coupled to the optical transmission line so that the optical axis of the signal beam transmitted inside is in a direction not parallel to the second direction.

According to this structure, it is unnecessary to provide the incident portion or the exit portion at the end surface in the transmission direction of the optical transmission line. Consequently, it is unnecessary to perform padding when the optical parts are mounted.

Preferably, at least one of the incident portion and the exit portion is coupled to the optical transmission line so that the optical axis of the signal beam transmitted inside is orthogonal to the second direction.

According to this structure, the outside and the optical transmission line can be easily coupled together. For example, when optical parts such as a light emitting element that emits the signal beam that is incident on the optical transmission line and a light receiving element that receives the signal beam having exited from the optical transmission line are coupled to the optical transmission line, the optical parts can be easily mounted.

Preferably, an optical path length difference between the above-mentioned two optical axes is equal to an integral multiple of a wavelength of the transmitted signal beam (hereinafter, referred to as structure A). By providing the structure A, the phase difference between the two optical paths can be made zero.

In the structure A, preferably, the two optical axes include a number, m (m=1,2,3, . . . ), of optical path length difference generating portions where the optical path length difference is caused, and a sum of the optical path length differences caused in the number, m, of optical path length difference generating portions is equal to a natural multiple of the wavelength of the signal beam (hereinafter, referred to as structure 1). According to this structure, the phase difference between the two optical paths can be made zero.

In the structure 1, preferably, the optical transmission line is a sheet-form optical transmission line capable of trapping the signal beam in the first direction, and includes a refractive index distribution such that a refractive index in a central portion where a thickness in the first direction is half is the highest and the refractive index does not increase with distance from the central portion in the first direction. According to this structure, the signal beam is transmitted while the mode dispersion is suppressed by the refractive index distribution.

In the structure 1, preferably, further, the above-described sheet-form optical transmission line includes: a first reflecting surface for bending an optical axis of a signal beam incident from a direction not parallel to the second direction, in the second direction; and a second reflecting surface for bending an optical axis of a signal beam transmitted in the second direction, in the direction not parallel to the second direction, and the optical path length difference generating portion is a portion where refractive index histories of the two optical paths reflected by the first and second reflecting surfaces are different from each other.

According to this structure, the signal beam incident on the optical transmission line from a direction not parallel to the first direction can be easily made incident on the optical transmission line. Moreover, the signal beam exiting from the optical transmission line in a direction not parallel to the first direction can be easily made to exit from the optical transmission line.

In the structure 1, preferably, further, in the above-described sheet-form optical transmission line, a physical optical path length from a position where all of the signal beam is bent in the second direction by the first reflecting surface to a position immediately before all of the signal beam is incident on the second reflecting surface is equal to j (j=0,1,2,3, . . . ) times a period of meandering of an optical path transmitted while meandering based on the refractive index distribution. According to this structure, the intensity distribution of the signal beam is the same between on the incident side and on the exit side.

In the structure A, preferably, the two optical paths include a number, n (n=2,3,4, . . . ) of optical path length difference generating portions where an optical path length difference is caused, and a sum of the optical path length differences caused in the number, n, of optical path length difference generating portions is zero (hereinafter, referred to structure 2). According to this structure, the phase difference between the two optical paths can be made zero.

In the structure 2, preferably, the optical transmission line is a sheet-form optical transmission line capable of trapping the signal beam in the first direction, and includes a refractive index distribution such that a refractive index in a central portion where a thickness in the first direction is half is the highest and the refractive index does not increase with distance from the central portion in the first direction. According to this structure, the signal beam is transmitted while the mode dispersion is suppressed by the refractive index distribution.

In the structure 2, preferably, further, the above-described sheet-form optical transmission line includes: a first reflecting surface for bending an optical axis of a signal beam incident from a direction not parallel to the second direction, in the second direction; and a second reflecting surface for bending an optical axis of a signal beam transmitted in the second direction, in the direction not parallel to the second direction, and the optical path length difference generating portions are portions where refractive index histories of the two optical paths reflected by the first and second reflecting surfaces are different from each other.

According to this structure, the signal beam incident on the optical transmission line from a direction not parallel to the second direction can be easily made incident on the optical transmission line. Moreover, the signal beam exiting from the optical transmission line in a direction not parallel to the second direction can be easily made to exit from the optical transmission line.

In the structure 2, preferably, further, in the above-described sheet-form optical transmission line, a physical optical path length from a position where all of the signal beam is bent in the second direction by the first reflecting surface to a position immediately before all of the signal beam is incident on the second reflecting surface is equal to (j+0.5) (j=0,1,2,3, . . . ) times a period of meandering of an optical path transmitted while meandering based on the refractive index distribution. According to this structure, the intensity distribution of the signal beam is the same between on the incident side and on the exit side.

Preferably, an optical path length difference between the two optical paths is zero (hereinafter, referred to as structure B). By providing the structure B, the phase difference between the two optical paths can be made zero.

In the structure B, preferably, the two optical paths include a number, n (n=2,3,4, . . . ) of optical path length difference generating portions where an optical path length difference is caused, and a sum of the optical path length differences caused in the number, n, of optical path length difference generating portions is zero (hereinafter, referred to as structure 2). According to this structure, the phase difference between the two optical paths can be made zero.

In the structure 2, preferably, the optical transmission line is a sheet-form optical transmission line capable of trapping the signal beam in the first direction, and includes a refractive index distribution such that a refractive index in a central portion where a thickness in the first direction is half is the highest and the refractive index does not increase with distance from the central portion in the first direction. According to this structure, the signal beam is transmitted while the mode dispersion is suppressed by the refractive index distribution.

In the structure 2, preferably, further, the above-described sheet-form optical transmission line includes: a first reflecting surface for bending an optical axis of a signal beam incident from a direction not parallel to the second direction, in the second direction; and a second reflecting surface for bending an optical axis of a signal beam transmitted in the second direction, in the direction not parallel to the second direction, and the optical path length difference generating portions are portions where refractive index histories of the two optical paths reflected by the first and second reflecting surfaces are different from each other.

According to this structure, the signal beam incident on the optical transmission line from a direction not parallel to the second direction can be easily made incident on the optical transmission line. Moreover, the signal beam exiting from the optical transmission line in a direction not parallel to the second direction can be easily made to exit from the optical transmission line.

In the structure 2, preferably, further, in the above-described sheet-form optical transmission line, a physical optical path length from a position where all of the signal beam is bent in the second direction by the first reflecting surface to a position immediately before all of the signal beam is incident on the second reflecting surface is equal to (j+0.5) (j=0,1,2,3, . . . ) times a period of meandering of an optical path transmitted while meandering based on the refractive index distribution. According to this structure, the intensity distribution of the signal beam is the same between on the incident side and on the exit side.

In the structure B, preferably, the two optical paths do not have a portion where the optical path length difference is caused (hereinafter, referred to as structure 3). According to this structure, the phase difference between the two optical paths can be made zero.

In the structure 3, preferably, further, the optical transmission line is a sheet-form optical transmission line capable of trapping the signal beam in the first direction, and includes a refractive index distribution such that a refractive index in a central portion where a thickness in the first direction is half is the highest and the refractive index does not increase with distance from the central portion in the first direction.

In the structure 3, preferably, further, the sheet-form optical transmission line includes: a first reflecting surface for bending an optical axis of a signal beam incident from a direction not parallel to the second direction, in the second direction; and a second reflecting surface for bending an optical axis of a signal beam transmitted in the second direction, in the direction not parallel to the second direction, a physical optical path length between the first reflecting surface and the second reflecting surface in the central portion is equal to j/2 (j=0,1,2,3, . . . ) times a period of meandering of an optical path transmitted while meandering based on the refractive index distribution, and the signal beam is condensed into a line parallel to a third direction orthogonal to both the first direction and the second direction in the central portion where the thickness, in the first direction, of the optical transmission line is half on the first reflecting surface and the second reflecting surface.

According to this structure, the first reflecting surface and the second reflecting surface are optically in a conjugate relationship at the central portion. For this reason, the two optical paths do not have a part where an optical path length difference is caused, between the first reflecting surface and the second reflecting surface. Consequently, the phase difference between the two optical paths can be made zero.

Moreover, the above-mentioned sixth object is achieved by a ninth optical device having the following structure:

An optical device that transmits an externally incident signal beam and makes the transmitted signal beam exit from a predetermined position to an outside by a multi-mode interference, is provided with:

a sheet-form optical transmission line including a refractive index distribution in a first direction, being capable of transmitting the signal beam in a second direction orthogonal to the first direction, and being capable of trapping the signal beam in the first direction;

a number, M (M=1,2,3, . . . ), of incident portions for making the signal beam incident on the sheet-form optical transmission line; and a number, N (N=1,2,3, . . . ), of exit portions for making the signal beam exit from the sheet-form optical transmission line, the number, M, of incident portions and the number, N, of exit portions include at least one nonparallel incident and exit portion that is coupled to the sheet-form optical transmission line in a direction where an optical axis of the signal beam transmitted inside is not parallel to the second direction, between two optical paths incident on the sheet-form optical transmission line symmetrically to each other with respect to the optical axis of the signal beam, of a plurality of optical paths of the signal beam transmitted between the nonparallel incident and exit portion and the corresponding incident or exit portion, a phase difference at the time of incidence on the sheet-form optical transmission line and a phase difference at the time of exit from the sheet-form optical transmission line are the same, and the number, M, of incident portions and the number, N, of exit portions are all disposed in positions satisfying a predetermined condition of a self-imaging principle of the multi-mode interference.

According to the above structure, since the ninth optical device according to the present invention is provided with the optical transmission line including the refractive index distribution in the first direction and being capable of transmitting the signal beam in the second direction orthogonal to the first direction by a plurality of optical paths, the mode dispersion is suppressed, so that gigabit-class high-frequency signal beams can be transmitted in multiple modes.

Moreover, since the nonparallel incident and exit portion is included, it is unnecessary to perform padding when the optical parts are mounted. Consequently, the overall structure of the optical device can be made compact.

Moreover, since the phase difference, at the time of incidence on the optical transmission line, between the two optical paths, of the plurality of optical paths of the signal beam, incident on the optical transmission line symmetrically to each other with respect to the optical axis of the signal beam and the phase difference, at the time of exit from the optical transmission line, between the two optical paths are the same, the intensity distribution of the signal beam at the time of incidence can be made to exit as the signal beam as it is. That is, since no phase difference is caused by the optical transmission line, the signal beam can be made to exit from the optical transmission line with the intensity distribution of the incident beam being maintained, so that the signal beam can be made to exit from the optical transmission line without any loss.

Further, the number, M, of incident portions and the number, N, of exit portions are all disposed in positions satisfying the predetermined condition of the self-imaging principle of the multi-mode interference, the signal beam can be controlled by use of the multi-mode interference. Consequently, an optical device such as an optical splitter or an optical combiner can be obtained.

Preferably, the nonparallel incident portion is coupled to the optical transmission line so that the optical axis of the signal beam transmitted inside is orthogonal to the second direction. According to this structure, the outside and the optical transmission line can be easily coupled together. For example, when optical parts such as a light emitting element that emits the signal beam that is incident on the optical transmission line and a light receiving element that receives the signal beam having exited from the optical transmission line are coupled to the optical transmission line, the optical parts can be easily mounted.

Preferably, an optical path length difference between the two optical paths is equal to an integral multiple of a wavelength of the transmitted signal beam (hereinafter, referred to structure A). By providing the structure A, the phase difference between the two optical paths can be made zero.

In the structure A, preferably, the two optical paths include a number, m (m=1,2,3, . . . ) of optical path length difference generating portions where the optical path length difference is caused, and a sum of the optical path length differences caused in the number, m, of optical path length difference generating portions is equal to a natural multiple of the wavelength of the signal beam (hereinafter, referred to as structure 1). According to this structure, the phase difference between the two optical paths can be made zero.

In the structure 1, preferably, the optical transmission line includes a refractive index distribution such that a refractive index in a central portion where a thickness in the first direction is half is the highest and the refractive index does not increase with distance from the central portion in the first direction. According to this structure, the signal beam is transmitted while the mode dispersion is suppressed by the refractive index distribution.

In the structure 1, preferably, further, the above-described sheet-form optical transmission line includes: a first reflecting surface for bending an optical axis of a signal beam incident from a direction not parallel to the second direction, in the second direction; and a second reflecting surface for bending an optical axis of a signal beam transmitted in the second direction, in the direction not parallel to the second direction, the optical path length difference generating portion is a portion where refractive index histories of the two optical paths reflected by the first and second reflecting surfaces are different from each other.

According to this structure, the signal beam incident on the optical transmission line from a direction not parallel to the first direction can be easily made incident on the optical transmission line. Moreover, the signal beam exiting from the optical transmission line in a direction not parallel to the first direction can be easily made to exit from the optical transmission line.

In the structure 1, preferably, further, in the above-described sheet-form optical transmission line, a physical optical path length from a position where all of the signal beam is bent in the second direction by the first reflecting surface to a position immediately before all of the signal beam is incident on the second reflecting surface is equal to j (j=0,1,2,3, . . . ) times a period of meandering of an optical path transmitted while meandering based on the refractive index distribution. According to this structure, the intensity distribution of the signal beam is the same between on the incident side and on the exit side.

In the structure A, preferably, the two optical paths include a number, n (n=2,3,4, . . . ) of optical path length difference generating portions where the optical path length difference is caused, and a sum of the optical path length differences caused in the number, n, of optical path length difference generating portions is zero (hereinafter, referred to as structure 2). According to this structure, the phase difference between the two optical paths can be made zero.

In the structure 2, preferably, the optical transmission line includes a refractive index distribution such that a refractive index in a central portion where a thickness in the first direction is half is the highest and the refractive index does not increase with distance from the central portion in the first direction. According to this structure, the signal beam is transmitted while the mode dispersion is suppressed by the refractive index distribution.

In the structure 2, preferably, further, the above-described sheet-form optical transmission line includes: a first reflecting surface for bending an optical axis of a signal beam incident from a direction not parallel to the second direction, in the second direction; and a second reflecting surface for bending an optical axis of a signal beam transmitted in the second direction, in the direction not parallel to the second direction, and the optical path length difference generating portions are portions where refractive index histories of the two optical paths reflected by the first and second reflecting surfaces are different from each other.

According to this structure, the signal beam incident on the optical transmission line from a direction not parallel to the second direction can be easily made incident on the optical transmission line. Moreover, the signal beam exiting from the optical transmission line in a direction not parallel to the first direction can be easily made to exit from the optical transmission line.

In the structure 2, preferably, further, in the sheet-form optical transmission line, a physical optical path length from a position where all of the signal beam is bent in the second direction by the first reflecting surface to a position immediately before all of the signal beam is incident on the second reflecting surface is equal to (j+0.5) (j=0,1,2,3, . . . ) times a period of meandering of an optical path transmitted while meandering based on the refractive index distribution. According to this structure, the intensity distribution of the signal beam is the same between on the incident side and on the exit side.

Preferably, an optical path length difference between the two optical paths is zero (hereinafter, referred to as structure B). By providing the structure B, the phase difference between the two optical paths can be made zero.

In the structure B, preferably, the two optical paths include a number, n (n=2,3,4, . . . ) of optical path length difference generating portions where the optical path length difference is caused, and a sum of the optical path length differences caused in the number, n, of optical path length difference generating portions is zero (hereinafter, referred to as structure 2). According to this structure, the phase difference between the two optical paths can be made zero.

In the structure 2, preferably, the optical transmission line includes a refractive index distribution such that a refractive index in a central portion where a thickness in the first direction is half is the highest and the refractive index does not increase with distance from the central portion in the first direction. According to this structure, the signal beam is transmitted while the mode dispersion is suppressed by the refractive index distribution.

In the structure 2, preferably, further, the above-described sheet-form optical transmission line includes: a first reflecting surface for bending an optical axis of a signal beam incident from a direction not parallel to the second direction, in the second direction; and a second reflecting surface for bending an optical axis of a signal beam transmitted in the second direction, in the direction not parallel to the second direction, and the optical path length difference generating portions are portions where refractive index histories of the two optical paths reflected by the first and second reflecting surfaces are different from each other.

According to this structure, the signal beam incident on the optical transmission line from a direction not parallel to the second direction can be easily made incident on the optical transmission line. Moreover, the signal beam exiting from the optical transmission line in a direction not parallel to the second direction can be easily made to exit from the optical transmission line.

In the structure 2, preferably, further, in the above-described sheet-form optical transmission line, a physical optical path length from a position where all of the signal beam is bent in the second direction by the first reflecting surface to a position immediately before all of the signal beam is incident on the second reflecting surface is equal to (j+0.5) (j=0,1,2,3, . . . ) times a period of meandering of an optical path transmitted while meandering based on the refractive index distribution. According to this structure, the intensity distribution of the signal beam is the same between on the incident side and on the exit side.

In the structure B, preferably, the two optical paths do not have a portion where the optical path length difference is caused (hereinafter, referred to as structure 3). According to this structure, the phase difference between the two optical paths can be made zero.

In the structure 3, preferably, the optical transmission line includes a refractive index distribution such that a refractive index in a central portion where a thickness in the first direction is half is the highest and the refractive index does not increase with distance from the central portion in the first direction.

In the structure 3, preferably, further, the above-described sheet-form optical transmission line includes: a first reflecting surface for bending an optical axis of a signal beam incident from a direction not parallel to the second direction, in the second direction; and a second reflecting surface for bending an optical axis of a signal beam transmitted in the second direction, in the direction not parallel to the second direction, a physical optical path length between the first reflecting surface and the second reflecting surface in the central portion is equal to j/2 (j=0,1,2,3, . . . ) times a period of meandering of an optical path transmitted while meandering based on the refractive index distribution, and the signal beam is condensed into a line parallel to a third direction orthogonal to both the first direction and the second direction in the central portion where the thickness, in the first direction, of the optical transmission line is half on the first reflecting surface and the second reflecting surface.

According to this structure, the first reflecting surface and the second reflecting surface are optically in a conjugate relationship at the central portion. For this reason, the two optical paths do not have a part where an optical path length difference is caused, between the first reflecting surface and the second reflecting surface. Consequently, the phase difference between the two optical paths can be made zero.

BRIEF DESCRIPTION OF THE DRAWINGS

FIG. 1A is a perspective view showing the general outline of a graded index slab waveguide of an optical device that splits one beam into two beams according to a first embodiment of the present invention.

FIG. 1B is a cross-sectional view of the graded index slab waveguide of the optical device that splits one beam into two beams according to the first embodiment of the present invention.

FIG. 21A is a perspective view showing the general outline of a graded index slab waveguide of an optical device that performs beam multiplexing according to a twelfth embodiment of the present invention.

FIG. 21B is a cross-sectional view of the graded index slab waveguide of the optical device that performs beam multiplexing according to the twelfth embodiment of the present invention.

FIG. 27 is a perspective view showing the general outline of the structure of an optical device according to a first modification of the fourteenth embodiment of the present invention.

FIGS. 32 are explanatory views explaining the mechanism of the refractive index distribution using polysilane.

BEST MODE FOR CARRYING OUT THE INVENTION

Hereinafter, embodiments of the present invention will be described with reference to the drawings. The present invention is not limited to the embodiments described below. Moreover, the present invention includes combinations of the embodiments described below. In the graded index slab waveguides according to the embodiments, the direction parallel to the z-axis is defined as the direction of the length, the direction parallel to the y-axis is defined as the direction of the thickness and the direction parallel to the x-axis is defined as the direction of the width. In particular, the direction, toward the positive side, of the z-axis is defined as the transmission direction. Moreover, in the graded index slab waveguides according to the embodiments, the size in the direction parallel to the x-axis is the slab width (W), the size in the direction parallel to the y-axis is the slab thickness (D), and the size in the direction parallel to the z-axis is the slab length L. Unless otherwise specified, in the figures, the refractive index distribution is schematically shown by the shading in the figures, and the darker the shading is, the higher the refractive index is.

First Embodiment

Figure 18:
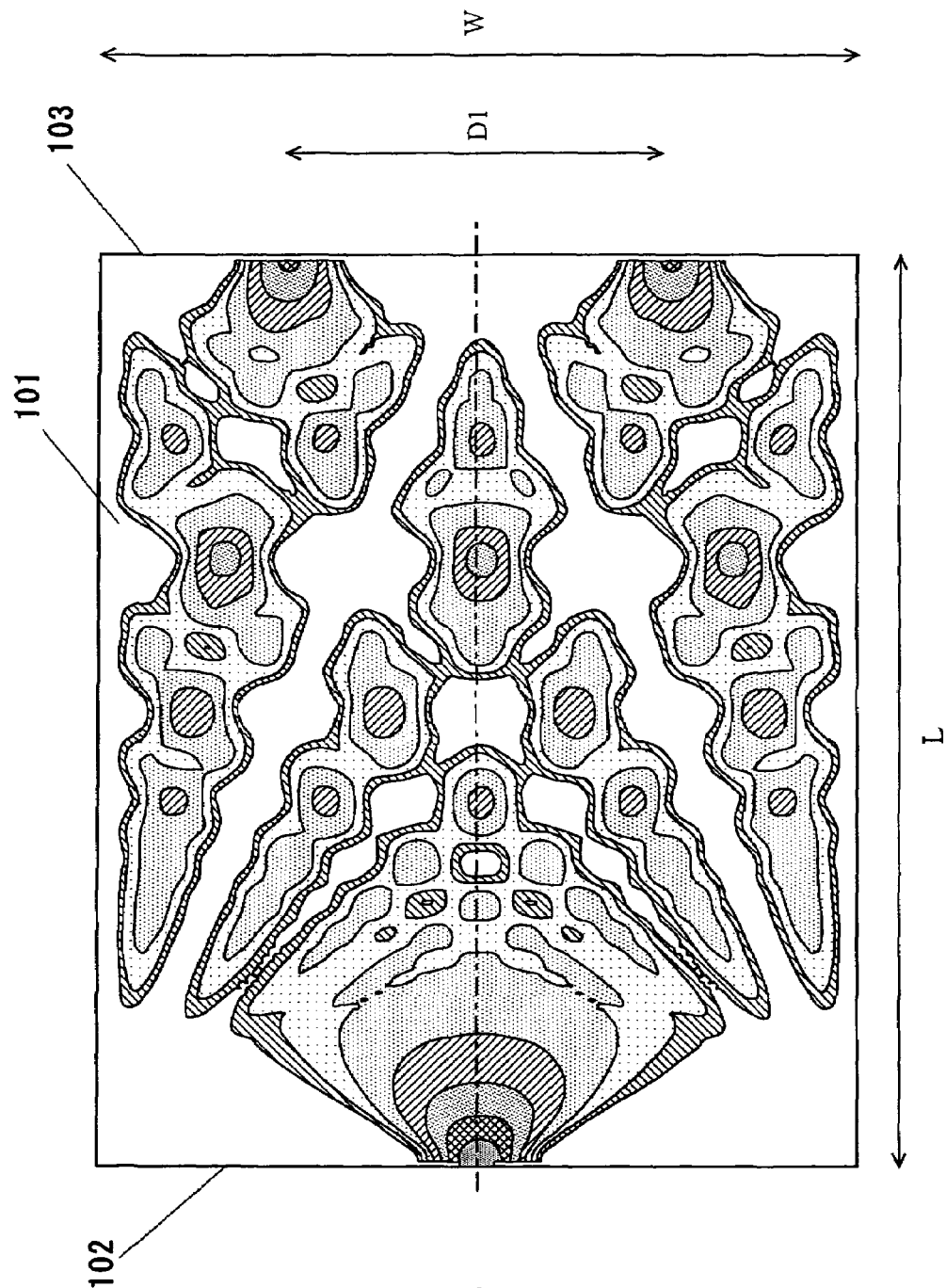
FIG. 18 is a result of a BPM (beam propagation method) simulation in the case where one signal beam is split into two beams.

FIG. 1A is a perspective view showing the general outline of a graded index slab waveguide 101 of an optical device that splits one beam into two beams according to a first embodiment of the present invention. FIG. 1B is a cross-sectional view of the graded index slab waveguide 101 of the optical device that splits one beam into two beams according to the first embodiment of the present invention. FIG. 18 is a result of a BPM (beam propagation method) simulation in the case where one beam is split into two beams.

The optical device according to the first embodiment comprises as a main element the graded index slab waveguide 101 that transmits beams. The graded index slab waveguide 101 is, as shown in FIG. 1A, a sheet-form multi-mode optical transmission line that extends parallel to the x-z plane. The graded index slab waveguide 101 has a refractive index distribution in the direction of the thickness such that the highest refractive index $n_{max}$ is provided at the central position in the direction of the thickness and the refractive index does not increase with distance from the center. The graded index slab waveguide 101 has a uniform refractive index in the direction of the width and has no refractive index distribution. The graded index slab waveguide 101 includes an incident surface 102 and an exit surface 103. The incident surface 102 is opposed to an incident portion (not shown) that makes an incident beam 107 incident on the central position in the direction of the width. The exit surface 103 is opposed to an exit portion (not shown) that receives two exiting beams 108 that exit from positions symmetrical with respect to the center in the direction of the width. The incident portion makes the incident beam 107 corresponding to a signal beam incident on the central position, in the direction of the width, of the incident surface 102. The incident beam 107 is transmitted inside the graded index slab waveguide 101. The incident beam 107 is split into two beams according to the self-imaging principle of the multi-mode interference described later inside the graded index slab waveguide 101, and exits as the two exiting beams 108 from positions, apart from each other in the direction of the width, of the exit surface 103 to reach the exit portion.

The slab length L of the graded index slab waveguide 101 is substantially $n_0 \times W_0^2 / (2\lambda)$, and the distance D1, in the direction of the width, between the exit positions of the two exiting beams 108 is substantially, $W_0/2$. Here, $W_0$ is the width of the basic mode, in the direction of the width, of the graded index slab waveguide 101, and $n_0$ is the effective refractive index of the 0th-order mode beam excited in the direction of the width. The effective refractive index $n_0$ is a constant determined by the highest refractive index $n_{max}$ in the direction of the thickness and the configuration of the graded index slab waveguide 101. However, behind the position where the slab length L coincides with $n_0 \times W_0^2 / (2\lambda)$, similar output is repeated every length $n_0 \times W_0^2 / \lambda$ by the self-imaging principle. Therefore, by the slab length L being an odd multiple of $n_0 \times W_0^2 / (2\lambda)$, the slab length L can be adjusted so as to be a desired length.

For example, a case will be considered where in the graded index slab waveguide 101 shown in FIG. 1A, the effective refractive index $n_0$ with respect to the 0-th order mode beam excited in the direction of the width is approximately 1.5, the wavelength λ of the transmitted beam is 1.30 µm, the slab width W of the graded index slab waveguide 101 is 400 µm and the slab thickness D of the graded index slab waveguide 101 is 50 µm. The width $W_0$ of the basic mode, in the direction of the width, of the graded index slab waveguide 101 is dependent on the refractive index $n_1$ of the surrounding of the graded index slab waveguide 101. When the surrounding of the graded index slab waveguide 101 is air ($n_1 = 1$), since the value of $W_0$ is 400.16 µm, the value of the shortest slab length L of the graded index slab waveguide 101 is approximately 92,400 µm. At this time, the value of the distance D1 between the exit positions of the exiting beams 108 is 200.08 µm. FIG. 18 shows the result of the BPM simulation performed under the above-described conditions. In FIG. 18, a manner is seen in which the incident beam 107 incident on the central position, in the direction of the width, of the incident surface 102 is split into five beams, four beams and then, three beams while interfering in multiple modes in the direction of the length, and in the end, the incident beam 107 is split into two beams at the exit surface as designed.

The refractive index distribution, in the direction of the thickness, of the graded index slab waveguide 101 is approximately expressed, for example, by the highest refractive index $n_{max}$ at the central position in the direction of the thickness situated at the center in the direction of the thickness, the distance r away from the central position in the direction of the thickness and a refractive index distribution constant $A^{1/2}$ as shown by (Expression 1):

$$n = n_{max}\left(1 - A\frac{r^2}{2}\right) \qquad \text{(Expression 1)}$$

It is difficult for the actual refractive index distribution to completely coincide with (Expression 1) because of the difficulty of controlling the manufacturing process. The graded index slab waveguide 101 according to the first embodiment has a structure in which the part of the highest refractive index is formed in the vicinity of the center and the refractive index decreases according to the parabola as defined by (Expression 1) according to the distance from the part of the highest refractive index.

In actuality, in the signal beam transmitted through the graded index slab waveguide 101, a plurality of modes is excited in the direction of the width and the effective refractive index differs among the modes. As mentioned later, in the MMI, since the size in the direction of the length is a function of the effective refractive index of the 0th-order mode beam excited in the direction of the width, it is more convenient to replace the highest refractive index $n_{max}$ with the effective refractive index $n_0$ of the 0th-order mode beam excited in the direction of the width. Therefore, in the following discussion, the effective refractive index $n_0$ of the 0th-order mode beam excited in the direction of the width is used as the refractive index. The effective refractive index $n_0$ is determined by the highest refractive index $n_{max}$, the wavelength of the signal beam and the configuration of the sheet-form optical transmission line.

The refractive index distribution constant is optimized according to the film thickness of the graded index slab waveguide 101 and the profile of the incident beam 107 so that the beam transmitted in the graded index slab waveguide 101 does not spread outside the film thickness. For example, when the spread angle of the incident beam 107 is large compared to the film thickness of the graded index slab waveguide 101, the refractive index distribution constant is increased. Conversely, when the spread angle of the incident beam 107 is low, the refractive index distribution constant is decreased. Moreover, by adjusting the film thickness of the graded index slab waveguide 101 in accordance with the beam diameter of the incident beam 107, the coupling loss can be reduced. The refractive index distribution is not necessarily a continuous change as shown in (Expression 1); it may step wisely change as a function of the distance from the center.

Next, a mechanism will be described of, when an incident beam incident symmetrically with respect to the central line in the direction of the width is incident on the incident surface 102 of the graded index slab waveguide 101, splitting the incident beam into two beams symmetrically with respect to the central line in the direction of the width on the side of the exit surface 103. The case (i) of a beam transmitted within the central plane in the direction of the thickness (signal beam transmitted on the optical path designated A in FIG. 1B and (ii) a beam not transmitted within the central plane in the direction of the thickness will be described separately. As the beam of (ii) not transmitted within the central plane in the direction of the thickness, the following two signal beams are present: the case of an incident beam that is incident with an angle of axis shift on the central plane (signal beam transmitted on the optical path designated B in FIG. 1B) and the case of an incident beam that is incident on a position position-shifted (axis-shifted) from the central plane (signal beam transmitted on the optical path designated C in FIG. 1B). The beam of (i) transmitted within the central plane in the direction of the thickness is not affected by the refractive index distribution in the direction of the thickness. On the other hand, the beam of (ii) not transmitted within the central plane in the direction of the thickness is affected by the refractive index distribution in the direction of the thickness.

In the graded index slab waveguide 101, the behavior of the beam of (i) transmitted within the central plane in the direction of the thickness is equivalent to that in a case where a uniform refractive index is the effective refractive index $n_0$ with respect to the 0th-order mode excited in the direction of the width in the slab waveguide described in Document (11), because it is affected substantially only by the effective refractive index $n_0$. Therefore, the condition of the exiting beams with respect to the incident beam transmitted within the central plane, in the direction of the thickness, of the graded index slab waveguide 101 varies according to the slab length L by the multi-mode mode dispersion excited in the direction of the width of the slab waveguide whose refractive index is $n_0$ and uniform. Here, that the condition of the exiting beams varies means that the number and exit positions of images the same as the incident beam vary. The graded index slab waveguide 101 according to the first embodiment is structured so that by the slab length L substantially coinciding with $n_0 \times W_0^2/\lambda/2$ and making one incident beam 107 incident on the central position, in the direction of the width, of the incident surface 102, images the same as the incident beam 107 are formed on the exit surface 103 at an interval of substantially $W_0/2$ so as to be symmetrical with respect to the center in the direction of the width. The graded index slab waveguide 101 outputs two images formed on the exiting surface 103 as the two exiting beams 108. The two exiting beams 108 have the same profile since they are outputs of the same image as the incident beam 107.

By using this self-imaging principle of the multi-mode interference (MMI), a device having functions shown in the following (1) and (2) can be formed in accordance with the incident position in the direction of the width:

(1) Asymmetrical Incidence

In a slab waveguide having the uniform refractive index $n_0$, with respect to an incident beam shifted by x from the center in the direction of the width, an exiting beam having the same profile as the incident beam exits from the exit surface with the position and number thereof being varied according to the slab length L as shown by the following (Expression 2) to (Expression 8). Here, p and N are integers. Moreover, the integer p is an integer where (p±1/N) is positive.

(1-1)

$$L = p \frac{8 n_0 W_0^2}{\lambda} \quad \text{(Expression 2)}$$

By the slab length L satisfying (Expression 2), an exiting beam can be made to exit from a position corresponding to the incident beam in the direction of the width of the exit surface, that is, a position shifted by x, from the center in the direction of the width, in the same direction as that in the case of the incident beam.

(1-2)

$$L = (2p+1) \frac{4 n_0 W_0^2}{\lambda} \quad \text{(Expression 3)}$$

By the slab length L satisfying (Expression 3), an exiting beam can be made to exit from a position symmetrical to the incident beam with respect to the center in the direction of the width in the direction of the width of the exit surface, that is, a position shifted by x, from the center in the direction of the width, in the direction opposite to that in the case of the incident beam.

(1-3)

$$L = \left(p \pm \frac{1}{N}\right) \frac{4 n_0 W_0^2}{\lambda} \quad \text{(Expression 4)}$$

By the slab length L satisfying (Expression 4), a number, N, of exiting beams can be made to exit from a number, N, of positions between a position corresponding to the incident beam in the direction of the width of the exit surface, that is, a position shifted by x, from the center in the direction of the width, in the same direction as that in the case of the incident beam and a position symmetrical to the incident beam with respect to the center in the direction of the width in the direction of the width of the exit surface, that is, a position shifted by x, from the center in the direction of the width, in the direction opposite to that in the case of the incident beam.

When the number of incident beams is two and the incident positions thereof are both shifted by approximately $\pm W_0/6$ from the center, the slab length L is ⅓ the slab length L that is mentioned in (1-1) to (1-3) as shown below.

(1-1)′

-continued $$L = p\frac{8n_0 W_0^2}{3\lambda}$$ (Expression 5)

(1-2)'

$$L = (2p+1)\frac{4n_0 W_0^2}{3\lambda}$$ (Expression 6)

(1-3)'

$$L = \left(p \pm \frac{1}{N}\right)\frac{4n_0 W_0^2}{3\lambda}$$ (Expression 7)

(2) Symmetrical Center Incidence

In a slab waveguide having the uniform refractive index $n_0$, with respect to an incident beam that is incident symmetrically with respect to the center in the direction of the width, an exiting beam having the same profile as the incident beam exits from the exit surface with the position and number thereof being varied according to the slab length L as shown by the following (Expression 8). Here, p and N are integers. Moreover, the integer p is an integer where $(p \pm 1/N)$ is positive.

$$L = \left(p \pm \frac{1}{N}\right)\frac{n_0 W_0^2}{\lambda}$$ (Expression 8)

By the slab length L satisfying (Expression 8), a number, N, of exiting beams exit at intervals of $W_0/N$ so as to be symmetrical with respect to the center in the direction of the width of the exit surface.

When there is a plurality of incident beams, exiting beams are separately obtained for each of the incident beams, and the corresponding exiting beams are superimposed on each other.

The beam transmitted within the central plane, in the direction of the thickness, of the graded index slab waveguide 101 according to the first embodiment corresponds to a case where the refractive index is $n_0$ and N=2 in (Expression 8). Therefore, the incident beam is split into two beams at the exit end.

On the other hand, the beam of (ii) not transmitted within the central plane in the direction of the thickness propagates along the central plane while meandering in the direction of the thickness as shown in FIG. 1B, because it is affected by the refractive index distribution in the direction of the thickness. That is, since the beam traveling in a direction away from the central plane always travels from a part where the refractive index is relatively high to a part where the refractive index is relatively low, as the beam travels, the angle between the direction of travel and the direction of the thickness gradually increases, and becomes 90° at the position farthest from the central axis. Moreover, since the beam traveling in a direction toward the central plane always travels from a part where the refractive index is relatively low to a part where the refractive index is relatively high, as the beam travels, the angle between the direction of travel and the direction of the thickness gradually decreases, and becomes smallest at the position intersecting the central plane. Since the refractive index that affects the beam of (ii) not transmitted within the central plane in the direction of the thickness is always lower than the refractive index at the center although it makes the beam meander, the speed of the beam (ii) is higher than that of the beam of (i) transmitted on the central axis in the direction of the thickness.

When the refractive index distribution is the refractive index distribution of the quadratic function shown in (Expression 1), the component of the transmission speed parallel to the central plane of the beam of (ii) not transmitted within the central plane in the direction of the thickness is equal to the transmission speed of the beam of (i) transmitted within the central plane in the direction of the thickness. This means that there is no mode dispersion in the direction of the thickness. Therefore, the component, parallel to the central plane, of the beam of (ii) not transmitted within the central plane in the direction of the thickness (component, in a direction vertical to the direction of the thickness, of a meandering beam) of the incident beam is split into two beams symmetrically with respect to the center in the direction of the width at the exit surface like the beam of (i) transmitted within the central plane in the direction of the thickness.

Since the component, vertical to the central plane, of the beam of (ii) not transmitted within the central plane in the direction of the thickness (component, in the direction of the thickness, of a meandering beam) of the incident beam changes according to the propagation position of the meandering beam, the condition of the exiting beams cannot be determined. However, the component, in the direction of the thickness, of the meandering beam is not affected by a signal waveform disturbance due to the mode dispersion, because the mode dispersion in the direction of the thickness does not occur. For this reason, the component behaves equivalently to that in the case where there is no influence of the mode dispersion also in the direction of the width. Therefore, the two exiting beams each have the same image as the incident beam. From the above result, the beam of (ii) not transmitted within the central plane in the direction of the thickness (meandering beam) is split into two beams as the same image as the incident beam symmetrically with respect to the center in the direction of the width according to the slab waveguide configuration like in the case of (i).

As described above, since the incident beam is equally split into two beams with respect to all the eigenmodes in the direction of the thickness of the graded index slab waveguide 101, an optical device can be obtained that functions, if the incident beam is incident on the central position, in the direction of the width, of the incident surface, as a 1×2 splitting device even when the incident beam is position-shifted from the center in the direction of the thickness or has a large spread angle. Since the position shift, from the center in the direction of the width, of the incident beam is a cause of an imbalance in the splitting ratio between the exiting beams, when it is intended to obtain equal exiting beams, it is preferable that position shift be minimized. However, it is possible to adjust the splitting ratio by actively using the position shift.

As described above, since the 1×2 splitting device according to the first embodiment has a graded index slab waveguide having a slab length L which is an odd multiple of a value expressed by the following expression, with respect to an incident beam that is incident on the center, in the direction of the width, of the incident surface of the graded index slab waveguide, two exiting beams can be generated and outputted symmetrically with respect to the center, in the direction of the width, of the exit surface.

$$\frac{n_0 W_0^2}{2\lambda}$$

By interchanging the incident surface and the exit surface, the 1×2 optical splitting device according to the first embodiment can be used as a 2×1 optical combining device. In this case, two incident beams are made incident symmetrically with respect to the center, in the direction of the width, of the incident surface, and one exiting beam is made to exit from the center, in the direction of the width, of the exit surface. The slab length L of the 2×1 optical combining device is equal to the slab length L of the 1×2 optical splitting device.

Second Embodiment

Figure 2:
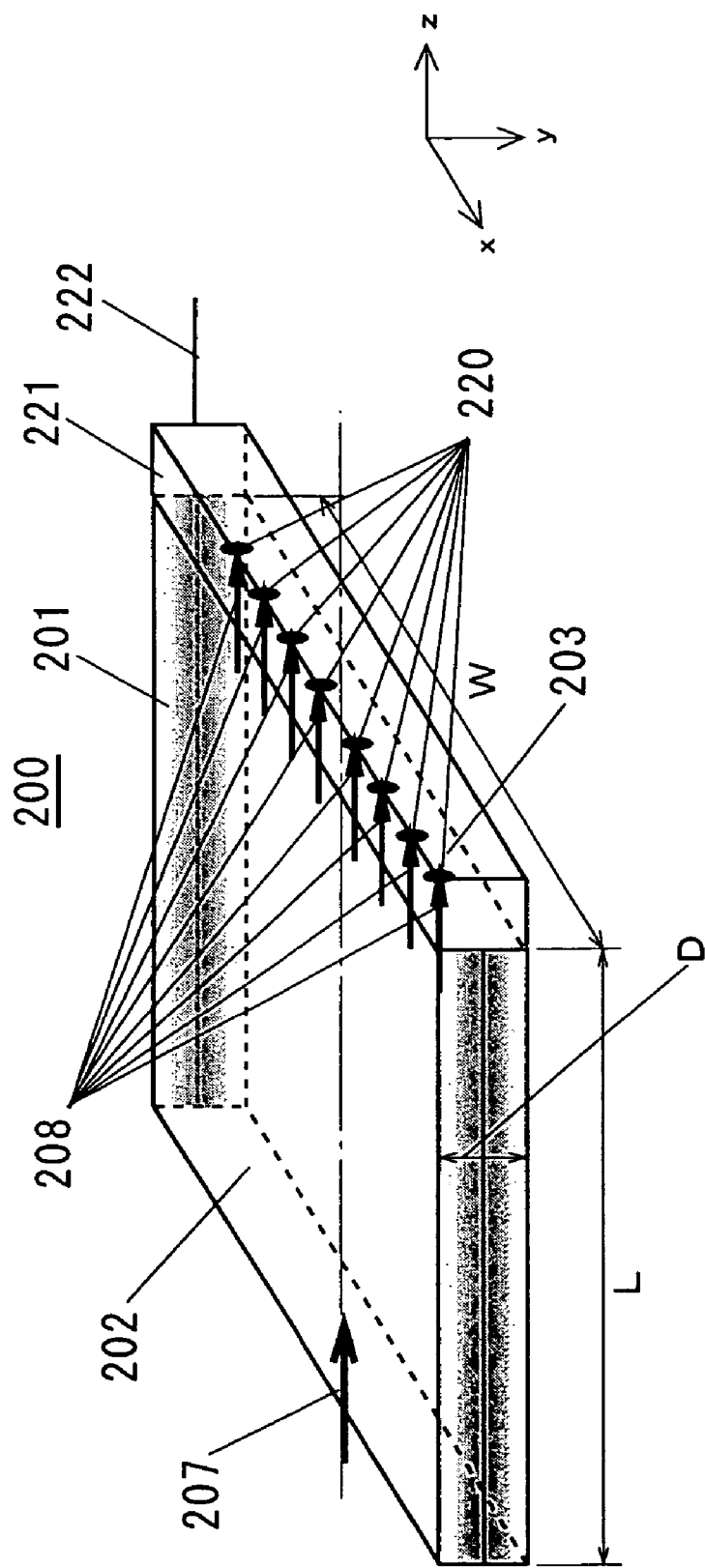
FIG. 2 is a perspective view showing the general outline of a graded index slab waveguide of an optical device that splits one beam into eight beams according to a second embodiment of the present invention.

FIG. 2 is a perspective view showing the general outline of a graded index slab waveguide of an optical device that splits one beam into eight beams according to a second embodiment of the present invention. The optical device according to the second embodiment comprises as a main element the graded index slab waveguide 201 that transmits beams. The graded index slab waveguide 201 is, as shown in FIG. 2, a sheet-form multi-mode optical transmission line that extends parallel to the x-z plane. The graded index slab waveguide 201 has a refractive index distribution such that the highest refractive index $n_{max}$ is provided at the center in the direction of the thickness and the refractive index does not increase with distance from the center. The graded index slab waveguide 201 has a uniform refractive index in the direction of the width and has no refractive index distribution. The graded index slab waveguide 201 includes an incident surface 202 and an exit surface 203. The incident surface 202 is opposed to an incident portion (not shown) that makes an incident beam 207 incident on the central position in the direction of the width. The exit surface 203 is opposed to a light receiving portion 220 that receives eight exiting beams 208 that exit from positions symmetrical with respect to the center in the direction of the width. Moreover, the optical device 200 according to the second embodiment is provided with an array O/E converter 221 and an output electric line (bus) 222. The array O/E converter 221 includes eight light receiving portions 220. The array O/E converter 221 is connected to the output electric line 222.

In the second embodiment, the slab length L substantially coincides with $n_0 \times W_0^2/(8\lambda)$, and the distance D1 between the exit positions of the eight exiting beams 208 substantially coincides with $W_0/8$. Here, the effective refractive index of the 0th-order mode beam excited in the direction of the width is $n_0$. By setting the slab length L and the exit position distance D1 to these values, eight images that are the same as the incident beam are formed on the exit surface at intervals of substantially $W_0/8$ so as to be symmetrical with respect to the center in the direction of the width. The graded index slab waveguide 201 according to the second embodiment outputs the eight images formed on the exit surface 203, as the eight exiting beams 208. The eight exiting beams 208 which are outputs of the same image as the incident beam 207 have the same profile. According to the self-imaging principle, since a similar phenomenon occurs every length of the value of the expression shown below, by changing the integer p, the slab length L can be adjusted according to use. The detailed mechanism of splitting one beam into eight beams and the mechanism in which there is no signal beam waveform disturbance in the direction of the thickness and in the direction of the width even in the case of high-speed transmission are similar to those of the first embodiment.

$$\left(p \pm \frac{1}{8}\right)\frac{nW_0^2}{\lambda}$$

(p is an integer that makes the value inside the parentheses positive)

By the above structure, the incident beam 207 is incident, as a signal beam, on the center, in the direction of the width, of the incident surface 202, and is transmitted inside the graded index slab waveguide 201. The signal beam is split into eight beams according to the self-imaging principle of the MMI inside the graded index slab waveguide 201, and exits as the eight exiting beams 208 from positions, apart from each other in the direction of the width, of the exit surface 203 to reach the eight light receiving portions 220. The signal beams received by the light receiving portions 220 are converted into electric signals by the array O/E converter 221, and outputted to the outside from the output electric line (bus) 222.

Moreover, in the optical device according to the second embodiment, the light receiving portions 220 that receive the exiting beams 208 having exited from the exit surface are formed in the array O/E converter 221 and the array O/E converter 221 is connected to the output electric line 222. By this structure, the exiting beams outputted from the graded index slab waveguide 201 are converted into electric signals in a space-saving manner, so that a coupler that couples the exiting beams to an optical fiber or the like is unnecessary. Consequently, the optical device according to the second embodiment can be structured so as to be easy to adjust and compact.

As described above, since the 1×8 optical splitting device according to the second embodiment has a graded index slab waveguide having a slab length L of a value expressed by the following expression, with respect to an incident beam that is incident on the center, in the direction of the width, of the incident surface of the graded index slab waveguide, eight exiting beams can be generated and outputted symmetrically with respect to the center, in the direction of the width, of the exit surface.

$$\left(p \pm \frac{1}{8}\right)\frac{nW_0^2}{\lambda}$$

(p is an integer that makes the value inside the parentheses positive)

By interchanging the incident surface and the exit surface, the 1×8 optical splitting device according to the second embodiment can be used as an 8×1 optical combining device. In this case, eight incident beams are made incident symmetrically with respect to the center, in the direction of the width, of the incident surface, and one exiting beam is made to exit from the center, in the direction of the width, of the exit surface. The slab length L of the 8×1 optical combining device is equal to the slab length L of the 1×2 optical splitting device.

While an example of the 1×2 optical splitting device is shown in the first embodiment and an example of the 1×8 optical splitting device is shown in the second embodiment, generally, a 1×N (N=1,2,3, . . . ) optical splitting device can be similarly designed. In this case, by making incident one incident beam on the central position, in the direction of the width, of the incident surface of the graded index slab waveguide having a slab length L that satisfies the value of the following expression, a number, N, of exiting beams can be obtained so as to be symmetrical with respect to the center, in the direction of the width, of the exit surface.

$$\left(p \pm \frac{1}{N}\right)\frac{nW_0^2}{\lambda}$$

(p is an integer that makes the value inside the parentheses positive)

In the case of an N×1 optical combining device, by making incident a number, N, of incident beams symmetrically with respect to the center, in the direction of the width, of the incident surface of the graded index slab waveguide having a similar slab length, one exiting beam can be obtained at the center of the exit surface.

Third Embodiment

Figure 3:
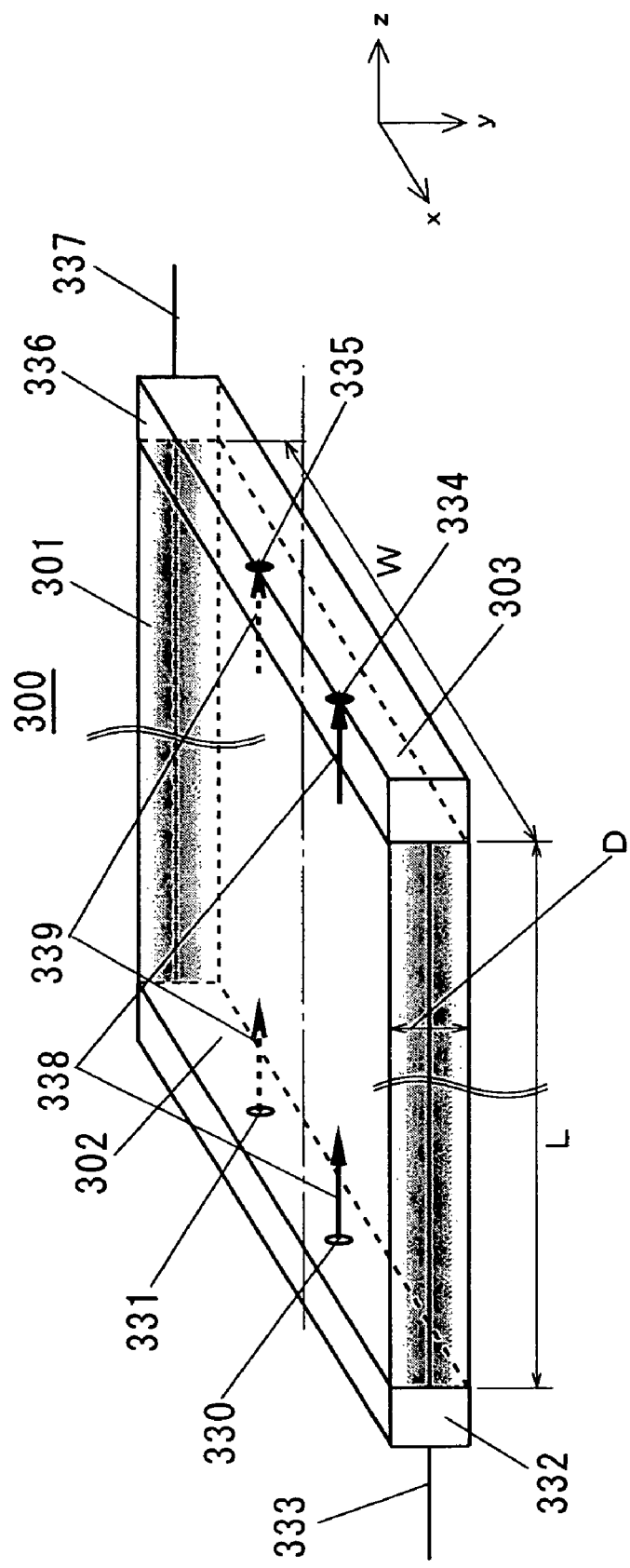
FIG. 3 is a perspective view showing the general outline of a two-signal straight sheet bus which is an optical device according to a third embodiment of the present invention.

FIG. 3 is a perspective view showing the general outline of a two-signal straight sheet bus which is an optical device according to a third embodiment of the present invention. The optical device according to the third embodiment comprises as a main element a graded index slab waveguide 301 that transmits beams. The graded index slab waveguide 301 is, as shown in FIG. 3, a sheet-form multi-mode optical transmission line that extends parallel to the x-z plane. The graded index slab waveguide 301 has a distribution such that the highest refractive index $n_{max}$ is provided at the center in the direction of the thickness and the refractive index does not increase with distance from the center. The graded index slab waveguide 301 has a uniform refractive index in the direction of the width and has no refractive index distribution. The optical device according to the third embodiment is provided with an array E/O converter 332, an input electric line (bus) 333, and an array O/E converter 336 and an output electric line (bus) 337.

The array E/O converter 332 includes a first light emitting portion 330 and a second light emitting portion 331. The first light emitting portion 330 makes a first beam 338 (wavelength: λ) incident on a given position in the direction of the width on an incident surface 302 of the graded index slab waveguide 301. The second light emitting portion 331 makes a second beam 339, having the same wavelength as the first beam, incident on a given position in the direction of the width on the incident surface of the graded index slab waveguide 301. Moreover, the array E/O converter 332 is connected to the input electric line (bus) 333. The array E/O converter 332 converts external electric signals inputted from the input electric line 333 into signal beams emitted from the first light emitting portion 330 and the second light emitting portion 331.

The array O/E converter 336 includes a first light receiving portion 334 and a second light receiving portion 335. The first light receiving portion 334 is disposed in a position whose position in the direction of the width is the same as that of the first light emitting portion 330 on the exit surface 303 of the graded index slab waveguide 301. The second light receiving portion 335 is disposed in a position whose position in the direction of the width is the same as that of the second light emitting portion 331 on the exit surface of the graded index slab waveguide 301. Moreover, the array O/E converter 336 is connected to the output electric line (bus) 337. The array O/E converter 336 converts signal beams received by the first light receiving portion 334 and the second light receiving portion 335 into electric signals, and outputs the electric signals to the output electric line 337.

The slab length L of the graded index slab waveguide 301 substantially coincides with $8 \times n_0 \times W_0^2/\lambda$. Here, the effective refractive index of the 0th-order mode beam excited in the direction of the width is $n_0$. The slab length L of the graded index slab waveguide 301 corresponds to the case where a plurality of incident beams is superimposed one on another in (Expression 2) of (1) Asymmetrical incidence described in the first embodiment. By setting the slab length L like this, the first beam 338 incident from the first light emitting portion 330 forms an image having the same profile as that when the beam is incident in the vicinity of the first light receiving portion 334. Likewise, the second beam 339 incident from the second light emitting portion 331 forms an image having the same profile as that when the beam is incident in the vicinity of the first light receiving portion 335. According to the self-imaging principle, since a similar phenomenon occurs every length of $8 \times n_0 \times W_0^2/\lambda$, by setting the slab length L to an integral multiple of $8 \times n_0 \times W_0^2/\lambda$, the length of the graded index slab waveguide 301 can be adjusted according to use. The detailed mechanism of splitting and the mechanism in which there is no signal beam waveform disturbance in the direction of the thickness and in the direction of the width even in the case of high-speed transmission are similar to those of the first embodiment.

By the above structure, when an external electric signal is inputted to the array E/O converter 332 from the input electric line 333, the array E/O converter 332 converts the external electric signal into the first beam 338 emitted from the first light emitting portion 330 and the second beam 339 emitted from the second light emitting portion 331. The first beam 338 emitted from the first light emitting portion 330 is incident on the graded index slab waveguide 301 through the incident surface 302 to be transmitted. The first beam 338 forms, according to the self-imaging principle, an image having the same profile as that when the beam is incident in the vicinity of the first light receiving portion 334. By this, the first beam 338 is outputted from the exit surface 303 to the first light receiving portion 334. On the other hand, the second beam 339 emitted from the second light emitting portion 331 is incident on the graded index slab waveguide 301 through the incident surface 302 to be transmitted. The second beam 339 forms, according to the self-imaging principle, an image having the same profile as that when the beam is incident in the vicinity of the second light receiving portion 335. By this, the second beam 339 is outputted from the exit surface 303 to the first light receiving portion 335. The first light receiving portion 334 outputs an electric signal corresponding to the received first beam 338. The second light receiving portion 335 outputs an electric signal corresponding to the received second beam 339. The outputted electric signals are outputted to the outside from the output electric line 337. As described above, by using the MMI, it is unnecessary to provide separate optical waveguides to straightly transmit two signal beams, and two signal beams can be independently transmitted with one graded index slab waveguide 301.

Figure 4:
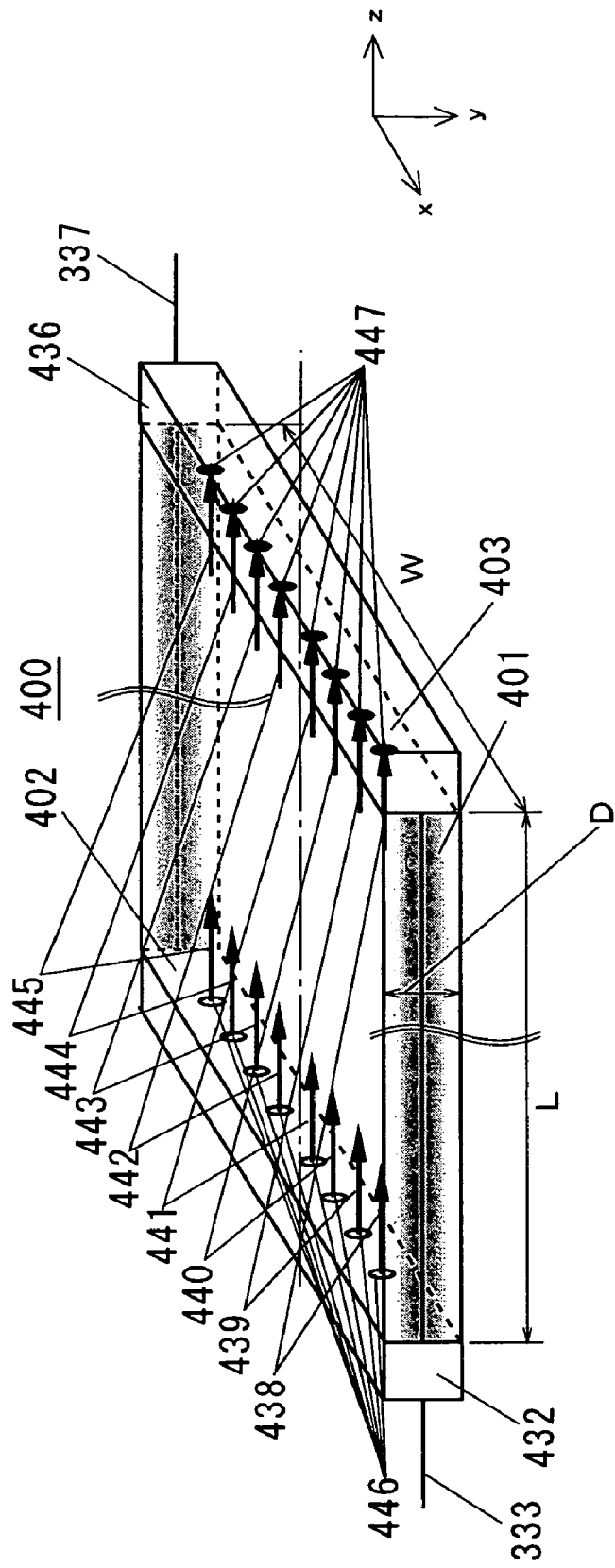
FIG. 4 is a perspective view showing the general outline of an eight-signal straight sheet bus which is an optical device according to a modification of the third embodiment of the present invention.

FIG. 4 is a perspective view showing the general outline of an eight-signal straight sheet bus which is an optical device according to a modification of the third embodiment of the present invention. The schematic structure of the optical device of the modification is the same as that of the previously-described two-signal straight sheet bus. The optical device of the modification is provided with a graded index slab waveguide 401, an array E/O converter 432, an input electric line (bus) 333, an array O/E converter 436 and an output electric line (bus) 337. The array E/O converter 432 has generally the same structure as the array E/O converter 332 of the two-signal straight sheet bus; however, it is different in that a light emitting portion group 446 comprising eight light emitting portions is formed instead of the first light emitting portion 330 and the second light emitting portion 331. Moreover, the array O/E converter 436 has generally the same structure as the array O/E converter 336 of the two-signal straight sheet bus; however, it is different in that a light receiving portion group 447 comprising eight light receiving portions is formed instead of the first light receiving portion 334 and the second light receiving portion 335. The positions, in the direction of the width, of the light emitting portions included in the light emitting portion group 446 all correspond to those of the light receiving portions included in the light receiving portion group 447.

The light emitting portion group 446 makes a first beam 438 to an eighth beam 445, which are eight signal beams all having the same wavelength, independently incident on the graded index slab waveguide 401 through an incident surface 402 based on the external electric signal inputted from the input electric line 333. The graded index slab waveguide 401 transmits the first beam 438 to the eighth beam 445. The first beam 438 to the eighth beam 445 exit from an exit surface 403 and are received by the light receiving portions, whose positions in the direction of the width are the same, of the light receiving portion group 447 like in the case of the graded index slab waveguide 301. The principle that eight incident beams independently appear in parallel positions in the direction of the width at the exit end corresponds to the case where a plurality of incident beams is superimposed one on another in (Expression 2) of (1) Asymmetrical incidence described in the first embodiment. As described above, by using the MMI, it is unnecessary to provide separate optical waveguides to straightly transmit eight signal beams, and eight signal beams can be independently transmitted with one graded index slab waveguide 401.

While examples of the two-signal straight sheet bus and the eight-signal straight sheet bus are shown in the third embodiment, generally, an N-signal straight sheet bus (N=1, 2,3, . . . ) can be similarly designed. In this case, by making a number, N, of incident beams incident on given positions of the incident surface of the graded index slab waveguide having a slab length L which is substantially an integral multiple of the following expression, a number, N, of exiting beams can be obtained from positions, whose positions in the direction of the width are the same, of the exit surface:

$$\frac{8n_0 W_0^2}{\lambda}$$

Fourth Embodiment

Figure 5:
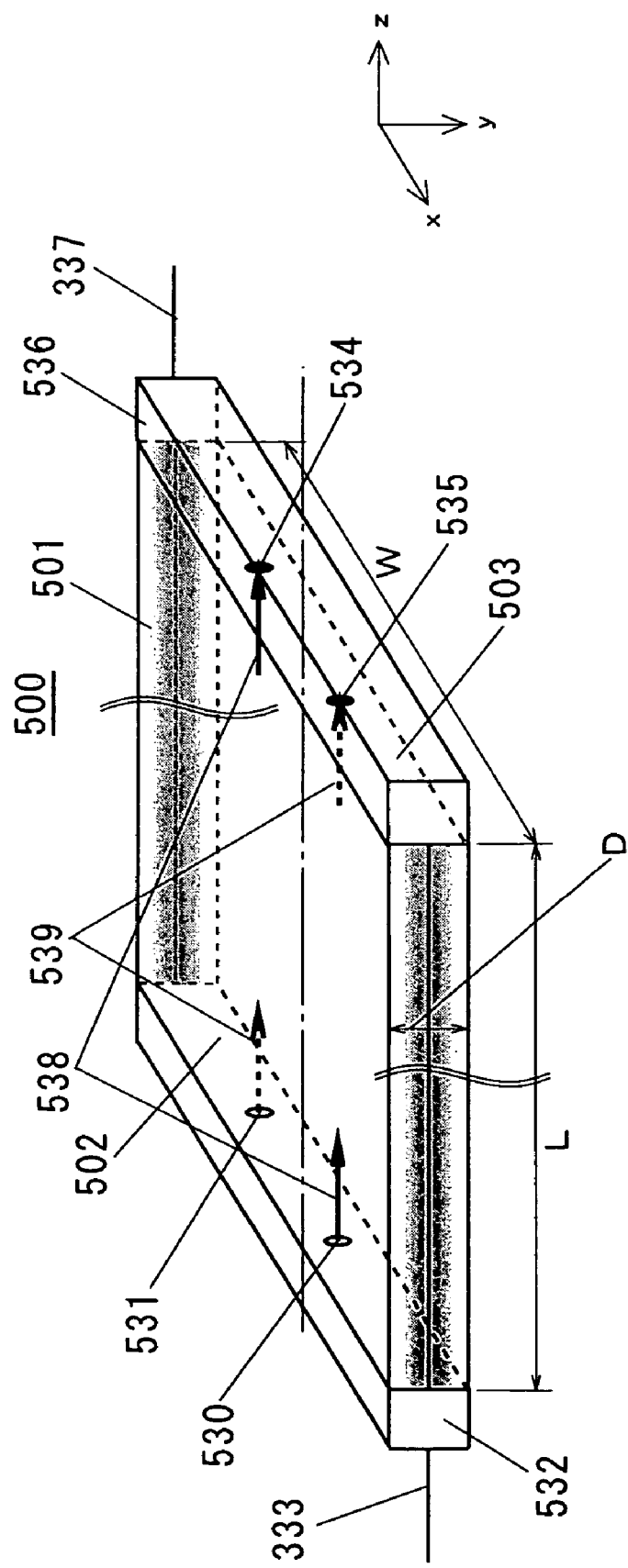
FIG. 5 is a perspective view showing the general outline of a two-signal cross sheet bus which is an optical device according to a fourth embodiment of the present invention.

FIG. 5 is a perspective view showing the general outline of a two-signal cross sheet bus which is an optical device according to a fourth embodiment of the present invention. The optical device according to the fourth embodiment comprises as a main element a graded index slab waveguide 501 that transmits beams. The graded index slab waveguide 501 is, as shown in FIG. 5, a sheet-form multi-mode optical transmission line that extends parallel to the x-z plane. The graded index slab waveguide 501 has a distribution such that the highest refractive index $n_{max}$ is provided at the center in the direction of the thickness and the refractive index does not increase with distance from the center. The graded index slab waveguide 501 has a uniform refractive index in the direction of the width and has no refractive index distribution. The optical device according to the fourth embodiment is provided with an array E/O converter 532, an input electric line (bus) 333, and an array O/E converter 536 and an output electric line (bus) 337.

The array E/O converter 532 includes a first light emitting portion 530 and a second light emitting portion 531. The first light emitting portion 530 makes a first beam 538 (wavelength: λ) incident on a given position in the direction of the width on the incident surface of the graded index slab waveguide 501. The second light emitting portion 531 makes a second beam 539, having the same wavelength as the first beam, incident on a given position in the direction of the width on the incident surface of the graded index slab waveguide 501. Moreover, the array E/O converter 532 is connected to the input electric line (bus) 333. The array E/O converter 532 converts external electric signals inputted from the input electric line 333 into signal beams emitted from the first light emitting portion 530 and the second light emitting portion 531.

The array O/E converter 536 includes a first light receiving portion 534 and a second light receiving portion 535. The first light receiving portion 534 is disposed in a position symmetrical to the second light emitting portion 531 with respect to the center in the direction of the width on the exit surface of the graded index slab waveguide 501. The second light receiving portion 535 is disposed in a position symmetrical to the first light emitting portion 530 with respect to the center in the direction of the width on the exit surface of the graded index slab waveguide 501. Moreover, the array O/E converter 536 is connected to the output electric line (bus) 337. The array O/E converter 536 converts signal beams received by the first light receiving portion 534 and the second light receiving portion 535 into electric signals, and outputs the electric signals to the output electric line 337.

The slab length L of the graded index slab waveguide 501 substantially coincides with $4 \times n_0 \times W_0^2/\lambda$. Here, the effective refractive index of the 0th-order mode beam excited in the direction of the width is $n_0$. The slab length L of the graded index slab waveguide 501 corresponds to the case where a plurality of incident beams is superimposed one on another in (Expression 3) of (1) Asymmetrical incidence described in the first embodiment. By setting the slab length L like this, the first beam 538 emitted from the first light emitting portion 530 and incident through an incident surface 502 forms an image having the same profile as that when the beam is incident in the vicinity of the first light receiving portion 534. Likewise, the second beam 539 emitted from the second light emitting portion 531 and incident through the incident surface 502 forms an image having the same profile as that when the beam is incident in the vicinity of the second light receiving portion 535. According to the self-imaging principle, since a similar phenomenon occurs every length of $8 \times n_0 \times W_0^2/\lambda$, by setting the slab length L to an odd multiple of $4 \times n_0 \times W_0^2/\lambda$, the length of the graded index slab waveguide 501 can be adjusted according to use. The detailed mechanism of splitting and the mechanism in which there is no signal beam waveform disturbance in the direction of the thickness and in the direction of the width even in the case of high-speed transmission are similar to those of the first embodiment.

By the above structure, when an external electric signal is inputted to the array E/O converter 532 from the input electric line 333, the array E/O converter 532 converts the external electric signal into the first beam 538 emitted from the first light emitting portion 530 and the second beam 539 emitted from the second light emitting portion 531. The first beam 538 emitted from the first light emitting portion 530 is incident on the graded index slab waveguide 501 through the incident surface 502 to be transmitted. The first beam 538 forms, according to the self-imaging principle, an image having the same profile as that when the beam is incident in the vicinity of the first light receiving portion 534. By this, the first beam 538 exits from the exit surface 503 and is received by the first light receiving portion 534. On the other hand, the emitted second beam 539 is incident on the graded index slab waveguide 501 through the incident surface 502 to be transmitted. The second beam 539 forms, according to the self-imaging principle, an image having the same profile as that when the beam is incident in the vicinity of the second light receiving portion 535. By this, the second beam 539 exits from the exit surface 503 and is outputted by the first light receiving portion 535. The first light receiving portion 534 outputs an electric signal corresponding to the received first beam 538. The second light receiving portion 535 outputs an electric signal corresponding to the received second beam 539. The outputted electric signals are outputted to the outside from the output electric line 337. As described above, by using the MMI, it is unnecessary to provide separate optical waveguides to transmit two signal beams so as to cross each other, and two signal beams can be independently transmitted with one graded index slab waveguide 501.

Figure 6:
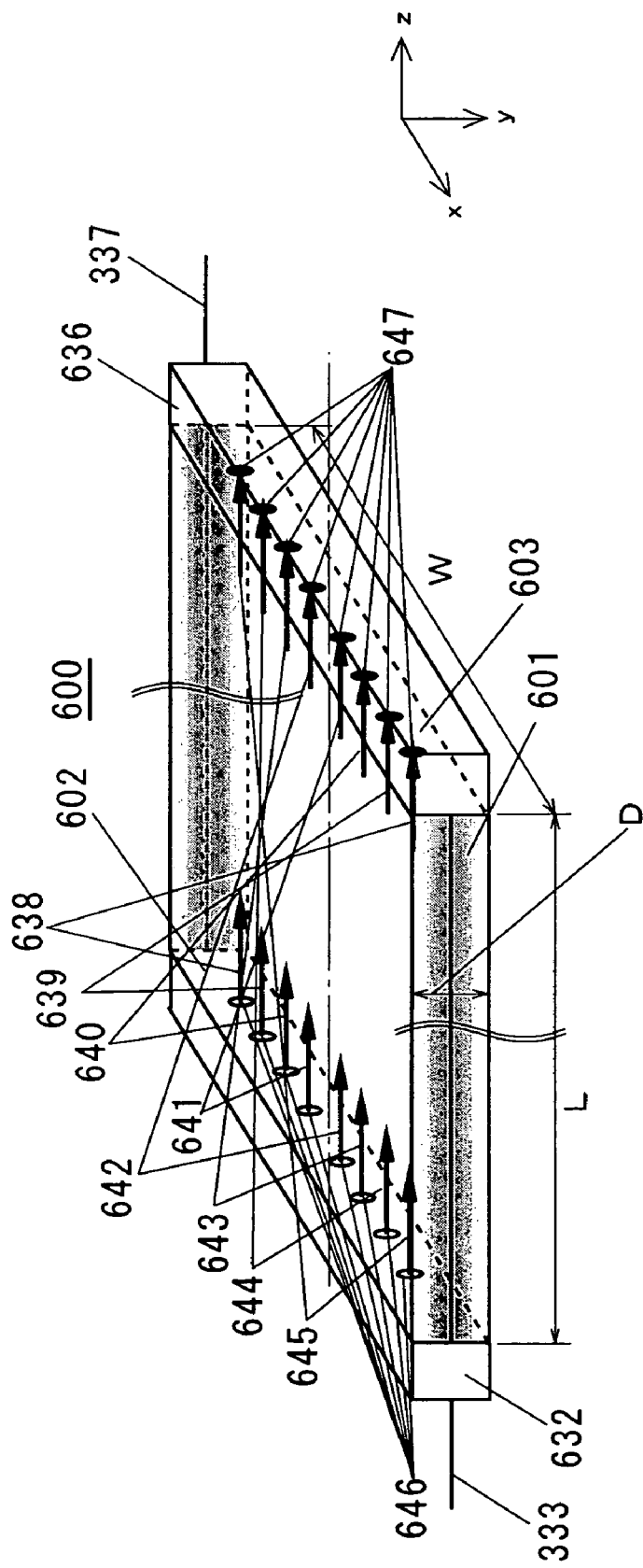
FIG. 6 is a perspective view showing the general outline of an eight-signal cross sheet bus which is an optical device according to a modification of the fourth embodiment of the present invention.

FIG. 6 is a perspective view showing the general outline of an eight-signal cross sheet bus which is an optical device according to a modification of the fourth embodiment of the present invention. The schematic structure of the optical device of the modification is the same as that of the previously-described two-signal straight sheet bus. The optical device of the modification is provided with a graded index slab waveguide 601, an array E/O converter 632, an input electric line (bus) 333, an array O/E converter 636 and an output electric line (bus) 337. The array E/O converter 632 has generally the same structure as the array E/O converter 532 of the two-signal straight sheet bus; however, it is different in that a light emitting portion group 646 comprising eight light emitting portions is formed instead of the first light emitting portion 530 and the second light emitting portion 531. Moreover, the array O/E converter 636 has generally the same structure as the array O/E converter 536 of the two-signal straight sheet bus; however, it is different in that a light receiving portion group 647 comprising eight light receiving portions is formed instead of the first light receiving portion 534 and the second light receiving portion 535. The light emitting portions included in the light emitting portion group 640 are all disposed in positions symmetrical to the light receiving portions included in the light receiving portion group 647 with respect to the center in the direction of the width.

The light emitting portion group 646 makes a first beam 638 to an eighth beam 645, which are eight signal beams all having the same wavelength, independently incident on the graded index slab waveguide 601 through an incident surface 502 based on the external electric signal inputted from the input electric line 333. The graded index slab waveguide 601 transmits the first beam 638 to the eighth beam 645. The first beam 638 to the eighth beam 645 exit from an exit surface 603 and are outputted from the light receiving portions, symmetrical with respect to the center in the direction of the width, in the light receiving portion group 647 like in the case of the graded index slab waveguide 501. The principle that eight incident beams independently appear in parallel positions in the direction of the width at the exit end corresponds to the case where a plurality of incident beams is superimposed one on another in (Expression 3) of (1) Asymmetrical incidence described in the first embodiment. As described above, by using the MMI, it is unnecessary to provide separate optical waveguides to transmit eight signal beams so as to cross each other, and eight signal beams can be independently transmitted with one graded index slab waveguide 601.

While examples of the two-signal cross sheet bus and the eight-signal cross sheet bus are shown in the fourth embodiment, generally, an N-signal cross sheet bus (N=1,2,3, . . . ) can be similarly designed. In this case, by making a number, N, of incident beams incident on given positions of the incident surface of the graded index slab waveguide having a slab length L which is substantially an odd multiple of the following expression, a number, N, of exiting beams can be obtained from positions the same as the positions symmetrical with respect to the center, in the direction of the width, of the exit surface.

$$\frac{4n_0 W_0^2}{\lambda}$$

Fifth Embodiment

Figure 7:
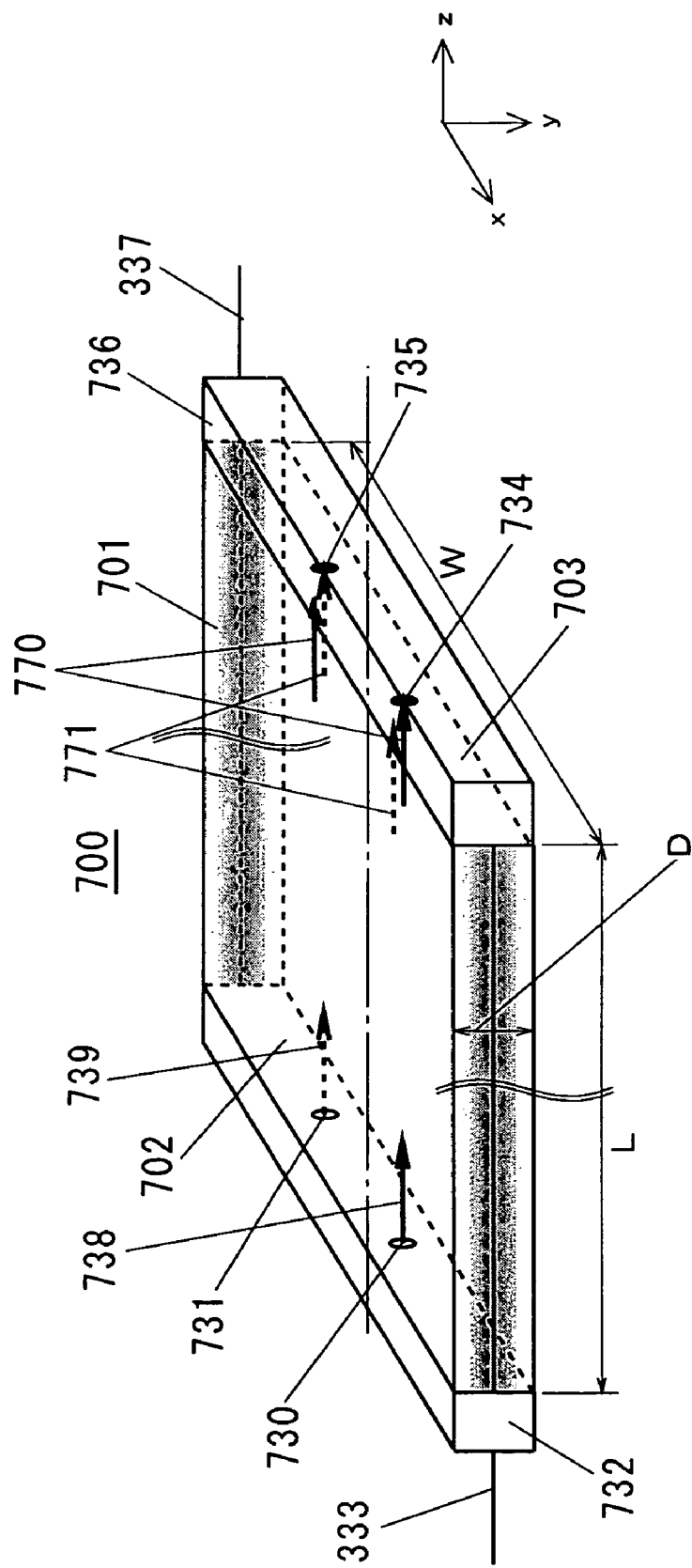
FIG. 7 is a perspective view showing the general outline of a two-signal star coupler which is an optical device according to a fifth embodiment of the present invention.

FIG. 7 is a perspective view showing the general outline of a two-signal star coupler which is an optical device according to a fifth embodiment of the present invention. The optical device according to the fifth embodiment comprises as a main element a graded index slab waveguide 701 that transmits beams. The graded index slab waveguide 701 is, as shown in FIG. 7, a sheet-form multi-mode optical transmission line that extends parallel to the x-z plane. The graded index slab waveguide 701 has a distribution such that the highest refractive index $n_{max}$ is provided at the center in the direction of the thickness and the refractive index does not increase with distance from the center. The graded index slab waveguide 701 has a uniform refractive index in the direction of the width and has no refractive index distribution. The optical device according to the fifth embodiment is provided with an array E/O converter 732, an input electric line (bus) 333, an array O/E converter 736 and an output electric line (bus) 337.

The array E/O converter 732 includes a first light emitting portion 730 and a second light emitting portion 731. The first light emitting portion 730 makes a first beam 738 (wavelength: λ) incident on a position a predetermined distance away from the center in the direction of the width on the incident surface of the graded index slab waveguide 701. The second light emitting portion 731 makes a second beam 739, having the same wavelength as the first beam, incident on a position symmetrical to the first light emitting portion 703 with respect to the center in the direction of the width on the incident surface of the graded index slab waveguide 701. Moreover, the array E/O converter 732 is connected to the input electric line (bus) 333. The array E/O converter 732 converts external electric signals inputted from the input electric line 333 into signal beams emitted from the first light emitting portion 730 and the second light emitting portion 731.

The array O/E converter 736 includes a first light receiving portion 734 and a second light receiving portion 735. The first light receiving portion 734 is disposed in a position whose position in the direction of the width is the same as that of the first light emitting portion 730 on the exit surface of the graded index slab waveguide 701. The second light receiving portion 735 is disposed in a position whose position in the direction of the width is the same as that of the second light emitting portion 731 on the exit surface of the graded index slab waveguide 701. Moreover, the array O/E converter 736 is connected to the output electric line (bus) 337. The array O/E converter 736 converts signal beams received by the first light receiving portion 734 and the second light receiving portion 735 into electric signals, and outputs the electric signals to the output electric line 337.

The slab length L of the graded index slab waveguide 701 substantially coincides with $2 \times n_0 \times W_0^2/\lambda$. Here, the effective refractive index of the 0th-order mode beam excited in the direction of the width is $n_0$. The slab length L of the graded index slab waveguide 701 corresponds to the case where a plurality of incident beams is superimposed one on another when p=0 and N=2 in (Expression 4) of (1) Asymmetrical incidence described in the first embodiment. By setting the slab length L like this, the first beam 738 emitted from the first light emitting portion 730 and incident through an incident surface 702 forms two images having the same profile as that when the beam is incident in the vicinity of the first light receiving portion 734 and the second light receiving portion 735. Likewise, the second beam 739 emitted from the second light emitting portion 731 and incident through the incident surface 702 forms two images having the same profile as that when the beam is incident in the vicinity of the first light receiving portion 734 and the second light receiving portion 735. According to the self-imaging principle, since a similar phenomenon occurs every length of the value of the expression shown below, by changing the value of p in (Expression 10) of the slab length L, the length of the graded index slab waveguide 701 can be adjusted according to use.

$$\left(p \pm \frac{1}{2}\right)\frac{4n_0 W_0^2}{\lambda}$$

(p is an integer that makes the value inside the parentheses positive)

The detailed mechanism of splitting and the mechanism in which there is no signal beam waveform disturbance in the direction of the thickness and in the direction of the width even in the case of high-speed transmission are similar to those of the first embodiment.

By the above structure, when an external electric signal is inputted to the array E/O converter 732 from the input electric line 333, the array E/O converter 732 converts the external electric signal into the first beam 738 emitted from the first light emitting portion 730 and the second beam 739 emitted from the second light emitting portion 731. The first beam 738 emitted from the first light emitting portion 730 is incident on the graded index slab waveguide 701 through the incident surface 702 to be transmitted. The first beam 538 forms, according to the self-imaging principle, two images having the same profile as that when the beam is incident in the vicinity of the first light receiving portion 734 and the second light receiving portion 735. By this, the first beam 738 exits from the exit surface 703 and is outputted to the first light receiving portion 734 and the second light receiving portion 735. On the other hand, the second beam 739 emitted from the second light emitting portion 731 is incident on the graded index slab waveguide 701 through the incident surface 702 to be transmitted. The second beam 739 forms, according to the self-imaging principle, two images having the same profile as that when the beam is incident in the vicinity of the first light receiving portion 734 and the second light receiving portion 735. By this, the second beam 739 exits from the exit surface 703 and is outputted to the first light receiving portion 735. The first light receiving portion 734 outputs an electric signal corresponding to the received first beam 738. The second light receiving portion 735 outputs an electric signal corresponding to the received second beam 739. The outputted electric signals are outputted to the outside from the output electric line 337. As described above, by using the MMI, a two-signal star coupler can be realized with one graded index slab waveguide 701.

While the above two-signal star coupler is an optical device that makes two signal beams incident on positions symmetrical in the direction of the width and makes the two signal beams exit from positions symmetrical in the direction of the width, not less than two signal beams may be inputted and outputted. In the case of a star coupler that makes a number, N (N is an even number), of signal beams incident on positions symmetrical in the direction of the width and makes a number, N, of signal beams exit from positions symmetrical in the direction of the width, the slab length L of the graded index slab waveguide satisfies the following expression:

$$\left(p \pm \frac{1}{N_{EVEN}}\right)\frac{4n_0 W_0^2}{\lambda}$$

(p is an integer that makes the value inside the parentheses positive, $N_{EVEN}$=2,4,6, . . . )

Since p is an integer in the above expression, by changing p, the slab length L of the graded index slab waveguide can be adjusted to a desired length. In particular, when it is unnecessary to adjust the length, by p=0, a graded index slab waveguide with a minimum length can be obtained.

On the other hand, in the case of a star coupler that makes a number, N (N is an odd number), of signal beams incident and makes a number, N, of signal beams exit, the slab length L of the graded index slab waveguide satisfies the value of the following expression:

$$\left(p \pm \frac{1}{N_{ODD}}\right)\frac{4n_0 W_0^2}{\lambda}$$

Figure 19:
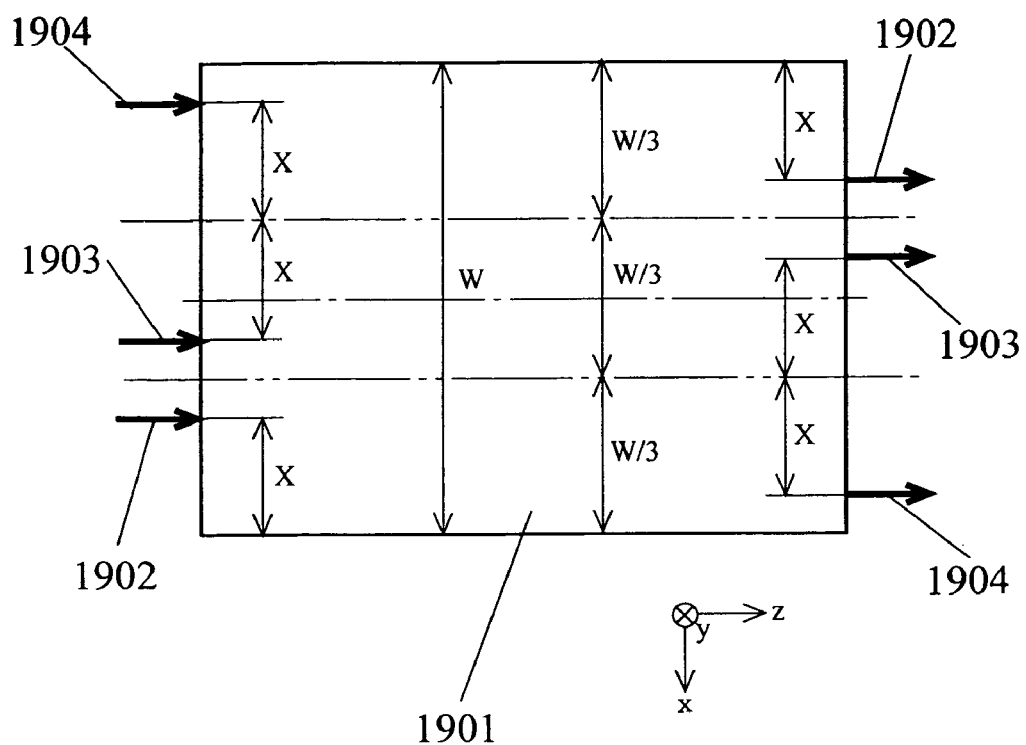
FIG. 19 is a top view showing a graded index slab waveguide of a star coupler having three input and output beams according to the present invention.

(p is an integer that makes the value inside the parentheses positive, $N_{ODD}$=3,5,7, . . . ) The above expression is the same in format as that in the case of a plurality of signal beams. However, when N is an odd number, the positions of the incident and exiting signal beams are not symmetrical in the direction of the width. FIG. 19 is a top view showing a graded index slab waveguide of a star coupler having three input and output beams according to the present invention. In FIG. 19, a first beam 1902, a second beam 1903 and a third beam 1904 all having the same wavelength λ are incident on the incident surface of a graded index slab waveguide 1901. The first beam 1902 is incident on a position a distance X away from one surface, parallel to the direction of the length, of the graded index slab waveguide 1901. The second beam 1903 is incident on a position further the distance X away toward the one surface with respect to a position a distance 2W/3 (W is the slab width) away from the one surface, parallel to the direction of the length, of the graded index slab waveguide 1901. The third beam 1904 is incident on a position further the distance X away toward the other surface with respect to a position the distance 2W/3 (W is the slab width) away from the one surface, parallel to the direction of the length, of the graded index slab waveguide 1901.

When the three signal beams having the above incident positions are incident through the incident surface and transmitted in a graded index slab waveguide having a slab length L satisfying the above-mentioned (Expression 12), the first beam 1902, the second beam 1903 and the third beam 1904 form three images having the same profile as that when the beams are incident on the following three positions, respectively: a position the distance X away from the other surface, parallel to the direction of the length, of the graded index slab waveguide 1901; a position further the distance X away toward the other surface with respect to a position a distance W/3 (W is the slab width) away from the other surface, parallel to the direction of the length, of the graded index slab waveguide 1901; and a position further the distance X away toward the one surface. Therefore, by forming light receiving portions in the positions of the images of the signals, the exiting beams can be outputted.

While the above example is a case where N=3, when N is an odd number mot less than 3, a star coupler can also be structured that obtains outputs asymmetrical with respect to the center in the direction of the width in accordance with the input of signal beams asymmetrical with respect to the direction of the width by a graded index slab waveguide satisfying (Expression 12). As described above, when N is an odd number, a star coupler can also be realized by using the self-imaging principle of the MMI. Since p is an integer in the above-mentioned (Expression 12), by changing p, the slab length L of the graded index slab waveguide can be adjusted to a desired length. In particular, when it is unnecessary to adjust the length, by p=0, a graded index slab waveguide with a minimum length can be obtained.

Sixth Embodiment

Figure 8A:
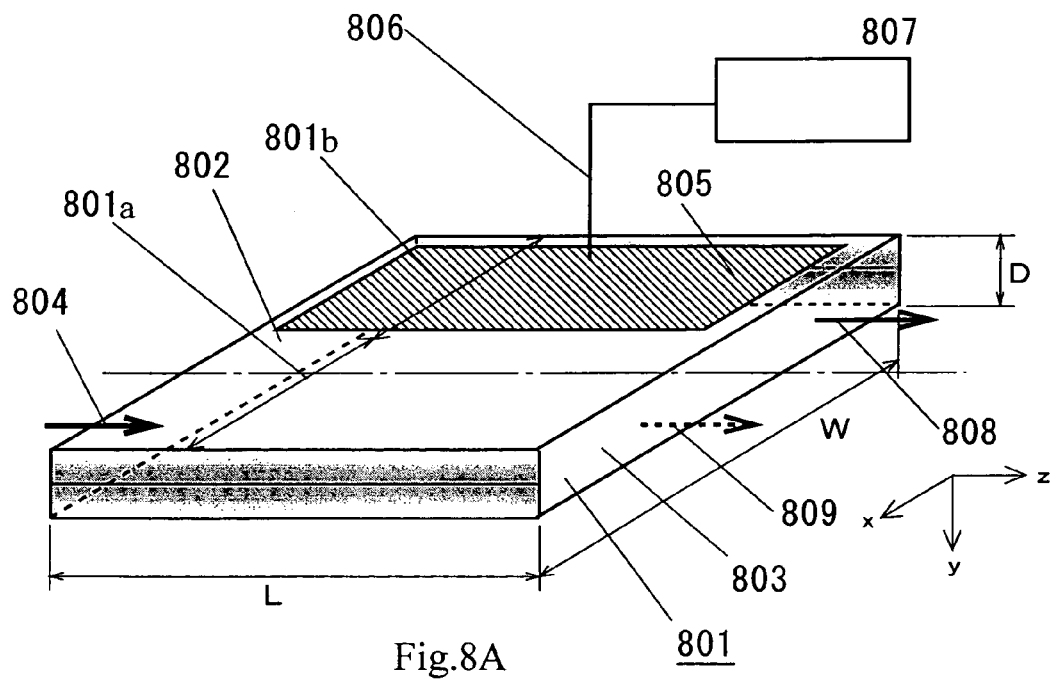
FIG. 8A is a perspective view showing the general outline of a one side control type optical switch which is an optical device according to a sixth embodiment of the present invention.

FIG. 8A is a perspective view showing the general outline of a one side control type optical switch which is an optical device according to a sixth embodiment of the present invention. The optical device according to the sixth embodiment comprises as main elements a first graded index slab partial waveguide 801a and a second graded index slab partial waveguide 801b that transmit beams. The first graded index slab partial waveguide 801a and the second graded index slab partial waveguide 801b are both sheet-form multi-mode optical transmission lines that extend parallel to the x-z plane as shown in FIG. 8A. The first graded index slab partial waveguide 801a and the second graded index slab partial waveguide 801b have the same size in the direction of the width. The first graded index slab partial waveguide 801a and the second graded index slab partial waveguide 801b are disposed so as to be connected continuously in the direction of the width. Moreover, the first graded index slab partial waveguide 801a and the second graded index slab partial waveguide 801b are made of a polymer exhibiting a predetermined thermooptic effect.

The first graded index slab partial waveguide 801a has an incident position for making an incident beam 804 incident on an incident surface 801 and an exit position for making an exiting beam 809 exit on an exit surface 802. The incident position and the exit position are situated in positions away from the center in the direction of the width when the first graded index slab partial waveguide 801a and the second graded index slab partial waveguide 801b are regarded as one slab waveguide 801, and their positions in the direction of the width are the same. The second graded index slab partial waveguide 801b has an exit position for making an exiting beam 808 exit on the exit surface 802. The exit position of the second graded index slab partial waveguide 801b is situated in a position symmetrical to the exit position of the first graded index slab partial waveguide 801a with respect to the center in the direction of the width when the first graded index slab partial waveguide 801a and the second graded index slab partial waveguide 801b are regarded as one slab waveguide. Moreover, the second graded index slab partial waveguide 801b has a thermal sheet 805 on the top surface. The thermal sheet 805 is connected to a temperature controller 807 by a connection line 806.

The temperature controller 807 controls the temperature of the thermal sheet 805 based on the externally supplied control signal. Since the temperature of the second graded index slab partial waveguide 801b is changed by controlling the temperature of the thermal sheet 805, the absolute value of the refractive index is changed based on the thermooptic effect. The optical device of the sixth embodiment is structured so that when the temperature controller 807 is OFF, the refractive index distributions of the first graded index slab partial waveguide 801a and the second graded index slab partial waveguide 801b coincide with each other. At this time, the first graded index slab partial waveguide 801a and the second graded index slab partial waveguide 801b both have a distribution such that the highest refractive index $n_{max}$ is provided at the center in the direction of the thickness and the refractive index does not increase with distance from the center. Moreover, at this time, the first graded index slab partial waveguide 801a and the second graded index slab partial waveguide 801b have a uniform refractive index in the direction of the width and have no refractive index distribution. The optical device of the sixth embodiment is structured so that when the temperature controller 807 is ON, the highest refractive index of the first graded index slab partial waveguide 801a is higher than the absolute value of the highest refractive index of the second graded index slab partial waveguide 801b and their overall refractive index distributions are different from each other.

The slab lengths L of the first graded index slab partial waveguide 801a and the second graded index slab partial waveguide 801b substantially coincide with $4 \times n_0 \times W_0^2/\lambda$. Here, the effective refractive index of the 0th-order mode beam excited in the direction of the width is $n_0$. The slab lengths L of the first graded index slab partial waveguide 801a and the second graded index slab partial waveguide 801b correspond to the case where a plurality of incident beams is superimposed one on another in (Expression 3) of (1) Asymmetrical incidence described in the first embodiment. According to the self-imaging principle, since a similar phenomenon occurs every length of $8 \times n_0 \times W_0^2/\lambda$, by setting the slab lengths L to an integral multiple of $4 \times n_0 \times W_0^2/\lambda$, the lengths of the first graded index slab partial waveguide 801a and the second graded index slab partial waveguide 801b can be adjusted according to use.

Next, the mechanism of the optical switch that changes the beam path direction by the above-described structure will be described. When the temperature controller 807 is OFF, the incident beam 804 incident on the incident position of the first graded index slab partial waveguide 801a is transmitted with the first graded index slab partial waveguide 801a and the second graded index slab partial waveguide 801b as one slab waveguide since these waveguides have the same refractive index distribution. Therefore, according to (Expression 4) of (1) Asymmetrical incidence described in the first embodiment, an image having the same profile as the incident beam is formed in the exit position whose position in the direction of the width on the exit surface 803 is symmetrical to the incident position with respect to the center. This image exits as the exiting beam 808.

On the other hand, when the temperature controller 807 is ON, since the highest refractive index of the first graded index slab partial waveguide 801a is higher than the highest refractive index of the second graded index slab partial waveguide 801b, by satisfying a predetermined refractive index difference, the second graded index slab partial waveguide 801b functions as cladding for the first graded index slab partial waveguide 801a. Therefore, the incident beam 804 incident on the incident position of the first graded index slab partial waveguide 801a is trapped in the first graded index slab partial waveguide 801a to the exit surface 803 by the total reflection at the interface between the first graded index slab partial waveguide 801a and the second graded index slab partial waveguide 801b. Consequently, the exiting beam 808 exits from the exit surface 803.

As described above, an optical switch capable of changing the travel direction of the incident beam 804 can be realized by the ON-OFF switching control of the temperature controller 807. While the optical device of the sixth embodiment is an example structured so that the refractive index distributions of the first graded index slab partial waveguide 801a and the second graded index slab partial waveguide 801b coincide with each other when the temperature controller 807 is OFF, it may be structured so that the refractive index distributions coincide with each other when the temperature controller 807 is ON. In this case, when the temperature controller 807 is OFF, the highest refractive index of the first graded index slab partial waveguide 801a is lower than the highest refractive index of the second graded index slab partial waveguide 801b, and their refractive index distributions are different from each other. In a case where the case of this structure is adopted, when the temperature controller 807 is ON, the exiting beam 808 exits from the second graded index slab partial waveguide 801b, and when the temperature controller 807 is OFF, the exiting beam 809 exits from the first graded index slab partial waveguide 801a.

Figure 8B:
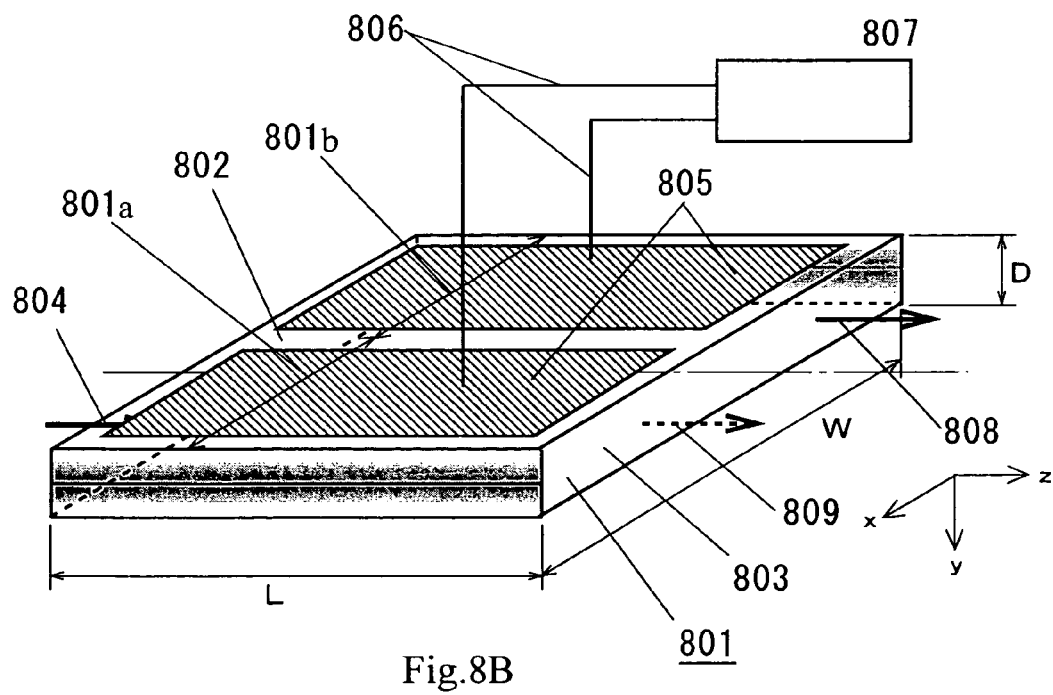
FIG. 8B is a perspective view showing the general outline of a both side control type optical switch which is an optical device according to a first modification of the sixth embodiment of the present invention.

FIG. 8B is a perspective view showing the general outline of a both side control type optical switch which is an optical device according to a first modification of the sixth embodiment of the present invention. Since the schematic structure of the first modification of the sixth embodiment is the same as that of the previously-described optical device, only different parts will be described. The same reference numerals indicate the same elements.

In the first modification of the sixth embodiment, the second graded index slab partial waveguide 801b has the thermal sheet 805, and is connected to the temperature controller 807 by the connection line 806. The optical device of the first modification of the sixth embodiment is structured so that when the temperature controller 807 is OFF, the refractive index distributions of the first graded index slab partial waveguide 801a and the second graded index slab partial waveguide 801b coincide with each other and that the optical device of the first modification is structured so that when the temperature controller 807 is ON, the temperatures of the first graded index slab partial waveguide 801a and the second graded index slab partial waveguide 801b are controlled in opposite phase to increase the highest refractive index of the first graded index slab partial waveguide 801a and decrease the highest refractive index of the second graded index slab partial waveguide 801b so that their refractive index distributions are different from each other. By structuring the optical device like this, switching can be performed at a higher speed than in the case of the one side control type. In the first modification of the sixth embodiment, the optical device may be structured so that when the temperature controller 807 is ON, the refractive index distributions of the first graded index slab partial waveguide 801a and the second graded index slab partial waveguide 801b coincide with each other. In this case, the optical device is structured so that when the temperature controller 807 is OFF, the temperatures of the first graded index slab partial waveguide 801a and the second graded index slab partial waveguide 801b are controlled in opposite phase to increase the highest refractive index of the first graded index slab partial waveguide 801a and decrease the highest refractive index of the second graded index slab partial waveguide 801b so that their refractive index distributions are different from each other.

Figure 20A:
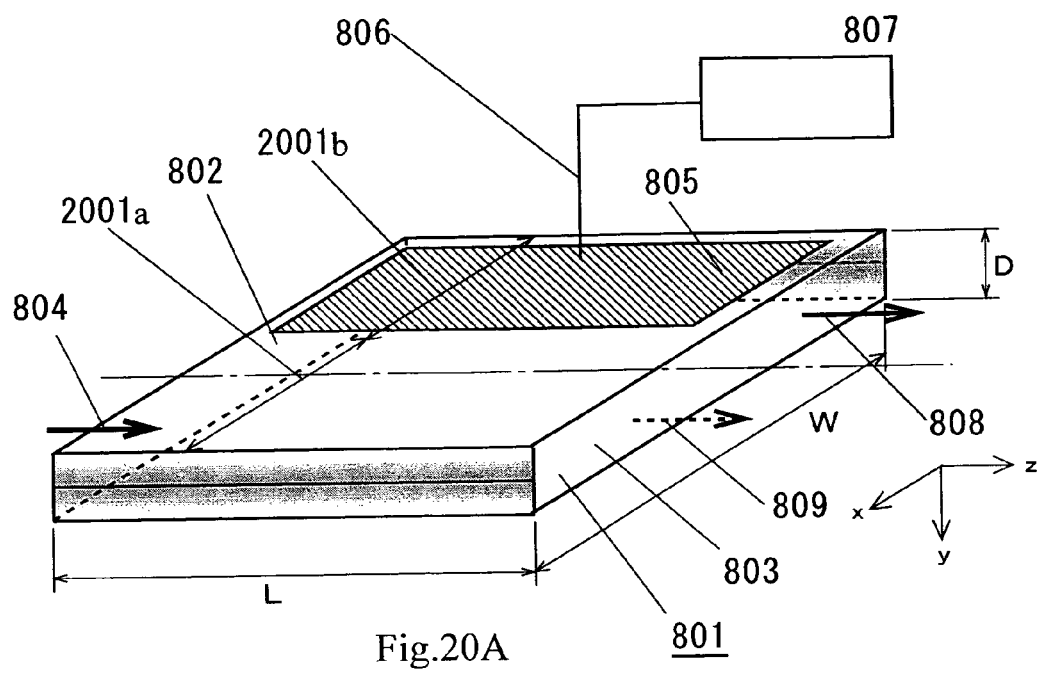
FIG. 20A is a perspective view showing the general outline of a one side control type optical switch which is an optical device according to a second modification of the sixth embodiment of the present invention.

FIG. 20A is a perspective view showing the general outline of a one side control type optical switch which is an optical device according to a second modification of the sixth embodiment of the present invention. Since the schematic structure of the second modification of the sixth embodiment is the same as that of the previously-described optical device of the sixth embodiment, only different parts will be described. The same reference numerals indicate the same elements.

In the second modification of the sixth embodiment, the size, in the direction of the width, of a first graded index slab partial waveguide 2001a is $1/\sqrt{2}$ times that when the first graded index slab partial waveguide 2001a and a second graded index slab partial waveguide 2001b are regarded as one optical waveguide. Moreover, in the second modification of the sixth embodiment, the optical device is structured so that when the temperature controller 807 is ON, the highest refractive index of the first graded index slab partial waveguide 801a is higher than the highest refractive index of the second graded index slab partial waveguide 801b and their overall refractive index distributions are different from each other. By structuring the optical device like this, when the temperature controller 807 is ON, the first graded index slab partial waveguide 2001a according to the second modification of the sixth embodiment functions as a graded index slab waveguide whose size in the direction of the width is $1/\sqrt{2}$ W, and the size of the basic mode is also $1/\sqrt{2}$ $W_0$. When the slab length L of the first graded index slab partial waveguide 2001a substantially coincides with $4 \times n_0 \times W_0^2/\lambda$, the condition is satisfied for the exiting beam 809 to form an image having the same profile as the incident beam 804 in the exit position whose position in the direction of the width is the same as the incident position on the exit surface 2003.

Consequently, the optical device according to the second modification of the sixth embodiment is capable of generating an exiting beam having the same profile as the incident beam based on the self-imaging principle of the multi-mode interference even when the temperature controller 807 is ON.

While the optical device according to the second modification of the sixth embodiment is an example structured so that the refractive index distributions of the first graded index slab partial waveguide 2001*a* and the second graded index slab partial waveguide 2001*b* coincide with each other when the temperature controller 807 is OFF, it is to be noted that the optical device may be structured so that the refractive index distributions coincide with each other when the temperature controller 807 is ON. In a case where the case of this structure is adopted, when the temperature controller 807 is ON, the exiting beam 808 exits from the second graded index slab partial waveguide 2001*b*, and when the temperature controller 807 is OFF, the exiting beam 809 exits from the first graded index slab partial waveguide 2001*a*.

Figure 20B:
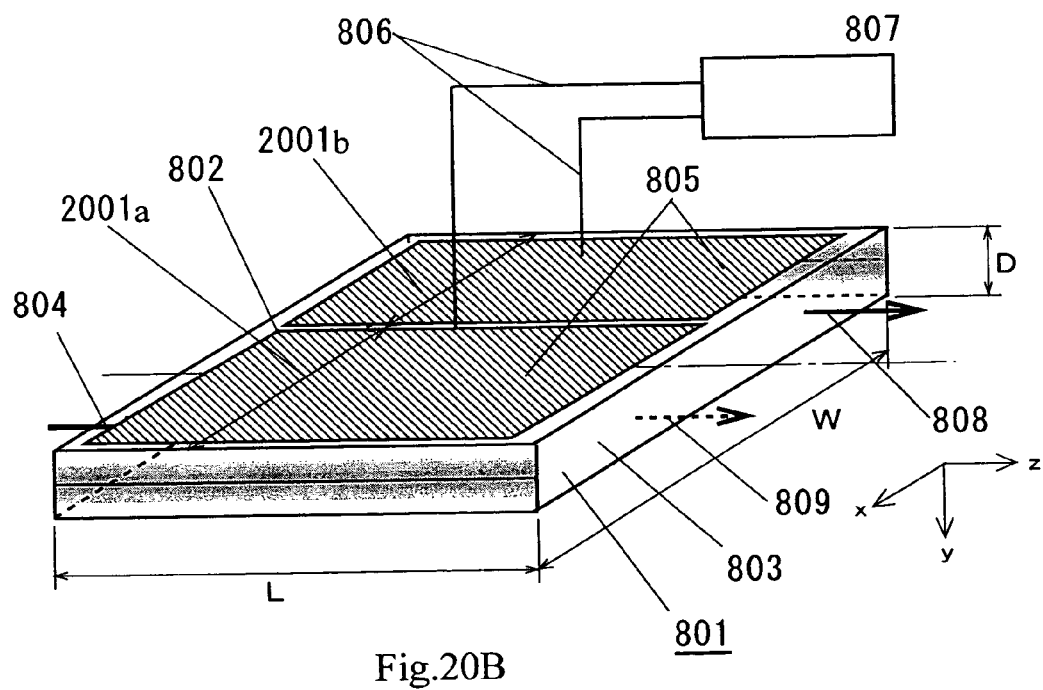
FIG. 20B is a perspective view showing the general outline of a both side control type optical switch which is an optical device according to a third modification of the sixth embodiment of the present invention.

FIG. 20B is a perspective view showing the general outline of a both side control type optical switch which is an optical device according to a third modification of the sixth embodiment of the present invention. The third modification of the sixth embodiment is an optical device comprising a combination of the previously-described first modification and second modification of the sixth embodiment. The same reference numerals indicate the same elements.

In the optical device according to the third modification of the sixth embodiment, the size, in the direction of the width, of the first graded index slab partial waveguide 2001*a* is 1/√2 times that when the first graded index slab partial waveguide 2001*a* and the second graded index slab partial waveguide 2001*b* are regarded as one optical waveguide, and the second graded index slab partial waveguide 2001*b* is also connected to the temperature controller 807 by the connection line 806. By this structure, ON-OFF switching control based on the signal from the temperature controller 807 can be performed at high speed, and an exiting beam generated by the self-imaging principle of the multi-mode interference can be obtained in both the ON state and the OFF state.

While examples in which refractive index control is performed by using a polymer with a high thermooptic effect are shown in all the descriptions of the sixth embodiment, any method that independently changes the refractive indices of the first and second graded index slab partial waveguides such as the electrooptic effect may be used.

Seventh Embodiment

Figure 9:
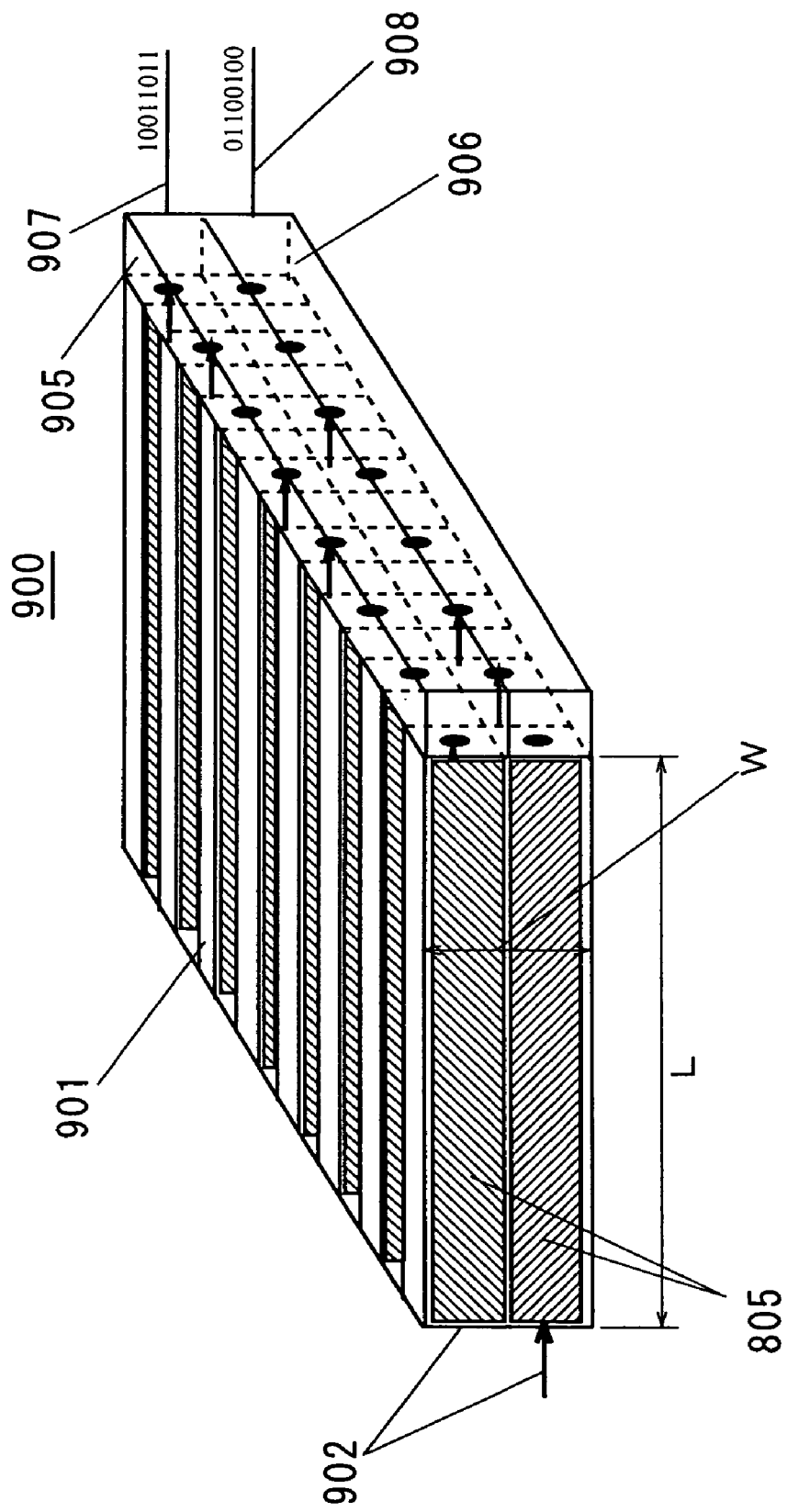
FIG. 9 is a perspective view showing the general outline of an optical switch array which is an optical integrated device according to a seventh embodiment of the present invention.

FIG. 9 is a perspective view showing the general outline of an optical switch array which is an optical integrated device according to a seventh embodiment of the present invention. The optical switch array of the seventh embodiment is provided with a laminated optical switch group 901 in which eight optical switches that are described in the first modification of the sixth embodiment (FIG. 8B) are laminated in the direction of the thickness of the graded index slab waveguide 801. In each of the optical switches included in the laminated optical switch group 901, the part corresponding to the first graded index slab partial waveguide 801*a* described in the sixth embodiment is disposed on the lower side in the figure. The optical integrated device according to the seventh embodiment includes a first array O/E converter 905, a second array O/E converter 906, a first output electric line (bus) 907 and a second output electric line (bus) 908.

The first array O/E converter 905 has a first light receiving portion group 903 comprising eight light receiving portions provided so as to be opposed to exit portions corresponding to the first graded index slab partial waveguides 801*a* of the optical switches. Moreover, the first array O/E converter 905 is connected to the first output signal line 908. The second array O/E converter 906 has a second light receiving portion group 904 comprising eight light receiving portions provided so as to be opposed to exit portions corresponding to the second graded index slab partial waveguides 801*b* of the optical switches. Moreover, the second array O/E converter 906 is connected to the second output signal line 908. In this example, the optical device is structured so that when the temperature controller is ON, the exiting beam exits from the side of the first graded index slab partial waveguide and when the temperature controller is OFF, the exiting beam exits from the side of the second graded index slab partial waveguide.

In the above structure, an array incident beam 902 is made incident on the parts (lower side in the figure) corresponding to the first graded index slab partial waveguides of the optical switches included in the laminated optical switch 901, and is transmitted in the direction of the length. The optical switches independently perform switching based on the control of the temperature controller described in the sixth embodiment. When the temperature controller is ON, the exiting beams from the optical switches are incident on the light receiving portions included in the first light receiving portion group 903 of the first array O/E converter 905. Moreover, when the temperature controller is OFF, the exiting beams from the optical switches are incident on the light receiving portions included in the second light receiving portion group 904 of the second array O/E converter 906.

The first array O/E converter 905 and the second array O/E converter 906 assign a 1 signal when the exiting beams are made to exit to the light receiving portions, and assign a 0 signal when the exiting beams are not made to exit to the light receiving portions. The signal assigned in the first array O/E converter 905 is outputted as an output signal to the outside by the first output electric line 907. The signal assigned in the second array O/E converter 906 is outputted as an output signal to the outside by the second output electric line 908. As described above, by assigning signals, 8-digit digital signals and their inverted signals can be parallelly transmitted.

As the array incident beam 902, a beam emitted from an array light emitting device may be made directly incident or a beam from an external light source may be made incident by an optical transmission line disposed on the incident side of an optical fiber or the like. Moreover, the array incident beam may be generated by, for example, an optical device that splits one beam into eight beams. Moreover, a heatproof material or an insulating material such as air may be provided between the switches of the integrated optical switch.

Eighth Embodiment

Figure 10:
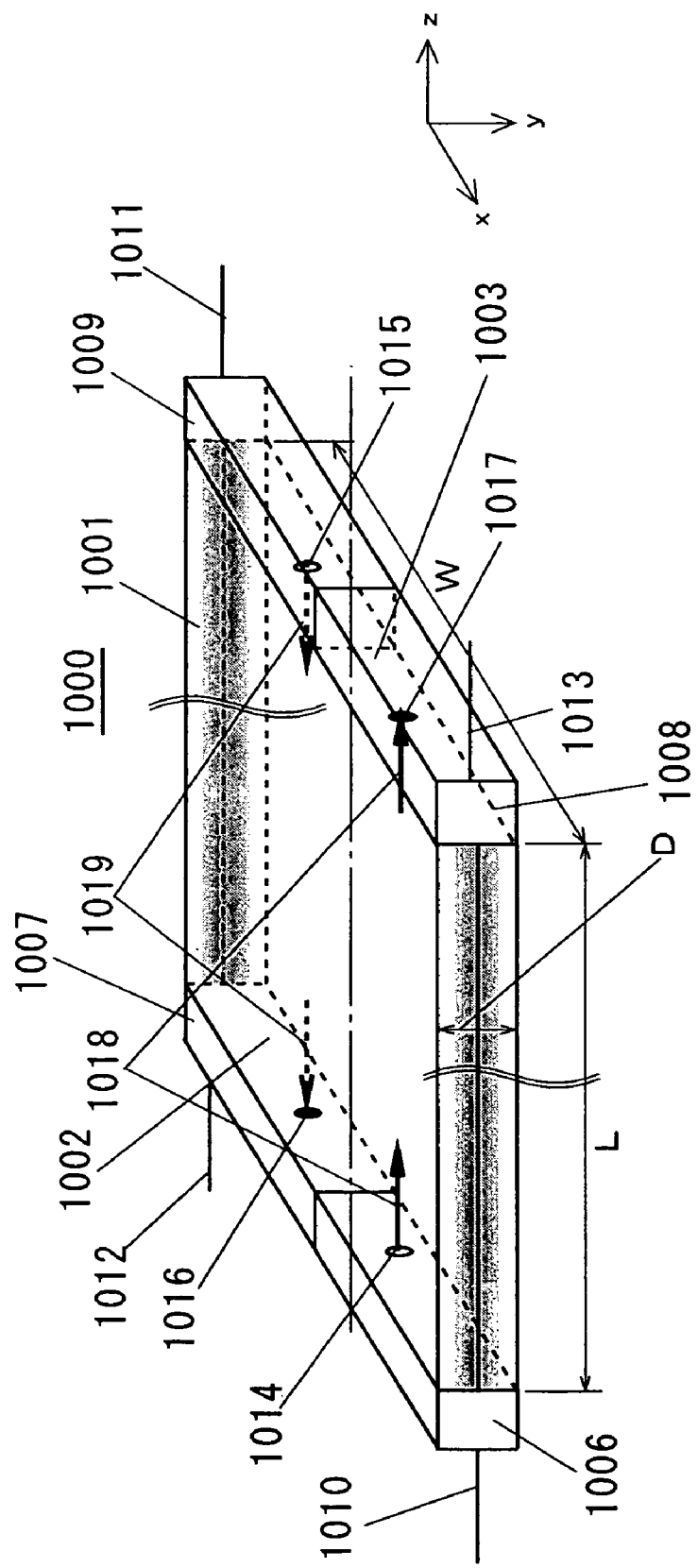
FIG. 10 is a perspective view showing the general outline of a single-pair two-way straight sheet bus which is an optical device according to an eighth embodiment of the present invention.

FIG. 10 is a perspective view showing the general outline of a single-pair two-way straight sheet bus which is an optical device according to an eighth embodiment of the present invention. In the optical device according to the eighth embodiment, one signal beam transmission direction of the two-signal straight sheet bus described in the third embodiment is reversed to enable two-way communication. The optical device according to the eighth embodiment comprises as a main element the graded index slab waveguide 1000. The graded index slab waveguide 1001 is, as shown in FIG. 10, a sheet-form multi-mode optical transmission line that extends parallel to the x-z plane. The graded index slab waveguide 1001 has a distribution such that the highest refractive index $n_{max}$ is provided at the center in the direction of the thickness and the refractive index does not increase with distance from the center. The graded index slab waveguide 1001 has a uniform refractive index in the direction of the width and has no refractive index distribution. The optical device according to the eighth embodiment is provided with a first E/O converter 1006, a second E/O converter 1009, a first O/E converter 1007, a second O/E converter 1008, a first input electric line (bus) 1010, a second input electric line (bus) 1011, a first output electric line (bus) 1012 and a second output electric line (bus) 1013.

The first E/O converter 1006 includes a first light emitting portion 1014. The second E/O converter 1009 includes a second light emitting portion 1015. The first light emitting portion 1014 makes a second beam 1019 (wavelength: λ) incident on a given position in the direction of the width on a first surface 1002 of the graded index slab waveguide 1001. The second light emitting portion 1015 makes a first beam 1018 having the same wavelength as the second beam 1019 incident on a given position in the direction of the width on a second surface 1003 of the graded index slab waveguide 1001. The first E/O converter 1006 is connected to the first input electric line (bus) 1010. The first E/O converter 1006 converts an external electric signal inputted from the first input electric line (bus) 1010 into a signal beam emitted from the first light emitting portion 1014. The second E/O converter 1009 is connected to the second input electric line (bus) 1011. The second E/O converter 1009 converts an external electric signal inputted from the second input electric line (bus) 1011 into a signal beam emitted from the second light emitting portion 1015.

The first O/E converter 1007 includes a first light receiving portion 1016. The second O/E converter 1008 includes a second light receiving portion 1017. The first light receiving portion 1016 is disposed in a position whose position in the direction of the width is the same as that of the second light emitting portion 1015 on the first surface 1002 of the graded index slab waveguide 1001, and receives the second beam 1019 (wavelength: X). The second light receiving portion 1017 receives the first beam 1018 having the same wavelength as the second beam 1019 in a position whose position in the direction of the width is the same as that of the first light emitting portion 1014 on the second surface 1003 of the graded index slab waveguide 1001. The first O/E converter 1007 is connected to the first output electric line (bus) 1012. The first O/E converter 1007 converts the received signal beam into an external electric signal outputted to the outside by the first output electric line (bus) 1010. The second O/E converter 1008 is connected to the second output electric line (bus) 1013. The second O/E converter 1008 converts the received signal beam into an external electric signal outputted to the outside by the second output electric line (bus) 1013.

The slab length L of the graded index slab waveguide 1001 substantially coincides with $8 \times n_0 \times W_0^2 / \lambda$. Here, the effective refractive index of the 0th-order mode beam excited in the direction of the width is $n_0$. The slab length L of the graded index slab waveguide 1001 corresponds to the case where a plurality of incident beams is superimposed one on another in (Expression 2) of (1) Asymmetrical incidence described in the first embodiment. By setting the slab length L like this, the first beam 1018 incident from the first light emitting portion 1014 forms an image having the same profile as that when the beam is incident in the vicinity of the second light receiving portion 1017. Likewise, the second beam 1019 incident from the second light emitting portion 1015 forms an image having the same profile as that when the beam is incident in the vicinity of the first light receiving portion 1016. According to the self-imaging principle, since a similar phenomenon occurs every length of $8 \times n_0 \times W_0^2 / \lambda$, by setting the slab length L to an integral multiple of $8 \times n_0 \times W_0^2 / \lambda$, the length of the graded index slab waveguide 1001 can be adjusted according to use. The detailed mechanism of splitting and the mechanism in which there is no signal beam waveform disturbance in the direction of the thickness and in the direction of the width even in the case of high-speed transmission are similar to those of the first embodiment.

By the above structure, when an external electric signal is inputted to the first E/O converter 1006 from the first input electric line 1010, the first E/O converter 1006 converts the external electric signal into the first beam 1018 emitted from the first light emitting portion 1014. Moreover, when an external signal is inputted to the second E/O converter 1009 from the second input electric line 1011, the second E/O converter 1009 converts the external electric signal into the second beam 1019 emitted from the second light emitting portion 1015.

The first beam 1018 emitted from the first light emitting portion 1014 is incident on the graded index slab waveguide 1001 through the incident surface 1002 to be transmitted. The first beam 1018 forms, according to the self-imaging principle, an image having the same profile as that when the beam is incident in the vicinity of the second light receiving portion 1017. By this, the first beam 1014 is outputted from the second surface 1003 to the second light receiving portion 1017. The second light receiving portion 1017 outputs an electric signal corresponding to the received first beam 1018. The outputted electric signal is outputted to the outside from the second output electric line 1013. On the other hand, the second beam 1019 emitted from the second light emitting portion 1015 is incident on the graded index slab waveguide 1001 through the second surface 1003 to be transmitted. The second beam 1019 forms, according to the self-imaging principle, an image having the same profile as that when the beam is incident in the vicinity of the first light receiving portion 1016. By this, the second beam 1019 is outputted from the first surface 1002 to the first light receiving portion 1016. The first light receiving portion 1016 outputs an electric signal corresponding to the received second beam 1019. The outputted electric signals are outputted to the outside from the first output electric line 1012. As described above, since the MMI is reversible irrespective of the beam transmission direction, the MMI can be used in both directions. Consequently, it is unnecessary to provide separate optical waveguides to straightly transmit two signal beams in both directions, so that two signal beams can be independently transmitted in both directions with one graded index slab waveguide 1001.

Figure 11:
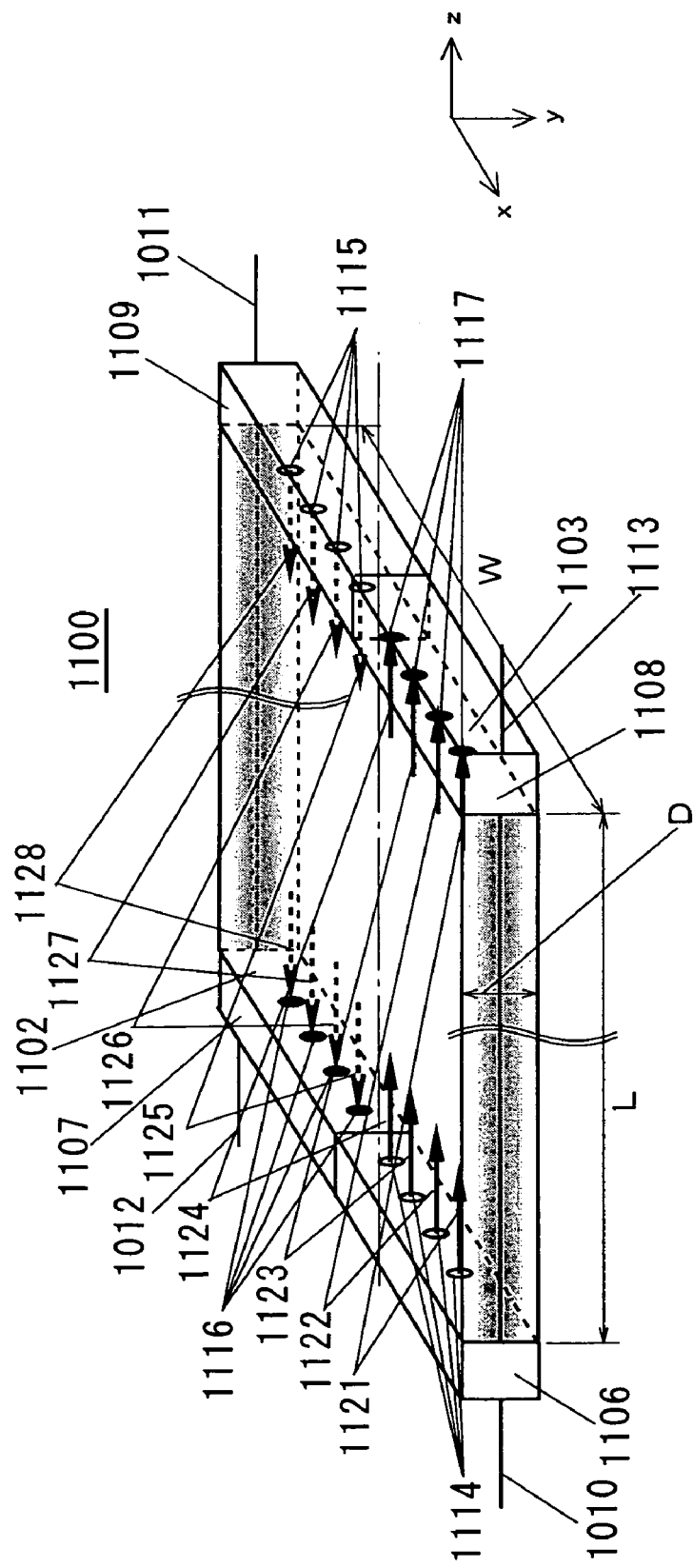
FIG. 11 is a perspective view showing the general outline of a four-pair two-way straight sheet bus which is an optical device according to a modification of the eighth embodiment of the present invention.

FIG. 11 is a perspective view showing the general outline of a four-pair two-way straight sheet bus which is an optical device according to a modification of the eighth embodiment of the present invention. The schematic structure of the optical device of the modification is the same as that of the previously-described single-pair two-way straight sheet bus.

The optical device of the modification is provided with a graded index slab waveguide 1101, a first array E/O converter 1106, a second array E/O converter 1109, a first array O/E converter 1107, a second array O/E converter 1108, a first input electric line (bus) 1010, a second input electric line (bus) 1011, a first output electric line (bus) 1012 and a second output electric line (bus) 1013.

While the first array E/O converter 1106 has substantially the same structure as the first E/O converter 1006 of the single-pair two-way straight sheet bus, it is different in that a first light emitting portion group 1114 comprising four light emitting portions is formed instead of the first light emitting portion 1014. While the second array E/O converter 1109 has substantially the same structure as the second E/O converter 1009 of the single-pair two-way straight sheet bus, it is different in that a second light emitting portion group 1115 comprising four light emitting portions is formed instead of the second light emitting portion 1015. While the first array O/E converter 1107 has substantially the same structure as the first O/E converter 1007 of the single-pair two-way straight sheet bus, it is different in that a first light receiving portion group 1116 comprising four light receiving portions is formed instead of the first light receiving portion 1016. While the second array O/E converter 1108 has substantially the same structure as the second O/E converter 1008 of the single-pair two-way straight sheet bus, it is different in that a second light receiving portion group 1117 comprising four light receiving portions is formed instead of the second light receiving portion 1017. The positions, in the direction of the width, of the light emitting portions included in the first light emitting portion group 1114 all correspond to those of the light receiving portions included in the second light receiving portion group 1117. The positions, in the direction of the width, of the light emitting portions included in the second light emitting portion group 1115 all correspond to those of the light receiving portions included in the first light receiving portion group 1116.

The first light emitting portion group 1114 makes a first beam 1121 to a fourth beam 1124, which are four signal beams all having the same wavelength, independently incident on the graded index slab waveguide 1101 through a first surface 1102 based on the external electric signal inputted from the first input electric line 1010. The graded index slab waveguide 1101 transmits the first beam 1121 to the fourth beam 1124. The first beam 1121 to the fourth beam 1124 exit from a second surface 1103 and are received by the light receiving portions, whose positions in the direction of the width are the same, of the second light receiving portion group 1117 like in the case of the graded index slab waveguide 1001. The received signals are outputted to the outside by the second output electric line 1013.

The second light emitting portion group 1115 makes a fifth beam 1125 to an eighth beam 1128, which are four signal beams all having the same wavelength, independently incident on the graded index slab waveguide 1101 through the second surface 1103 based on the external electric signal inputted from the second input electric line 1011. The graded index slab waveguide 1101 transmits the fifth beam 1125 to the eighth beam 1128. The fifth beam 1125 to the eighth beam 1128 exit from the first surface 1102 and are received by the light receiving portions, whose positions in the direction of the width are the same, of the first light receiving portion group 1116 like in the case of the graded index slab waveguide 1001. The received signals are outputted to the outside by the first output electric line 1011.

The principle that four incident beams independently appear in parallel positions in the direction of the width corresponds to the case where a plurality of incident beams is superimposed one on another in (Expression 2) of (1) Asymmetrical incidence described in the first embodiment. As described above, by using the MMI, it is unnecessary to provide separate optical waveguides to straightly transmit four pairs of signal beams in both directions, and four pair of signal beams can be independently transmitted with one graded index slab waveguide 1101.

While the eighth embodiment shows examples of the single-pair two-way straight sheet bus and the four-pair two-way straight sheet bus, generally, N×M-signal straight sheet bus (N, M=1,2,3, . . . ) can be designed in like manner. In this case, by making a number, N, of incident beams incident on given positions on a first surface and making a number, M, of incident beams incident from given positions on a second surface in a graded index slab waveguide having a slab length L which is substantially an integral multiple of the following expression, a number, N, of exiting beams can be obtained from positions, whose positions in the direction of the width are the same, of the second surface and a number, M, of exiting beams can be obtained from positions, whose positions in the direction of the width are the same, of the first surface.

$$\frac{8n_0 W_0^2}{\lambda}$$

Ninth Embodiment

Figure 12:
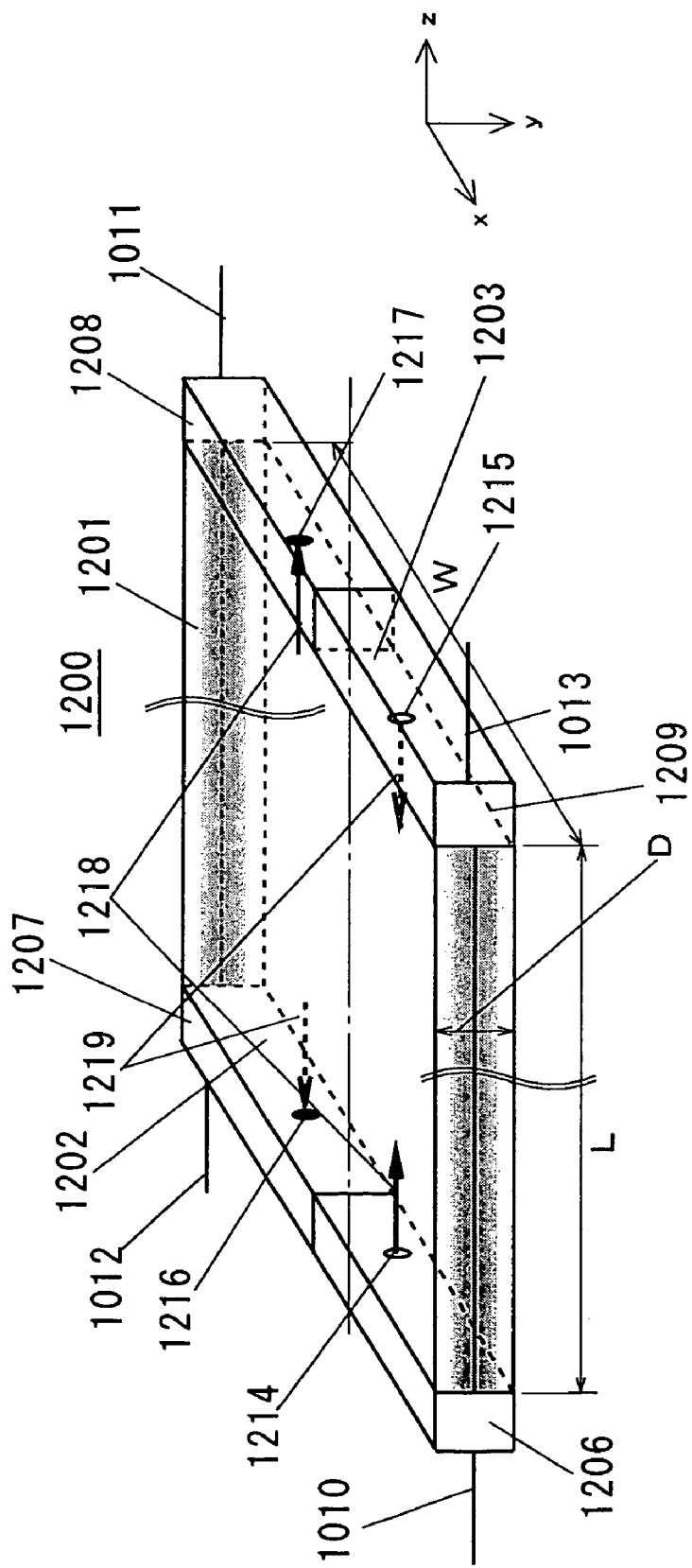
FIG. 12 is a perspective view showing the general outline of a single-pair two-way cross sheet bus which is an optical device of a ninth embodiment of the present invention.

FIG. 12 is a perspective view showing the general outline of a single-pair two-way cross sheet bus which is an optical device of a ninth embodiment of the present invention. In the optical device according to the ninth embodiment, one signal beam transmission direction of the two-signal cross sheet bus described in the fourth embodiment is reversed to enable two-way communication. The optical device according to the ninth embodiment comprises as a main element a graded index slab waveguide 1201. The graded index slab waveguide 1201 is, as shown in FIG. 12, a sheet-form multi-mode optical transmission line that extends parallel to the x-z plane. The graded index slab waveguide 1201 has a distribution such that the highest refractive index $n_{max}$ is provided at the center in the direction of the thickness and the refractive index does not increase with distance from the center. The graded index slab waveguide 1201 has a uniform refractive index in the direction of the width and has no refractive index distribution. The optical device according to the ninth embodiment is provided with a first E/O converter 1206, a second E/O converter 1209, a first O/E converter 1207, a second O/E converter 1208, a first input electric line (bus) 1010, a second input electric line (bus) 1011, a first output electric line (bus) 1012 and a second output electric line (bus) 1013.

The first E/O converter 1206 includes a first light emitting portion 1214. The second E/O converter 1209 includes a second light emitting portion 1215. The first light emitting portion 1214 makes a first beam 1218 (wavelength: λ) incident on a given position in the direction of the width on a first surface 1202 of the graded index slab waveguide 1201. The second light emitting portion 1215 makes a second beam 1219 having the same wavelength as the first beam 1218 incident on a given position in the direction of the width on a second surface 1203 of the graded index slab waveguide 1201. The first E/O converter 1206 is connected to the first input electric line (bus) 1010. The first E/O converter 1206 converts an external electric signal inputted to the first input electric line (bus) 1010 into a signal beam emitted from the first light emitting portion 1214. The second E/O converter 1209 is connected to the second input electric line (bus) 1013. The second E/O converter 1209 converts an external electric signal inputted from the second input electric line (bus) 1013 into a signal beam emitted from the second light emitting portion 1215.

The first O/E converter 1207 includes a first light receiving portion 1216. The second O/E converter 1208 includes a second light receiving portion 1217. The first light receiving portion 1216 is disposed in a position whose position in the direction of the width is symmetrical to the second light emitting portion 1015 with respect to the center on the first surface 1202 of the graded index slab waveguide 1201, and receives the second beam 1219 (wavelength: $\lambda$). The second light receiving portion 1217 receives the first beam 1218 having the same wavelength as the second beam 1219 in a position whose position in the direction of the width is symmetrical to the first light emitting portion 1214 with respect to the center on the second surface 1203 of the graded index slab waveguide 1201. The first O/E converter 1207 is connected to the first output electric line (bus) 1012. The first O/E converter 1207 converts the received signal beam into an external electric signal outputted to the outside by the first output electric line (bus) 1012. The second O/E converter 1208 is connected to the second output electric line (bus) 1011. The second O/E converter 1208 converts the received signal beam into an external electric signal outputted to the outside by the second output electric line (bus) 1011.

The slab length L of the graded index slab waveguide 1201 substantially coincides with $4 \times n_0 \times W_0^2 / \lambda$. Here, the effective refractive index of the 0th-order mode beam excited in the direction of the width is $n_0$. The slab length L of the graded index slab waveguide 1201 corresponds to the case where a plurality of incident beams is superimposed one on another in (Expression 3) of (1) Asymmetrical incidence described in the first embodiment. By setting the slab length L like this, the first beam 1218 incident from the first light emitting portion 1214 forms an image having the same profile as that when the beam is incident in the vicinity of the second light receiving portion 1217. Likewise, the second beam 1219 incident from the second light emitting portion 1215 forms an image having the same profile as that when the beam is incident in the vicinity of the first light receiving portion 1216. According to the self-imaging principle, since a similar phenomenon occurs every length of $8 \times n_0 \times W_0^2 / \lambda$, by setting the slab length L to an integral multiple of $4 \times n_0 \times W_0^2 / \lambda$ the length of the graded index slab waveguide 1201 can be adjusted according to use. The detailed mechanism of splitting and the mechanism in which there is no signal beam waveform disturbance in the direction of the thickness and in the direction of the width even in the case of high-speed transmission are similar to those of the first embodiment.

By the above structure, when an external electric signal is inputted to the first E/O converter 1206 from the first input electric line 1010, the first E/O converter 1206 converts the external electric signal into the first beam 1218 emitted from the first light emitting portion 1214. Moreover, when an external signal is inputted to the second E/O converter 1209 from the second input electric line (bus) 1013, the second E/O converter 1209 converts the external electric signal into the second beam 1219 emitted from the second light emitting portion 1215.

The first beam 1218 emitted from the first light emitting portion 1214 is incident on the graded index slab waveguide 1201 through the first surface 1202 to be transmitted. The first beam 1218 forms, according to the self-imaging principle, an image having the same profile as that when the beam is incident in the vicinity of the second light receiving portion 1217. By this, the first beam 1218 is outputted from the second surface 1203 to the second light receiving portion 1217, and is outputted to the outside from the second output electric line 1011. On the other hand, the second beam 1219 emitted from the second light emitting portion 1215 is incident on the graded index slab waveguide 1201 through the second surface 1203 to be transmitted. The second beam 1219 forms, according to the self-imaging principle, an image having the same profile as that when the beam is incident in the vicinity of the first light receiving portion 1216. By this, the second beam 1219 is outputted from the first surface 1202 to the first light receiving portion 1216. The first light receiving portion 1216 outputs an electric signal corresponding to the received second beam 1219. The outputted electric signals are outputted to the outside from the first output electric line 1012. As described above, since the MMI is reversible irrespective of the beam transmission direction, the MMI can be used in both directions. Consequently, it is unnecessary to provide separate optical waveguides to transmit two signal beams so as to cross each other in both directions, so that two signal beams can be independently transmitted in both directions with one graded index slab waveguide 1201.

While the ninth embodiment shows an example of the single-pair two-way straight sheet bus, generally, N×M-signal cross sheet bus (N, M=1,2,3, . . . ) can be designed in like manner. In this case, by making a number, N, of incident beams incident on given positions on a first surface and making a number, M, of incident beams incident from given positions on a second surface in a graded index slab waveguide having a slab length L which is substantially an odd multiple of the following expression, a number, N, of exiting beams can be obtained from positions, symmetrical with respect to the center in the direction of the width, of the second surface and a number, M, of exiting beams can be obtained from positions, symmetrical with respect to the center in the direction of the width, of the first surface.

$$\frac{4n_0 W_0^2}{\lambda}$$

Tenth Embodiment

Figure 13:
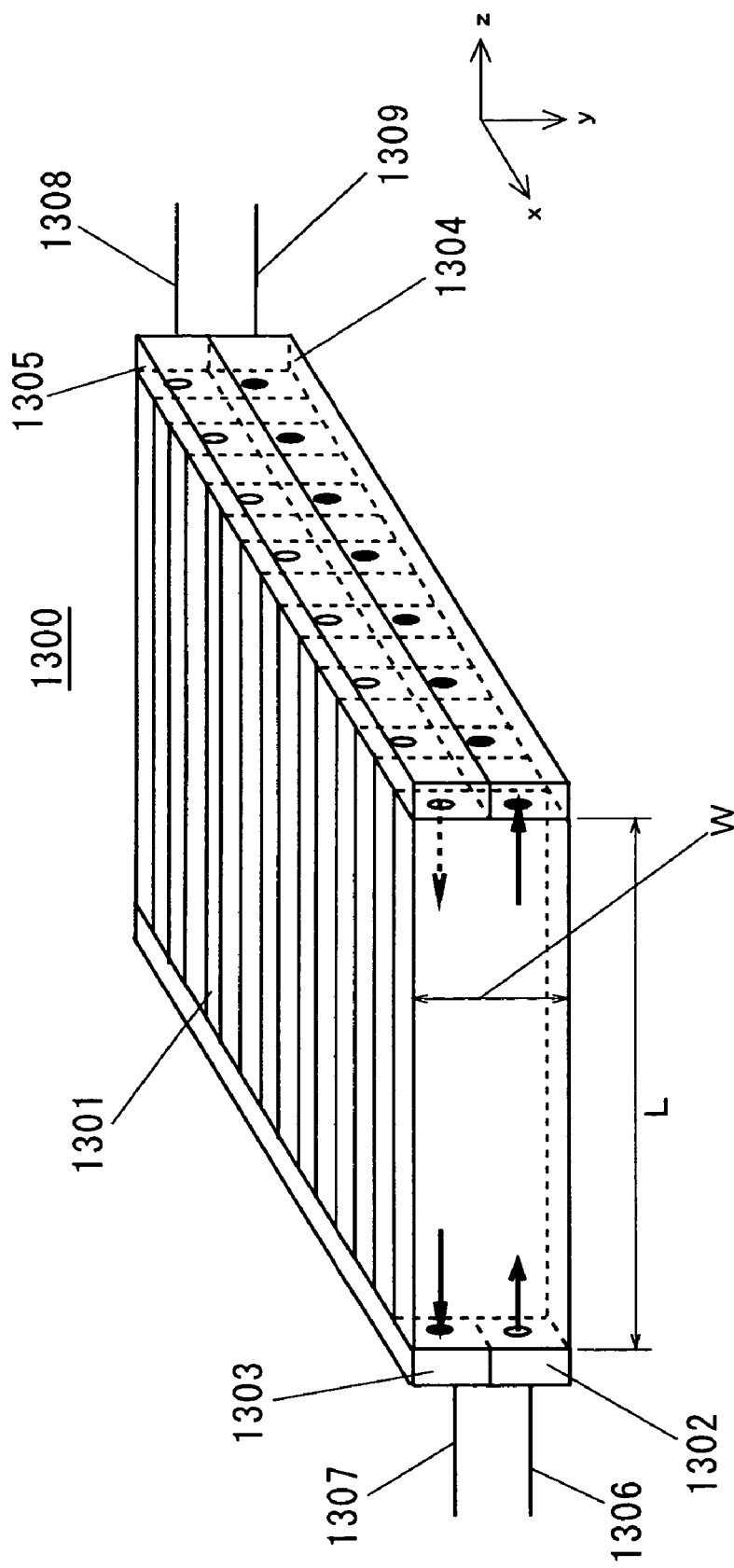
FIG. 13 is a schematic diagram of the structure of a single-pair two-way straight sheet bus array which is an optical integrated device according to a tenth embodiment of the present invention.

FIG. 13 is a schematic diagram of the structure of a single-pair two-way straight sheet bus array which is an optical integrated device according to a tenth embodiment of the present invention. The optical integrated device of the tenth embodiment comprises as a main element a laminated two-way straight sheet bus 1301 in which eight single-pair two-way straight sheet buses of the eighth embodiment are laminated in the direction of the thickness as shown in FIG. 13. The optical integrated device of the tenth embodiment is provided with the laminated two-way straight sheet bus 1301, a first array E/O converter 1302, a first array O/E converter 1303, a second array E/O converter 1305, a second array O/E converter 1304, a first input electric line (bus) 1306, a second input electric line (bus) 1308, a first output electric line (bus) 1307 and a second output electric line (bus) 1309.

In the first array E/O converter 1302, eight light emitting portions disposed on one end surface (left side of the figure) of the two-way straight sheet buses are formed into an array. In the first array O/E converter 1303, eight light receiving portions disposed on one end surface (left side of the figure) of the two-way straight sheet buses are formed into an array. The first array E/O converter 1302 and the first array E/O converter 1303 are disposed so as to adjoin each other. In the second array E/O converter 1305, eight light emitting portions disposed on the other end surface (right side of the figure) of the two-way straight sheet buses are formed into an array. In the second array O/E converter 1304, eight light receiving portions disposed on one end surface (left side of the figure) of the two-way straight sheet buses are formed into an array. The second array E/O converter 1305 and the second array O/E converter 1304 are disposed so as to adjoin each other. The light emitting portions of the first array E/O converter 1302 and the light receiving portions of the second array O/E converter 1304 are disposed so as to be opposed to each other with the two-way straight sheet buses in between. The light emitting portions of the second array E/O converter 1305 and the light receiving portions of the second array O/E converter 1303 are disposed so as to be opposed to each other with the two-way straight sheet buses in between. The first array E/O converter 1302 is connected to the first input electric line 1306. The second array E/O converter 1305 is connected to the second input electric line 1308. The first array O/E converter 1303 is connected to the first output electric line 1307. The second array O/E converter 1304 is connected to the second output electric line 1309.

In the above structure, electric signals inputted from the first input electric line 1306 are converted into signal beams by the first array E/O converter 1302. The converted signal beams are emitted from the light emitting portions and incident on the two-way straight sheet buses as incident beams. On the other hand, electric signals inputted from the second input electric line 1308 are converted into signal beams by the second array E/O converter 1305. The converted signal beams are emitted from the light emitting portions and incident on the two-way straight sheet buses as incident beams. The signal beams are transmitted and form, according to the self-imaging principle, images having the same profiles as the incident beams in the vicinity of the light receiving portions. The images are made to exit to the light receiving portions of the two-way straight sheet buses. The first array O/E converter 1303 having received the exiting beams by the light receiving portions converts the exiting beams into electric signals and outputs them to the first output electric line 1307. The second array O/E converter 1304 having received the exiting beams by the light receiving portions converts the exiting beams into electric signals and outputs them to the second output electric line 1309. In this manner, two-way straight sheet buses are realized with a simple structure.

While the tenth embodiment discloses a laminated two-way straight sheet bus in which the included straight sheet buses are all single-pair two-way straight sheet buses, the present invention is not limited thereto. For example, the single-pair two-way cross sheet buses of the ninth embodiment may be laminated. Moreover, the optical integrated device of the tenth embodiment may be a two-way optical bus array in which two kinds of the single-pair straight sheet bus according to the eighth embodiment and the single-pair two-way cross sheet bus according to the ninth embodiment are laminated, or may be a composite optical bus array in which a plurality of kinds of optical buses selected from among the two-way sheet buses according to the eighth embodiment and the ninth embodiment and the optical sheet bus according to the third embodiment and the fourth embodiment are laminated.

Eleventh Embodiment

Figure 14:
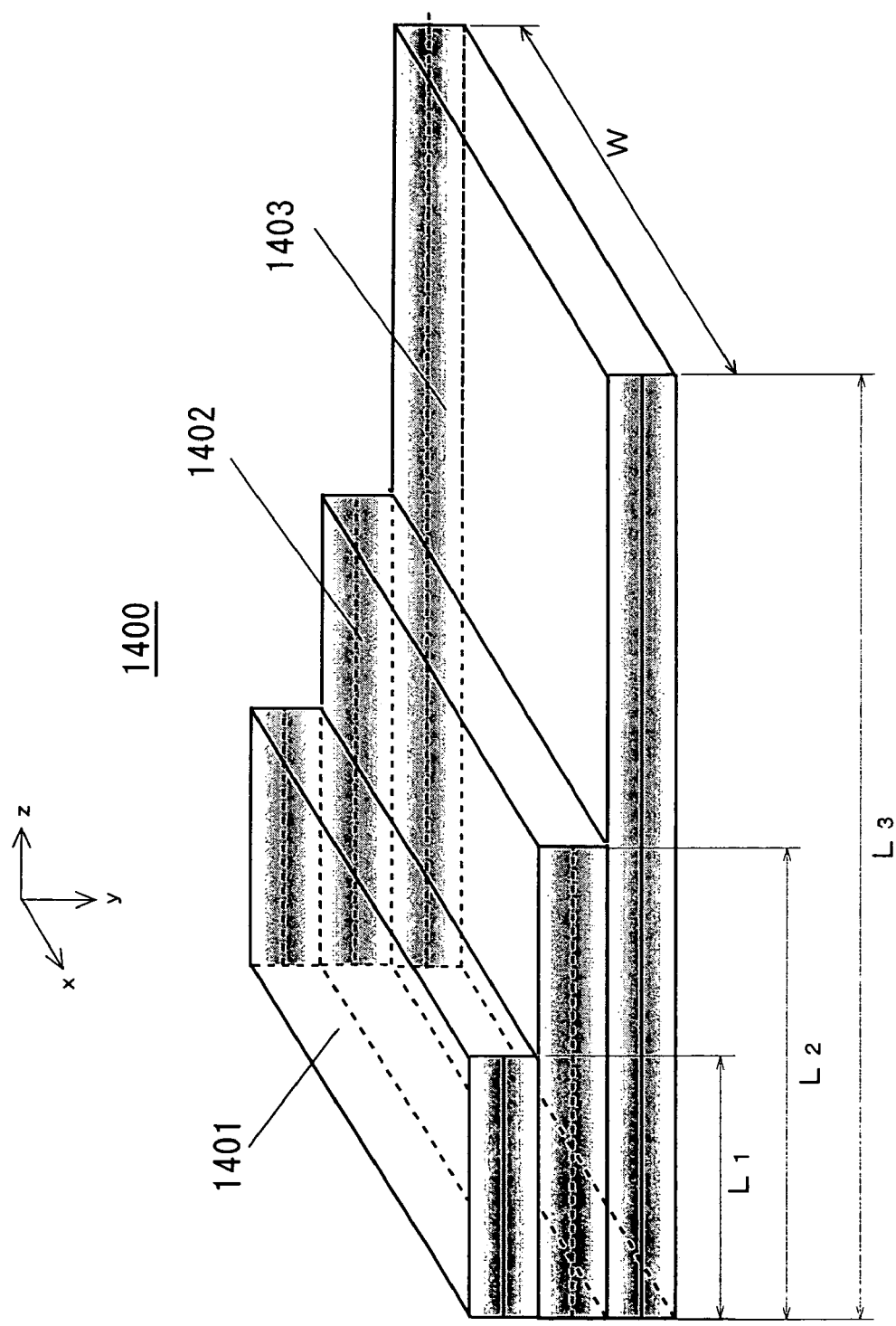
FIG. 14 is a schematic diagram of the structure of a multi-layer optical bus which is an optical integrated device according to an eleventh embodiment of the present invention.

FIG. 14 is a schematic diagram of the structure of a multi-layer optical bus which is an optical integrated device according to an eleventh embodiment of the present invention. In the optical integrated device according to the eleventh embodiment, graded index slab waveguides whose sizes in the direction of the length are different are laminated in the direction of the thickness. As the graded index slab waveguides to be laminated, any of the single-layer graded index slab waveguides such as the ones of the first to fifth, eighth and ninth embodiments may be used. According to the self-imaging principle of the multi-mode interference, since a similar effect occurs every predetermined period, graded index slab waveguides having different lengths may be used even in the case of the same kind of optical devices. For example, in the optical integrated device described in FIG. 14, straight sheet buses using graded index slab waveguides are laminated. In the optical integrated device, the incident surfaces are aligned, and the lengths, in the direction of the width, of a first graded index slab waveguide 1401, a second graded index slab waveguide 1402 and a third graded index slab waveguide 1403 are $L_1=8\,n_0W_0^2/\lambda$, $L_2=16\,n_0W_0^2/\lambda$ and $L_1=32\,n_0W_0^2/\lambda$, respectively. By structuring the optical integrated device like this, the profiles of the exiting beams from the graded index slab waveguides whose sizes in the direction of the length are different can be made the same.

In actuality, the distances between apparatuses, substrates or chips mounted on a substrate are not the same. Therefore, in actuality, optical sheet buses corresponding to the various lengths are necessary. By laminating optical sheet buses of different lengths into one device like the eleventh embodiment, optical transmission from a substrate to a plurality of substrates at different distances is enabled. At this time, an end surface 140 comprising the aligned end surfaces of the multi-layer optical bus is connected to the substrate, and as the input and output to the side where the end surfaces are aligned, for example, a 1×N optical splitter (an N×1 optical combiner) according to the first embodiment may be used.

Twelfth Embodiment

Figures 22A, 22B:
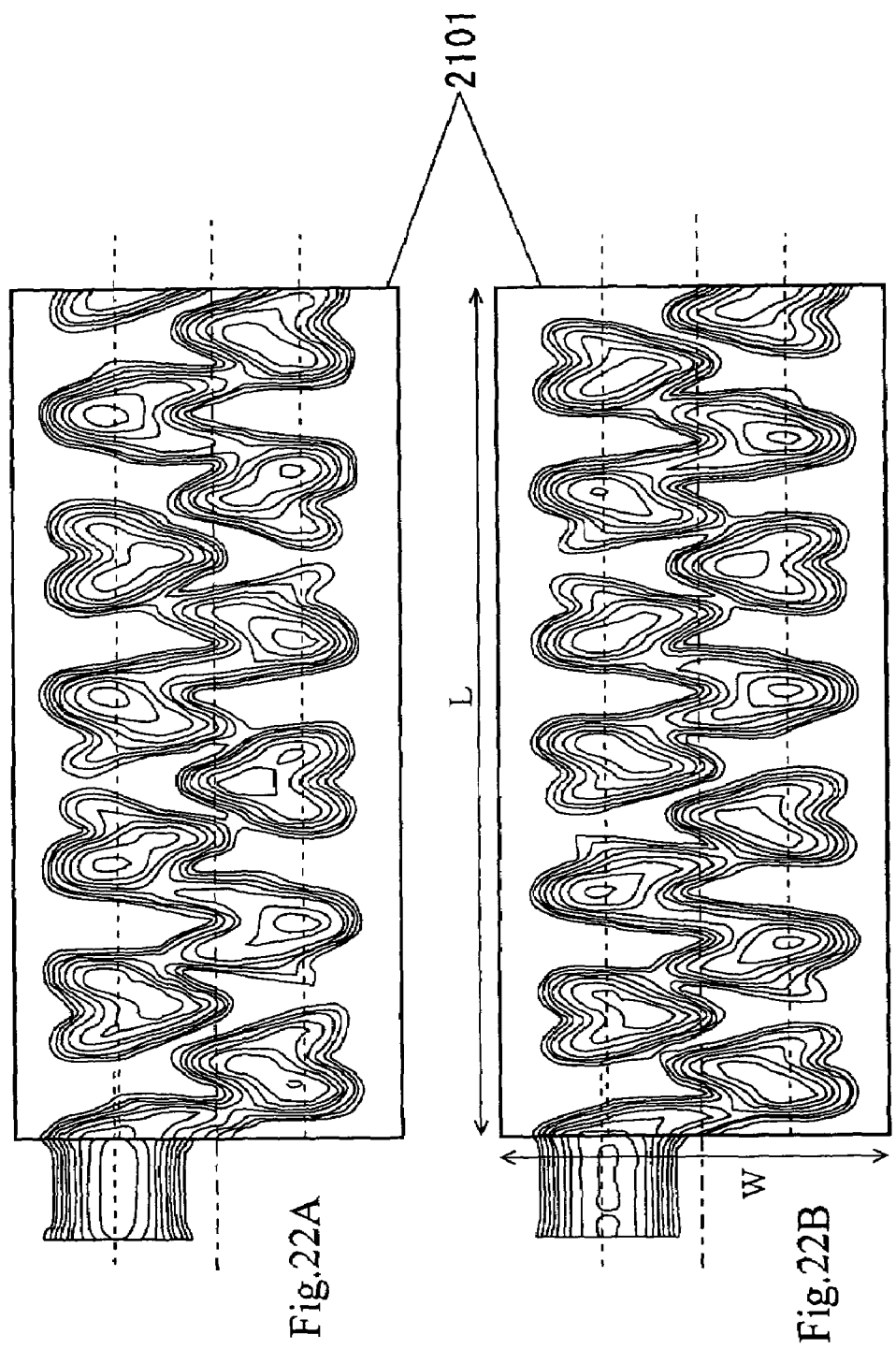
FIG. 22A is a result of a BPM simulation performed when a signal beam of 1.30 μm is transmitted through the graded index slab waveguide.
FIG. 22B is a result of a BPM simulation performed when a signal beam of 1.55 μm is transmitted through the graded index slab waveguide 1201.

FIG. 21A is a perspective view showing the general outline of a graded index slab waveguide 2101 of an optical device that performs beam demultiplexing according to a twelfth embodiment of the present invention. FIG. 21B is a cross-sectional view of the graded index slab waveguide 2101 of the optical device that performs beam demultiplexing according to the twelfth embodiment of the present invention. FIG. 22A is a result of a BPM (beam propagation method) simulation performed when a signal beam of 1.30 μm is transmitted through the graded index slab waveguide 2101. FIG. 22B is a result of a BPM simulation performed when a signal beam of 1.55 μm is transmitted through the graded index slab waveguide 2101.

The optical device according to the twelfth embodiment comprises as a main element the graded index slab waveguide 2101 that transmits beams. The graded index slab waveguide 2101 is, as shown in FIG. 21A, a sheet-form multi-mode optical transmission line that extends parallel to the x-z plane. The graded index slab waveguide 2101 has a refractive index distribution in the direction of the thickness such that the highest refractive index $n_{max}$ is provided at the central position in the direction of the thickness and the refractive index does not increase with distance from the center. The graded index slab waveguide 2101 has a uniform refractive index in the direction of the width and has no refractive index distribution. The graded index slab waveguide 2101 includes an incident surface 2102 and an exit surface 2103.

The incident surface 2102 is opposed to an incident portion (not shown) that makes a multiplex incident beam 2107 comprising multiplexed beams of two different wavelengths (a wavelength 1.30 μm and a wavelength 1.55 μm) incident on a position a predetermined distance away from the center in the direction of the width. The exit surface 2103 is opposed to an exit portion (not shown) that receives two exiting beams 2108 and 2109 of different wavelengths that exit from positions symmetrical to each other with respect to the center in the direction of the width. The incident portion makes the multiplex incident beam 2107 incident on a position a predetermined distance away from the center, in the direction of the width, of the incident surface 2102. The multiplex incident beam 2107 is transmitted inside the graded index slab waveguide 2101. Inside the graded index slab waveguide 2101, the multiplex incident beam 2107 is demultiplexed into two beams in accordance with the wavelength according to the self-imaging principle of the multi-mode interference described later, exits as the two exiting beams 2108 and 2109 having different wavelengths (a wavelength 1.30 μm and a wavelength 1.55 μm) from positions away from each other in the direction of the width of the exit surface 2103, and reaches the exit portion. The slab length L of the graded index slab waveguide 2101 is an optical path length where the phase difference between the light quantity movement of the wavelength 1.30 μm and the light quantity movement of the wavelength 1.55 μm is opposite phase (that is, an integral multiple of π).

The refractive index distribution, in the direction of the thickness, of the graded index slab waveguide 2101 is expressed, for example, by the maximum point $n_{max}$ of the refractive index which point is situated at the center in the direction of the thickness, the distance r from the maximum point in the direction of the thickness and the refractive index distribution constant $A^{1/2}$ as shown by the previously-mentioned (Expression 1).

The refractive index distribution constant is optimized according to the film thickness of the graded index slab waveguide 2101 and the profile of the multiplex incident beam 2107 so that the beam transmitted in the graded index slab waveguide 2101 does not spread outside the film thickness. For example, when the spread angle of the multiplex incident beam 2107 is large compared to the film thickness of the graded index slab waveguide 2101, the refractive index distribution constant is increased. Conversely, when the spread angle of the multiplex incident beam 2107 is small, the refractive index distribution constant is decreased. Moreover, by adjusting the film thickness of the graded index slab waveguide 2101 in accordance with the beam diameter of the multiplex incident beam 2107, the coupling loss can be reduced. The refractive index distribution is not necessarily a continuous change as shown in (Expression 1); it may stepwisely change as a function of the distance from the center.

Next, a mechanism will be described of, when the multiplex incident beam 2107 incident on a position a predetermined distance away from the center in the direction of the width is incident on the incident surface 2102 of the graded index slab waveguide 2101, demultiplexing the incident beam in to two beams in accordance with the wavelength symmetrically with respect to the central line in the direction of the width on the side of the exit surface 2103. Description will be separately given for (i) the case of a beam transmitted within the central plane in the direction of the thickness (signal beam transmitted on the optical path designated A in FIG. 21B; and (ii) a beam not transmitted within the central plane in the direction of the thickness. As the beam of (ii) not transmitted within the central plane in the direction of the thickness, the following two signal beams are present: the case of an incident beam that is incident with an axis shift angle on the central plane (signal beam transmitted on the optical path designated B in FIG. 21B) and the case of an incident beam that is incident on a position position-shifted (axis-shifted) from the central plane (signal beam transmitted on the optical path designated C in FIG. 21B). The beam of (i) transmitted within the central plane in the direction of the thickness is not affected by the refractive index distribution in the direction of the thickness. On the other hand, the beam of (ii) not transmitted within the central plane in the direction of the thickness is affected by the refractive index distribution in the direction of the thickness.

In the graded index slab waveguide 2101, the behavior of the beam of (i) transmitted within the central plane in the direction of the thickness which behavior is affected substantially only by the effective refractive index no is equivalent to that in a case where the uniform refractive index is the effective refractive index $n_0$ in the slab waveguide described in Document (11). Therefore, the condition of the exiting beams with respect to the multiplex incident beam 2107 transmitted within the central plane, in the direction of the thickness, of the graded index slab waveguide 2101 varies according to the slab length L by the multi-mode mode dispersion excited in the direction of the width of the slab waveguide whose refractive index is no and uniform. Here, that the condition of the exiting beams varies means that the number and exit positions of images the same as the incident beam vary. In the case of the graded index slab waveguide 2101 according to the twelfth embodiment, by the slab length L being the optical path length where the phase difference between the light quantity movement of the wavelength 1.30 μm and the light quantity movement of the wavelength 1.55 μm is opposite phase (that is, an integral multiple of π), two images the same as the multiplex incident beam 2107 having different wavelengths are formed on the exit surface 2103 so as to be symmetrical with respect to the center in the direction of the width.

The BPM simulation of FIG. 22A shows the behavior of the beam of the wavelength 1.30 μm. Of the multiplex incident beam 2107, the signal beam component corresponding to the wavelength 1.30 μm is developed into the 0th-order mode (basic mode) intrinsic to the graded index slab waveguide 2101 and the primary mode. The mode dispersion is different between the 0th-order mode and the primary mode. In other words, the propagation constant of the 0th-order mode and the propagation constant of the primary mode are different from each other. Therefore, a mode interference occurs between the 0th-order mode and the primary mode. By this mode interference, as shown in FIG. 22A, the signal beam component corresponding to the wavelength 1.30 μm is transmitted in one direction in the direction of the length (the direction from the left to the right in the figure) while alternately moving in the direction of the width in the graded index slab waveguide 2101.

On the other hand, the BPM simulation of FIG. 22B shows the behavior of the beam of the wavelength 1.55 μm. Of the multiplex incident beam 2107, the signal beam component corresponding to the wavelength 1.55 μm is also developed into the 0th-order mode (basic mode) intrinsic to the graded index slab waveguide 2101 and the primary mode. Therefore, a mode interference occurs between the 0th-order mode and the primary mode like the case of the signal beam component of the wavelength 1.30 μm. By this mode interference, as shown in FIG. 22B, the signal beam component corresponding to the wavelength 1.55 μm is transmitted in one direction in the direction of the length (the direction from the left to the right in the figure) while alternately moving in the direction of the width in the graded index slab waveguide 2101.

The signal beam component of the wavelength 1.30 μm is different from the signal beam component of the wavelength 1.55 μm in signal beam component and wavelength dispersion. That is, since the signal beam component of the wavelength 1.30 μm and the signal beam component of the wavelength 1.55 μm are different from each other in the propagation constant of each mode, these beams exhibit different behaviors when transmitted through the graded index slab waveguide 2101. Using this characteristic, in the optical device according to the twelfth embodiment, the slab length L of the graded index slab waveguide 2101 is set to a value where the phase difference between the light quantity movement of the signal beam of the wavelength 1.30 μm and the light quantity movement of the signal beam of the wavelength 1.55 μm is opposite phase (that is, an integral multiple of π). By structuring the optical device like this, according to the self-imaging principle of the multi-mode interference, an image having the same profile as the incident beam of the signal component of the wavelength 1.30 μm and an image having the same profile as the incident beam of the signal component of the wavelength 1.55 μm can be formed in different positions. Then, the two images formed in different positions are made to exit as the exiting beam 2108 and the exiting beam 2109, respectively, whereby beam demultiplexing is achieved.

On the other hand, the beam of (ii) not transmitted within the central plane in the direction of the thickness propagates along the central plane while meandering in the direction of the thickness as shown in FIG. 21B, because it is affected by the refractive index distribution in the direction of the thickness. That is, since the beam traveling in a direction away from the central plane always travels from a part where the refractive index is relatively high to a part where the refractive index is relatively low, as the beam travels, the angle between the direction of travel and the direction of the thickness gradually increases, and becomes 90° at the position farthest from the central axis. Moreover, since the beam traveling in a direction toward the central plane always travels from a part where the refractive index is relatively low to a part where the refractive index is relatively high, as the beam travels, the angle between the direction of travel and the direction of the thickness gradually decreases, and becomes smallest at the position intersecting the central plane. Since the refractive index that affects the beam of (ii) not transmitted within the central plane in the direction of the thickness is always lower than the refractive index no although it makes the beam meander, the speed of the beam of (ii) is higher than that of the beam of (i) transmitted within the central axis in the direction of the thickness.

When the refractive index distribution is the refractive index distribution of the quadratic function shown in the previously-shown (Expression 1), the component of the transmission speed, parallel to the central plane, of the beam of (ii) not transmitted within the central plane in the direction of the thickness is equal to the transmission speed of the beam of (i) transmitted within the central plane in the direction of the thickness. This means that there is no mode dispersion in the direction of the thickness. Therefore, the component, parallel to the central plane of the beam of (ii) not transmitted within the central plane in the direction of the thickness (component, in a direction vertical to the direction of the thickness, of a meandering beam) of the incident beam is demultiplexed into two beams symmetrically with respect to the center in the direction of the width at the exit surface like the beam of (i) transmitted within the central plane in the direction of the thickness.

Since the component, vertical to the central plane of the beam of (ii) not transmitted within the central plane in the direction of the thickness (component in the direction of the thickness of a meandering beam) of the incident beam changes according to the propagation position of the meandering beam, the condition of the exiting beam cannot be determined. However, the component in the direction of the thickness of the meandering beam is not affected by a signal waveform disturbance due to the mode dispersion, because the mode dispersion in the direction of the thickness does not occur. For this reason, the component behaves equivalently to that in the case where there is no influence of the mode dispersion also in the direction of the width. Therefore, the two exiting beams have the same images as the signal beam components corresponding to the wavelengths of the multiplex incident beam. From the above result, the beam of (ii) not transmitted within the central plane in the direction of the thickness (meandering beam) is demultiplexed into two beams as the same image as the incident beam symmetrically with respect to the center in the direction of the width according to the slab waveguide configuration like in the case of (i).

As described above, since the incident beam is equally demultiplexed into two beams with respect to all the eigenmodes in the direction of the thickness of the graded index slab waveguide 2101, an optical device can be obtained that functions, if the multiplex incident beam is incident on a position a predetermined distance away from the center, in the direction of the width, of the incident surface, as a device demultiplexing the incident beam into two beams even when the incident beam is position-shifted from the center in the direction of the thickness or has a large spread angle. Since the position shift, from the center in the direction of the width, of the incident beam is a cause of an imbalance in the demultiplexing ratio between the exiting beams, when it is intended to obtain equal exiting beams, it is preferable that the position shift be minimized. However, it is possible to adjust the intensity ratio between the signal beams by actively using the position shift.

When the position where opposite phase occurs between the two wavelengths is determined, either of the following methods may be adopted: determining the position from the position, in the direction of the width, where the ratio between the light quantities of the two exiting beams is highest; and determining the position from the position, in the direction of the width, where the light quantities of the two exiting beams are smallest. When the former method is adopted, the exiting beam loss can be reduced, and the efficiency of use of the transmitted signal beams can be improved. When the latter method is adopted, since the error component included in the exiting beams can be reduced, the transmission error can be reduced.

Figure 15A:
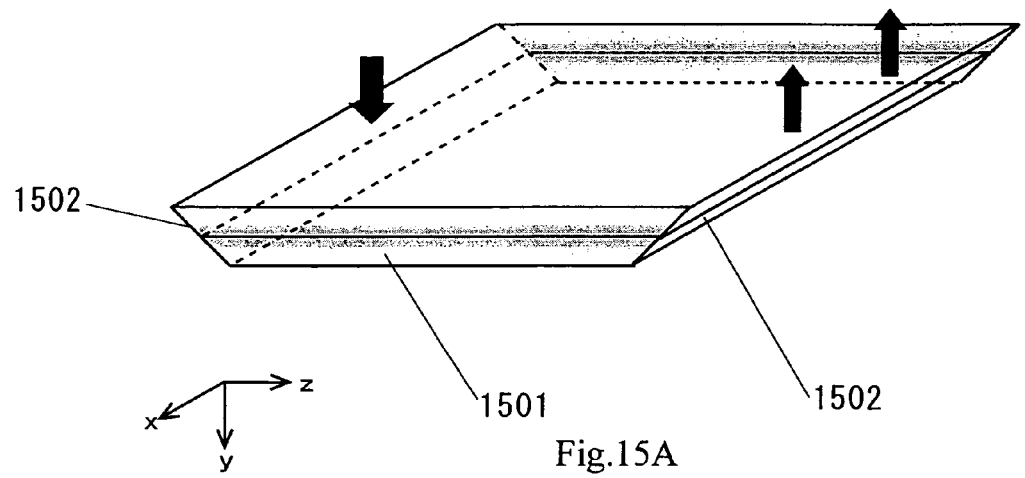
FIG. 15A is a perspective view showing an example of the incidence and exit method of the graded index slab waveguide.
Figure 15B:
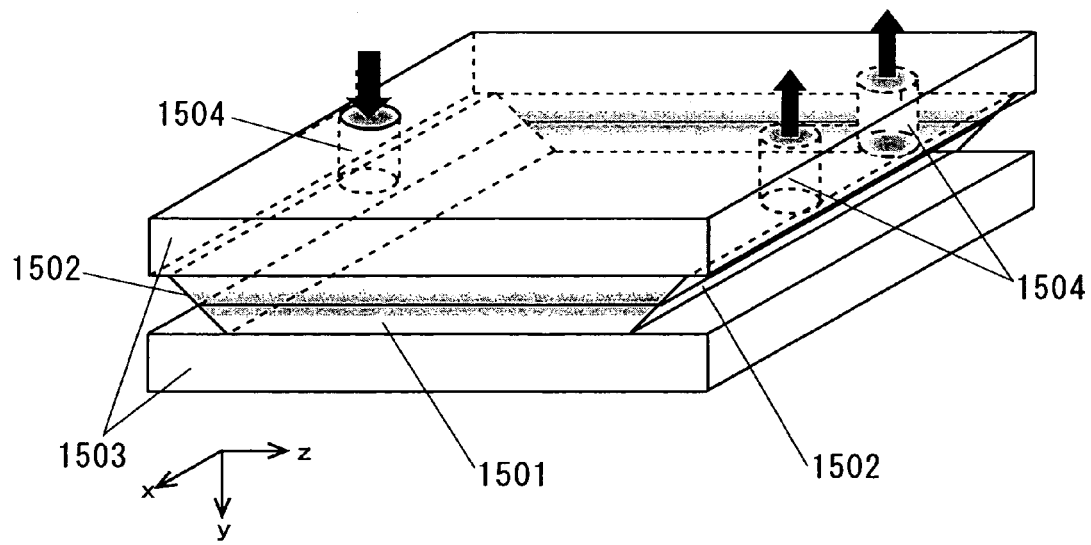
FIG. 15B is a perspective view showing another example of the incidence and exit method of the graded index slab waveguide.
Figure 16:
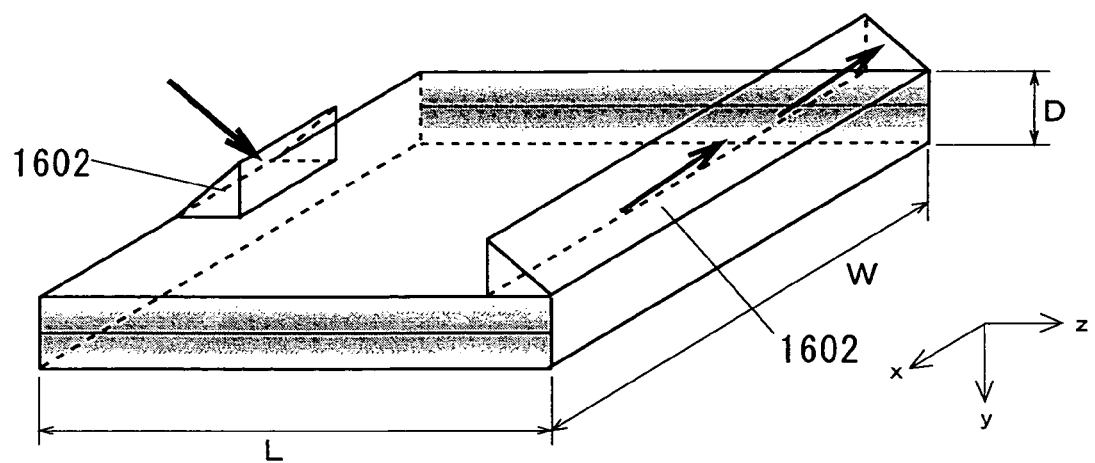
FIG. 16 is a perspective view showing still another example of the incident and exit method of the graded index slab waveguide.

While the first to twelfth embodiments show examples of vertical incidence and exit on and from the end surfaces as the method of input and output to and from the graded index slab waveguide, the present invention is not limited thereto. FIG. 15A is a perspective view showing an example of the incidence and exit method of the graded index slab waveguide. FIG. 15B is a perspective view showing another example of the incidence and exit method of the graded index slab waveguide. FIG. 16 is a perspective view showing still another example of the incident and exit method of the graded index slab waveguide. For example, a reflection method (FIG. 15A) may be adopted in which a reflecting surface 1502 and a reflecting surface 1503 are formed by inclining the incident and exit end surfaces of the graded index slab waveguide 45° and the incident and exiting beams incident from a direction vertical to the direction of the thickness are reflected by the reflecting surface 1502 and the reflecting surface 1503 to thereby bend the optical path 90°. Moreover, a coupler method (FIG. 16) may be adopted in which a prism 1602 is disposed in the vicinity of the incident and exiting end surfaces of the graded index slab waveguide so as to be adjacent to the surface in the direction of the thickness and beams incident and exiting on and from the prism 1602 are coupled to the optical bus. Moreover, a diffraction optical element such as a diffraction grating may be used instead of the prism 1602. Moreover, when the substrate used is an electric-optical hybrid substrate formed by sandwiching a graded index slab waveguide between the electric substrates 1503, as shown in FIG. 15B, a graded index slab waveguide where reflecting surfaces are formed by inclining the incident and exit end surfaces 45° is used, and through holes 1504 that pass a vertical incident beam therethrough are formed in parts of the electric substrate that are made to be reflecting surfaces by being inclined 45°.

Figure 17A:
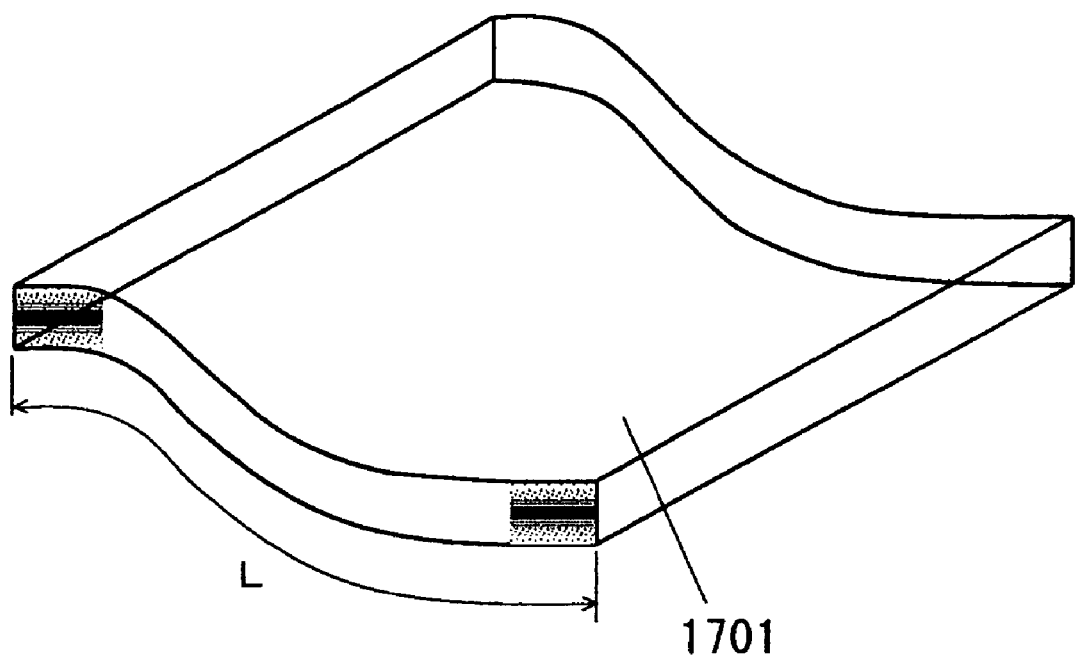
FIG. 17A is a perspective view showing an example of the configuration of the graded index slab waveguide.
Figure 17B:
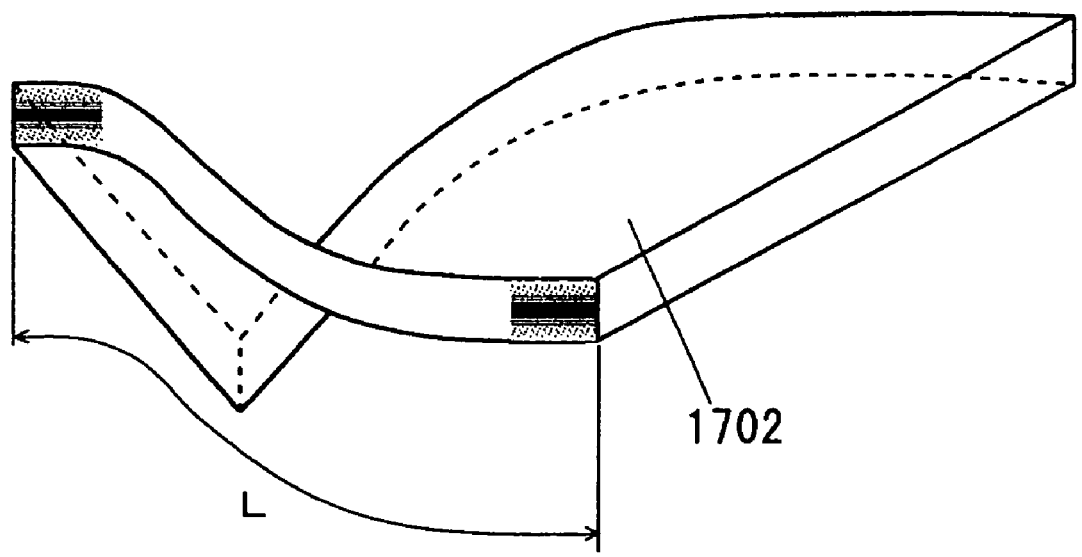
FIG. 17B is a perspective view showing another example of the configuration of the graded index slab waveguide.

Moreover, while the sheet-form graded index slab waveguide is on a single plane in the first to twelfth embodiments, the present invention is not limited thereto. FIG. 17A is a perspective view showing an example of the configuration of the graded index slab waveguide, and FIG. 17B is a perspective view showing another example of the configuration of the graded index slab waveguide. As shown in FIG. 17A, a graded index slab waveguide 1701 may be curved (FIG. 17A) so that the central position in the direction of the thickness always draws the same curve on given two different cross sections including the direction of the length and the direction of the thickness. Moreover, a graded index slab waveguide 1702 may be twisted (FIG. 17B) so that the central position in the direction of the thickness draws different curves on given two different cross sections including the direction of the length and the direction of the thickness. This is because while in typical slab waveguides where the refractive index is uniform in the direction of the thickness, the influence of the dispersion and the loss due to a change in incident angle when the beam is reflected at the interface by the curve or the twist cannot be avoided, in the case of a slab having a refractive index having the maximum value at the center in the direction of the thickness, the beam does not reach the interface of the slab and propagates irrespective of the condition of the interface of the slab.

While the input and exiting beams are limited to multi-mode beams in the above description, the use of single-mode beams is not a problem when the coupling loss is not a problem.

Thirteenth Embodiment

Figure 23:
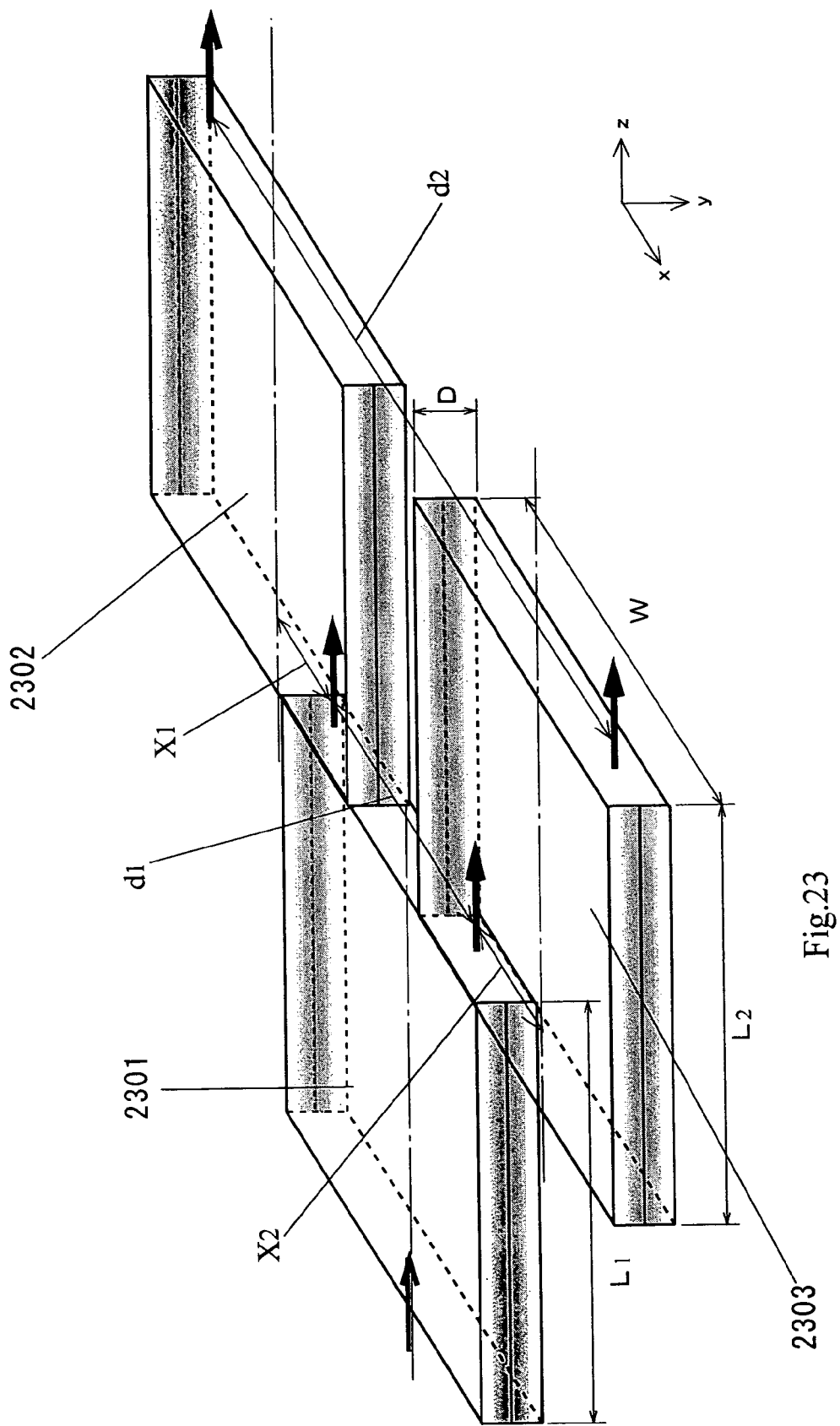
FIG. 23 is a schematic diagram of the structure of an optical device which is a 1×2 optical splitter according to a thirteenth embodiment of the present invention.

FIG. 23 is a schematic diagram of the structure of an optical device which is a 1×2 optical splitter according to a thirteenth embodiment of the present invention. As shown in FIG. 23, the optical device according to the thirteenth embodiment comprises as main elements a first graded index slab waveguide 2301, a second graded index slab waveguide 2302 and a third graded index slab waveguide 2303.

The first to third graded index slab waveguides 2301 to 2303 are each a sheet-form multi-mode optical transmission line that extends parallel to the x-z plane. The first to third graded index slab waveguides 2301 to 2303 have a refractive index distribution in the direction of the thickness such that the highest refractive index $n_{max}$ is provided at the central position in the direction of the thickness and the refractive index does not increase with distance from the center. The first to third graded index slab waveguides 2301 to 2303 have a uniform refractive index in the direction of the width and have no refractive index distribution.

The first graded index slab waveguide 2301 is the same as the graded index slab waveguide described in the case of the splitting into two beams according to the fist embodiment. That is, the slab length $L_1$ of the first graded index slab waveguide 2301 is a function of the basic mode width $W_0$ in the direction of the width, the effective refractive index $n_0$ of the 0th-order mode beam excited in the direction of the width and the wavelength $\lambda$ of the incident beam, and is approximately $n_0 \times W_0^2/(2\lambda)$.

The second graded index slab waveguide 2302 and the third graded index slab waveguide 2302 are the same as the cross sheet bus according to the fourth embodiment. That is, the slab lengths $L_2$ of the second graded index slab waveguide 2302 and the third graded index slab waveguide 2303 are a function of the basic mode width $W_0$ in the direction of the width, the effective refractive index $n_0$ of the 0th-order mode beam excited in the direction of the width and the wavelength $\lambda$ of the incident beam, and are both approximately $4 \times n_0 \times W_0^2/\lambda$.

The optical device according to the thirteenth embodiment makes an incident beam incident on a central position, in the direction of the width, of the incident surface of the first graded index slab waveguide 2301 from a non-illustrated incident portion. The first graded index slab waveguide 2301 transmits the incident beam that is incident on the center, in the direction of the width, of the incident surface, and generates two exiting beams that are symmetrical with respect to the center, in the direction of the width, of the exit surface according to the self-imaging principle.

Of the exiting beams having exited from the first graded index slab waveguide 2301, one exiting beam is incident on a position a predetermined distance away from the center, in the direction of the width, of the incident surface of the second graded index slab waveguide 2302. The second graded index slab waveguide 2302 transmits the incident beam that is incident, and generates an exiting beam in a position, of the exit surface, that is symmetrical to the incident beam with respect to the center in the direction of the width according to the self-imaging principle.

Of the exiting beams having exited from the first graded index slab waveguide 2301, the other exiting beam is incident on a position a predetermined distance away from the center, in the direction of the width, of the incident surface of the third graded index slab waveguide 2303. The third graded index slab waveguide 2303 transmits the incident beam that is incident, and generates an exiting beam in a position, of the exit surface, that is symmetrical to the incident beam with respect to the center in the direction of the width according to the self-imaging principle.

Here, the width of the basic mode of the first graded index slab waveguide 2301 is $W_0$, the predetermined distance from the center in the direction of the width to the incident position of the incident beam on the incident surface of the second graded index slab waveguide 2302 is x1, and the predetermined distance from the center in the direction of the width to the incident position of the incident beam on the incident surface of the third graded index slab waveguide 2303 is x2. In this case, the separation width d1 on the exit surface of the first graded index slab waveguide 2301 is equal to $d1=W_0/2$ according to the self-imaging principle. However, the separation width d2 between the exiting beams having exited from the second graded index slab waveguide 2302 and the third graded index slab waveguide 2303 is equal to $d2=W_0/2+2\times x1+2\times x2$ and is largely increased.

As described above, in the optical device according to the thirteenth embodiment, the separation width can be increased without the basic mode width $W_0$ being changed. For example, when the splitting into two beams is structured only with the first graded index slab waveguide 2301, the separation width after the beam is split into two beams is $W_0/2$, and when an optical fiber with a diameter of 125 μm is connected, it is necessary that the basic mode width $W_0$ be not less than 250 μm. In this case, the length of the first graded index slab waveguide 2301 is not less than L=35,000 μm, and size increase cannot be avoided. Further, when a plastic optical fiber with a diameter of 200 to 1.000 μm is connected, L>100.000 μm (L is proportional to the square of $W_0$).

On the other hand, when the second graded index slab waveguide 2302 and the third graded index slab waveguide 2303 are used, the movement amounts of the two exiting beams are $2\times x1+2\times x2$. The values of x1 and x2 can be increased to the half breadth of the second graded index slab waveguide 2302 and the third graded index slab waveguide 2303. Therefore, the slab length L can be made smaller than that when it is intended to obtain an equal separation width by using only the first graded index slab waveguide 2301. As described above, even when the first graded index slab waveguide 2301 is an optical splitter with a small separation width, the separation width can be easily increased by connecting the second and third graded index slab waveguides.

Figure 24:
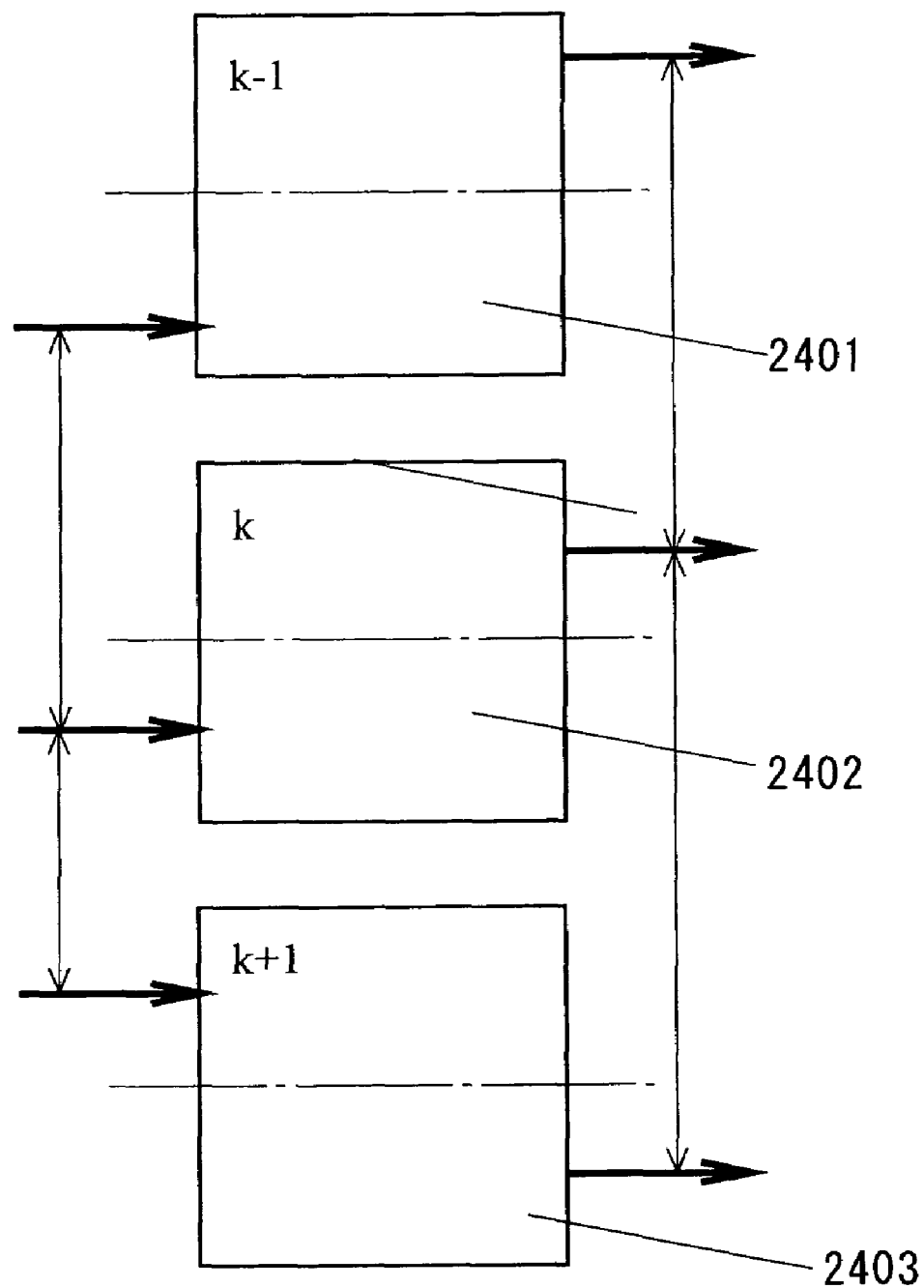
FIG. 24 is a top view showing a relevant part of an optical device for increasing the distance among three or more signal beams according to a first modification of the thirteenth embodiment of the present invention.

FIG. 24 is a top view showing a relevant part of an optical device for increasing the distance between three or more signal beams according to a first modification of the thirteenth embodiment of the present invention. The optical device according to the first modification of the thirteenth embodiment comprises, as shown in FIG. 24, a plurality of graded index slab waveguides disposed in the direction of the width. The graded index slab waveguides are each the same as the graded index slab waveguide described in the case of the cross sheet bus according to the fourth embodiment.

The optical device according to the first modification of the thirteenth embodiment comprises as main elements, a (k−1)-th graded index slab waveguide 2401 which is the (k−1)-th graded index slab waveguide from the top of the figure in the direction of the width, a k-th graded index slab waveguide 2402 which is the k-th graded index slab waveguide from the top of the figure in the direction of the width and a (k+1)-th graded index slab waveguide 2403 which is the (k+1)-th graded index slab waveguide from the top of the figure in the direction of the width.

In the optical device according to the first modification of the thirteenth embodiment, to increase the distance between three or more signal beams, transmission is performed by appropriately combining the following two patterns:

(1) A method in which the relationship between the incident position and the center in the direction of the width is made different directions like the adjoining k-th and (k+1)-th graded index slab waveguides. In this case, the distance between the signal beams can be largely increased.

(2) A method in which the relationship between the incident position and the center in the direction of the width is made the same direction so that the distance between the incident position and the center, in the direction of the width, of the k-th graded index slab waveguide having the incident position closer to the center of the overall optical device is made smaller than the distance between the incident position and the center, in the direction of the width, of the (k−1)-th graded index slab waveguide like the adjoining k-th and (k−1)-th graded index slab waveguides.

By appropriately combining the methods described in (1) and (2), the distance between three or more signal beams can be increased.

Figure 25:
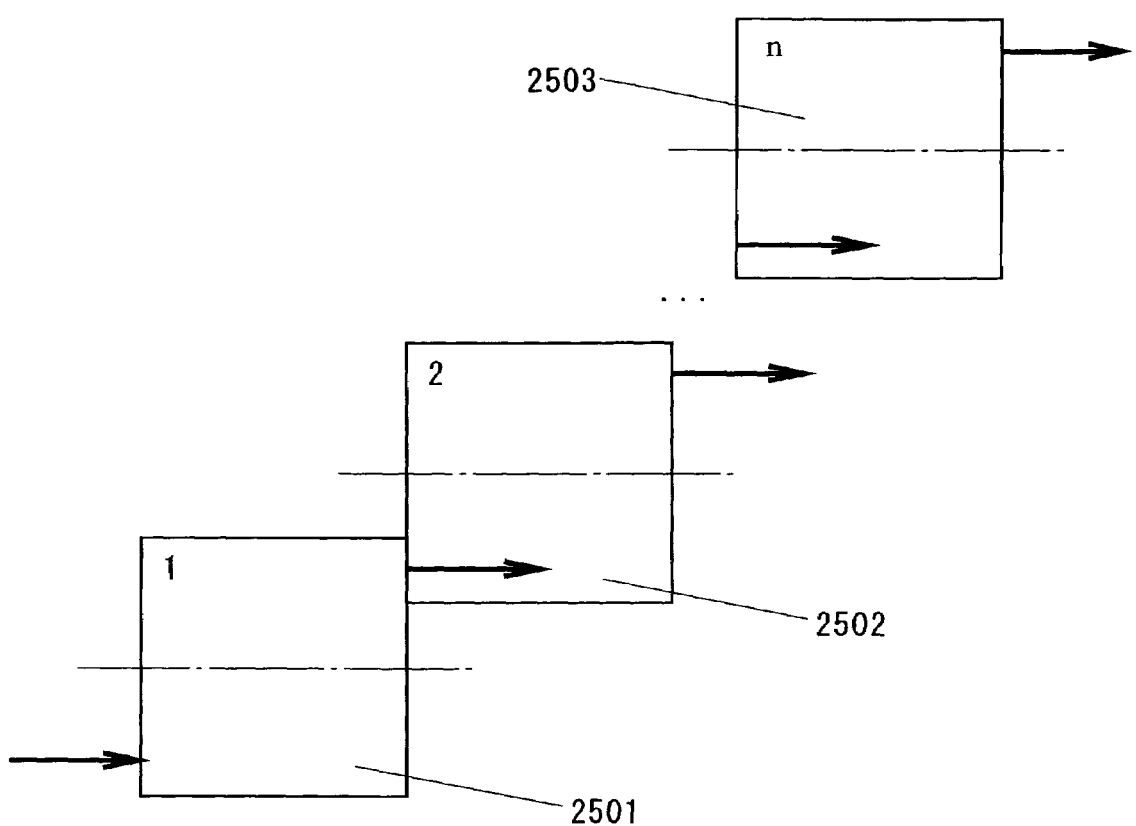
FIG. 25 is a top view showing a relevant part of an optical device for increasing the distance between signal beams according to a second modification of the thirteenth embodiment of the present invention.

FIG. 25 is a top view showing a relevant part of an optical device for increasing the distance between signal beams according to a second modification of the thirteenth embodiment of the present invention. As shown in FIG. 25, the optical device according to the second modification of the thirteenth embodiment is provided with a plurality of graded index slab waveguides disposed so that the incident positions are shifted from one another in the direction of the length. The graded index slab waveguides are each the same as the graded index slab waveguide described in the case of the cross sheet bus according to the fourth embodiment.

In the optical device according to the second modification of the thirteenth embodiment, the graded index slab waveguides are connected in multiple stages in the direction of the length. That is, the exiting beam from a graded index slab waveguide 2501 of the first stage is connected as the incident beam of a graded index slab waveguide 2502 of the second stage, and the exiting beam from the graded index slab waveguide 2502 of the second stage is successively connected as the incident beam of a graded index slab waveguide 2503 of the n-th stage. At this time, the optical device of the second modification of the thirteenth embodiment is arranged so that the positions of exit from the gradient index slab waveguides are always shifted in the same direction from the center in the direction of the width. By this arrangement, the exiting beam can be moved in the direction of the width.

While in all of the above-described optical devices, square graded index slab waveguides that are independent of each other are connected to thereby increase the separation width, the present invention is not limited thereto. For example, a graded index slab waveguide may be manufactured that has a condition where a plurality of sheet-form multi-mode waveguides is connected.

Fourteenth Embodiment

Figure 26:
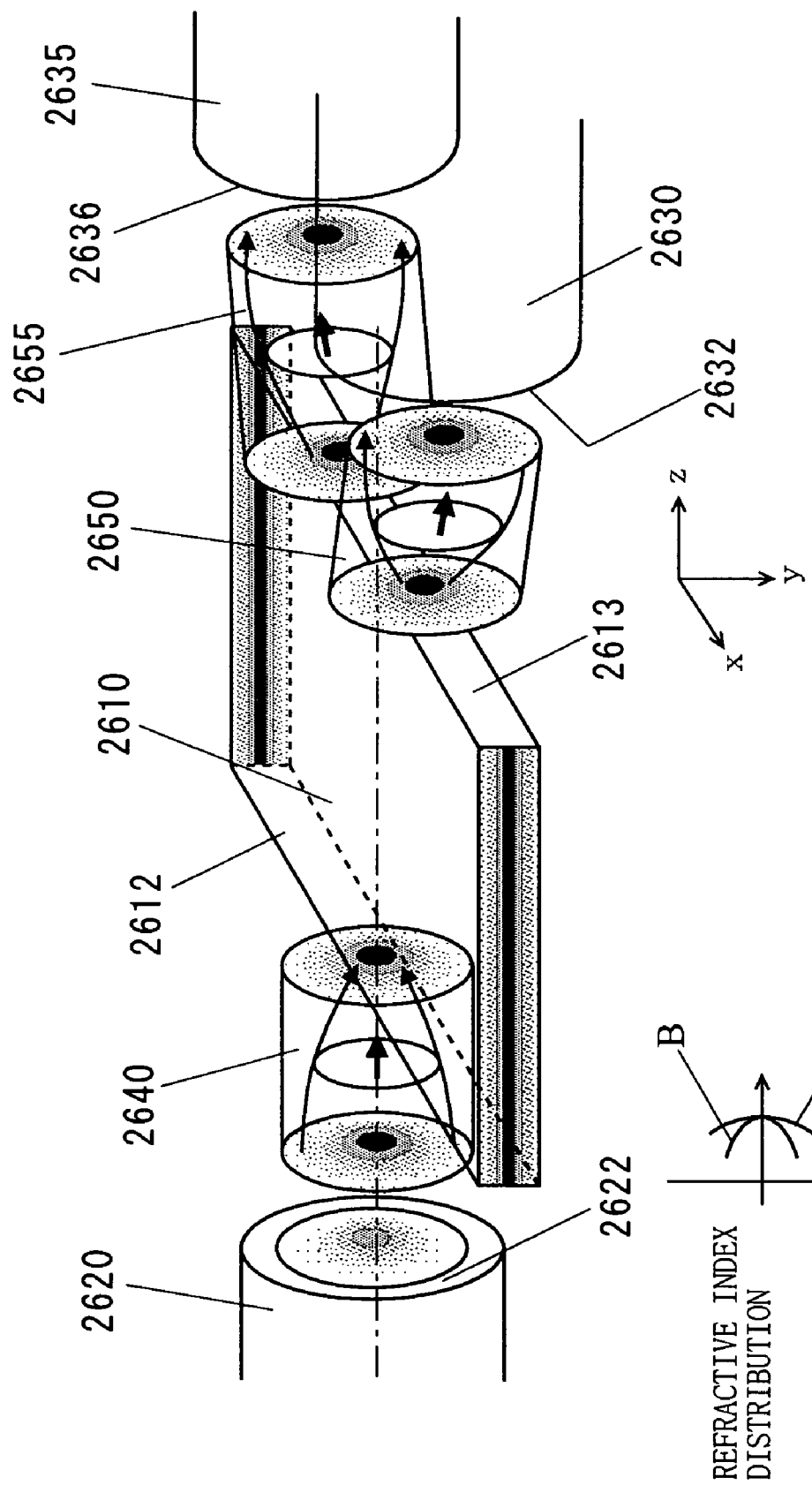
FIG. 26 is a perspective view showing the general outline of the structure of an optical device having a beam converter according to a fourteenth embodiment of the present invention.

FIG. 26 is a perspective view showing the general outline of the structure of an optical device having a beam converter according to a fourteenth embodiment of the present invention. The optical device according to the fourteenth embodiment is provided with a graded index slab waveguide 2610, an incident side optical fiber 2620, a first exit side optical fiber 2630, a second exit side optical fiber 2635, and an incident side beam converter 2640, a first exit side beam converter 2650 and a second exiting beam converter 2655.

The graded index slab waveguide 2610 has the same structure as the graded index slab waveguide 101 constituting the optical device of the first embodiment, and has a predetermined slab length L performing the splitting into two beams. The incident side optical fiber 2620, the first exit side optical fiber 2630 and the second exit side optical fiber 2635 are all GI (graded index) multi-mode optical fibers. The incident side optical fiber 2620, the first exit side optical fiber 2630 and the second exit side optical fiber 2635 all have a refractive index distribution such that the highest refractive index is provided at the center and the refractive index decreases toward the periphery substantially along a quadratic function.

The incident side beam converter 2640 is disposed between the incident surface 2612 of the graded index slab waveguide 2610 and the exit side end surface 2622 of the incident side optical fiber 2620. The incident side beam converter 2640 is substantially cylindrical, and has a refractive index distribution such that the refractive index is the maximum at the central axis of the cylinder and decreases toward the periphery. The refractive index distribution of the incident side beam converter 2640 is such that the refractive index is the maximum at the center and changes toward the periphery substantially along the quadratic function.

The incident side beam converter 2640 has a refractive index distribution such that the change gradually increases from the side of the incident side optical fiber 2620 toward the side of the graded index slab waveguide 2610. The graph in FIG. 26 shows the refractive index distribution of the incident side optical fiber 2620 side end surface 2641 of the incident side beam converter 2640 which refractive index is designated A and the refractive index distribution of the graded index slab waveguide 2610 side end surface 2642 of the incident side beam converter 2640 which refractive index distribution is designated B. As is apparent from the graph, the refractive index distribution A changes more gently than the refractive index distribution B.

The first exit side beam converter 2650 is disposed between the exit surface 2613 of the graded index slab waveguide 2610 and the incident side end surface of the first exit side optical fiber 2630. The second exit side beam converter 2655 is disposed between the exit surface 2613 of the graded index slab waveguide 2610 and the incident side end surface of the second exit side optical fiber 2635. The first exit side beam converter 2650 and the second exit side beam converter 2655 are substantially cylindrical, and have a refractive index distribution such that the refractive index is the maximum at the central axis of the cylinder and decreases toward the periphery. The refractive index distributions of the first exit side beam converter 2650 and the second exit side beam converter 2655 are such that the refractive index is the maximum at the center and changes toward the periphery substantially along the quadratic function.

The first exit side beam converter 2650 has a refractive index distribution such that the change gradually increases from the side of the first exit side optical fiber 2630 toward the side of the graded index slab waveguide 2610. The second exit side beam converter 2655 has a refractive index distribution such that the change gradually increases from the side of the second exit side optical fiber 2631 toward the side of the graded index slab waveguide 2610. The manner of the change is a reversed one of the distribution of the above-described incident side beam converter 2640.

By the above structure, the multi-mode signal beam having exited from the incident side optical fiber 2620 is incident on the incident side beam converter 2640 and transmitted in the direction of the length. The incident side beam converter 2640 converts the mode field (beam spot diameter) of the incident side optical fiber 2620 into a small mode field (beam spot diameter) according to a change, in the direction of the length, of the refractive index distribution. The signal beam whose mode field has been converted into a small one is incident, as an incident beam, on the central position in the direction of the width on the incident surface of the graded index slab waveguide 2610. As described in the first embodiment, the graded index slab waveguide 2610 transmits the incident beam in the direction of the length, forms two images in the vicinity of the exit surface according to the self-imaging principle, and emits these images as exiting beams.

The emitted two signal beams are incident on the first exit side beam converter 2650 and the second exit side beam converter 2655, respectively, and transmitted in the direction of the length. The first exit side beam converter 2650 converts the mode field (beam spot diameter) of the graded index slab waveguide 2610 into a large mode field (beam spot diameter) according to a change, in the direction of the length, of the refractive index distribution. The second exit side beam converter 2655 converts the mode field (beam spot diameter) of the graded index slab waveguide 2610 into a large mode field (beam spot diameter) according to a change, in the direction of the length, of the refractive index distribution. The signal beams whose mode fields have been converted into large ones are incident on the first exit side optical fiber 2630 and the second exit side optical fiber 2635, respectively, and then, transmitted.

As described above, since the optical device according to the fourteenth embodiment is provided with the beam converters that convert the mode fields of the signal beams that are incident and exit on and from the graded index slab waveguide, an incident beam having a small mode field can be made incident on the graded index slab waveguide 2610. Consequently, according to the self-imaging principle, the mode field of the exiting beam can be made small.

Conventionally, when an optical fiber where the proportion of the core diameter (mode field, beam spot diameter) is large with respect to the width of the graded index slab waveguide like a POF is connected, according to the self-imaging principle, a beam with a large beam spot diameter having the same profile as the incident beam is outputted on the exit side, so that it is difficult to increase the distance between the exiting beams. Consequently, the number of splits of the signal beam cannot be increased. On the other hand, in the optical device according to the fourteenth embodiment, since the mode field of the exiting beam can be reduced, the number of splits can be easily increased.

When the mode field of the incidence is reduced, the distance between a plurality of exiting beams formed by the splitting is also reduced. For this, an optical fiber with a large core diameter can be connected to the output side by angling the output side beam converter so that the output position can be parallelly moved or making it S-shaped by gently curving it. While in the above-described example, the graded index slab waveguide 2610 is for use in the optical device that splits one beam into two beams according to the first embodiment, it is to be noted that the straight sheet bus, the cross sheet bus, the star coupler, the optical switch and the like described in the other embodiments are applicable.

In this case, the numbers of incident and exit side optical fibers and incident and exit side beam converters are adjusted according to the number of incident and exiting signal beams.

FIG. 27 is a perspective view showing the general outline of the structure of an optical device according to a first modification of the fourteenth embodiment of the present invention. Since the optical device according to the first modification of the fourth embodiment has substantially the same structure as the optical device of the fourteenth embodiment, only different parts will be described. Moreover, the same reference numerals indicate the same elements.

The optical device according to the first modification of the fourteenth embodiment is provided with a graded index slab waveguide 2710 where N=5 in the optical device that splits one beam into a number, N, of beams described in the second embodiment. The optical device according to the first modification of the fourteenth embodiment is provided with an incident side beam converter 2740 comprising a graded index waveguide having a refractive index distribution such that the highest refractive index is provided at the center in the direction of the thickness and the refractive index decreases substantially along a quadratic function only in the direction of the thickness. Moreover, the optical device according to the first modification of the fourteenth embodiment is provided with an exit side beam converter 2750 comprising five graded index waveguides each having a refractive index distribution such that the highest refractive index is provided at the center in the direction of the thickness and the refractive index decreases substantially along a quadratic function only in the direction of the thickness.

The graded index waveguide of the incident side beam converter 2720 has a configuration such that the size in the direction of the width decreases from the side of the incident optical fiber 2620 toward the side of the graded index slab waveguide 2710. The graded index waveguides of the exit side beam converter 2730 are graded index slab waveguides having a configuration such that the size in the direction of the width decreases from the side of the exit side optical fibers 2630 to side of the graded index slab waveguide 2710. As described above, even when the graded index waveguides whose sizes in the direction of the width change are used as the beam converters on the incident and exit sides, the mode field can be converted.

Figures 28A, 28B, 28C:
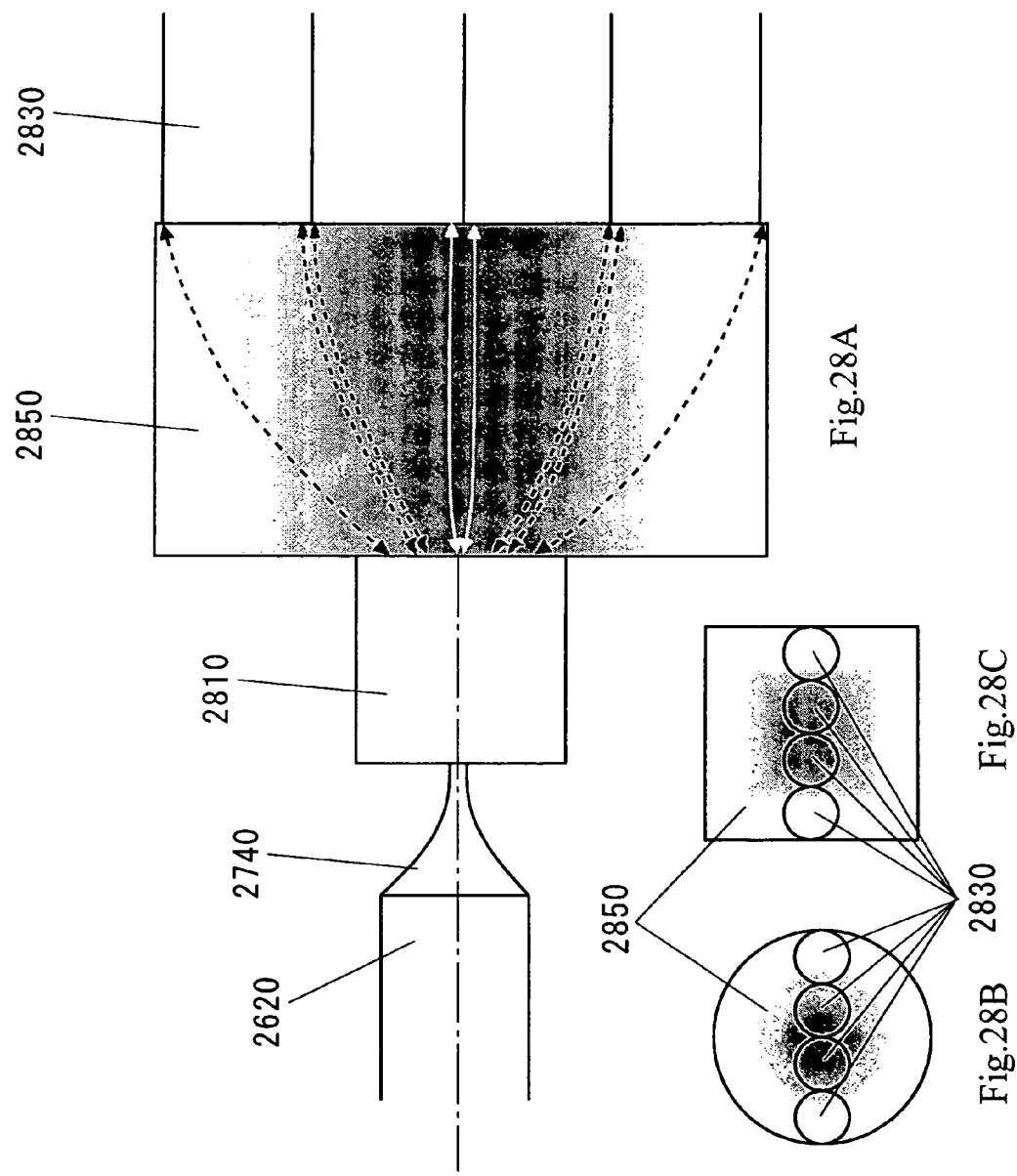
FIG. 28A is a top view showing the general outline of the structure of an optical device according to a second modification of the fourteenth embodiment of the present invention.
FIG. 28B is a cross-sectional view showing an example of an exit side beam converter of the optical device according to the second modification of the fourteenth embodiment of the present invention.
FIG. 28C is a cross-sectional view showing another example of the exit side beam converter of the optical device according to the second modification of the fourteenth embodiment of the present invention.

FIG. 28A is a top view showing the general outline of the structure of an optical device according to a second modification of the fourteenth embodiment of the present invention. FIG. 28B is a cross-sectional view showing an example of an exit side beam converter 2850 of the optical device according to the second modification of the fourteenth embodiment of the present invention. FIG. 28C is a cross-sectional view showing another example of the exit side beam converter 2850 of the optical device according to the second modification of the fourteenth embodiment of the present invention. Since the optical device according to the second modification of the fourteenth embodiment has substantially the same structure as the optical device of the fourteenth embodiment, only different parts will be described. Moreover, the same reference numerals indicate the same elements.

The optical device according to the second modification of the fourteenth embodiment is provided with a graded index slab waveguide 2810 where N=4 in the optical device that splits one beam into a number, N, of beams described in the second embodiment. The optical device according to the second modification of the fourteenth embodiment is provided with the incident side beam converter 2740 described in the first modification. The optical device according to the second modification of the fourteenth embodiment is provided with a discrete exit side beam converter 2850 that covers all the output side optical fibers 2830. The exit side beam converter 2850 is an optical transmission line having a refractive index distribution such that the highest refractive index is provided at the center corresponding to the center, in the direction of the width, of the graded index slab waveguide 2810 and the refractive index decreases toward the periphery within a plane vertical to the direction of the length. The exit side beam converter 2850 is either circular or rectangular in cross section. FIG. 28B shows the exit side beam converter 2850 which is circular in cross section, and FIG. 28C shows the exit side beam converter 2850 which is rectangular in cross section. In each cross-sectional view, the exit side optical fibers 2830 are all disposed within the cross section. As described above, even when a discrete optical transmission line having a refractive index distribution is used as the beam converter, the mode field can be converted.

It is unnecessary that the structure of the beam converter be the same between on the incident and exit sides like the second modification, but structures may be appropriately combined. For example, it may be performed to apply the structure described in the second modification for the incident side beam converter and apply the structure described in the first modification for the exit side beam converter.

Figure 29:
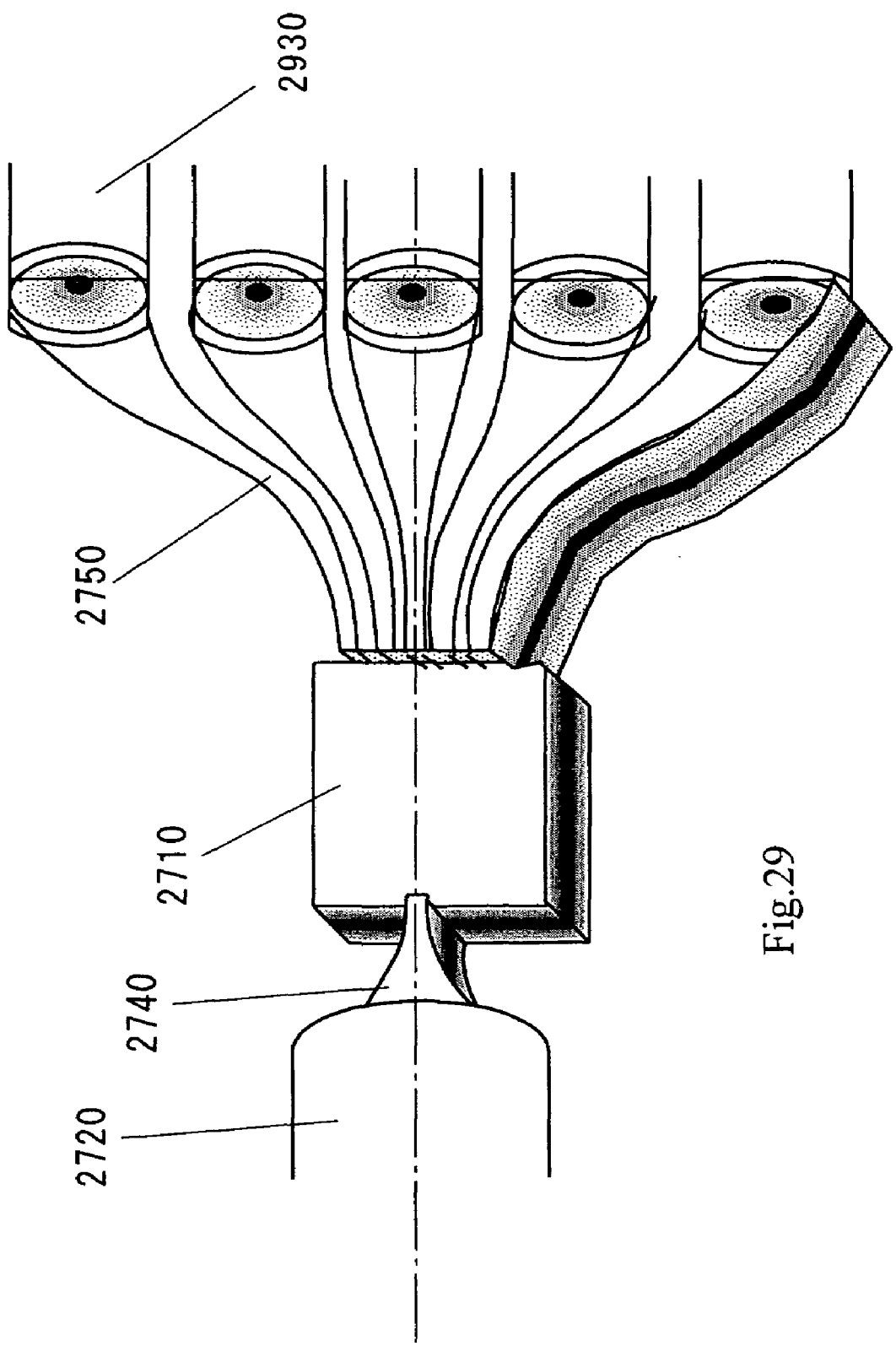
FIG. 29 is a perspective view showing the general outline of the structure of an optical device according to a third modification of the fourteenth embodiment of the present invention.

FIG. 29 is a perspective view showing the general outline of the structure of an optical device according to a third modification of the fourteenth embodiment of the present invention. Since the optical device according to the third modification of the fourteenth embodiment has substantially the same structure as the optical device according to the first modification of the fourteenth embodiment, only different parts will be described. Moreover, the same reference numerals indicate the same elements.

In the optical device according to the third modification of the fourteenth embodiment of the present invention, part of the clad of each exit side optical fiber 2930 is cut away in the direction of the width to thereby reduce the distance between the adjoining optical fibers. As described away, by cutting away part of the clad, the amount of deformation, in the direction of the width, of the exit side beam converter 2750 can be reduced.

(Embodiments Associated with Manufacturing Methods)

Hereinafter, methods of manufacturing the sheet-form graded index slab waveguides described in the embodiments will be described. Examples of the method of manufacturing the graded index slab waveguides include the following two:

A first manufacturing method is a method in which the graded index slab waveguides are manufactured by laminating ultra-thin films having different refractive indices according to the refractive index change in the direction of the thickness. Concrete examples of the first manufacturing method include a method adopting an epoxy, an acrylic, a polycarbonate or a polyimide resin. Since the refractive index is changed by adjusting the amount of addition of fluorine, heavy hydrogen, sulfur or the like to these resins, ultra-thin films having various refractive indices can be manufactured.

A second manufacturing method is a method in which the composition, in the direction of the thickness, of the optical transmission line is changed so as to be suited for the refractive index distribution in the direction of the thickness.

Concrete examples of the second manufacturing method include the methods shown below.

(1) A method in which ions are implanted into a sheet-form glass material and the distribution of the implanted ions is controlled inside the glass to thereby form a refractive index distribution.

(2) A method in which when a sheet-form polysilane is cured, the oxygen concentration is controlled and a distribution is provided to the oxygen concentration inside the polysilane to thereby form a refractive index distribution.

(3) A method in which when a sheet-form perfluorinated resin is cured, the distributions of high-refractive-index low molecules and low-refractive-index monomers are controlled inside the resin to thereby provide a refractive index distribution.

The method (3) in which a refractive index distribution is formed inside the perfluorinated resin is applicable to other resins.

Hereinafter, the method (2) of the second manufacturing method in which the graded index slab waveguides are formed by use of polysilane will be described in detail. Polysilane is cured by ultraviolet exposure or heat treatment. At this time, part of the polysilane structure is oxidized into a siloxane structure having a lower refractive index when cured. Therefore, the refractive index of the cured polysilane can be controlled by changing the ratio between the part cured while remaining the polysilane structure without being oxidized and the part oxidized into a siloxiane structure when cured. For example, when cured by ultraviolet irradiation under an environment where oxygen is included in the atmosphere, polysilane is cured with the oxygen concentration decreasing from the surface irradiated with ultraviolet rays toward the center, so that a refractive index distribution structure such that the refractive index decreases from the inside where the oxygen concentration is low toward the surface where the oxygen concentration is high can be formed. As described above, by equally irradiating a sheet-form polysilane with ultraviolet rays from above and below, a refractive index distribution centrosymmetrical in the direction of the thickness can be obtained.

Figure 30A:
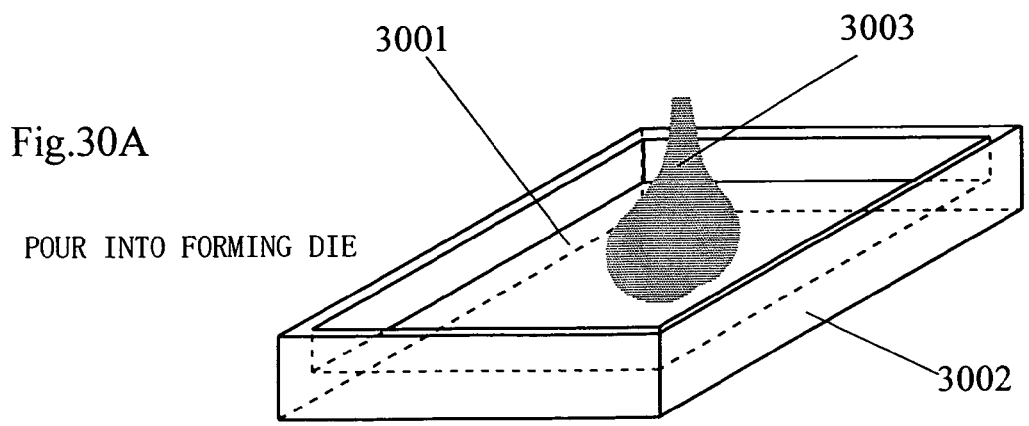
FIGS. 30 are explanatory views showing another example of the method of manufacturing the graded index slab waveguide.

Hereinafter, the method of manufacturing of the graded index slab waveguide of the optical device will be described. FIG. 30 is an explanatory view showing an example of the method of manufacturing the graded index slab waveguide. In FIG. 30, first, a transparent forming die 3002 is prepared that has a concave portion 3001 having the same depth as the slab thickness D of the graded index slab waveguide 3010 described in the first embodiment and corresponding to the size of the plurality of graded index slab waveguides 3010 (first step). The transparent forming die 3002 is formed of a material that is transparent with respect to ultraviolet rays. Then, a polysilane 3003 is poured into the concave portion 3001 of the transparent forming die 3002 so as substantially not to overflow out of the concave portion 3001 (second step). This step is shown in FIG. 30A.

Figure 30B:
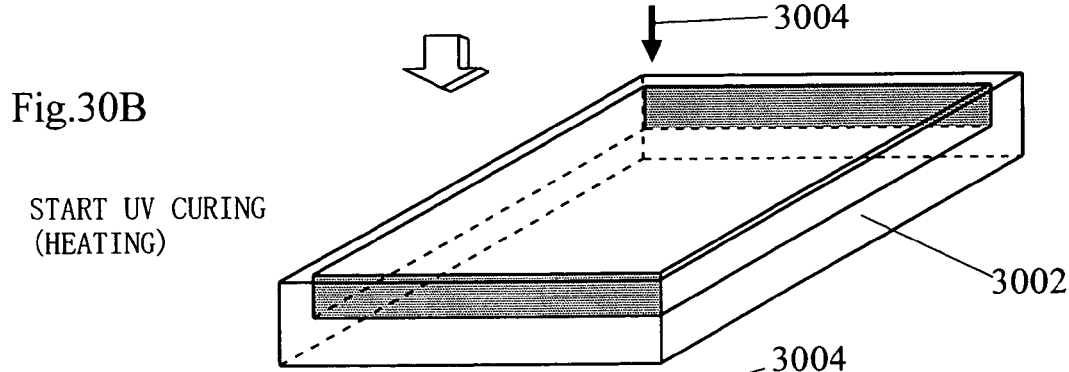
Figure 30C:
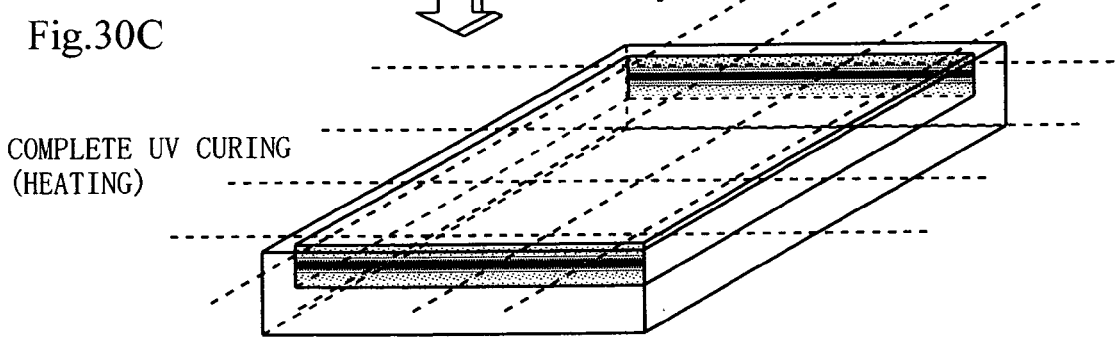
Figure 30D:
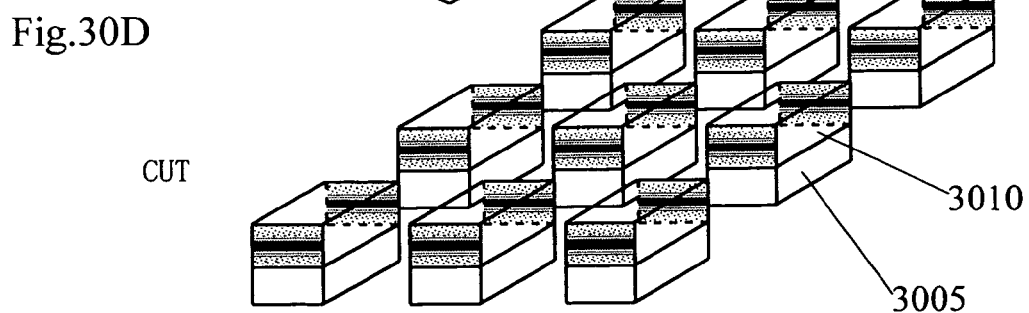

Then, the polysilane 3003 accumulated in the concave portion 3001 is irradiated with ultraviolet rays 3004 from above and below in the direction of the thickness and heated at the same time. This step is shown in FIG. 30B. Then, the polysilane 3003 is cured (third step). This step is shown in FIG. 30B.

After the polysilane 3003 is cured, cutting into a desired shape of the graded index slab waveguide 3010 is performed (fourth step). In this manner, a plurality of graded index slab waveguides can be manufactured. The transparent forming die 3002 after the cutting can be used as a substrate 3005 of the graded index slab waveguide 3010 as it is. Needless to say, the substrate 3005 may be removed.

The side walls of the concave portion 3002 which are cut lastly are not necessarily vertical but may be tapered. Moreover, the sections of the graded index slab waveguide 3000 may be optically polished. Moreover, when a sheet-form polysilane having a predetermined thickness can be formed, the sidewalls are not always necessary.

FIG. 31 is an explanatory view showing another example of the method of manufacturing the graded index slab waveguide. In FIG. 31, first, a transparent forming die 3102 is prepared that has a concave portion 3001 having the same depth as the slab thickness D of the graded index slab waveguide 3110 described in the first embodiment and corresponding to the size of a single graded index slab waveguides 3110 (first step). The transparent forming die 3102 is formed of a material that is transparent with respect to ultraviolet rays. Then, a polysilane 3103 is poured into the concave portion 3101 of the transparent forming die 3102 so as substantially not to overflow out of the concave portion 3101 (second step). This step is shown in FIG. 31A.

Figure 31A:
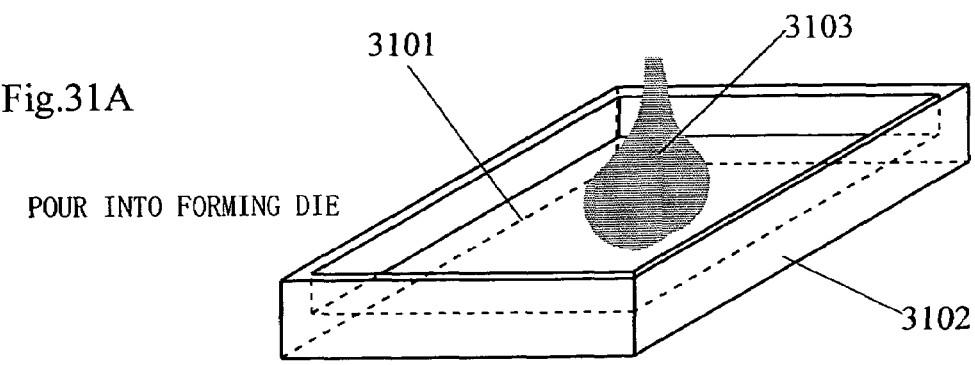
FIGS. 31 are explanatory views showing another example of the method of manufacturing the graded index slab waveguide.
Figure 31B:
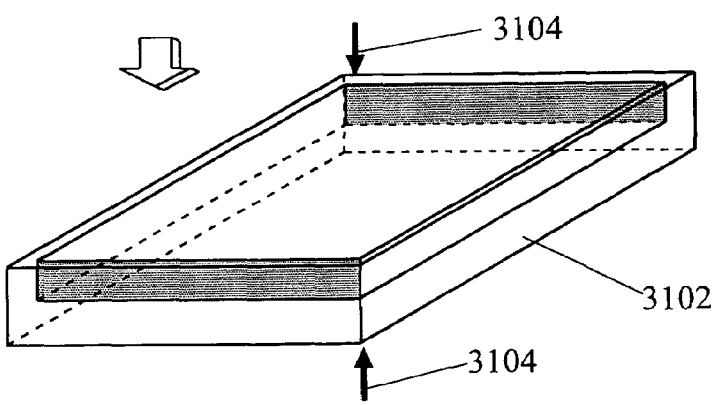
Figure 31C:
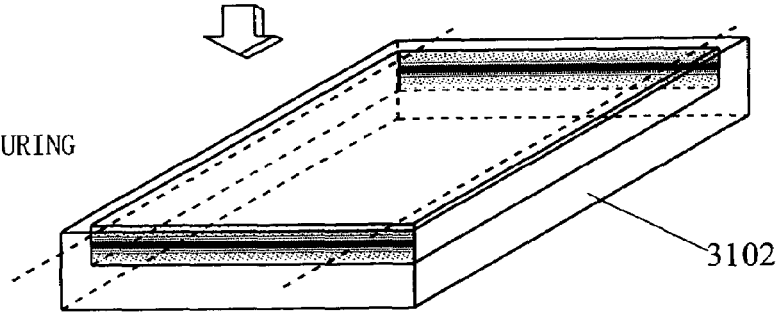
Figure 31D:
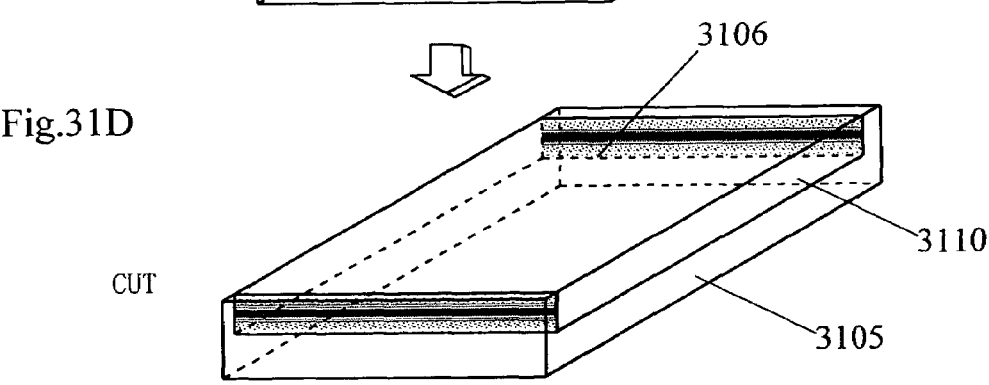

Then, the polysilane 3103 accumulated in the concave portion 3101 is irradiated with ultraviolet rays 3004 from above and below in the direction of the thickness and is heated at the same time. This step is shown in FIG. 31B. Then, the polysilane 3103 is cured (third step). This step is shown in FIG. 31B.

After the polysilane 3103 is cured, parts corresponding to the incident and exit end surfaces are cut into the shape of the graded index slab waveguide 3110 (fourth step). In this manner, the graded index slab waveguide can be manufactured. The transparent forming die 3102 after the cutting can be used as a substrate 3105 of the graded index slab waveguide 3110 as it is. Needless to say, the substrate 3105 may be removed.

While the incident and exit end surfaces of the concave portion which are cut and deleted lastly are not necessarily vertical but may be tapered, it is desirable that the side surfaces 3106 in the direction of the width be vertical surfaces of not more than 10°. Moreover, while the incident and exit surfaces of the concave portion may be formed only in the vicinity of the incident and exit positions as well as being cut and deleted or the sections may be optically polished, when the thickness of the transparent forming die 3102 in the direction of the beam incident and exit surfaces is not more than 10 µm, the transparent forming die 3102 itself may be cut or polished into the incident and exit surfaces.

As described above, by accumulating the resin poured into the concave portion provided in the transparent forming die, the film thickness can be made arbitrarily thick even in the case of a resin with a low viscosity. Therefore, an optical transmission line in which an optical fiber with a large core diameter can be used on the incident and exit sides can be handled.

FIG. 32 is an explanatory view explaining the mechanism of the refractive index distribution using polysilane. As mentioned previously, polysilane is changed into a siloxane structure (FIG. 32E) having a lower refractive index by the oxidization, at the time of curing, that occurs due to ultraviolet exposure or heat treatment. For this reason, a refractive index distribution can be provided by controlling the ratio between the polysilane structure (FIG. 32D) part that is not oxidized and the siloxiane structure part that occurs due to oxidization. As is apparent from the figures, polysilane is disposed in an oxygen atmosphere (FIG. 32A) and either ultraviolet exposure or heating is performed (FIG. 32B), whereby a mold is obtained in which the ratio of the polysilane structure is high in the central portion where the oxygen concentration is low and the ratio of the siloxane structure is high in the surface part where the oxygen concentration is high (FIG. 32C).

When the film thickness of the polysilane is not more than 50 μm, the oxygen concentration decreases from the surface toward the inside in the polysilane due to the oxygen in the atmosphere. For this reason, a refractive index distribution is naturally formed such that the refractive index decreases from the inside where the oxygen concentration is low toward the surface where the oxygen concentration is high. Moreover, when the film thickness of the polysilane is not less than 50 μm, the refractive index distribution at the time of oxidization can be arbitrarily controlled by previously diffusing oxygen or an oxide into the polysilane before cured in a predetermined distribution in addition to the oxygen in the atmosphere.

Moreover, by oxidizing the polysilane symmetrically from both surfaces, a refractive index distribution symmetrical with respect to the center in the direction of the thickness can be formed. However, when ultraviolet rays are applied from the substrate side in the case of the curing by ultraviolet exposure, a material that is transparent with respect to ultraviolet rays, for example, quartz or glass such as Pyrex is used, and when ultraviolet rays are applied from the substrate side, a material that is opaque with respect to ultraviolet rays such as silicon or resin may be used in addition to glass.

Figure 33:
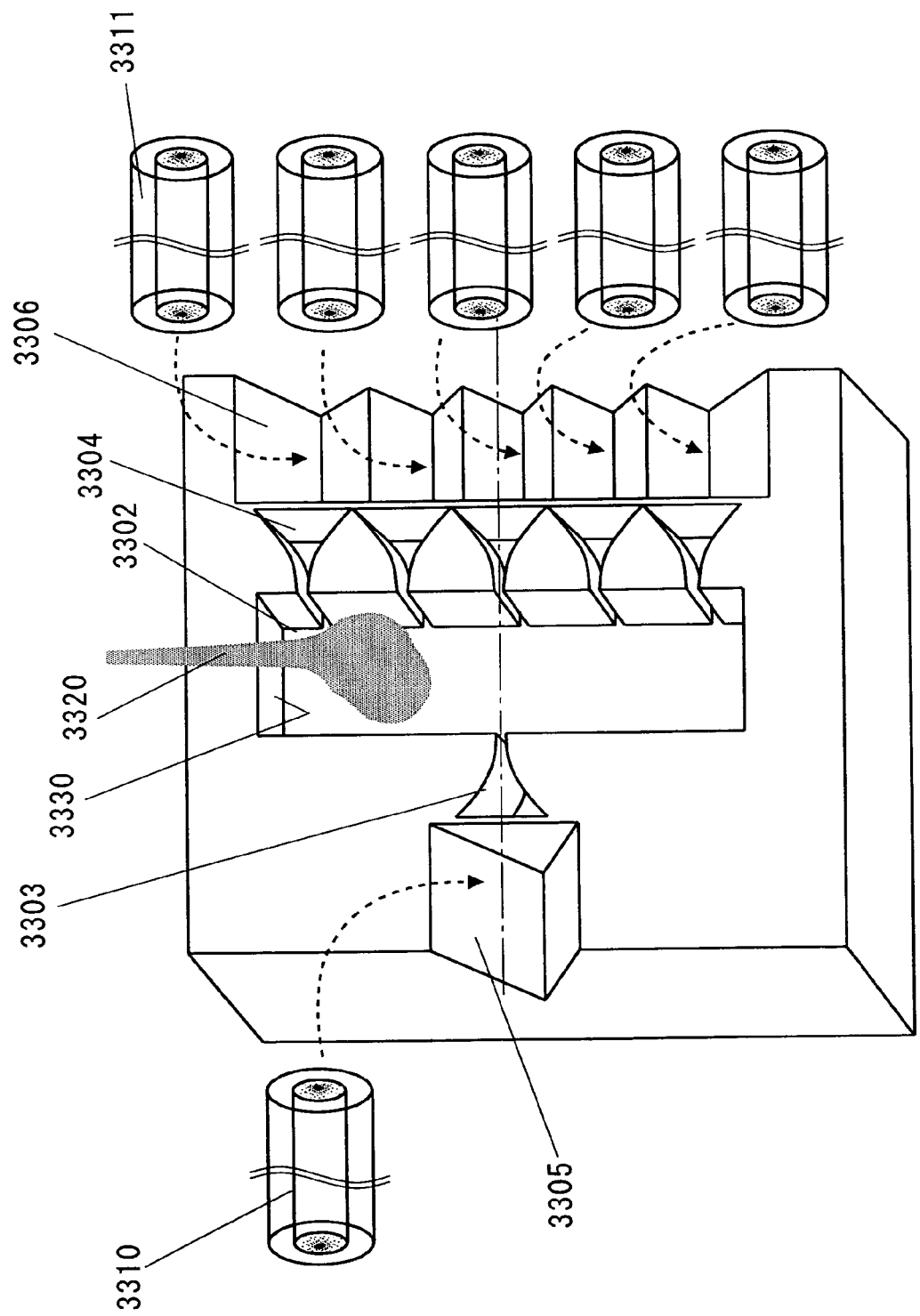
FIG. 33 is an explanatory view explaining a method of manufacturing the optical device according to the first modification of the fourteenth embodiment of the present invention.

FIG. 33 is an explanatory view explaining a method of manufacturing the optical device according to the first modification of the fourteenth embodiment of the present invention. Hereinafter, a method of manufacturing the optical device will be described with the first modification according to the fourteenth embodiment of the present invention as an example.

In a transparent forming die 3301, a concave portion 3302 corresponding to the graded index multi-mode waveguide, a concave portion 3303 corresponding to the incident side beam converter and a concave portion 3304 corresponding to the exit side beam converter are previously formed. Moreover, in the transparent forming die 3301, a V-groove 3305 for positioning an incident side optical fiber 3310 and a V-groove 3306 for positioning an exit side optical fiber 3311 are formed. A polysilane 3320 is poured into the concave portions of the transparent forming die 3301. After poured, the polysilane 3320 accumulated in the concave portions is irradiated with ultraviolet rays from above and below and heated at the same time to thereby cure the polysilane 3301. Lastly, optical fibers are disposed in the V-groove 3305 and the V-groove 3306 to manufacture the optical device.

However, it is desirable that the side walls 3330 that determine the direction of the width of the concave portion 3302 be vertical surfaces of not more than 10°. As described above, by accumulating the resin poured into the concave portions provided in the transparent forming die, the film thickness can be made arbitrarily thick even in the case of a resin with a low viscosity. Therefore, even a case where an optical fiber with a large core diameter is used for optical transmission lines on the incident and exit sides can be handled.

While the transparent forming die is used as part of the optical device as the substrate of the graded index slab waveguide in the above example, the cured polysilane may be released from the forming die. By releasing the polysilane from the forming die, the transparent forming die can be reused, so that the manufacturing cost of the transparent forming die can be reduced.

Figure 34:
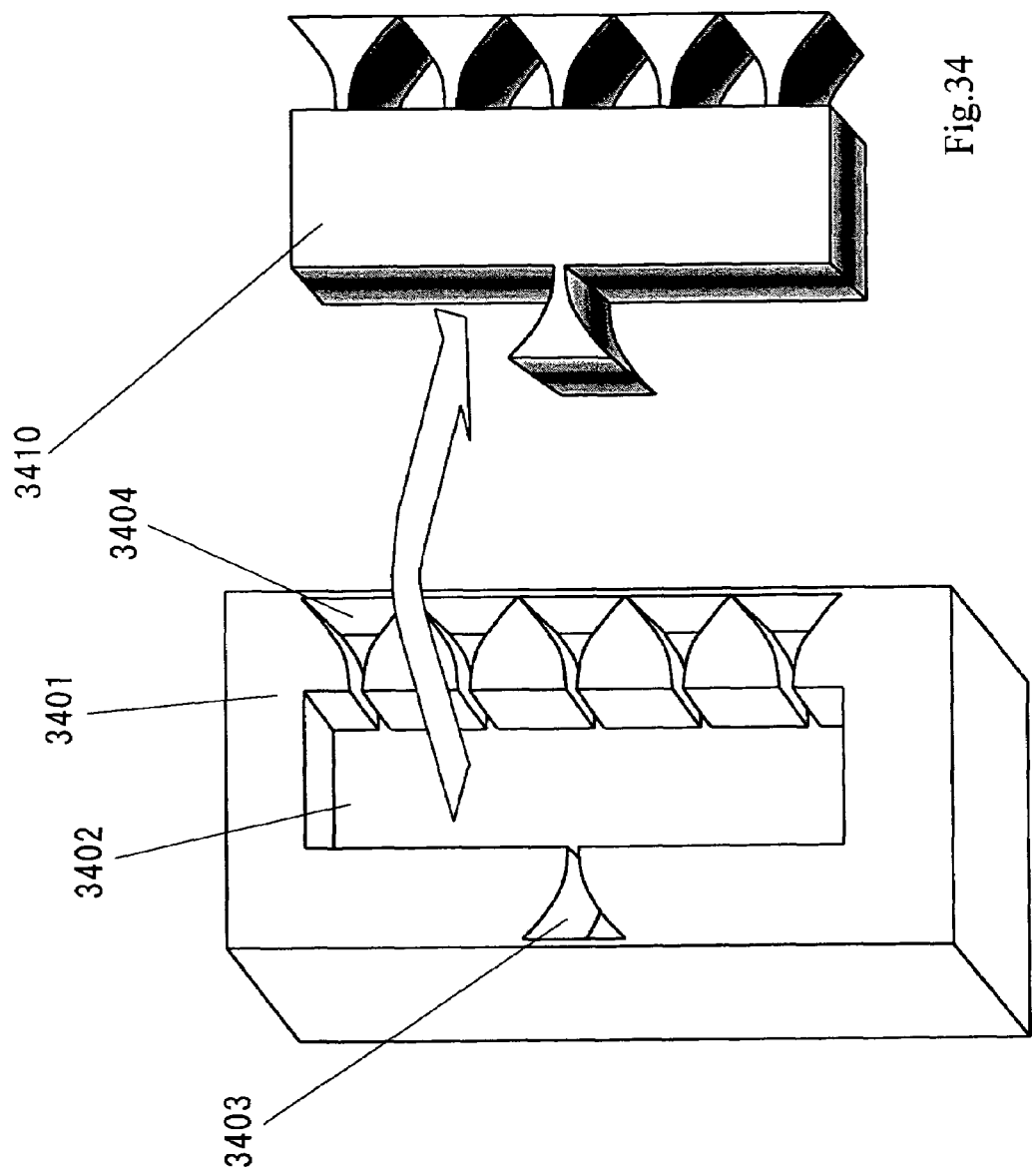
FIG. 34 is an explanatory view explaining another example of the method of manufacturing the optical device according to the first modification of the fourteenth embodiment of the present invention.
Figure 35:
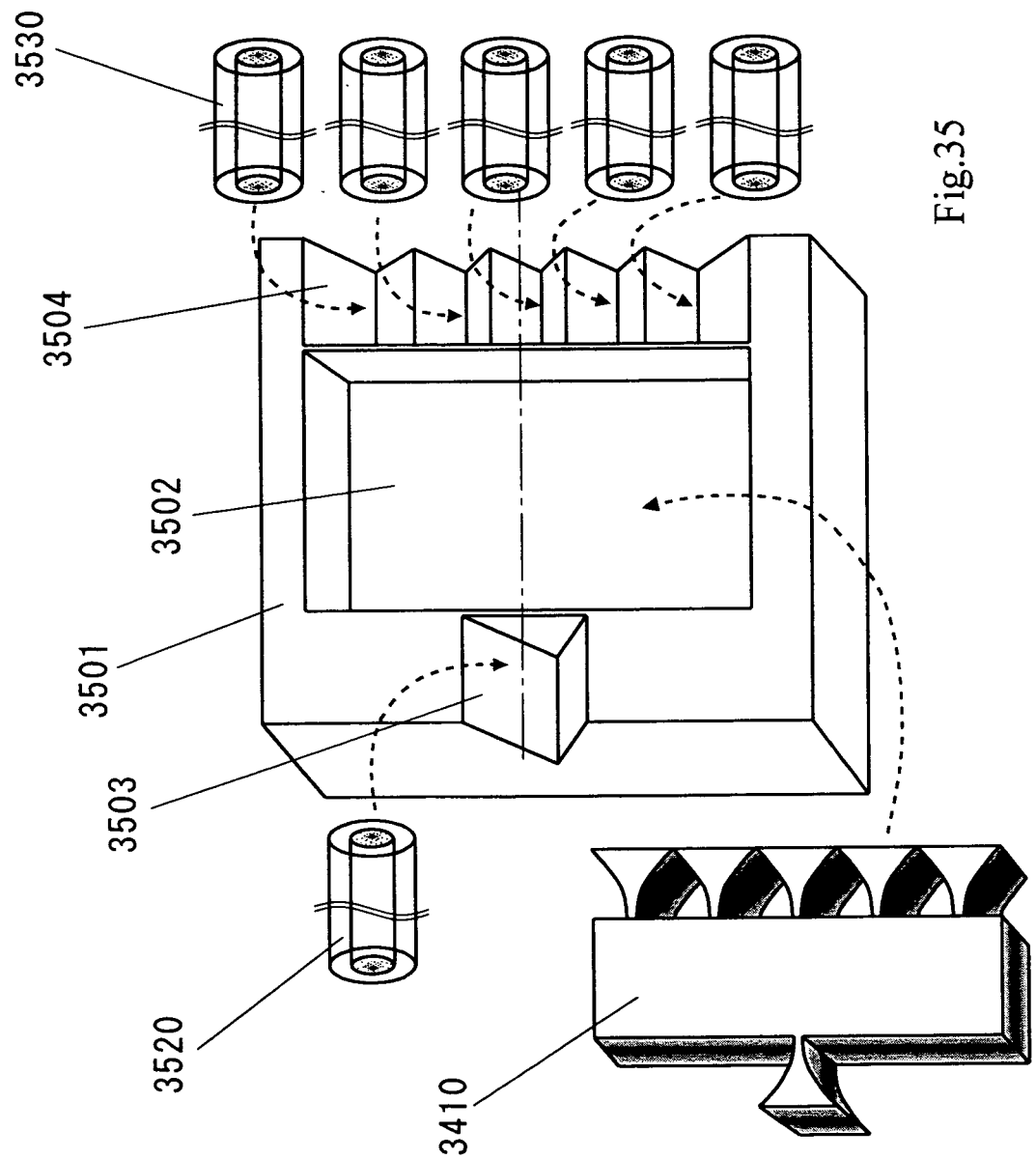
FIG. 35 is an explanatory view explaining another example of the method of manufacturing the optical device according to the first modification of the fourteenth embodiment of the present invention.

FIGS. 34 and 35 are explanatory views explaining another example of the method of manufacturing the optical device according to the first modification of the fourteenth embodiment of the present invention. In FIG. 34, in a transparent forming die 3401, a concave portion 3402 corresponding to the graded in dexmulti-mode waveguide, a concave portion 3403 corresponding to the incident side beam converter and a concave portion 3404 corresponding to the exit side beam converter are previously formed. With this transparent forming die 3401, a graded index slab waveguide 3410 in which incident and exit side beam converters are integrally formed is formed by a previously-described method such as ultraviolet exposure. The graded index slab waveguide 3410 is released from the transparent forming die 3401 after curing.

Then, in FIG. 35, an assembly die 3501 is prepared in which a concave portion 3502 corresponding to the graded index slab waveguide 3410, a V-groove 3503 for positioning an incident side optical fiber 3520 and a V-groove 3504 for positioning exit side optical fibers 3530 are previously formed. By disposing the graded index slab waveguide 3410, the incident side optical fiber 3520 and the exit side optical fiber 3530 in the assembly die 3501, the optical device can be manufactured.

According to this manufacturing method, since the transparent forming die used for the forming of the graded index slab waveguide 3401 can be reused by releasing the mold from the die, cost can be reduced. Moreover, since the positioning adjustment of the incident and exit side beam converters is unnecessary, the productivity at the time of manufacturing can be improved. Moreover, since the assembly die 3501 does not require ultraviolet exposure in the manufacturing process, the limitation on the material is small, so that a low-priced die material can be selected. Moreover, since the use of the assembly die 3501 facilitates the position adjustment of the incident and exit side optical fibers, the productivity at the time of manufacturing can be improved.

While in the exit side beam converters of FIGS. 34 and 35, the optical axes of the exit side optical fiber side and the GI multi-mode slab waveguide side coincide with each other, the present invention is not limited thereto. As described in the first modification of the fourteenth embodiment, by setting the distances between the exit side beam converters so as to gradually increase from the graded index slab waveguide toward the exit side optical fibers, the configuration of the graded index slab waveguide can be reduced.

It is to be noted that the above-described manufacturing method is applicable not only to optical devices that split one beam into a number, N, of beams but also to optical devices such as the straight sheet bus, the cross sheet bus, the optical switch and the star coupler described in the embodiments.

Fifteenth Embodiment

Figure 36A:
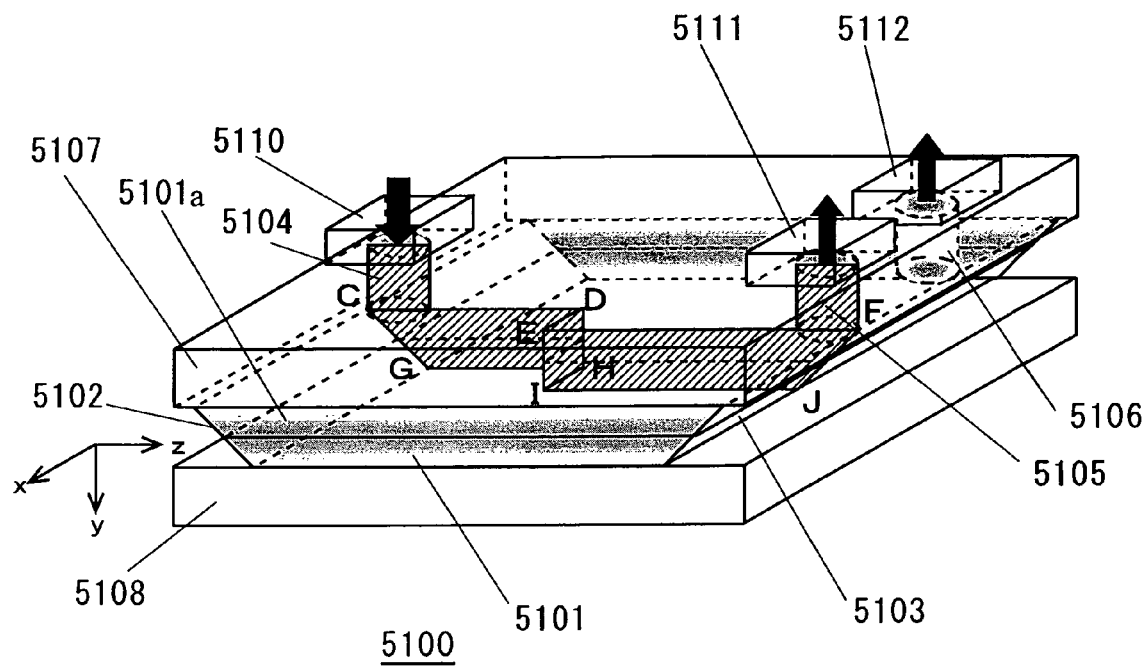
FIG. 36A is a perspective view of a multi-mode interference 1×2 splitter according to a fifteenth embodiment of the present invention.
Figure 36B:
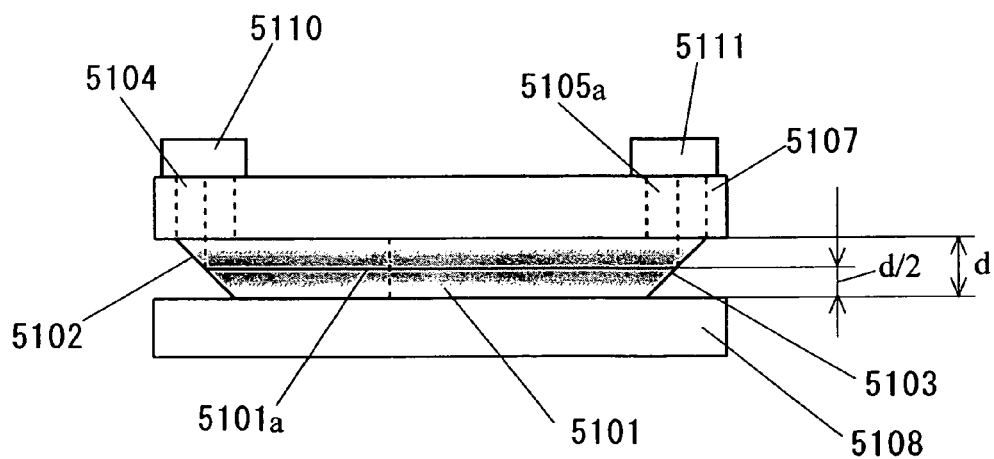
FIG. 36B is a front view of the multi-mode interference 1×2 splitter.

FIG. 36A is a perspective view of a multi-mode interference 1×2 splitter 5100 according to a fifteenth embodiment of the present invention. FIG. 36B is a front view of the multi-mode interference 1×2 splitter 5100. In FIG. 36A, the coordinate system is defined as shown in the figure, the downward direction of the figure is defined as they-direction, the rightward direction of the figure is defined as the z-direction, and the direction vertical to the y-direction and the z-direction is defined as the x-direction.

The multi-mode interference 1×2 splitter 5100 is provided with a sheet-form optical transmission line 5101, an incident portion 5104, an exit portion 5105, an exit portion 5106, an electric purpose substrate 5107 and an electric purpose substrate 5108. The sheet-form optical transmission line 5101 has a three-layer structure in which the electric purpose substrate 5107, the sheet-form optical transmission line 5101 and the electric purpose substrate 5108 are laminated in this order in the positive direction of the y-direction.

The sheet-form optical transmission line 5101 is a two-dimensional optical transmission line whose thickness in the y-direction (the direction of the thickness) is d and that is parallel to the z-x plane. The sheet-form optical transmission line 5101 traps the externally incident signal beam in the y-direction and can transmit it in the z-direction (transmission direction). The sheet-form optical transmission line 5101 has a reflecting surface 5102 and a reflecting surface 5103 at both ends in the z-direction.

The reflecting surface 5102 is formed at one end in the z-direction. The reflecting surface 5102 is a reflecting surface inclined 45° with respect to the z-x plane so that the signal beam incident in the positive direction of the y-direction is bent in the positive direction of the z-direction.

The reflecting surface 5103 is formed at the other end in the z-direction which end is opposite to the incident side. The reflecting surface 5103 is a reflecting surface inclined 45° with respect to the z-x plane so that the signal beam transmitted in the positive direction of the z-direction is bent in the negative direction of the y-direction.

The sheet-form optical transmission line 5101 has a refractive index distribution in the y-direction. In the sheet-form optical transmission line 5101, the highest refractive index $n_{max}$ is provided on a surface (hereinafter, referred to as a central portion 5101a) parallel to the zx direction and situated in a position of d/2 which is half the thickness in the y-direction. The sheet-form optical transmission line 5101 has a refractive index distribution such that with the central portion 5101a as the symmetry plane, the refractive index continuously decreases from the central portion 5101a toward the electric purpose substrate 5107 and the electric purpose substrate 5108.

Moreover, in the sheet-form optical transmission line 5101, the refractive index within a plane parallel to the z-x plane is always the same. That is, the sheet-form optical transmission line 5101 has a refractive index distribution only in the y-direction and has no refractive index distribution in the other directions.

The electric purpose substrate 5107 and the electric purpose substrate 5108 are flat. The electric purpose substrate 5107 includes a light emitting element 5110, a light receiving element 5111 and a light receiving element 5112.

The light emitting element 5110 is a vertical cavity surface emitting laser for generating a signal beam. The vertical cavity surface emitting laser is disposed so that the laser serving as the signal beam is oscillated in the positive direction of the y-direction.

Moreover, the light receiving element 5111 and the light receiving element 5112 are photodiodes that receive the signal beam. The photodiodes are disposed so as to receive the signal beam transmitted in the negative direction of the y-direction. On the electric purpose substrate 5107 and the electric purpose substrate 5108, non-illustrated other electric parts and optical parts necessary for driving the optical device are mounted.

The electric purpose substrate 5107 has a throughhole, which is a cylindrical through hole, in a position corresponding to the light emitting element 5110. Inside the through hole, the cylindrical incident portion 5104 is formed. Moreover, the electric purpose substrate 5107 has a through hole, which is a cylindrical through hole, in a position corresponding to the light receiving element 5111.

Inside the through hole, the cylindrical exit portion 5105 is formed. Likewise, the electric purpose substrate 5107 has a through hole, which is a cylindrical through hole, in a position corresponding to the light receiving element 5112. Inside the through hole, the cylindrical exit portion 5106 is formed.

The incident portion 5104 is made of the same material as the material of the sheet-form optical transmission line 5101. The incident portion 5104 has a refractive index distribution axisymmetrical with respect to the central axis of the cylinder, and has a refractive index distribution such that the highest refractive index $n_{max}$ is provided at the central axis of the cylinder and the refractive index does not continuously increase with distance from the central axis toward the periphery symmetrically with respect to the central axis. The length, in the y-direction, of the incident portion 5104 is determined so that the signal beam is incident on the sheet-form optical transmission line 5101 as a parallel beam.

The incident portion 5104, the exit portion 5105 and the exit portion 5106 have the same structure. Moreover, the incident portion 5104, the exit portion 5105 and the exit portion 5106 are all bonded to the sheet-form optical transmission line 5101. The incident portion 5104, the exit portion 5105 and the exit portion 5106 are formed in predetermined positions according to a condition of the self-imaging principle of the multi-mode interference. The condition of the self-imaging principle of the multi-mode interference will be described later.

In the above-described structure, the signal beam oscillated from the light emitting point of the vertical cavity surface emitting laser of the light emitting element 5110 is incident on the incident portion 5104 and travels in the positive direction of the y-direction. Then, the signal beam is incident on the sheet-form optical transmission line 5101 from the incident portion 5104, is bent in the positive direction of the z-direction by the reflecting surface 5102, and propagates in the sheet-form transmission line 5101. The signal beam is diffused in the x-direction and transmitted in multiple modes in the positive direction of the z-direction in the sheet-form optical transmission line 5101. Then, the signal beam is bent in the negative direction of the y-direction by the reflecting surface 5103.

Since the incident portion 5104, the exit portion 5105 and the exit portion 5106 are formed in the predetermined positions according to the condition of the self-imaging principle of the multi-mode interference described later, the signal beam is split into two beams of equal energy in the positions of the exit portion 5105 and the exit portion 5106, and the two beams are incident on the exit portion 5105 and the exit portion 5106, respectively.

The signal beam incident on the exit portion 5105 exits from the exit portion 5101 and is detected at the light receiving surface of the photodiode of the light receiving element 5111. Likewise, the signal beam incident on the exit portion 5106 exits from the exit portion 5106 and is detected at the light receiving portion of the photodiode of the light receiving element 5112.

As described above, the exit portion 5106 has the same structure as the exit portion 5105, and is disposed in the predetermined position according to the condition of the self-imaging principle of the multi-mode interference. For this reason, the exit portion 5106 is equivalent to the exit portion 5105, and has the same optical property. Therefore, the description given below is based on only the exit portion 5105, and the description of the exit portion 5106 is omitted because it is the same as that of the exit portion 5105.

The optical axes, of the signal beam transmitted inside, of the incident portion 5104, the exit portion 5105 and the exit portion 5106 are all parallel to the y-direction, and orthogonal to the z-direction which is the signal beam transmission direction of the sheet-form optical transmission line 5101. Therefore, the incident portion 5104, the exit portion 5105 and the exit portion 5106 are all nonparallel incident portions.

Figure 37:
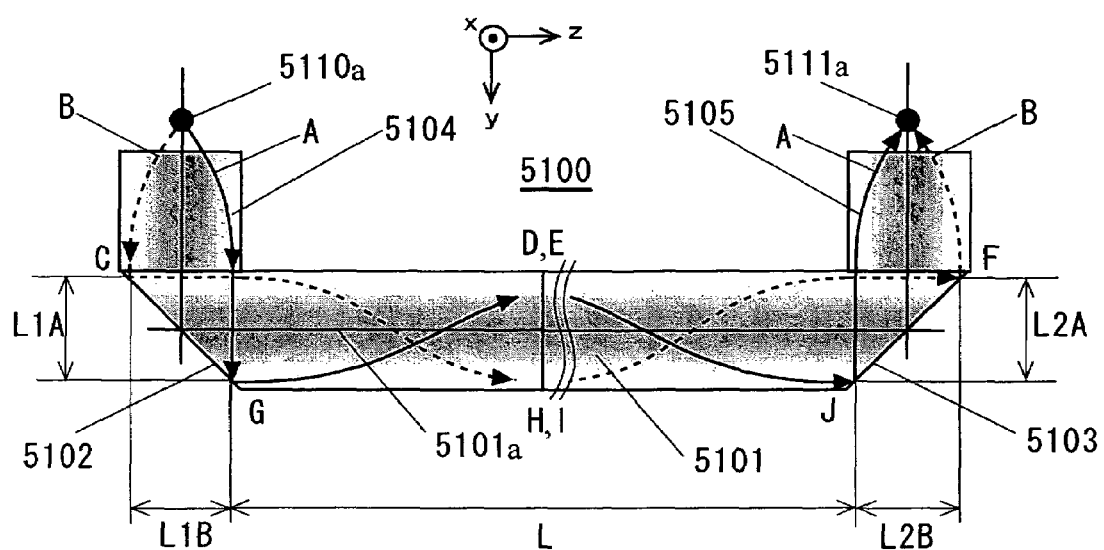
FIG. 37 is a cross-sectional view of a part, where the signal beam is transmitted, of the multi-mode interference 1×2 splitter according to the fifteenth embodiment of the present invention.

FIG. 37 is a cross-sectional view of a part, where the signal beam is transmitted, of the multi-mode interference 1×2 splitter 5100 according to the fifteenth embodiment of the present invention. FIG. 37 is a cross-sectional view in which the D-H side of the cross section, taken on a plane including the C-D-G-H plane in FIG. 36A, of the sheet-form optical transmission line 5101 and the incident portion 5104 and the E-I side of the cross section, taken on a plane including the E-F-I-J plane in FIG. 36A, of the sheet-form optical transmission line 5101 and the exit portion 5105 are connected together.

Here, the plane including the C-D-G-H plane is a plane parallel to the y-z plane and including the central axis of the incident portion 5104. Moreover, the plane including the E-F-I-J is a plane parallel to the y-z plane and including the central axis of the exit portion 5106.

In FIG. 37, the same elements are denoted by the same reference numerals as those of FIG. 36. In FIG. 37, the light emitting point of the light emitting element 5110 is a light emitting point 5110a, and the light receiving point on the light receiving surface of the light receiving element 5111 is a light receiving point 5111a.

In the multi-mode interference 1×2 splitter 5100 according to the fifteenth embodiment, the signal beam is transmitted only in the positive direction of the y-direction in the sheet-form optical transmission line 5101. For this reason, when the phase condition in the signal beam transmission direction is discussed, it is unnecessary to consider the signal beam diffusion in the x-direction. This is because the signal beam diffusion in the x-direction which is caused by a change in the signal beam intensity distribution due to the multi-mode interference involves no energy propagation, and is always in phase in the x-direction of the signal beam.

Therefore, in FIG. 37, when the phase condition in the transmission direction is discussed, the D-E-H-I plane parallel to the x-y plane in FIG. 36 may be ignored, and the optical path described in a medium in which the D-H side of the C-D-G-H plane and the E-I side of the E-F-I-J plane of FIG. 37 are connected together is equivalent to the optical path of the signal beam. As described above, it is assumed that when the term optical path or optical path length is used, the diffusion in the x-direction is ignored in the embodiments described below.

In FIG. 37, the signal beam oscillated from the light emitting point 5110a which signal beam is a divergent beam includes light beams that travel along various optical paths. Of the signal beam oscillated from the light emitting point 5110a, particularly, two optical paths A and B incident on the farthest positions from the optical axis of the signal beam will be examined. The optical path A is symmetrical to the optical path B with respect to the optical axis of the signal beam incident on the incident portion 5104. In FIG. 37, the optical path A is shown by solid lines, and the optical path B is shown by dotted lines.

In FIG. 37, the signal beam oscillated from the light emitting point 5110a in the positive direction of the y-direction is incident on the incident portion 5104 as a divergent beam. The incident portion 5104 has a refractive index distribution such that the refractive index does not continuously increase with distance from the central axis to the periphery symmetrically with respect to the central axis as mentioned above. For this reason, of the signal beam incident on the incident portion 5104, light beams incident on the incident portion 5104 at angles other than 90° are not linearly transmitted but travels while meandering.

That is, the light beam transmitted along the optical path A is transmitted from a region where the refractive index is high to a region where the refractive index is low, and is gradually bent parallelly to the y-direction. The light beam transmitted along the optical path B is also transmitted from a region where the refractive index is high to a region where the refractive index is low, and is gradually bent parallelly to the y-direction.

The length, in the y-direction, of the incident portion 5104 is determined so that the signal beam becomes a parallel beam (collimated beam) when incident on the sheet-form optical transmission line 5101. That is, the physical length, in the y-direction, of the incident portion 5104 is determined so that the optical path A is parallel to the optical path B. Consequently, the signal beam is incident on the sheet-form optical transmission line 5101 as a parallel beam.

The optical path A vertically traverses the sheet-form optical transmission line 5101 to reach the reflecting surface 5102 and is bent in the positive direction of the z-direction by the reflecting surface 5102. On the other hand, the optical path B immediately reaches the reflecting surface 5102 and is bent in the positive direction of the z-direction by the reflecting surface 5102. By the optical path A being bent by the reflecting surface 5102, the signal beam is all transmitted in the positive direction of the z-direction of the sheet-form optical transmission line 5101. Then, the optical path A and the optical path B travel while meandering according to the refractive index distribution.

The optical path A reaches the reflecting surface 5103, and is bent in the negative direction of the y-direction by the reflecting surface 5103. On the other hand, the optical path B parallelly incident in the positive direction of the y-direction reaches the reflecting surface 5103 later than the optical path A, and is bent in the negative direction of the y-direction by the reflecting surface 5103.

At this time, the structure, in the z-direction, of the sheet-form optical transmission line 5101 is determined so that the signal beam becomes a parallel beam when exiting from the exit portion 5105. That is, the physical length of the sheet-form optical transmission line 5105 is determined so that the optical path A is parallel to the optical path B. Consequently, the signal beam is incident on the exit portion 5105 as a parallel beam. Here, the optical axis of the signal beam transmitted through the exit portion 5105 is parallel to the y-direction, and is orthogonal to the z-direction which is the signal beam transmission direction of the sheet-form optical transmission line 5101. The structure of the sheet-form optical transmission line 5101 will be described later in detail.

The exit portion 5105 has a refractive index distribution such that the refractive index does not continuously increase with distance from the central axis to the periphery symmetrically with respect to the central axis as mentioned previously. For this reason, of the signal beam incident on the exit portion 5105, signal beams incident on the part away from the central axis are not linearly transmitted but travel while meandering.

The optical path A is transmitted from a region where the refractive index is low to a region where the refractive index is high, and is gradually bent in a direction that approaches the optical axis of symmetry. The optical path B is also transmitted from a region where the refractive index is low to a region where the refractive index is high, and is gradually bent in a direction that approaches the optical axis of symmetry.

The refractive index distribution and the physical length, in the y-direction, of the exit portion 5101 are the same as those of the incident portion 5104. For this reason, the signal beam exits from the exit portion 5105 as a convergent beam, and is imaged at the light receiving point 5111*a*.

The physical optical path length, on the optical path A, from the position corresponding to the position where the optical path B reaches the reflecting surface 5102 to the position where the optical path A reaches the reflecting surface 5102 is defined as L1A. The physical optical path length, on the optical path B, from the position where the optical path B reaches the reflecting surface 5102 to the position corresponding to the position where the optical path A reaches the reflecting surface 5102 is defined as L1B.

Moreover, the physical optical path length, on the optical path A, from the position where the optical path A reaches the reflecting surface 5103 to the position corresponding to the position where the optical path B reaches the reflecting surface 5103 is defined as L2A. The physical optical path length, on the optical path B, from the position corresponding to the position where the optical path A reaches the reflecting surface 5103 to the position where the optical path B reaches the reflecting surface 5103 is defined as L2B.

Moreover, the physical distance from the position where the optical path A reaches the reflecting surface 5102 to the position where the optical path A reaches the reflecting surface 5103 is defined as a transmission length L. The transmission length L corresponds to the physical length of the region where the signal beam is transmitted in the positive direction of the z-direction.

Since the reflecting surface 5102 and the reflecting surface 5103 both function as mirrors that bend the optical path 90 degrees, their geometries in the y- and z-directions are common. Therefore, the physical optical path length L1A is equal to the physical optical path length L1B. Likewise, the physical optical path length L2A is equal to the physical optical path length L2B.

However, the optical path length corresponding to the physical optical path length L1A does not coincide with the optical path length corresponding to the physical optical path length L1B. This is because, since the optical path length is different after the reflection at the reflecting surface 5102, the phase of the light beam traveling along the optical path A does not coincide with the phase of the light beam traveling along the optical path B. That is, a phase difference occurs between the optical path A and the optical path B. As described above, when a reflecting surface that is not vertical to the transmission direction is provided in a sheet-form optical transmission line including a refractive index distribution, the reflecting surface functions as an optical path length difference generating portion.

Since there is a phase difference between the optical path A and the optical path B, the intensity peak position of the signal beam transmitted inside the sheet-form optical transmission line 5101 is shifted. The refractive index that affects the signal beam while the optical path A is transmitted along the optical path corresponding to L1A is higher than the refractive index that affects the signal beam while the optical path B is transmitted along the optical path corresponding to L1B.

Consequently, the optical path A is delayed in phase from the optical path B. Therefore, as is apparent from FIG. 37, the position where these optical paths intersect each other does not coincide with the central portion 5101*a* of the sheet-form optical transmission line 5101 but is shifted toward the positive side in the y-direction.

Moreover, the phase of the light beam transmitted in the z-direction in the sheet-form optical transmission line 5101 is not disturbed by the refractive index distribution. Therefore, the phase difference between the optical path A and the optical path B caused by the reflecting surface 5102 is transmitted to the reflecting surface 5103 as it is. At the reflecting surface 5103, a phase difference is caused between the optical path A and the optical path B by the same mechanism.

Figure 38A:
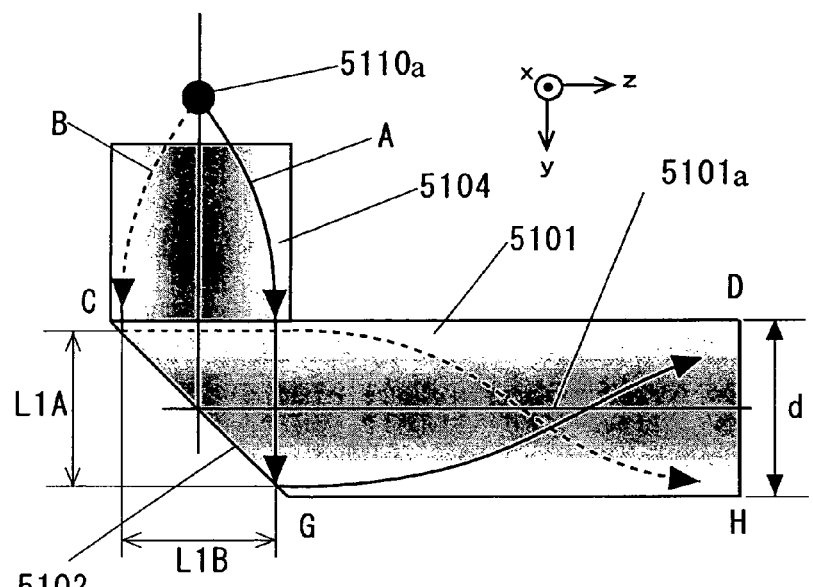
FIG. 38A is a cross section, taken on a plane including the C-D-G-H plane in FIG. 36A, of a sheet-form optical transmission line and an incident portion.
Figure 38B:
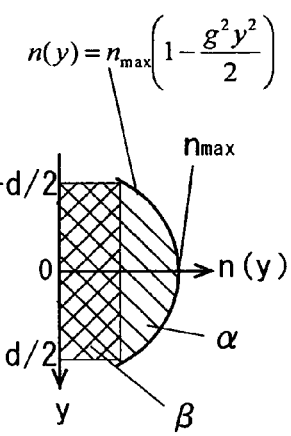
FIG. 38B is a graph showing the refractive index distribution of the sheet-form optical transmission line.

The phase difference caused by the reflecting surface 5102 is quantified. FIG. 38A is a cross section, taken on the plane including the C-D-G-H plane in FIG. 36A, of the sheet-form optical transmission line 5101 and the incident portion 5104. FIG. 38B is a graph showing the refractive index distribution of the sheet-form optical transmission line 5101. In FIG. 38B, the vertical axis coincides with the y-direction, and the origin of the y-coordinate is the central portion 5101*a*.

Letting the refractive index distribution constant be g and the refractive index at the central portion 5101*a* be $n_{max}$, the refractive index distribution in the y-direction is defined by the quadratic function shown by the following (Expression 9):

$$n(y) = n_{\max}\left(1 - \frac{g^2 y^2}{2}\right) \qquad \text{(Expression 9)}$$

In FIG. 38B, the horizontal axis represents the refractive index n(y) and the vertical axis represents the position coordinate, in the y-direction, of the sheet-form optical transmission line 5101. The origin of the position is the central portion 5101*a* of the sheet-form optical transmission line 5101. As is apparent from FIG. 38B, (Expression 9) is a quadratic function that is convex upward, and the refractive index distribution is such that the refractive index at the central portion 5101*a* is the highest refractive index $n_{max}$ and the refractive index continuously and centrosymmetrically decreases with distance from the central portion 5101*a* in both the positive and negative directions of the y-direction.

To convert the physical optical path length into an optical path length, the function of the refractive index distribution is integrated with respect to the position. For the sake of simplification, it is assumed that the position where the signal beam transmitted along the optical path A and the optical path B is reflected by the reflecting surface 5102 is the position of the largest diameter of the sheet-form optical transmission line 5101.

In actuality, in the signal beam transmitted in the sheet-form optical transmission line 5101, a plurality of modes is excited in the direction of the width, and the effective refractive index differs among the modes. In the MMI, since the size in the direction of the length is a function of the effective refractive index of the 0th-order mode beam excited in the direction of the width, it is more convenient to replace the highest refractive index $n_{max}$ with the effective refractive index $n_0$ of the 0th-order mode beam excited in the direction of the width. Therefore, in the following discussion, the effective refractive index no of the 0th-order mode beam excited in the direction of the width is used as the refractive index. The effective refractive index no is determined by the highest refractive index $n_{max}$, the wavelength of the signal beam and the configuration of the sheet-form optical transmission line.

The optical path length corresponding to the physical optical path length L1A of the optical path A is equal to (Expression 9), being a function of the refractive index, integrated with respect to the position coordinate y from −d/2 to d/2. That is, the optical path length corresponding to the physical optical path length L1A of the optical path A is equal to the area of the region a defined by the y-axis and the graph of (Expression 9) representing the refractive index distribution in FIG. 38B.

Likewise, the optical path length corresponding to the physical optical path length L1B of the optical path B is equal to the value n(d/2), of the refractive index at a position d/2 in FIG. 38B, integrated with respect to the position coordinate y from −d/2 to d/2. That is, the optical path length corresponding to the physical optical path length L1B of the optical path B is equal to the area of the rectangular region β in FIG. 38B.

Therefore, the difference ΔL in optical path length between the optical path A and the optical path B caused by the reflecting surface 5102 is expressed by the following (Expression 10). Moreover, the phase difference A caused between the optical path A and the optical path B at this time is expressed by the following (Expression 11). Here, the effective refractive index no is used as the refractive index.

$$\Delta L = \int_{-\frac{d}{2}}^{\frac{d}{2}} \left\{ n(y) - n\left(\frac{d}{2}\right) \right\} dy = \qquad \text{(Expression 10)}$$

$$2 \int_{0}^{\frac{d}{2}} \left\{ n(y) - n\left(\frac{d}{2}\right) \right\} dy = \frac{n_0 g^2 d^3}{12}$$

$$\Delta = \frac{2\pi}{\lambda} \Delta L = \frac{n_0 g^2 d^3}{6\lambda} \pi \qquad \text{(Expression 11)}$$

Results of concrete numerical calculations of the above-mentioned phase difference Δ are shown in Table 1. In the calculations, the refractive index distribution coefficient g is set as a value that decreases approximately 1% from the center at d/2. Moreover, the effective refractive index corresponding to the refractive index at the central portion 5101a is set to $n_0$=1.5.

TABLE 1

| | Diameter, in the direction of the refractive index distribution, of the sheet-form optical transmission line [μm] | | | |
|---|---|---|---|---|
| | 50 | 100 | 200 | 1000 |
| Refractive index distribution coefficient g [mm$^{-1}$] | 5.6 | 2.8 | 1.414 | 0.28 |
| Phase difference Δ [radian] | 1.18π | 2.35π | 4.71π | 23.5π |

As is apparent from Table 1, the phase difference between the optical path A and the optical path B caused at the reflecting surface 5102 is not less than π radian. The signal beam cannot be made to exit with its intensity distribution being unchanged unless the phase difference between the optical path A and the optical path B is zero.

Therefore, a method of compensating for the phase difference will be described. First, a condition that is necessarily satisfied by the physical length (hereinafter, referred to as transmission length) L from the position where the signal beam transmitted along the optical path A reaches the reflecting surface 5102 to the position where the signal beam transmitted along the optical path A reaches the reflecting surface 5103.

The signal beam incident on the sheet-form optical transmission line 5101 from the incident portion 5104 and the signal beam exiting from the sheet-form optical transmission line 5101 to the exit portion 5105 are both parallel beams. Moreover, when the refractive index distribution coefficient g is provided, the light beam transmitted in the sheet-form optical transmission line 5101 meanders with a period of 2π/g according to the refractive index distribution.

Therefore, to cause the signal beam incident as a parallel beam to exit as a parallel beam at the sheet-form optical transmission line 5101, the transmission length L is set to an integral multiple of the period 2π/g. That is, the transmission length L necessarily satisfies the following (Expression 12):

$$L = \frac{2\pi}{g} j \quad (j = 0, 1, 2, 3, \ldots) \qquad \text{(Expression 12)}$$

On the other hand, because of the refractive index distribution, the optical path length corresponding to the physical transmission length L of the optical path A is equal to the optical path length corresponding to the physical transmission length of the optical path B. The difference in overall optical path length between the optical path A and the optical path B of the sheet-form optical transmission line 5101 can be considered to be caused only at the reflecting surface 5102 and the reflecting surface 5103. As described above, the reflecting surface 5102 and the reflecting surface 5103 are optical path length difference generating portions.

The difference $\Delta L_{total}$ in overall optical path length of the sheet-form optical transmission line 5101 is equal to the value of the following (Expression 13) which is double the (Expression 10) calculated with respect to the reflecting surface 5102:

$$\Delta L_{total} = 2\Delta L = \frac{n_0 g^2 d^3}{6} \qquad \text{(Expression 13)}$$

The above (Expression 13) means that the optical path length of the optical path A is larger by the value of $\Delta L_{total}$ than the optical path length of the optical path B. Therefore, by making the value of (Expression 13) to coincide with an integral multiple of the wavelength of the signal beam, the difference between the phase of the optical path A and the phase of the optical path B can be made zero. That is, the condition that makes zero the phase difference between the optical path A and the optical path B is a condition expressed by the following (Expression 14):

$$\Delta L_{total} = \frac{n_0 g^2 d^3}{6} = k\lambda \ (k = 1, 2, 3, \ldots) \quad \text{(Expression 14)}$$

As described above, the phase difference between the optical path A and the optical path B is a natural multiple of the wavelength k of the signal beam by structuring the sheet-form optical transmission line 5101 so that the difference in optical path length between the optical path A and the optical path B caused in the entire sheet-form optical transmission line 5101 satisfies (Expression 14). Consequently, the phase difference between the optical path A and the optical path B does not occur.

The sheet-form optical transmission line 5101 is designed as follows: First, the transmission length L is determined by (Expression 12). By this, the refractive index distribution coefficient g is determined. Then, (Expression 14) is adjusted by use of the determined refractive index distribution coefficient g and the preprovided signal beam wavelength $\lambda$.

The parameters for the adjustment are the refractive index $n_{max}$ at the central portion 5101a and the thickness d in the y-direction. The effective refractive index $n_0$ of the 0th-order mode beam excited in the direction of the width can be changed by changing the refractive index $n_{max}$ at the central portion 5101a and the thickness d in the y-direction. When the adjustment cannot be made, the refractive index distribution coefficient g is changed and the transmission length L is again determined by (Expression 12). By repeating this optimization design, a desired sheet-form optical transmission line 5101 can be obtained.

As described above, in the optical device according to the fifteenth embodiment, the difference in optical path length between the optical path A and the optical path B is a natural multiple of the signal beam wavelength $\lambda$. Therefore, the phase difference between the optical path A and the optical path B is the same between before the incidence on the optical transmission line and the exit from the optical transmission line. Consequently, in the optical device according to the fifteenth embodiment, the waveform at the time of the incidence on the optical transmission line and the waveform at the time of the exit therefrom can be made to coincide with each other, so that the signal beam can be made to exit from the optical transmission line without any loss.

Moreover, in the optical device according to the fifteenth embodiment, since the optical axis of the signal beam incident on the optical transmission line and the optical axis of the signal beam exiting from the optical transmission line are both orthogonal to the z-direction, the outside and the optical transmission line can be easily coupled together. In particular, when optical parts such as a light emitting element that emits the signal beam that is incident on the optical transmission line and a light receiving element that receives the signal beam having exited from the optical transmission line are coupled to the optical transmission line, the optical parts can be easily mounted.

Moreover, in the optical device according to the fifteenth embodiment, the optical path A and the optical path B include two optical path length difference generating portions where the optical path length difference is caused, and the sum of the optical path length differences caused by the two optical path length difference generating portions is equal to a natural multiple of the signal beam wavelength. By this structure, the phase difference between the two optical paths can be made zero.

Moreover, the optical device according to the fifteenth embodiment includes a sheet-form optical transmission line capable of trapping the signal beam in the y-direction, and the sheet-form optical transmission line has a refractive index distribution such that the refractive index at the central portion where the thickness in the y-direction is half is the highest and the refractive index does not increase with distance from the center in a first direction. By this structure, the mode dispersion is suppressed by the refractive index distribution, and the signal beam can be transmitted.

Moreover, in the optical device according to the fifteenth embodiment, the sheet-form optical transmission line includes the reflecting surface 5102 for bending, in the z-direction, the optical axis of the signal beam incident from a direction not parallel to the z-direction and the reflecting surface 5103 for bending, in the direction not parallel to the z-direction, the optical axis of the signal beam transmitted in the z-direction. In this case, the reflecting surface 5102 and the reflecting surface 5103 are optical path length difference generating portions.

By this structure, the signal beam incident on the optical transmission line from the direction not parallel to the z-direction can be easily made incident on the optical transmission line. Moreover, the signal beam exiting from the optical transmission line in the direction not parallel to the z-direction can be easily made to exit from the optical transmission line.

Moreover, in the optical device according to the fifteenth embodiment, in the sheet-form optical transmission line, the physical optical path length from the position where the signal beam is all bent in the z-direction by the reflecting surface 5102 to the position immediately before the signal beam is all incident on the reflecting surface 5103 is equal to j times (j=0,1,2,3, . . . ) the period of meandering of the optical path along which the signal beam is transmitted while meandering based on the refractive index distribution. By this structure, the intensity distribution of the signal beam is the same between on the incident side and on the exit side.

Sixteenth Embodiment

Next, a sixteenth embodiment of the present invention will be described. In the sixteenth embodiment, descriptions of the same parts as those of the fifteenth embodiment are omitted and only different parts will be described. A multi-mode interference 1×2 splitter 5200 of the sixteenth embodiment has approximately the same structure as the multi-mode interference 1×2 splitter 5100 shown in FIG. 36, and is different only in the structure of a sheet-form optical transmission line 5201.

Figure 39:
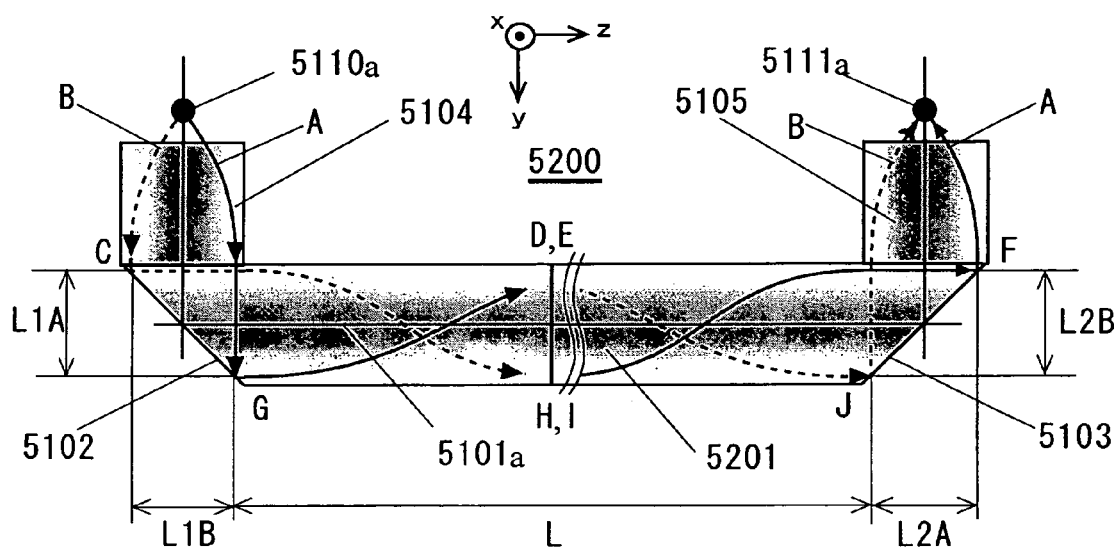
FIG. 39 is a cross-sectional view of a part, where the signal beam is transmitted, of a multi-mode interference 1×2 splitter according to a sixteenth embodiment of the present invention.

FIG. 39 is a cross-sectional view of a part, where the signal beam is transmitted, of the multi-mode interference 1×2 splitter 5200 according to the sixteenth embodiment of the present invention. FIG. 39 is a cross-sectional view of the multi-mode interference 1×2 splitter 5200 taken on the same place as that in the case of the multi-mode interference 1×2 splitter 5100 according to the fifteenth embodiment shown in FIG. 36 and FIG. 37. In FIG. 39, the incident portion 5104, the exit portion 5105, the reflecting surface 5102 and the reflecting surface 5103 all have the same structures as those of the multi-mode interference 1×2 splitter 5100 according to the fifteenth embodiment.

The sheet-form optical transmission line 5201 has a refractive index distribution in the y-direction. The sheet-form optical transmission line 5201 has the highest refractive index $n_{max}$ at the central portion 5101a. The sheet-form optical transmission line 5201 has a refractive index distribution that satisfies (Expression 9) with the central portion 5101a as the symmetry plane. Moreover, the sheet-form optical transmission line 5201 has a refractive index distribution only in the y-direction, and has no refractive index distribution in the other directions. Moreover, the transmission length L of the sheet-form optical transmission line 5201 satisfies the following (Expression 15):

$$L = \frac{2\pi}{g}(j + 0.5) \ (j = 0, 1, 2, \ldots) \quad \text{(Expression 15)}$$

(Expression 15) means that the transmission length L is (an integer+0.5) times the period of meandering when the beam is transmitted through the sheet-form optical transmission line 5201. When the transmission length L satisfies (Expression 15), the period of meandering of the optical path A and the optical path B is shifted by half the period compared to that at the time of incidence.

The optical path A is reflected at the side, the farthest from the incident portion 5104, of the reflecting surface 5102 to be bent in the positive direction of the z-direction and transmitted, and then, reflected at the side, the closest to the exit portion 5105, of the reflecting surface 5103. Likewise, the optical path B is reflected at the side, the closest to the incident portion 5104, of the reflecting surface 5102 to be bent in the positive direction of the z-direction and transmitted, and then, reflected at the side, the farthest from the exit portion 5105, of the reflecting surface 5103.

Here, the physical optical path lengths L1A, L2A, L1B and L2B are defined equally to the case of the fifteenth embodiment. Moreover, the transmission length L is also defined equally to the case of the fifteenth embodiment. In the case of the sixteenth embodiment, the optical path length corresponding to the physical optical path length L1A of the optical path A is equal to the optical path length corresponding to the physical optical path length L2B of the optical path B. Moreover, the optical path length corresponding to the physical optical path length L2A of the optical path A is equal to the optical path length corresponding to the physical optical path length L1B of the optical path B.

On the other hand, because of the refractive index distribution, the optical path length corresponding to the physical transmission length L of the optical path A is equal to the optical path length corresponding to the physical transmission length of the optical path B. Therefore, the difference in overall optical path length between the optical path A and the optical path B of the sheet-form optical transmission line 5201 is zero. Similarly to the case of the fifteenth embodiment, when the optical path length is $\Delta L_{total}$, the following (Expression 16) holds:

$$\Delta L_{total} = 0 \quad \text{(Expression 16)}$$

That is, the difference between the optical path length of the optical path A and the optical path length of the optical path B is zero. Since the difference in optical path length is zero, no phase difference occurs between the optical path A and the optical path B. As described above, the phase difference between the optical path A and the optical path B is zero when the transmission length L of the sheet-form optical transmission line 5201 is set so as to satisfy (Expression 15).

As described above, in the optical device according to the sixteenth embodiment, the difference in optical path length between the optical path A and the optical path B is zero. Therefore, the phase difference between the optical path A and the optical path B is the same between before the incidence on the optical transmission line and after the exit from the optical transmission line. Consequently, in the optical device according to the sixteenth embodiment, the waveform at the time of the incidence on the optical transmission line and the waveform at the time of the exit therefrom can be made to coincide with each other, so that the signal beam can be made to exit from the optical transmission line without any loss.

Moreover, in the optical device according to the sixteenth embodiment, since the optical axis of the signal beam incident on the optical transmission line and the optical axis of the signal beam exiting from the optical transmission line are both orthogonal to the z-direction, the outside and the optical transmission line can be easily coupled together. In particular, when optical parts such as a light emitting element that emits the signal beam that is incident on the optical transmission line and a light receiving element that receives the signal beam having exited from the optical transmission line are coupled to the optical transmission line, the optical parts can be easily mounted.

Moreover, in the optical device according to the sixteenth embodiment, the optical path A and the optical path B include two optical path length difference generating portions where the optical path length difference is caused, and the sum of the optical path length differences caused by the two optical path length difference generating portions is zero. By this structure, the phase difference between the two optical paths can be made zero.

Moreover, the optical device according to the sixteenth embodiment includes a sheet-form optical transmission line capable of trapping the signal beam in the y-direction, and the sheet-form optical transmission line has a refractive index distribution such that the refractive index at the central portion where the thickness in the y-direction is half is the highest and the refractive index does not increase with distance from the center in a first direction. By this structure, the mode dispersion is suppressed by the refractive index distribution, and the signal beam can be transmitted.

Moreover, in the optical device according to the sixteenth embodiment, the sheet-form optical transmission line includes the reflecting surface 5102 for bending, in the z-direction, the optical axis of the signal beam incident from a direction not parallel to the z-direction and the reflecting surface 5103 for bending, in the direction not parallel to the z-direction, the optical axis of the signal beam transmitted in the z-direction. Further, the reflecting surface 5102 and the reflecting surface 5103 are optical path length difference generating portions.

By this structure, the signal beam incident on the optical transmission line from the direction not parallel to the z-direction can be easily made incident on the optical transmission line. Moreover, the signal beam exiting from the optical transmission line in the direction not parallel to the z-direction can be easily made to exit from the optical transmission line.

Moreover, in the optical device according to the sixteenth embodiment, in the sheet-form optical transmission line, the physical optical path length from the position where the signal beam is all bent in the z-direction by the reflecting surface 5102 to the position immediately before the signal beam is all incident on the reflecting surface 5103 is equal to (j+0.5) times (j=0,1,2,3, . . . ) the period of meandering of the optical path along which the signal beam is transmitted while meandering based on the refractive index distribution. By this structure, the intensity distribution of the signal beam is the same between on the incident side and on the exit side.

Seventeenth Embodiment

Next, a seventeenth embodiment of the present invention will be described. In the seventeenth embodiment, descriptions of the same parts as those of the fifteenth embodiment are omitted and only different parts will be described. A multi-mode interference 1×2 splitter 5300 of the seventeenth embodiment has approximately the same structure as the multi-mode interference 1×2 splitter 5100 shown in FIG. 36, and is different in the structure of an incident portion 5304, an exit portion 5305 and a sheet-form optical transmission line 5301.

Figure 40:
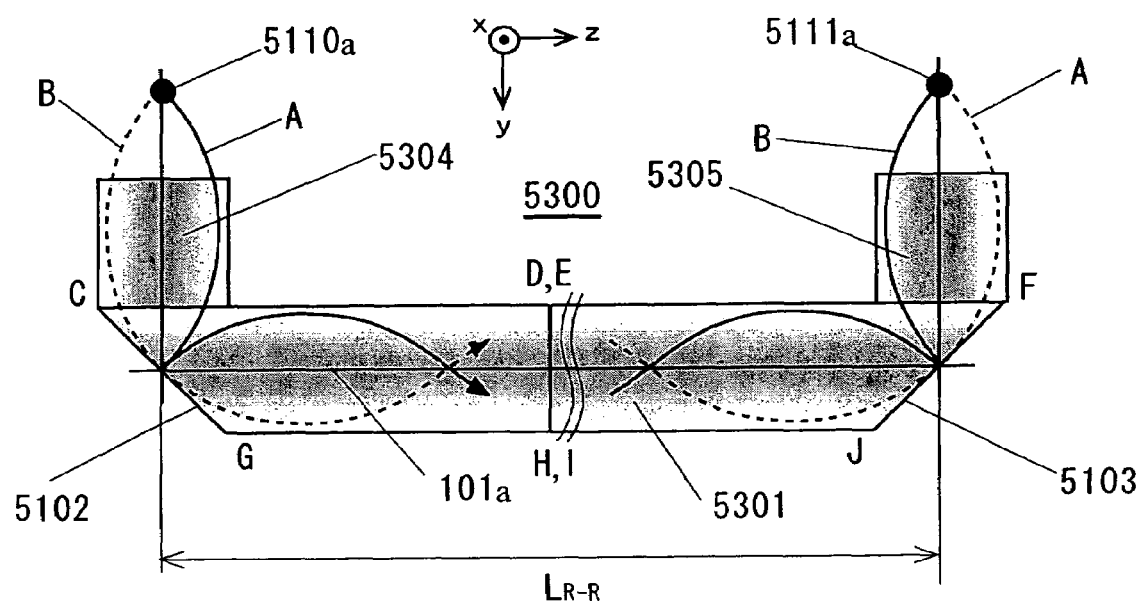
FIG. 40 is a cross-sectional view of a part, where the signal beam is transmitted, of a multi-mode interference 1×2 splitter according to a seventeenth embodiment of the present invention.

FIG. 40 is a cross-sectional view of a part, where the signal beam is transmitted, of the multi-mode interference 1×2 splitter 5300 according to the seventeenth embodiment of the present invention. FIG. 40 is a cross-sectional view of the multi-mode interference 1×2 splitter 5200 taken on the same place as that in the case of the multi-mode interference 1×2 splitter 5100 according to the fifteenth embodiment shown in FIG. 36 and FIG. 37.

The sheet-form optical transmission line 5301 has a refractive index distribution in the y-direction. The sheet-form optical transmission line 5301 has the highest refractive index $n_{max}$ at the central portion 5101a. The sheet-form optical transmission line 5301 has a refractive index distribution that satisfies Expression (1) with the central portion 5101a as the symmetry plane. Moreover, the sheet-form optical transmission line 5301 has a refractive index distribution only in the y-direction, and has no refractive index distribution in the other directions.

In the sheet-form optical transmission line 5301, the signal beam incident through the incident portion 5304 is condensed into a line parallel to the x-direction at the central portion 5101a of the sheet-form optical transmission line on the reflecting surface 5102. That is, by appropriately setting the length, in the y-direction, of the incident portion 5304, the signal beam can be condensed into a line parallel to the x-direction at the central portion 5101a of the sheet-form optical transmission line on the reflecting surface 5102.

Moreover, in the sheet-form optical transmission line 5301, the signal beam exiting from the exit portion 5305 exits from the exit portion 5105 after condensed into a line parallel to the x-direction at the central portion 5101a of the sheet-form optical transmission line on the reflecting surface 5103. That is, by appropriately setting the length, in the y-direction, of the exit portion 5305, the signal beam can be condensed into a line parallel to the x-direction at the central portion 5101a of the sheet-form optical transmission line on the reflecting surface 5103.

Further, in the sheet-form optical transmission line 5301, at this time, the physical optical path length $L_{R-R}$, at the central portion 5101a, from the reflecting surface 5102 and the reflecting surface 5103 of the sheet-form optical transmission line 5301 satisfies the relationship of the following (Expression 17):

$$L_{R-R} = \frac{2\pi}{g} \cdot \frac{j}{2} (j = 0, 1, 2, 3, \ldots)$$ (Expression 17)

(Expression 17) means that the physical optical path length $L_{R-R}$ is equal to a half-integral multiple of the meandering period of the optical path of the signal beam that meanders in the sheet-form optical transmission line 5301. When the physical optical path length $L_{R-R}$ is set so as to satisfy (Expression 17), the signal beam condensed into a line parallel to the x-direction on the reflecting surface 5102 is again condensed into a line parallel to the x-direction on the reflecting surface 5103.

Therefore, between the reflecting surface 5101 and the reflecting surface 5102, a conjugate relationship optically holds within a plane parallel to the y-z plane. At this time, since the refractive index that affects the optical path A and the reflective index that affects the optical path B completely coincide with each other, no phase difference occurs between the optical path A and the optical path B. As described above, the phase difference between the optical path A and the optical path B is zero when the physical optical path length $L_{R-R}$ of the sheet-form optical transmission line 5301 is set so as to satisfy (Expression 17).

As described above, in the optical device according to the seventeenth embodiment, of a plurality of optical paths transmitted through the sheet-form optical transmission line 5301, the difference in optical path length between the optical path A and the optical path B is zero. The phase difference between the optical path A and the optical path B is the same between before the incidence on the optical transmission line and after the exit from the optical transmission line. Consequently, in the optical device according to the seventeenth embodiment, the waveform at the time of the incidence on the optical transmission line and the waveform at the time of the exit therefrom can be made to coincide with each other, so that the signal beam can be made to exit from the optical transmission line without any loss.

Moreover, in the optical device according to the seventeenth embodiment, the optical path A and the optical path B do not have a part where an optical path length difference is caused. By this structure, the phase difference between the optical path A and the optical path B can be made zero.

Moreover, in the optical device according to the seventeenth embodiment, the above-described sheet-form optical transmission line includes the reflecting surface 5102 and the reflecting surface 5103, and the physical optical path length between the reflecting surface 5102 and the reflecting surface 5103 at the central portion 5101a is equal to (j/2) times (j=0,1,2,3, . . . ) the period of meandering of the optical path along which the signal beam is transmitted while meandering based on the refractive index distribution. Moreover, in the optical device according to the seventeenth embodiment, the signal beam is condensed into a line parallel to the x-direction orthogonal to both the y-direction and the z-direction at the central portion, where the thickness in the first direction is half, of the optical transmission line.

By this structure, the reflecting surfaces are optically in a conjugate relationship at the central portion. For this reason, the two optical paths do not have a part where an optical path length difference is caused, between the reflecting surfaces. Consequently, the phase difference between the two optical paths can be made zero.

Eighteenth Embodiment

Next, an eighteenth embodiment of the present invention will be described. In the eighteenth embodiment, descriptions of the same parts as those of the fifteenth embodiment are omitted and only different parts will be described. A multi-mode interference 1×2 splitter 5400 of the eighteenth embodiment has approximately the same structure as the multi-mode interference 1×2 splitter 5100 shown in FIG. 36, and is different in the structure of an incident portion 5404, an exit portion 5405, an exit portion 5406 and a sheet-form optical transmission line 5401.

Figure 41A:
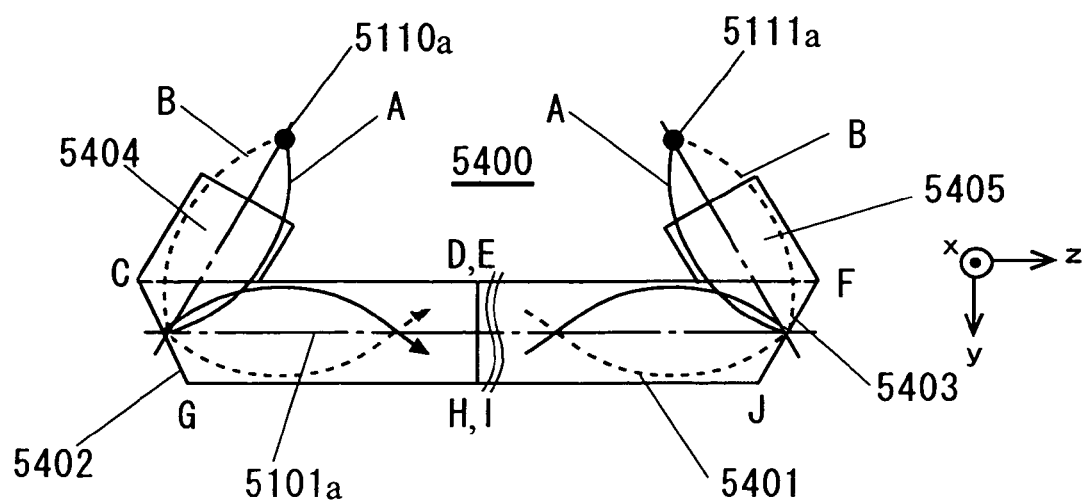
FIG. 41A is a cross-sectional view of a part, where the signal beam is transmitted, of a multi-mode interference 1×2 splitter according to an eighteenth embodiment of the present invention.

FIG. 41A is a cross-sectional view of a part, where the signal beam is transmitted, of the multi-mode interference 1×2 splitter 5400 according to the eighteenth embodiment of the present invention. FIG. 41A is a cross-sectional view of the multi-mode interference 1×2 splitter 5400 taken on the same place as that in the case of the multi-mode interference 1×2 splitter 5100 according to the fifteenth embodiment shown in FIG. 36 and FIG. 37. In the figure, the refractive index distribution is omitted.

The sheet-form optical transmission line 5401 traps the externally incident signal beam in the y-direction and can transmit it in the z-direction (transmission direction). The sheet-form optical transmission line 5401 has a reflecting surface 5402 and a reflecting surface 5403 at both ends in the z-direction.

The incident portion 5404 is structured so that the optical axis of the signal beam incident on the sheet-form optical transmission line 5401 is not parallel to the z-direction but is at a predetermined acute angle with respect thereto. Moreover, the exit portion 5405 is structured so that the optical axis of the signal beam exiting from the sheet-form optical transmission line 5401 is not parallel to the z-direction but is at a predetermined acute angle with respect thereto.

The reflecting surface 5402 is disposed so as to bend, in the z-direction, the optical axis of the signal beam transmitted through the incident portion 5405 and incident on the sheet-form optical transmission line 5401 from a direction at a predetermined acute angle with respect to the z-direction. The reflecting surface 5403 is disposed so as to bend the signal beam in a direction in which the signal beam is transmitted through the sheet-form optical transmission line 5401 and that is at a predetermined acute angle with respect to the z-direction.

In the sheet-form optical transmission line 5401, the signal beam incident through the incident portion 5404 is condensed into a line parallel to the x-direction at the central portion 5101a of the sheet-form optical transmission line on the reflecting surface 5402. That is, by appropriately setting the structure of the incident portion 5404, the signal beam can be condensed into a line parallel to the x-direction at the central portion 5101a of the sheet-form optical transmission line on the reflecting surface 5402.

Moreover, in the sheet-form optical transmission line 5401, the signal beam exiting from the exit portion 5405 exits from the exit portion 5405 after condensed into a line parallel to the x-direction at the central portion 5101a of the sheet-form optical transmission line on the reflecting surface 5403. That is, by appropriately setting the structure of the exit portion 5405, the signal beam can be condensed into a line parallel to the x-direction at the central portion 5101a of the sheet-form optical transmission line on the reflecting surface 5403.

As described above, in the multi-mode interference 1×2 splitter 5400 according to the eighteenth embodiment, the optical axis of the signal beam incident on the optical transmission line and the optical axis of the signal beam exiting from the optical transmission line are both not parallel to the z-direction but at the predetermined acute angle with respect thereto. Consequently, the degree of freedom of the layout of the light emitting element 5111 and the light receiving element 5112 can be improved.

In the eighteenth embodiment, it may be performed to calculate the phase difference between the optical path A and the optical path B of the signal beam in the sheet-form optical transmission line 5401 and makes the phase difference a natural multiple of the signal beam wavelength or zero as described in the fifteenth embodiment and the sixteenth embodiment. By doing this, the phase difference between the optical path A and the optical path B can also be made zero.

Nineteenth Embodiment

Next, a nineteenth embodiment of the present invention will be described. In the nineteenth embodiment, descriptions of the same parts as those of the fifteenth embodiment are omitted and only different parts will be described. A multi-mode interference 1×2 splitter 5500 of the nineteenth embodiment has approximately the same structure as the multi-mode interference 1×2 splitter 5100 shown in FIG. 36, and is different in the structure of an incident portion 5504, an exit portion 5505, an exit portion 5506 and a sheet-form optical transmission line 5501.

Figure 41B:
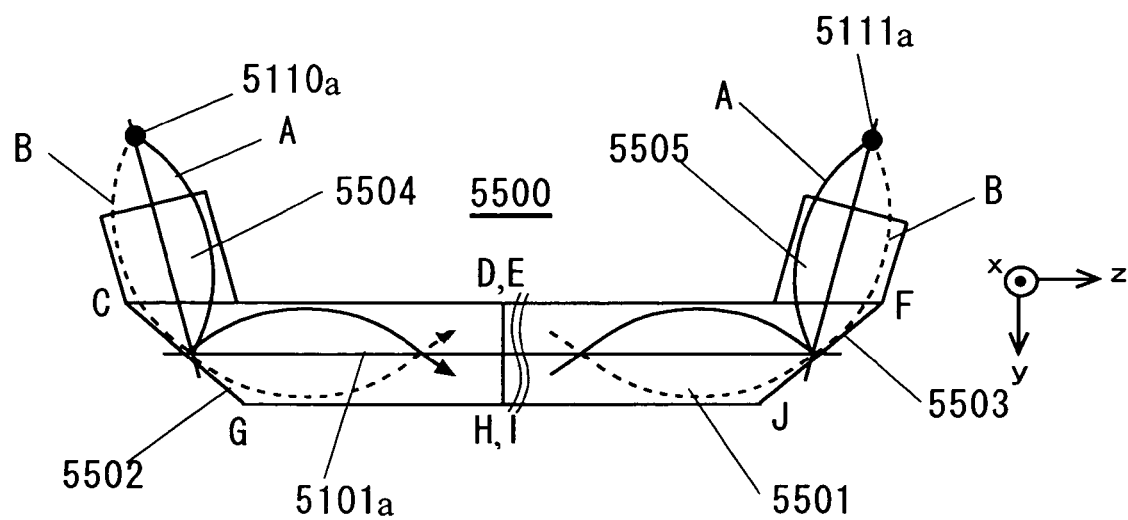
FIG. 41B is a cross-sectional view of apart, where the signal beam is transmitted, of a multi-mode interference 1×2 splitter according to a nineteenth embodiment of the present invention.

FIG. 41B is a cross-sectional view of a part, where the signal beam is transmitted, of the multi-mode interference 1×2 splitter 5500 according to the nineteenth embodiment of the present invention. FIG. 41B is a cross-sectional view of the multi-mode interference 1×2 splitter 5500 taken on the same place as that in the case of the multi-mode interference 1×2 splitter 5100 according to the fifteenth embodiment shown in FIG. 36 and FIG. 37. In the figure, the refractive index distribution is omitted.

The sheet-form optical transmission line 5501 traps the externally incident signal beam in the y-direction and can transmit it in the z-direction (transmission direction). The sheet-form optical transmission line 5501 has a reflecting surface 5502 and a reflecting surface 5503 at both ends in the z-direction.

The incident portion 5504 is structured so that the optical axis of the signal beam incident on the sheet-form optical transmission line 5501 is not parallel to the z-direction but is at a predetermined acute angle with respect thereto. Moreover, the exit portion 5505 is structured so that the optical axis of the signal beam exiting from the sheet-form optical transmission line 5501 is not parallel to the z-direction but is at a predetermined acute angle with respect thereto.

The reflecting surface 5502 is disposed so as to bend, in the z-direction, the optical axis of the signal beam transmitted through the incident portion 5504 and incident on the sheet-form optical transmission line 5501 from a direction at a predetermined acute angle with respect to the z-direction. The reflecting surface 5503 is disposed so as to bend the signal beam in a direction in which the signal beam is transmitted through the sheet-form optical transmission line 5501 and that is at a predetermined acute angle with respect to the z-direction.

In the sheet-form optical transmission line 5501, the signal beam incident through the incident portion 5504 is condensed into a line parallel to the x-direction at the central portion 5101a of the sheet-form optical transmission line on the reflecting surface 5502. That is, by appropriately setting the structure of the incident portion 5504, the signal beam can be condensed into a line parallel to the x-direction at the central portion 5101a of the sheet-form optical transmission line on the reflecting surface 5502.

Moreover, in the sheet-form optical transmission line 5501, the signal beam exiting from the exit portion 5505 exits from the exit portion 5505 after condensed into a line parallel to the x-direction at the central portion 5101a of the sheet-form optical transmission line on the reflecting surface 5503. That is, by appropriately setting the structure of the exit portion 5505, the signal beam can be condensed into a line parallel to the x-direction at the central portion 5101a of the sheet-form optical transmission line on the reflecting surface 5503.

At this time, the sheet-form optical transmission line 5501 satisfies (Expression 17) described in the seventeenth embodiment. Therefore, between the reflecting surface 5502 and the reflecting surface 5503, a conjugate relationship optically holds within a plane parallel to the y-z plane. At this time, since the refractive index that affects the optical path A and the reflective index that affects the optical path B completely coincide with each other, no phase difference occurs between the optical path A and the optical path B.

As described above, in the multi-mode interference 1×2 splitter 5500 according to the nineteenth embodiment, the optical axis of the signal beam incident on the optical transmission line and the optical axis of the signal beam exiting from the optical transmission line are both not parallel to the z-direction but at the predetermined acute angle with respect thereto. Consequently, the degree of freedom of the layout of the light emitting element 5111 and the light receiving element 5112 can be improved.

In the nineteenth embodiment, it may be performed to calculate the phase difference between the optical path A and the optical path B of the signal beam in the sheet-form optical transmission line 5501 and makes the phase difference a natural multiple of the signal beam wavelength or zero as described in the fifteenth embodiment and the sixteenth embodiment. By doing this, the phase difference between the optical path A and the optical path B can also be made zero.

Twentieth Embodiment

Figure 42A:
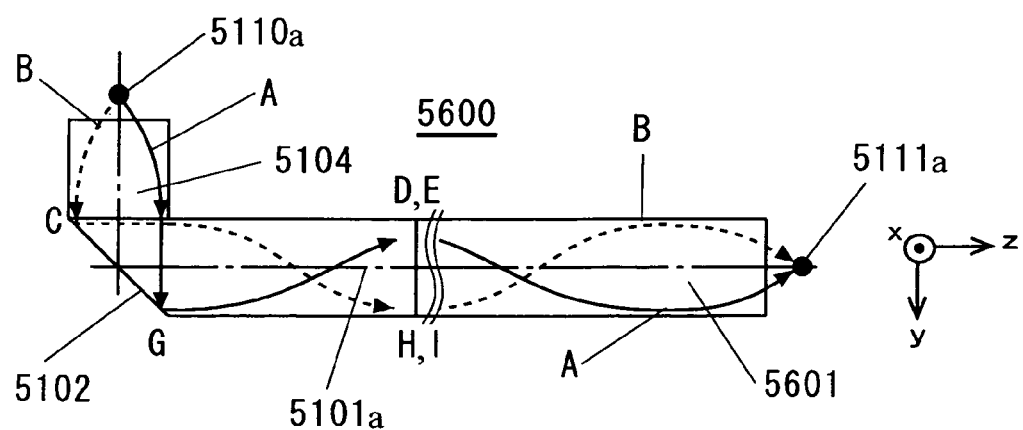
FIG. 42A is a cross-sectional view of a part, where the signal beam is transmitted, of a multi-mode interference 1×2 splitter according to a twentieth embodiment of the present invention.

FIG. 42A is a cross-sectional view of a part, where the signal beam is transmitted, of a multi-mode interference 1×2 splitter 5600 according to a twentieth embodiment of the present invention. In the twentieth embodiment, descriptions of the same parts as those of the fifteenth embodiment are omitted and only different parts will be described. The multi-mode interference 1×2 splitter 5600 according to the twentieth embodiment has approximately the same structure as the multi-mode interference 1×2 splitter 5100 shown in FIG. 36, and is different only in that a structure corresponding to the exit portion is not provided. In the figure, the refractive index distribution is omitted.

In FIG. 42A, the multi-mode interference 1×2 splitter 5600 according to the twentieth embodiment is provided with an incident portion 5104 and a sheet-form optical transmission line 5601. The structure of the incident side of the sheet-form optical transmission line 5601 is the same as that of the sheet-form optical transmission line 5101 according to the first embodiment. On the other hand, on the exit side, the signal beam exits in the z-direction from an end surface of the sheet-form optical transmission line 5601 from the exit side.

In the sheet-form optical transmission line 5601, the optical path length difference generating portion is only the reflecting surface 5102. Therefore, by making the phase difference between the optical path A and the optical path B caused at the reflecting surface 5102 an integral multiple of the signal beam wavelength, the phase difference can be made zero.

Twenty-First Embodiment

Figure 42B:
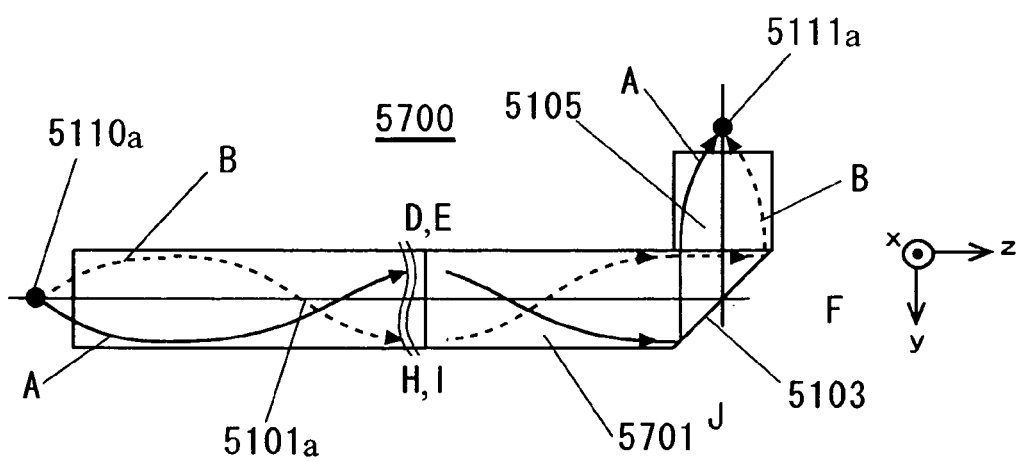
FIG. 42B is a cross-sectional view of a part, where the signal beam is transmitted, of a multi-mode interference 1×2 splitter according to a twenty-first embodiment of the present invention.

FIG. 42B is a cross-sectional view of a part, where the signal beam is transmitted, of a multi-mode interference 1×2 splitter 5700 according to a twenty-first embodiment of the present invention. In the twenty-first embodiment, descriptions of the same parts as those of the fifteenth embodiment are omitted and only different parts will be described. The multi-mode interference 1×2 splitter 5700 according to the twenty-first embodiment has approximately the same structure as the multi-mode interference 1×2 splitter 5100 shown in FIG. 36 and is different only in that a structure corresponding to the incident portion is not provided. In the figure, the refractive index distribution is omitted.

In FIG. 42B, the multi-mode interference 1×2 splitter 5700 according to the twenty-first embodiment is provided with an incident portion 5104 and a sheet-form optical transmission line 5701. The structure of the exit side of the sheet-form optical transmission line 5701 is the same as that of the sheet-form optical transmission line 5101 according to the fifteenth embodiment. On the other hand, on the incident side, the signal beam is incident in the z-direction through an end surface of the sheet-form optical transmission line 5701 from the incident side.

In the sheet-form optical transmission line 5701, the optical path length difference generating portion is only the reflecting surface 5103. Therefore, by making the phase difference between the optical path A and the optical path B caused at the reflecting surface 5103 an integral multiple of the signal beam wavelength, the phase difference can be made zero.

Twenty-Second Embodiment

Figure 43A:
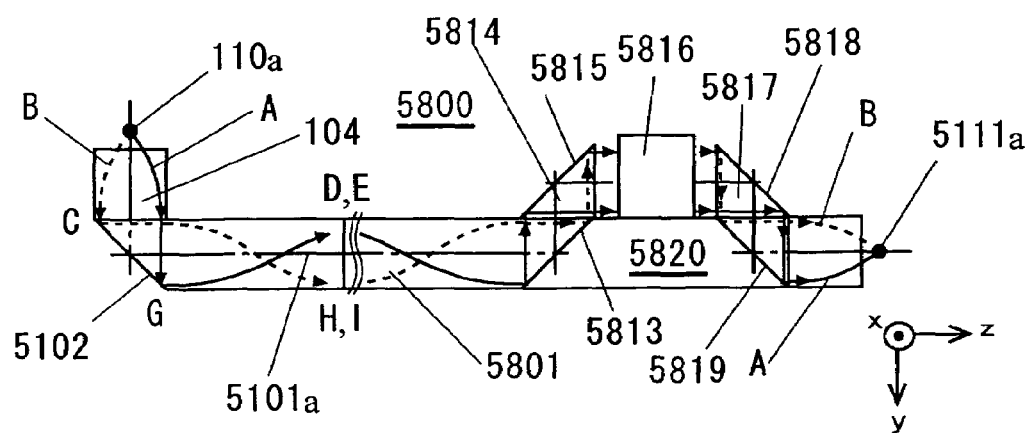
FIG. 43A is a cross-sectional view of apart, where the signal beam is transmitted, of a multi-mode interference 1×2 splitter according to a twenty-second embodiment of the present invention.

Next, a twenty-second embodiment of the present invention will be described with reference to FIG. 43A. In the twenty-second embodiment, descriptions of the same parts as those of the fifteenth embodiment are omitted and only different parts will be described. A multi-mode interference 1×2 splitter 5800 of the twenty-second embodiment has approximately the same structure as the multi-mode interference 1×2 splitter 5100 shown in FIG. 36, and is different in that a structure corresponding to the exit portion is not provided and an intermediate incident and exit portion is present. In the figure, the refractive index distribution is omitted.

The multi-mode interference 1×2 splitter 5800 according to the twenty-second embodiment is provided with an incident portion 5104, a sheet-form optical transmission line 5801 and an intermediate incident and exit portion 5820. The structure of the incident side of the sheet-form optical transmission line 5801 is the same as that of the sheet-form optical transmission line 5101 according to the first embodiment. On the other hand, on the exit side, the signal beam exits in the z-direction from an end surface of the sheet-form optical transmission line 5801 from the exit side.

The intermediate incident and exit portion 5820 includes a reflecting surface 5813, an intermediate exit portion 5814, a processor 5816, an intermediate incident portion 5817 and a reflecting surface 5819.

The reflecting surface 5813 is a reflecting surface disposed at an angle of 545° with respect to the z-x plane so as to bend the signal beam transmitted in the positive direction of the z-direction, in the negative direction of the y-direction.

The intermediate exit portion 5814 is a homogeneous-material prism having a triangle pole shape that extends in the x-direction. The intermediate exit portion 5814 has a reflecting surface 5815 that bends, in the positive direction of the z-direction, the optical axis of the signal beam bent in the negative direction of the y-direction.

The processor 5816 processes the incident signal beam with an optical filter. For example, the processor 5816 is a polarizing filter, a half-wave plate, a quarter-wave plate or an ND filter. Moreover, a liquid crystal element may be disposed. In this case, the processor 5816 functions as an optical switch.

The intermediate incident portion 5817 is a homogeneous-material prism having a triangle pole shape that extends in the x-direction. The intermediate incident portion 5817 has a reflecting surface 5818 that bends, in the positive direction of the y-direction, the signal beam transmitted in the z-direction.

The reflecting surface 5819 is a reflecting surface disposed at an angle of 45° with respect to the z-x plane so as to bend the signal beam incident in the positive direction of the y-direction, in the positive direction of the z-direction.

In the above structure, the signal beam oscillated from the light emitting point 5110*a* is transmitted similarly to that in the fifteenth embodiment to reach the reflecting surface 5813. The optical axis of the signal beam is bent in the negative direction of the y-direction by the reflecting surface 5813. Further, the signal beam is reflected at the reflecting surface 5815 of the intermediate exit portion 5814 to be bent in the positive direction of the z-direction. The optical axis of the signal beam bent in the positive direction of the z-direction undergoes predetermined processing at the processor 5816, and is reflected at the reflecting surface 5818 of the intermediate incident portion 5817 to be bent in the positive direction of the y-direction. The optical axis of the signal beam bent in the positive direction of the y-direction is bent in the positive direction of the z-direction by the reflecting surface 5819. The signal beam exits from an end of the sheet-form optical transmission line in the end.

In the sheet-form optical transmission line 5801, the optical path length difference generating portions are the following three surfaces: the reflecting surface 5102, the reflecting surface 5813 and the reflecting surface 5819. Therefore, by making the sum of the differences in optical path length between the optical path A and the optical path B caused at the three reflecting surfaces an integral multiple of the signal beam wavelength, the overall phase difference between the optical path A and the optical path B can be made zero.

Moreover, by making zero the sum of the differences in optical path length between the optical path A and the optical path B caused at the three reflecting surfaces, the overall phase difference between the optical path A and the optical path B can be made zero.

Twenty-Third Embodiment

Figure 43B:
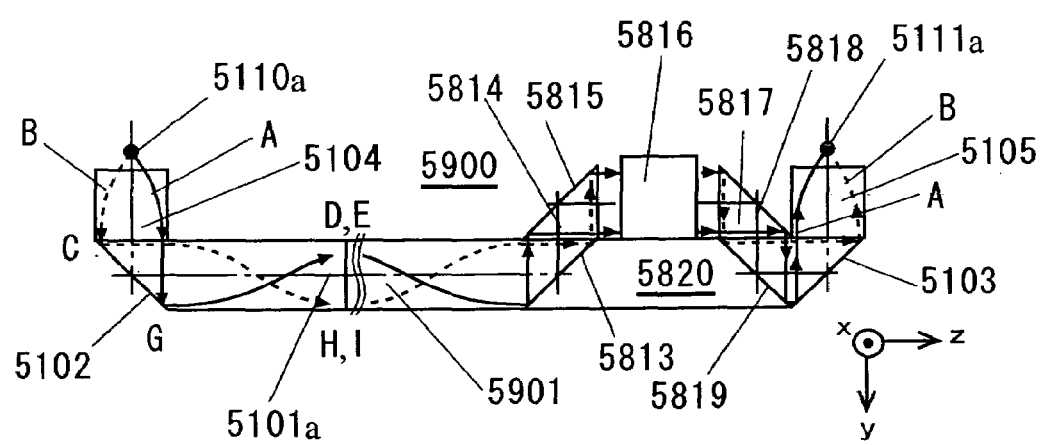
FIG. 43B is across-sectional view of apart, where the signal beam is transmitted, of a multi-mode interference 1×2 splitter according to a twenty-third embodiment of the present invention.

Next, a twenty-third embodiment of the present invention will be described with reference to FIG. 43B. In the twenty-third embodiment, descriptions of the same parts as those of the fifteenth embodiment and the twenty-second embodiment are omitted and only different parts will be described. A multi-mode interference 1×2 splitter 5900 according to the twenty-third embodiment has approximately the same structure as the multi-mode interference 1×2 splitter 5800 shown in FIG. 43A, and is different in that the exit portion 5105 is the same as that of the fifteenth embodiment. In the figure, the refractive index distribution is omitted.

In the sheet-form optical transmission line 5901, the optical path length difference generating portions are the following four surfaces: the reflecting surface 5102, the reflecting surface 5813, the reflecting surface 5819 and the reflecting surface 5103. Therefore, by making the sum of the differences in optical path length between the optical path A and the optical path B caused at the four reflecting surfaces an integral multiple of the signal beam wavelength, the overall phase difference between the optical path A and the optical path B can be made zero.

Moreover, by making zero the sum of the differences in optical path length between the optical path A and the optical path B caused at the four reflecting surfaces, the overall phase difference between the optical path A and the optical path B can be made zero.

Other Embodiments

The fifteenth to twenty-third embodiments are not limited to the above-described ones but may be appropriately modified. For example, while the part that causes the phase difference is the reflecting surface in the embodiments, it may be a different structure as long as the optical path length difference can be obtained.

While the light emitting element 5110 is a vertical cavity surface emitting laser in the embodiments, it may be a different element such as an edge emitting type laser. Moreover, the exit portion of a different optical transmission line that transmits the signal beam oscillated from an external light source may be disposed in the position of the light emitting point 5110*a* of the light emitting element 5110.

Moreover, while the light receiving element 5111 and the light receiving element 5112 are photodiodes in the embodiments, they may be different elements such as phototransistors. Moreover, the incident portion of a different optical transmission line for transmitting a signal beam may be disposed in the positions of the light receiving point 5112*a* of the light receiving element 5111.

While the refractive index distribution is a refractive index distribution such that the central refractive index is the highest (highest refractive index $n_{max}$) and the refractive index continuously and centrosymmetrically decreases with distance from the center toward the periphery in the embodiments, the present invention is not limited thereto. For example, it may be a refractive index distribution such that the refractive index stepwisely decreases from the center like a step function.

Further, while in the embodiments, the refractive index is uniform in the directions, other than the y-direction, of the sheet-form optical transmission line to cause the multi-mode interference, in the case of an optical data bus sheet or the like, a desired refractive index distribution may be provided to trap the signal beam in the x-direction. Moreover, the number of optical path length difference generating portions where the optical path length difference is caused may be an arbitrary number.

For example, a structure may be adopted such that a number, m (m=1,2,3, . . . ), of optical path length difference generating portions where the optical path length difference is caused are included and the sum of the optical path length differences caused in the number, m, of optical path length difference generating portions is equal to a natural multiple of the signal beam wavelength.

Moreover, a structure may be adopted such that a number, n (n=2,3,4, . . . ), of optical path length difference generating portions where the optical path length difference is caused are included and the sum of the optical path length differences caused in the number, n, of optical path length difference generating portions is zero.

Moreover, while a parallel beam is incident on the sheet-form optical transmission line through the incident portion in the first and second embodiments, a divergent beam or a convergent beam may be incident, and it is necessary only that symmetry of the signal beam with respect to the central portion of the sheet-form optical transmission line be present.

As described above, the optical devices of the embodiments have the following structures:

(1) An optical transmission line is provided that includes a refractive index distribution in a first direction (the y-direction in the above description) and is capable of transmitting a signal beam in a second direction (the z-direction in the above description) orthogonal to the first direction, along a plurality of optical paths.

(2) At least one of the optical axis of the signal beam incident on the optical transmission line and the optical axis of the signal beam exiting from the optical transmission line is not parallel to the second direction.

(3) The phase difference, at the time of the incidence on the optical transmission line, between the two optical paths, of the plurality of optical paths, incident on the optical transmission line symmetrically to each other with respect to the optical axis of the signal beam and the phase difference, at the time of the exit from the optical transmission line, between the two optical paths are the same.

Since the optical devices according to the embodiments have the structure of (1), the optical transmission line is provided with a refractive index distribution, so that the mode dispersion is suppressed in the signal beam transmitted through the optical transmission line. Consequently, a collapse of the waveform of the transmitted signal beam does not occur, so that gigabit-class high-frequency signal beams can be transmitted in multiple modes.

Since the optical devices according to the embodiments have the structure of (2), the incident portion and the exit portion function as nonparallel incident portions. Therefore, when optical parts such as a laser and a senor are mounted, it is easy to adjust the height between the optical parts and the optical transmission line. Consequently, these optical parts can be easily mounted. Moreover, since optical parts can be directly mounted on the electric purpose substrate, the optical device can be made compact.

Moreover, since the optical devices according to the embodiments have the structure of (3), the light beams transmitted along two optical paths are coupled together without any loss when exiting from the optical transmission line.

In particular, when at least one of the optical axis of the signal beam incident on the optical transmission line and the optical axis of the signal beam exiting from the optical transmission line is orthogonal to the second direction like in the optical devices according to the embodiments, the outside and the optical transmission line can be easily coupled together. For example, when optical parts such as a light emitting element that emits the signal beam that is incident on the optical transmission line and a light receiving element that receives the signal beam having exited from the optical transmission line are coupled to the optical transmission line, the optical parts can be easily mounted.

(Self-Imaging Principle of the Multi-Mode Interference)

Next, the relationship between the structure that compensates for the optical path length difference described in the embodiments and the physical optical path length of the sheet-form optical transmission line necessary for splitting the signal beam based on the self-imaging principle of the multi-mode interference will be described. In this description, for the sake of simplification, a case where one beam is split into two beams by use of the self-imaging principle in the optical device of the fifteenth embodiment will be described as an example.

Figure 44:
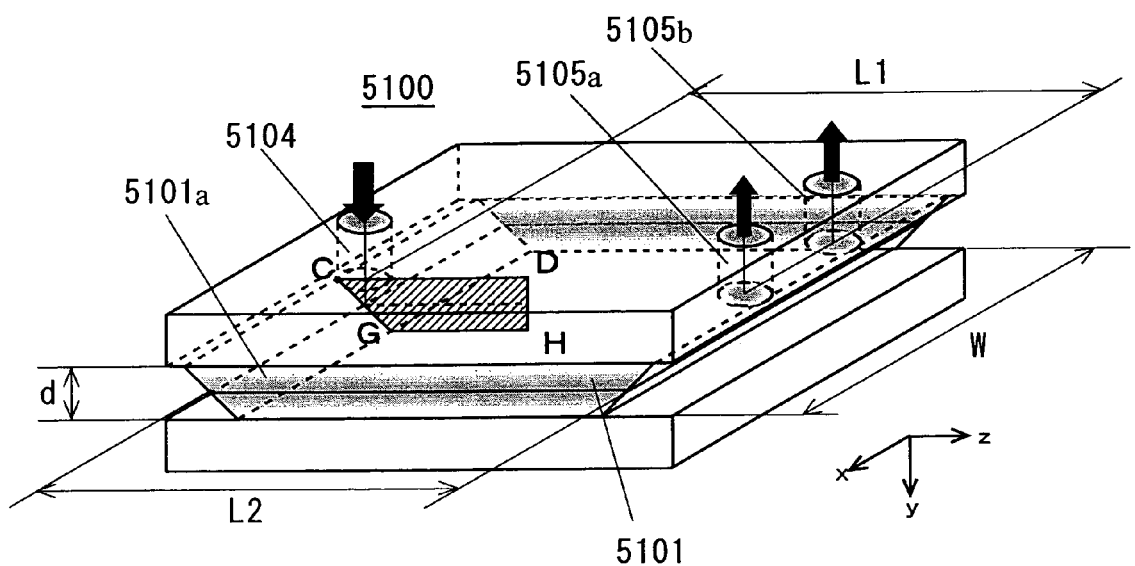
FIG. 44 is a perspective view showing the structure of the multi-mode interference 1×2 splitter according to the fifteenth embodiment of the present invention.
Figure 45:
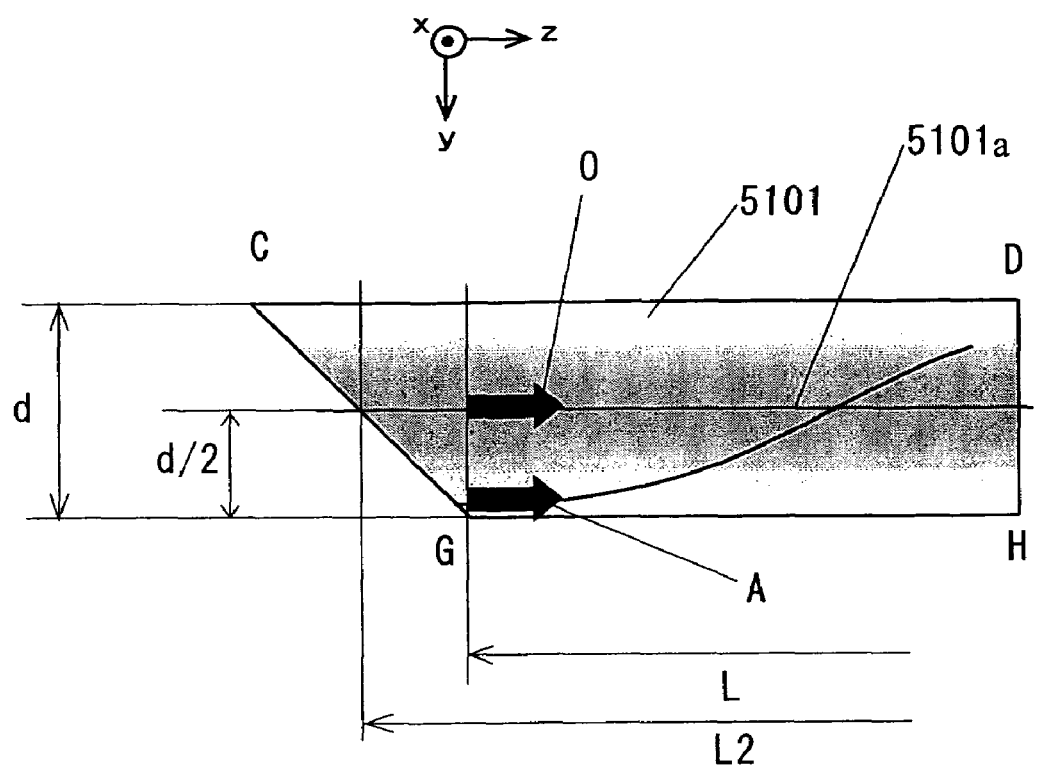
FIG. 45 is a partial cross-sectional view of the sheet-form optical transmission line according to the fifteenth embodiment.

FIG. 44 is a perspective view showing the structure of the multi-mode interference 1×2 splitter 5100 according to the fifteenth embodiment of the present invention. FIG. 45 is a partial cross-sectional view of the sheet-form optical transmission line 5101 according to the fifteenth embodiment. FIG. 45 shows the C-D-G-H plane shown in FIG. 44. In FIGS. 44 and 45, the detailed structure which is described in the fifteenth embodiment is omitted, and only parts required to be newly described will be described.

In FIGS. 44 and 45, the physical optical path length in the z-direction based on the self-imaging principle is L1. Moreover, the physical optical path length from the reflecting surface 5102 to the reflecting surface 5103 of the sheet-form optical transmission line 5101 at the central portion 5101a is L2.

In FIG. 45, in the sheet-form optical transmission line 5101, the refractive index is uniform within a plane parallel to the z-x plane. Therefore, of the optical paths of the signal beam, the optical path O incident on the central portion 5101a travels in a straight line without affected by the refractive index distribution. The refractive index that affects the optical path O while the optical path O is traveling in a straight line is uniform. On the other hand, on the optical path A, the refractive index incessantly changes as the beam travels in the transmission direction. Therefore, in the description of the multi-mode interference, these two optical paths will be separately described.

The signal beam transmitted along the optical path O incident on the central portion 5101a is transmitted within a plane of the uniform effective refractive index $n_0$. Therefore, L1 can be calculated by applying the self-imaging principle. According to the self-imaging principle, it is known that the configuration of the signal beam periodically transmitted with the $L_\pi$ shown in the following (Expression 18) as the unit returns to the same configuration as that of the incident signal beam.

$$L_\pi = \frac{\pi}{\beta_0 - \beta_1} \quad \text{(Expression 18)}$$

On the behavior of the incident signal beam, the calculation based on the self-imaging principle can be performed according to the position, in the x-direction, where the signal beam is incident on the optical transmission line. For example, it is known that like in the fifteenth embodiment, for the signal beam incident on the central position in the x-direction, the same waveform is obtained with ¾ $L_\pi$ as the period.

$$\frac{\pi}{\beta_0 - \beta_1} = \frac{4n_0 W^2}{3\lambda} \quad \text{(Expression 19)}$$

Here, $n_0$ is the effective refractive index, of the 0th-order mode beam excited in the direction of the width, corresponding to the highest refractive index $n_{max}$ at the center, W is the size, in the x-direction, of the sheet-form optical transmission line, and λ is the wavelength of the transmitted signal beam.

As described above, the self-imaging principle is characterized in that the transmission line length of the sheet-form optical transmission line is a function of the difference between the basic mode and the primary mode. Moreover, the self-imaging principle is characterized in that the difference between the basic mode and the primary mode is approximately determined by the wavelength λ of the signal beam, the effective refractive index no and the size W in the direction of the width.

Moreover, according to the self-imaging principle, the position where the signal beam incident on the central position in the x-direction passes through the central position in the x-direction and is condensed so as to be split into a number, N, of beams symmetrically with respect to a plane parallel to the y-z plane is a position shifted by (1/N) ¾ Lπ in the z-direction from a position where the output waveform becomes the same.

From the above, in order that the signal beam incident on the central position of the size W, in the x-direction, of the sheet-form optical transmission line 5101 passes through the central position in the x-direction and is condensed so as to be split into a number, N, of beams symmetrically with respect to a plane parallel to the y-z plane, it is necessary that the physical optical path length L1 satisfy the following (Expression 20):

$$L_1 = p * \frac{4}{3}L_\pi \pm \frac{1}{N} * \frac{4}{3}L_\pi = \left(p \pm \frac{1}{N}\right)\frac{4}{3}L_\pi = \left(p \pm \frac{1}{N}\right)\frac{n_0 W^2}{\lambda} \quad \text{(Expression 20)}$$

Here, since p (P≧0) and N (N≧1) are both integers and L1 is a positive number, a relationship where (p±1/N) is a positive number is satisfied.

Calculating L1 when the number of splits is two (when N=2), (Expression 20) is modified to obtain the following (Expression 21):

$$L_1 = \left(p \pm \frac{1}{2}\right)\frac{n_0 W^2}{\lambda} = (2p+1)\frac{n_0 W^2}{2\lambda} \quad (p = 0, 1, 2, \ldots) \quad \text{(Expression 21)}$$

As is apparent from (Expression 21), in the case of the fifteenth embodiment, the signal beam can be split by providing the exit portion in a position corresponding to the period which is an odd multiple (1,3,5, . . . ) of $n_0 W^2/(2\lambda)$ with $n_0 W^2/(2\lambda)$ as the unit.

On the other hand, the optical path A incident on a position away from the center is transmitted while meandering in the sheet-form optical transmission line 5101 by being affected by the refractive index distribution. Therefore, the refractive index that affects the signal beam transmitted along the optical path A is not uniform.

On the optical path A, when traveling in a direction away from the central portion 5101a, the signal beam travels in a direction that gradually increases the angle from the y-direction, because it always travels from where the refractive index is high to where the refractive index is low. That is, when traveling in a direction away from the central portion 5101a, the optical path A approaches so as to become parallel to the z-direction with distance from the central portion 5101a.

Conversely, on the optical path A, when traveling in a direction that approaches the central portion 5101a, the signal beam travels in a direction that gradually decreases the angle from the y-direction, because it always travels from where the refractive index is low to where the refractive index is low. That is, when traveling in a direction that approaches the central portion 5101a, the optical path A approaches so as to become vertical to the z-direction as it approaches the central portion 5101a. By repeating this action, the optical path A travels while meandering.

As described above, the signal beam on the optical path A always travels at a finite angle with respect to the y-direction. Consequently, the speed of the signal beam transmitted along the optical path A increases when the signal beam travels in a direction away from the central portion 5101a. Conversely, the speed of the signal beam transmitted along the optical path A decreases when the signal beam travels in a direction that approaches the central portion 5101a.

The refractive index distribution of the sheet-form optical transmission line 5101 is expressed by a quadratic function that satisfies the above-mentioned (Expression 9). By appropriately setting the refractive index distribution, the speed component, in the z-direction, of the optical path A is the same as the speed component, in the z-direction, of the optical path O.

That the speed component of the beam in the z-direction is constant means that there is no phase disturbance in the z-direction. Therefore, when the sheet-form optical transmission line 5101 is structured so as to satisfy (Expression 21), the signal beam transmitted along the optical path A behaves similarly to the signal beam transmitted along the optical path O.

As described above, as long as the physical optical path length L1 satisfies (Expression 21), the signal beam transmitted along the optical path A is condensed so as to be split into two beams in the x-direction based on the self-imaging principle. For this reason, by providing the exit portion in the condensation position calculated based on (Expression 21), the signal beam can be made to exit so as to be split into two beams.

However, in order that the intensity distributions of the incident signal beam and the exiting signal beam completely match with each other, it is necessary that the previously-described phase differences caused at the reflecting surface 5102 and the reflecting surface 5103 be zero.

The physical optical path length of the sheet-form optical transmission line 5101 where the phase difference is zero is as obtained by (Expression 12). Obtaining L2 from the condition of (Expression 12), the following (Expression 22) which is (Expression 12) to which d is added is obtained:

$$L_2 = \frac{2\pi}{g}j + d \quad (j = 0, 1, 2, 3, \ldots) \quad \text{(Expression 22)}$$

Table 2 shows results of concrete calculations of the relationship between the shortest physical optical path length L1 where the signal beam can be split into two beams based on the self-imaging principle of the multi-mode interference and the shortest physical optical path length L2 that compensates for the phase differences caused at the reflecting surfaces in the sheet-form optical transmission line 5101. Here, the refractive index $n_0=1.5$, the wavelength $\lambda=0.85$ μm, and the refractive index distribution coefficient g is set so as to decrease by approximately 1% from the center at d/2. Moreover, of the L1 cells, 1× and 2× show the separation widths W, in the x-direction, of the sheet-form optical transmission line which widths W are once and twice the thickness d, in the y-direction, of the sheet-form optical transmission line 5101 in the exit portion.

TABLE 2

| | | Thickness, in the y-direction, of the sheet-form optical transmission line d [μm] | | | |
|---|---|---|---|---|---|
| | | 50 | 100 | 200 | 1000 |
| Refractive index distribution coefficient g [mm$^{-1}$] | | 5.6 | 2.8 | 1.414 | 0.28 |
| Shortest physical optical path length L2 that compensates for the phase differences caused at the reflecting surfaces L2 [mm] | | 1.17 | 2.34 | 4.69 | 23.2 |
| Shortest physical optical path length L1 where the signal beam can be split into two beams by the multi-mode interference L1 [mm] | 1× | 8.8 | 35.3 | 141 | 352 |
| | 2× | 35.2 | 141 | 565 | 14118 |

As is apparent from Table 2, to simultaneously satisfy the optical path length L2 and the optical path length L1, a value that is an integral multiple of L2 and an odd multiple of L1 is adopted in the sheet-form optical transmission line 5101.

However, it is difficult that these completely coincide with each other. Therefore, it is necessary to make a fine adjustment by use of L1 where the permissible width for the length in the transmission direction is larger than L2. As is understood from Table 2, since L2 takes a much lower value than L1, in order that these match with each other, L2 is adjusted and a physical optical path length substantially coinciding with L1 is adopted. For example, by multiplying L2 substantially by 8, L1 necessary for splitting only the width d into two beams in the x-direction is obtained.

As described above, in the optical devices of the embodiments, the physical optical path length that compensates for the phase difference of the signal beam incident from a direction orthogonal to the refractive index distribution and the physical optical path length where the signal beam can be split based on the self-imaging principle under the condition of the self-imaging principle of the multi-mode interference coincide with each other. Consequently, when the incident signal beam exits so as to be split into two beams by the multi-mode interference, the incident and exit portions and the sheet-form optical transmission line can be coupled together without any loss.

As described above, in the optical devices of the embodiments, the physical optical path length that compensates for the phase differences caused at the reflecting surfaces and the physical optical path length based on the condition of the self-imaging principle of the multi-mode interference coincide with each other. Consequently, when the incident signal beam exits so as to be split into two beams by the multi-mode interference, the incident and exit portions and the sheet-form optical transmission line can be coupled together without any loss.

While an example in which the signal beam is split into two beams in symmetrical positions, in the x-direction, of the sheet-form optical transmission line 5101 is shown in the above example, the present invention is not limited to the embodiment.

FIGS. 46A to 46D are schematic views showing examples of the input and output structure of the optical device. FIGS. 46A to 46D are all views viewed from a plane parallel to the z-x plane of the optical device.

Figure 46A:
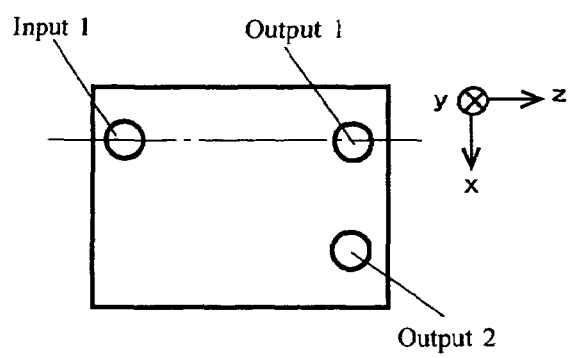
FIGS. 46A to 46D are schematic views each showing an example of the input and output structure of the optical device.

FIG. 46A is a schematic view of an optical device, using the multi-mode interference, of another embodiment. The optical device described in FIG. 46A is a splitter where the signal beam incident through one incident portion Input 1 is split by the multi-mode interference and exits from two exit portions Output 1 and Output 2. The incident portion Input 1 is disposed in a position away from the central position, in the z-direction, of the optical device. The exit portion Output 1 is disposed on a line passing through the incident portion Input 1 and parallel to the z-axis. The exit portion Output 2 is disposed at a distance in the x-direction from the exit portion Output 1.

Figure 46B:
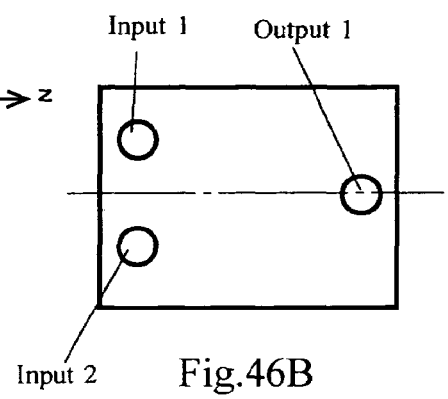

FIG. 46B is a schematic view of an optical device, using the multi-mode interference, of another embodiment. The optical device described in FIG. 46B is a combiner in which the signal beams incident through two incident portions Input 1 and Input 2 are combined together by the multi-mode interference and exit from one exit portion Output 1. The two input portions Input 1 and Input 2 are disposed symmetrically with respect to a line passing through the center in the x-direction and parallel to the z-axis. The exit portion Output 1 is disposed on the line passing through the center in the x-direction and parallel to the z-axis.

Figure 46C:
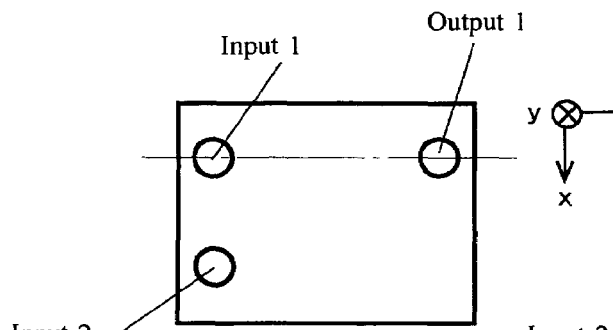

FIG. 46C is a schematic view of an optical device, using the multi-mode interference, of another embodiment. The optical device described in FIG. 46C is a combiner in which the signal beams incident through two incident portions Input 1 and Input 2 are combined together by the multi-mode interference and exit from one exit portion Output 1. The two input portions Input 1 and Input 2 are disposed symmetrically with respect to the line passing through the center in the x-direction and parallel to the z-axis. The exit portion Output 1 is disposed on the line passing through the input portion Input 1 and parallel to the z-axis.

Figure 46D:
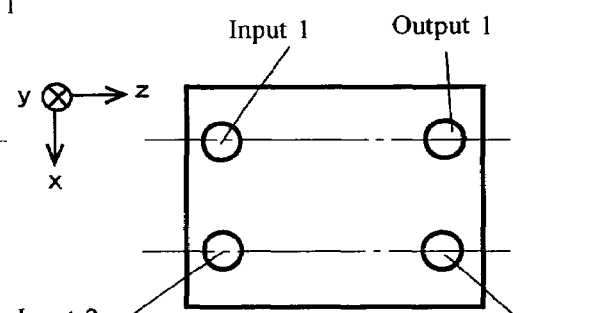

FIG. 46D is a schematic view of an optical device, using the multi-mode interference, of another embodiment. The optical device described in FIG. 46D is a combiner in which the signal beams incident through two incident portions Input 1 and Input 2 are combined together and split by the multi-mode interference and exit from two exit portions Output 1 and Output 2. The two input portions Input 1 and Input 2 are disposed symmetrically with respect to the line passing through the center in the x-direction and parallel to the z-axis. The two exit portions Output 1 and Output 2 are disposed symmetrically with respect to the line passing through the center in the x-direction and parallel to the z-axis.

The condition of the self-imaging principle of the multi-mode interference differs among the optical devices described in FIGS. 46A to 46D. Therefore, the condition of the self-imaging principle of the multi-mode interference is changed and the physical optical path length is adjusted. By doing this, in the optical devices described in FIGS. 46A to 46D, the physical optical path length that compensates for the phase difference caused at the reflecting surfaces and the physical optical path length based on the condition of the self-imaging principle of the multi-mode interference coincide with each other. Consequently, when the incident signal beam is split by the multi-mode interference and made to exit, the incident and exit portions and the sheet-form optical transmission line can be coupled together without any loss.

Further, the present invention is not limited to the above-described incident and exit structure of the optical device, but is applicable to an optical device that has a number, M (M=1,2,3, . . . ), of incident portions for making a signal beam incident on the sheet-form optical transmission line and a number, N (N=1,2,3, . . . ), of exit portions for making a signal beam exit from the sheet-form optical transmission line, and couples the incident and exit portions by the multi-mode interference.

(1) A sheet-form optical transmission line including a refractive index distribution in a first direction, being capable of transmitting the signal beam in a second direction orthogonal to the first direction, and being capable of trapping the signal beam in the first direction, (2) a number, M (M=1,2,3, . . . ), of incident portions for making the signal beam incident on the optical transmission line, (3) a number, N (N=1,2,3, . . . ), of exit portions for making the signal beam exit from the optical transmission line are provided, and (4) the number, M, of incident portions and the number, N, of exit portions include at least one nonparallel incident and exit portion that is coupled to the sheet-form optical transmission line in a direction where the optical axis of the signal beam transmitted inside is not parallel to the second direction.

(5) Between two optical paths incident on the sheet-form optical transmission line symmetrically to each other with respect to the optical axis of the signal beam, of a plurality of optical paths of the signal beam transmitted between the nonparallel incident and exit portion and the corresponding incident portion or exit portion, the phase difference at the time of the incidence on the sheet-form optical transmission line and the phase difference at the time of the exit from the sheet-form optical transmission line are the same.

(6) The number, M, of incident portions and the number, N, of exit portions are all disposed in positions satisfying the condition of the self-imaging principle of the multi-mode interference.

Since the multi-mode interference 1×2 splitter according to the embodiment has the structure of (1), the mode dispersion is suppressed in the signal beam transmitted through the optical transmission line. Consequently, a collapse of the waveform of the transmitted signal beam does not occur, so that gigabit-class high-frequency signal beams can be transmitted in multiple modes.

Since the multi-mode interference 1×2 splitter according to the embodiment has the structure of (4), when optical parts such as a laser and a senor are mounted, it is easy to adjust the height between the optical parts and the optical transmission line. Consequently, these optical parts can be easily mounted. Moreover, since optical parts can be directly mounted on the electric purpose substrate, the optical device can be made compact.

Moreover, since the multi-mode interference 1×2 splitter according to the embodiment has the structure of (5), the light beams transmitted along two optical paths are coupled together without any loss when exiting from the optical transmission line.

Moreover, since the multi-mode interference 1×2 splitter according to the embodiment has the structures of (2), (3) and (6), the signal beams incident through the incident portions exit from the exit portions by the multi-mode interference.

Twenty-Fourth Embodiment

Figure 47A:
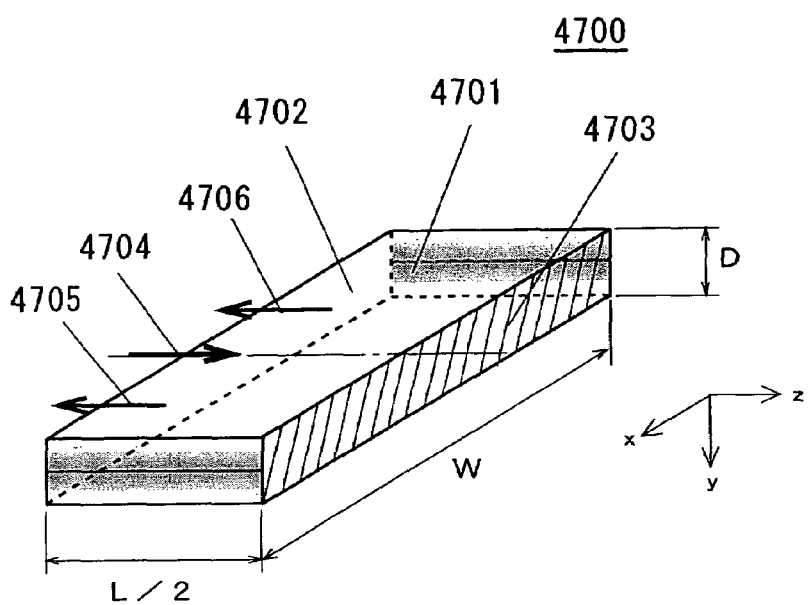
FIG. 47A is a perspective view showing the general outline of a graded index slab waveguide of an optical device that splits one beam into two beams according to a twenty-fourth embodiment of the present invention.

FIG. 47A is a perspective view showing the general outline of a graded index slab waveguide of an optical device that splits one beam into two beams according to a twenty-fourth embodiment of the present invention. The optical device according to the twenty-fourth embodiment comprises as a main element a graded index slab waveguide 4701 that transmits beams as shown in FIG. 47A. The graded index slab waveguide 4701 is, as shown in FIG. 47A, a sheet-form multi-mode optical transmission line that extends on the x-z plane. The graded index slab waveguide 4701 has a refractive index distribution such that the highest refractive index $n_{max}$ is provided at the center in the direction of the thickness and the refractive index does not increase with distance from the center. The graded index slab waveguide 4701 has a uniform refractive index in the direction of the width and has no refractive index. The graded index slab waveguide 4701 has an incident and exit surface 4702 and a reflecting surface 4703.

The incident and exit surface 4702 is opposed to all of an incident portion (not shown) that makes an incident beam 4704 incident on the central position in the direction of the width, a light receiving portion (not shown) that receives an exiting beam 4705 exiting from a position symmetrical with respect to the center in the direction of the width and a light receiving portion (not shown) that receives an exiting beam 4706. Moreover, the reflecting surface 4703 is a total reflection surface formed by evaporating a metal such as aluminum onto an end surface. The reflecting surface 4703 totally reflects all of the incident signal beam.

In the twenty-fourth embodiment, in the graded index slab waveguide 4701, the slab length L/2 substantially coincides with exiting beam $n_0 \times W_0^2/(4\lambda)$, and the distance D1 between the exiting beam 4705 and the exiting beam 4706 substantially coincides with $W_0/2$. Here, n0 is the effective refractive index of the 0th-order mode beam excited in the direction of the width.

The graded index slab waveguide 4701 has a slab length half that of the graded index slab waveguide 101 described in the optical device that splits one beam incident on the central position into two beams which optical device is described in the first embodiment. Therefore, the signal beam incident on the graded index slab waveguide 4701 through the incident portion propagates along a length equal to the optical path described in the first embodiment by propagating in the positive direction of the z-direction, being reflected at the reflecting surface 4703 and propagating in the negative direction of the z-direction. Consequently, the signal beam forms images having the same profile as the incident beam in positions of the exiting beam 4705 and the exiting beam 4706 based on the self-imaging principle of the multi-mode interference. The formed images are outputted as the exiting beams.

As described above, according to the optical device of the twenty-fourth embodiment, an optical splitter that splits an incident beam incident on the central position in the direction of th width into two beams symmetrically with respect to the center in the direction of the width can be realized with a graded index slab waveguide having a slab length half that of the first embodiment. Moreover, the optical device according to the twenty-fourth embodiment is capable of making the incident beam incident on the central position in the direction of the width exit from the same surface on which the incident beam is incident, as two exiting beams into which the incident beam is split symmetrically with respect to the center in the direction of the width.

Figure 47B:
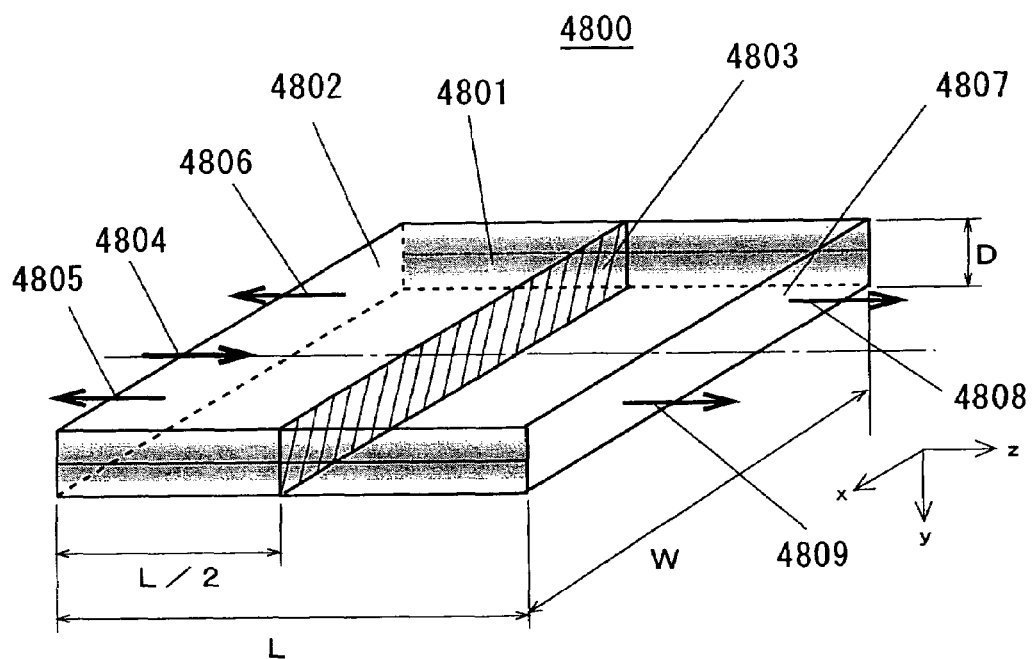
FIG. 47B is a perspective view showing the general outline of a graded index slab waveguide of an optical device that splits one beam into two beams according to a modification of the twenty-fourth embodiment of the present invention.

FIG. 47B is a perspective view showing the general outline of a graded index slab waveguide of an optical device that splits one beam into two beams according to a modification of the twenty-fourth embodiment of the present invention. The optical device according to the modification of the twenty-fourth embodiment comprises as a main element a graded index slab waveguide 4801 that transmits beams as shown in FIG. 47B. The graded index slab waveguide 4801 is, as shown in FIG. 47B, a sheet-form multi-mode optical transmission line that extends on the x-z plane. The graded index slab waveguide 4801 has a refractive index distribution such that the highest refractive index $n_{max}$ is provided at the center in the direction of the thickness and the refractive index does not increase with distance from the center. The graded index slab waveguide 4801 has a uniform refractive index in the direction of the width and has no refractive index. The graded index slab waveguide 4801 has an incident surface 4802, a reflecting surface 4803 and an exit surface 4807.

The incident surface 4802 is opposed to all of an incident portion (not shown) that makes an incident beam 4804 incident on the central position in the direction of the width, a light receiving portion (not shown) that receives an exiting beam 4805 exiting from a position symmetrical with respect to the center in the direction of the width and a light receiving portion (not shown) that receives an exiting beam 4806. The exit surface 4807 is opposed to all of a light receiving portion (not shown) that receives an exiting beam 4808 exiting from a position symmetrical with respect to the center in the direction of the width and a light receiving portion (not shown) that receives an exiting beam 4809. Moreover, the reflecting surface 4803 is a half mirror formed by evaporating a metal such as aluminum onto an end surface. The reflecting surface 4803 transmits half of the incident signal beam and reflects the remainder of the incident signal beam.

In the modification of the twenty-fourth embodiment, in the graded index slab waveguide 4801, the slab length L substantially coincides with $n_0 \times W_0^2/(2\lambda)$, and the distance D1 between the exiting beam 4805 and the exiting beam 4806 substantially coincides with $W_0/2$. Moreover, the reflecting surface 4803 is formed in a position where the slab length L is just half the length. Here, no is the effective refractive index of the 0th-order mode beam excited in the direction of the width.

By the above structure, the signal beam incident on the graded index slab waveguide 4801 through the incident portion propagates in the positive direction of the z-direction, and part thereof is reflected at the reflecting surface 4803 and the remainder thereof is transmitted. The reflected signal beam exits from the incident surface 4802 as the exiting beam 4805 and the exiting beam 4806 based on the self-imaging principle of the multi-mode interference as described in the twenty-fourth embodiment. On the other hand, the transmitted signal beam exits as the exiting beam 4808 and the exiting beam 4809 based on the self-imaging principle of the multi-mode interference completely similarly to the first embodiment.

As described above, according to the optical device of the modification of the twenty-fourth embodiment, an optical splitter that splits the incident beam incident on the central position in the direction of the width into four beams symmetrically with respect to the center in the direction of the width can be realized with a graded index slab waveguide having the same slab length as the first embodiment. Moreover, the optical device according to the modification of the twenty-fourth embodiment is capable of making the incident beam incident on the central position in the direction of the width exit in two different directions as two exiting beams into which the incident beam is split symmetrically with respect to the center in the direction of the width.

INDUSTRIAL APPLICABILITY

The present invention is suitable for optical devices such as an optical splitter, an optical combiner, an optical demultiplexer, an optical multiplexer, a star coupler and an optical switch used for high-speed multi-mode optical communication. Moreover, the present invention is suitable for an optical straight sheet bus, an optical cross sheet bus and the like used for high-speed multi-mode optical wiring.

The invention claimed is:

1. An optical device that connects, by a signal beam, between an externally inputted input signal and an output signal to be outputted, the optical device comprising:
   a sheet-form optical transmission line having a refractive index distribution such that a highest refractive index part is provided in a direction of a thickness of the optical transmission line and a refractive index does not increase with distance from the highest refractive index part in the direction of the thickness of the optical transmission line,
   wherein a signal beam corresponding to the input signal is made incident on the optical transmission line as an incident beam,
   wherein inside the optical transmission line, the incident beam is transmitted, in a direction of a length of the optical transmission line that is orthogonal to the direction of the thickness of the optical transmission line, in multiple modes having a plurality of eigenmodes in a direction of a width of the optical transmission line that is orthogonal to both the direction of the length of the optical transmission line and the direction of the thickness of the optical transmission line, and an exiting beam is generated by the plurality of eigenmodes interfering with each other in the direction of the length of the optical transmission line,
   wherein the exiting beam is made to exit from the optical transmission line, and the output signal corresponding to the exiting beam is outputted,
   wherein the optical transmission line has a refractive index distribution such that a central position in the direction of the thickness of the optical transmission line has the highest refractive index and the refractive index does not increase with distance from the central position, and
   wherein the optical transmission line is made of polysilane, and the refractive index distribution is provided by an oxygen concentration distribution when the polysilane is cured.

2. An optical device according to claim 1, wherein the optical transmission line has a size, in the direction of the length of the optical transmission line, expressed by a function of a difference between a propagation constant of a 0th-order mode excited in the direction of the width of the optical transmission line and a propagation constant of a primary mode.

3. An optical device according to claim 1, wherein the optical transmission line has a size, in the direction of the length of the optical transmission line, expressed by a function of a basic mode width in the direction of the width of the optical transmission line, the highest refractive index in the direction of the thickness of the optical transmission line, and a wavelength of a beam transmitted in the multi-mode optical transmission line.

4. An optical device according to claim 1, wherein the refractive index distribution changes substantially along a quadratic function.

5. An optical device according to claim 1, wherein the input signal is an electric signal, and an incident portion is provided that converts the electric signal into the signal beam and makes the signal beam incident on the optical transmission line as the incident beam.

6. An optical device according to claim 5, wherein the incident portion has a plurality of light emitting portions disposed in an array in the direction of the width of the optical transmission line.

7. An optical device according to claim 1, wherein the input signal is a signal beam, and an incident portion is provided that makes the signal beam incident on the optical transmission line as the incident beam.

8. An optical device according to claim 1, wherein the output signal is an electric signal, and an exit portion is provided that receives the signal beam as the exiting beam having exited from the optical transmission line and converts the signal beam into the electric signal.

9. An optical device according to claim 8, wherein the exit portion has a plurality of light receiving portions disposed in an array in the direction of the width of the optical transmission line.

10. An optical device according to claim 1, wherein the output signal is a signal beam, and an exit portion is provided that makes the signal beam exit from the optical transmission line as the exiting beam.

11. An optical device according to claim 1, wherein the optical device is a 1×N optical splitting device that is capable of receiving at least one input signal and outputting the input signal as a number, N (N=1,2,3, ... ), of output signals, and wherein the optical transmission line includes:
an incident surface for making the incident beam incident; and
an exit surface for making the exiting beam exit,
the size in the direction of the length of the optical transmission line is a value that is substantially an integral multiple of the following expression when the basic mode width in the direction of the width of the optical transmission line is $W_0$, an effective refractive index of a 0th-order mode beam excited in the direction of the width of the optical transmission line is $n_0$ and the wavelength of the beam transmitted in the multi-mode optical transmission line is $\lambda$, and
one incident beam is made incident on a center in the direction of the width of the optical transmission line on the incident surface and a number, N, of exiting beams are generated symmetrically with respect to the center in the direction of the width of the optical transmission line on the exit surface:

$$\frac{1}{N} \cdot \frac{n_0 W_0^2}{\lambda}.$$

12. An optical device according to claim 1, wherein the optical device is an N×1 optical combining device that is capable of receiving a number, N (N=1,2,3, ... ), of input signals and outputting the input signals as at least one output signal, and wherein the optical transmission line includes:
an incident surface for making the incident beam incident; and
an exit surface for making the exiting beam exit,
the size in the direction of the length of the optical transmission line is a value that is substantially an integral multiple of the following expression when the basic mode width in the direction of the width of the optical transmission line is $W_0$, an effective refractive index of a 0th-order mode beam excited in the direction of the width of the optical transmission line is $n_0$ and the wavelength of the beam transmitted in the multi-mode optical transmission line is $\lambda$, and
a number, N, of incident beams all having the same wavelength $\lambda$ are made incident symmetrically with respect to a center in the direction of the width of the optical transmission line on the incident surface and one exiting beam is generated at the center in the direction of the width of the optical transmission line on the exit surface:

$$\frac{1}{N} \cdot \frac{n_0 W_0^2}{\lambda}.$$

13. An optical device according to claim 1, wherein the optical device is a straight sheet bus that is capable of receiving a number, N (N=1,2,3, ... ), of input signals and outputting the input signals as a number, N, of output signals corresponding one-to-one to the input signals, and wherein the optical transmission line includes:
an incident surface for making the incident beam incident; and
an exit surface for making the exiting beam exit,
the size in the direction of the length of the optical transmission line is a value that is substantially an integral multiple of the following expression when the basic mode width in the direction of the width of the optical transmission line is $W_0$, an effective refractive index of a 0th-order mode beam excited in the direction of the width of the optical transmission line is $n_0$ and the wavelength of the beam transmitted in the multi-mode optical transmission line is $\lambda$, and
a number, N, of incident beams all having the same wavelength $\lambda$ are made incident on given positions in the direction of the width of the optical transmission line on the incident surface and a number, N, of exiting beams corresponding one-to-one to the number, N, of incident beams are generated in positions, on the exit surface, whose positions in the direction of the width of the optical transmission line are the same as incident positions of the incident beams:

$$\frac{8 n_0 W_0^2}{\lambda}.$$

14. An optical device according to claim 1, wherein the optical device is a cross sheet bus that is capable of receiving a number, N (N=1,2,3, ... ), of input signals and outputting the input signals as a number, N, of output signals corresponding one-to-one to the input signals, and wherein the optical transmission line includes:

an incident surface for making the incident beam incident; and an exit surface for making the exiting beam exit, a size in the direction of the length of the optical transmission line is a value that is substantially an odd multiple of the following expression when the basic mode width in the direction of the width of the optical transmission line is $W_0$, an effective refractive index of a 0th-order mode beam excited in the direction of the width of the optical transmission line is $n_0$ and the wavelength of the beam transmitted in the multi-mode optical transmission line is $\lambda$, and a number, N, of incident beams all having the same wavelength $\lambda$ are made incident on given positions in the direction of the width of the optical transmission line on the incident surface and a number, N, of exiting beams corresponding one-to-one to the number, N, of incident beams are generated in positions, on the exit surface, whose positions in the direction of the width of the optical transmission line are symmetrical to incident positions of the incident beams with respect to the center in the direction of the width of the optical transmission line:

$$\frac{4n_0 W_0^2}{\lambda}.$$

15. An optical device according to claim 1, wherein the optical device is a star coupler that receives a number, N (N=1,2,3, . . . ), of input signals and outputs the input signals as a number, N, of output signals corresponding to the input signals, and wherein the optical transmission line includes:

an incident surface for making the incident beam incident; and an exit surface for making the exiting beam exit, a size in the direction of the length of the optical transmission line is substantially a value of the following expression when the basic mode width in the direction of the width of the optical transmission line is $W_0$, an effective refractive index of a 0th-order mode beam excited in the direction of the width of the optical transmission line is $n_0$ and the wavelength of the beam transmitted in the multi-mode optical transmission line is $\lambda$, and a number, N, of incident beams all having the same wavelength $\lambda$ are made incident on predetermined positions in the direction of the width of the optical transmission line on the incident surface and a number, N, of exiting beams are generated for any one of the incident beams in positions, on the exit surface, whose positions in the direction of the width of the optical transmission line are symmetrical to incident positions of the incident beams with respect to the center in the direction of the width of the optical transmission line:

$$\left(p \pm \frac{1}{N}\right)\frac{4n_0 W_0^2}{\lambda},$$

wherein p is an integer that makes the value inside the parentheses positive.

16. An optical device according to claim 15, wherein the optical device is a star coupler that receives a number, $N_{EVEN}$ ($N_{EVEN}$=2,4,6, . . . ), of input signals and outputs the input signals as a number, $N_{EVEN}$, of output signals corresponding to the input signals, and wherein the optical transmission line makes a number, $N_{EVEN}$, of incident beams all having the same wavelength $\lambda$ incident on positions symmetrical with respect to the center in the direction of the width of the optical transmission line on the incident surface.

17. An optical device according to claim 15, wherein the optical device is a star coupler that receives a number, $N_{ODD}$ ($N_{ODD}$=1,3,5, . . . ), of input signals and outputs the input signals as a number, $N_{ODD}$, of output signals corresponding to the input signals, and wherein the optical transmission line makes a number, $N_{ODD}$, of incident beams all having the same wavelength $\lambda$ incident on positions asymmetrical with respect to the center in the direction of the width of the optical transmission line on the incident surface.

18. An optical device according to claim 1, wherein the optical device is a two-way straight sheet bus that is capable of receiving a number, N (N=1,2,3, . . . ), of input signals and outputting the input signals as a number, N, of output signals corresponding one-to-one to the first input signals, and is capable of receiving a number, M (M=1,2,3, . . . ), of input signals and outputting the input signals as a number, M, of output signals corresponding one-to-one to the input signals, and wherein the optical transmission line includes:

a first surface formed at one end in the direction of the length of the optical transmission line; and a second surface formed at another end in the direction of the length of the optical transmission line, a size in the direction of the length of the optical transmission line is a value that is substantially an integral multiple of the following expression when the basic mode width in the direction of the width of the optical transmission line is $W_0$, an effective refractive index of a 0th-order mode beam excited in the direction of the width of the optical transmission line is $n_0$ and the wavelength of the beam transmitted in the multi-mode optical transmission line is $\lambda$, a number, N, of incident beams all having the same wavelength $\lambda$ are made incident on given positions in the direction of the width of the optical transmission line on the first surface and a number, N, of exiting beams corresponding one-to-one to the number, N, of incident beams are generated in positions, on the second surface, whose positions in the direction of the width of the optical transmission line are the same as incident positions of the incident beams, and a number, M, of incident beams all having the same wavelength $\lambda$ as the incident beams on the first surface are made incident on given positions in the direction of the width of the optical transmission line on the second surface and a number, M, of exiting beams corresponding one-to-one to the number, M, of incident beams are generated in positions, on the first surface, whose positions in the direction of the width of the optical transmission line are the same as incident positions of the incident beams:

$$\frac{8n_0 W_0^2}{\lambda}.$$

19. An optical device according to claim 1, wherein the optical device is a two-way cross sheet bus that is capable of receiving a number, N (N=1,2,3, . . . ), of first input signals and outputting the input signals as a number, N, of first output signals corresponding one-to-one to the first input signals, and is capable of receiving a number, M (M=1,2, 3, . . . ), of second input signals and outputting the input signals as a number, M, of output signals corresponding one-to-one to the second input signals, and wherein the optical transmission line includes:
a first surface formed at one end in the direction of the length of the optical transmission line; and
a second surface formed at another end in the direction of the length of the optical transmission line,
a size in the direction of the length of the optical transmission line is a value that is substantially an odd multiple of the following expression when the basic mode width in the direction of the width of the optical transmission line is $W_0$, an effective refractive index of a 0th-order mode beam excited in the direction of the width of the optical transmission line is $n_0$ and the wavelength of the beam transmitted in the multi-mode optical transmission line is $\lambda$,
a number, N, of incident beams all having the same wavelength $\lambda$ are made incident on given positions in the direction of the width of the optical transmission line on the first surface and a number, N, of exiting beams corresponding one-to-one to the number, N, of incident beams are generated in positions, on the second surface, whose positions in the direction of the width of the optical transmission line are symmetrical to incident positions of the incident beams with respect to the center in the direction of the width of the optical transmission line, and
a number, M, of incident beams all having the same wavelength $\lambda$ are made incident on given positions in the direction of the width of the optical transmission line on the second surface and a number, M, of exiting beams corresponding one-to-one to the number, M, of incident beams are generated in positions, on the first surface, whose positions in the direction of the width of the optical transmission line are symmetrical to incident positions of the incident beams with respect to the center in the direction of the width of the optical transmission line:

$$\frac{4n_0 W_0^2}{\lambda}.$$

20. An optical device according to claim 1, wherein the optical transmission line includes: a reflecting surface that is formed at one end in the direction of the length of the optical transmission line and bends an optical path of the incident beam incident in a direction parallel to the direction of the thickness of the optical transmission line, substantially 90 degrees in the direction of the length of the optical transmission line; and/or a reflecting surface that is formed at another end in the direction of the length of the optical transmission line and bends an optical path of the exiting beam transmitted in the direction of the length of the optical transmission line, substantially 90 degrees so as to exit in a direction parallel to the direction of the thickness of the optical transmission line.

21. An optical device according to claim 1, wherein the optical transmission line includes: a prism that is formed at one end in the direction of the length of the optical transmission line and bends, in the direction of the length of the optical transmission line, an optical path of the incident beam incident in a direction inclined in the direction of the thickness of the optical transmission line; and/or a prism that is formed at another end in the direction of the length of the optical transmission line and bends an optical path of the exiting beam transmitted in the direction of the length of the optical transmission line, so as to exit in a direction inclined in the direction of the thickness of the optical transmission line.

22. An optical device according to claim 1, wherein the optical transmission line has a plurality of eigenmodes in the direction of the thickness of the optical transmission line.

23. An optical device according to claim 1, wherein the optical transmission line has a thickness of not less than 20 μm.

24. An optical device according to claim 1, wherein the optical transmission line is curved so that a central position in the direction of the thickness of the optical transmission line always draws the same curve on given two different cross sections including the direction of the length of the optical transmission line and the direction of the thickness of the optical transmission line.

25. An optical device according to claim 1, wherein the optical transmission line is twisted so that a central position in the direction of the thickness of the optical transmission line draws different curves on given two different cross sections including the direction of the length of the optical transmission line and the direction of the thickness of the optical transmission line.

26. A method of manufacturing an optical device that connects, by a signal beam, between an externally inputted input signal and an output signal to be outputted, wherein the optical device comprises
a sheet-form optical transmission line having a refractive index distribution such that a highest refractive index part is provided in a direction of a thickness of the optical transmission line and a refractive index does not increase with distance from the highest refractive index part in the direction of the thickness of the optical transmission line,
wherein a signal beam corresponding to the input signal is made incident on the optical transmission line as an incident beam,
wherein inside the optical transmission line, the incident beam is transmitted, in a direction of a length of the optical transmission line that is orthogonal to the direction of the thickness of the optical transmission line, in multiple modes having a plurality of eigenmodes in a direction of a width of the optical transmission line that is orthogonal to both the direction of the length of the optical transmission line and the direction of the thickness of the optical transmission line, and an exiting beam is generated by the plurality of eigenmodes interfering with each other in the direction of the length of the optical transmission line,
wherein the exiting beam is made to exit from the optical transmission line, and the output signal corresponding to the exiting beam is outputted,
wherein the optical transmission line has a refractive index distribution such that a central position in the direction of the thickness of the optical transmission line has the highest refractive index and the refractive index does not increase with distance from the central position, wherein the optical transmission line is made of polysilane, and the refractive index distribution is provided by an oxygen concentration distribution when the polysilane is cured, and wherein the optical device manufacturing method comprises:

a first step of preparing a forming die that is made of a material capable of transmitting an energy to be applied to cure a resin of which the optical transmission line is made, and includes a concave portion having at least the same depth as the direction of the thickness of the optical transmission line;

a second step of filling the concave portion with the resin;

a third step of applying the energy in a predetermined quantity to the forming die filled with the resin, from above and below in the direction of the thickness of the optical transmission line; and a fourth step of, on the resin cured with a desired refractive index distribution being formed, determining at least a size in the direction of the length of the optical transmission line and forming a part of connection of the incident and exiting beams in order to form the resin into the optical transmission line.

27. An optical device manufacturing method according to claim 26, wherein in the third step, the application of the energy is an application of an ultraviolet ray of a predetermined wavelength, and wherein in the first step, the prepared forming die is made of a material that is transparent with respect to the ultraviolet ray of the predetermined wavelength.

28. An optical device manufacturing method according to claim 26, wherein in the third step, the application of the energy is heating.

29. An optical device manufacturing method according to claim 26, wherein the refractive index distribution changes substantially along a quadratic function.

30. An optical device manufacturing method according to claim 26, wherein in the first step, the forming die includes a concave portion having a size including a plurality of optical transmission lines to be manufactured, and wherein in the fourth step, a plurality of optical transmission lines are simultaneously manufactured by cutting the resin.

31. An optical device manufacturing method according to claim 26, wherein in the first step, the forming die includes a concave portion having a size substantially equal to a size, in the direction of the width of the optical transmission line, of the optical transmission line to be manufactured, and wherein in the fourth step, the size in the direction of the length of the optical transmission line is determined by cutting the resin.

32. An optical device manufacturing method according to claim 26, wherein in the first step, the forming die includes a concave portion having a size substantially equal to a size of the optical transmission line to be manufactured, and wherein in the fourth step, a wall, of the concave portion, situated in a position where the incident beam and the exiting beam are made incident and made to exit on and from the optical transmission line is removed.

33. An optical device manufacturing method according to claim 26, further comprising a fifth step of releasing the optical transmission line from the forming die either before or after the fourth step.

* * * * *